US005805981A

United States Patent [19]

Sugio et al.

[11] Patent Number: 5,805,981

[45] Date of Patent: Sep. 8, 1998

[54] COMMUNICATION TERMINAL AND COMMUNICATION SYSTEM WITH IMAGE DISPLAY AND IMAGE STORAGE SECTION

[75] Inventors: Naoaki Sugio, Fussa; Morihiko Hayakawa, Tachikawa; Kazuyoshi Maehara, Fussa; Oh Takahashi, Tanashi; Katsuya Sakamaki, Tachikawa; Hiroyuki Nakamura, Akishima; Shouichi Nagatomo, Fussa, all of Japan

[73] Assignee: Casio Computer Co., Ltd., Tokyo, Japan

[21] Appl. No.: 457,093

[22] Filed: Jun. 1, 1995

[30] Foreign Application Priority Data

| | | | |
|---|---|---|---|
| Jun. 6, 1994 | [JP] | Japan | 6-123754 |
| Jun. 7, 1994 | [JP] | Japan | 6-125047 |
| Jun. 10, 1994 | [JP] | Japan | 6-129320 |
| Jun. 10, 1994 | [JP] | Japan | 6-129369 |
| Jun. 21, 1994 | [JP] | Japan | 6-139080 |
| Jun. 21, 1994 | [JP] | Japan | 6-139081 |
| Jun. 21, 1994 | [JP] | Japan | 6-139083 |
| Jul. 14, 1994 | [JP] | Japan | 6-162367 |
| Jan. 31, 1995 | [JP] | Japan | 7-014250 |

[51] Int. Cl.[6] .......... H04Q 7/14

[52] U.S. Cl. .......... 455/38.4; 340/825.44; 345/116

[58] Field of Search .......... 455/38.1, 38.4; 345/116; 340/825.44, 825.45

[56] References Cited

U.S. PATENT DOCUMENTS 5,087,905 2/1992 Kuramatsu et al. .......... 340/311.1

FOREIGN PATENT DOCUMENTS

WO-A-89 10610 11/1989 WIPO .

WO-A-91 03885 3/1991 WIPO .

*Primary Examiner*—Melvin Marcelo

*Attorney, Agent, or Firm*—Frishauf, Holtz, Goodman, Langer & Chick

[57] ABSTRACT

A pager comprises a receiver for receiving an image designating code together with a message, a display section, a memory for storing a plurality of images, and a CPU for, based on the image designating code received by the receiver, selecting an associated image and displaying the image together with the message on the display section. When a ringing signal transmitted from a base station is directed to this pager, the pager acquires a subsequent message and displays the associated image together with the message when the message contains an image designating code.

18 Claims, 104 Drawing Sheets

| | KEYWORD | CODE SEQUENCE | PORTRAIT CODE | | | DISPLAY |
|---|---|---|---|---|---|---|
| 1ST GROUP (JOY) | ENJOY | 1039203050 | 22 | 25 | 26 |  |
| | LIKE | 37293610 | | | | |
| | LOVE | 37305710 | | | | |
| | OK | 3036 | | | | |
| | AGREED | 162748101019 | | | | |
| | PLAY | 46371650 | | | | |
| 2ND GROUP (ANGER) | ANGRY | 1639274850 | 32 | 29 | 28 |  |
| | PISSED | 462949491019 | | | | |
| | REJECT | 481020101840 | | | | |
| | DESIST | 191049294940 | | | | |
| | TROUBLE | 40483056173710 | | | | |
| | HATE | 28164010 | | | | |
| 3RD GROUP (PITY) | LONELY | 373039103750 | 30 | 27 | 31 |  |
| | SORRY | 4930484850 | | | | |
| | MISS | 38294949 | | | | |
| | CANCEL | 181639181037 | | | | |
| | CHANGE | 182816392710 | | | | |
| | LATE | 37164010 | | | | |
| 4TH GROUP (COMFORT) | CALL | 18163737 | 23 | 21 | 24 |  |
| | FINE | 26293910 | | | | |
| | FUN | 265639 | | | | |
| | GO | 2730 | | | | |
| | MORNING | 38304839293927 | | | | |
| | NIGHT | 3929272840 | | | | |

| MASSAGE CODES | STANDARD MASSAGES | MASSAGE | STANDARD MESSAGES |
|---|---|---|---|
| 01 | URGENT | 11 | I'LL GO EARLIER |
| 02 | CALL ME | 12 | I'LL GO HOME |
| 03 | RETURN | 13 | I'LL BE LATE |
| 04 | MEET | 14 | VISITOR |
| 05 | GO EARLIER | 15 | TROUBLE |
| 06 | GO SOON | 16 | APPOINTMENT OK |
| 07 | CANCEL | 17 | I'LL GO SOON |
| 08 | CHANGE | 18 | OK |
| 09 | SEND FAX | 19 | MISS |
| 10 | WAIT | 20 | AGREED |

FIG.3

| TELEPHONE NUMBERS | NAMES | PORTRAITS |
|---|---|---|
| 123-4567 | SUGIO |  |
| 333-3333 | |  |
| 444-4444 | AOKI | |
| 555-5555 | SAITO |  |
| 666-6666 | | |

Da Db Dc Dd

| TELEPHONE NUMBERS | NAMES | PORTRAITS | FLAGS |
|---|---|---|---|
| 123-4567 | SUGIO |  | 1 |
| 333-3333 | YAMADA |  | 2 |
| 444-4444 | AOKI | | 3 |
| 555-5555 | SAITO |  | 1 |

| TELEPHONE NUMBERS (Da1) | NAMES (Db1) | PORTRAITS (Dc1) |
|---|---|---|
| 123-4567 | SUGIO |  |
| 333-3333 | YAMADA |  |
FIG.17A
| TELEPHONE NUMBERS (Da2) | COMPANY NAMES (Db2) | COMPANY EMBLEM (Dc2) |
|---|---|---|
| 123-4567 | AAA INC. | ◎ |
| 333-3333 | BBB INC. | × |
FIG.17B
| | | |
|---|---|---|
| FOR PERSON | FLAG | Dd1 |
| FOR COMPANY | FLAG | Dd2 |
FIG.17C

MOVING DIRECTION BY SELECT KEY →

MOVING DIRECTION BY MODE KEY ↓

| | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | : | ' | ? | . |
| 7 | マ | ミ | ム | メ | モ | ァ | ィ | ェ | ォ | ッ |
| 8 | ヤ | ( | ユ | ) | ヨ | ャ | ュ | ョ | _ | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

FIG.23

| | PORTRAIT | SELF-MADE STANDARD MESSAGE |
|---|---|---|
| 31 |  | PLEASE WAIT |
| 40 |  | |
| 64 |  | · · · |
| 33 |  | |
| 55 | | GO HOME |

| | | 1 | 0 |
|---|---|---|---|
| HUMAN | 0 |  | |
| MOVE (RIGHT) | 1 |  | |
| MOVE (LEFT) | 2 |  | |
| SWEAT | 3 |  | |
| BUILDING | 4 |  | |
| STATION | 5 |  | |
| COMPANY | 6 | OFFICE | |
| TELEPHONE BOX | 7 |  | |
| RESTAURANT | 8 |  | |
| THEATER | 9 |  | |

| | DYNAMIC PICTURE PATTERN | SELF-MADE STANDARD MESSAGE | FLAG |
|---|---|---|---|
| 96 |  | SORRY | |
| 77 |  | | |
| 32 |  | WAIT AT STATION | 0 |
| 55 | | COME | |
| 84 |  | GOOD MORNING | 1 |

| MESSAGE NO. | CONTENTS | CODE SEQUENCE |
|---|---|---|
| 01 | URGENT | 564827103940 |
| 02 | CALL ME | 18163737803810 |
| 03 | RETURN | 481040564839 |
| 04 | MEET | 38101040 |
| 05 | GO EARLIER | 27308010164837299991048 |
| 06 | GO SOON | 27308049303039 |
| 07 | CANCEL | 181639181037 |
| 08 | CHANGE | 182816392710 |
| 09 | SEND FAX | 4910391980261659 |
| 10 | WAIT | 58162940 |
| 11 | I'LL GO EARLIER | 296837378027308010164837291048 |
| 12 | I'LL GO HOME | 2968373780273080283 03810 |
| 13 | I'LL BE LATE | 29683737801710803716 4010 |
| 14 | VISITOR | 57294929403048 |
| 15 | TROUBLE | 40483056173710 |
| 16 | APPOINTMENT OK | 164646302939403810394080 3036 |
| 17 | I'LL GO SOON | 2968373780273080493030 39 |
| 18 | OK | 3036 |
| 19 | MISS | 38294949 |
| 20 | AGREED | 162748101019 |

FIG.86

| ROW / COLUMN | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | : | ' | ? | . |
| 7 | マ | ミ | ム | メ | モ | ァ | ィ | ェ | ォ | ッ |
| 8 | ヤ | ( | ユ | ) | ヨ | ャ | ュ | ョ | _ | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

FIG.87

| | KEYWORD | CODE SEQUENCE | PORTRAIT CODE | | | DISPLAY |
|---|---|---|---|---|---|---|
| 1ST GROUP (JOY) | ENJOY | 1039203050 | 22 | 25 | 26 |  |
| | LIKE | 37293610 | | | | |
| | LOVE | 37305710 | | | | |
| | OK | 3036 | | | | |
| | AGREED | 162748101019 | | | | |
| | PLAY | 46371650 | | | | |
| 2ND GROUP (ANGER) | ANGRY | 1639274850 | 32 | 29 | 28 |  |
| | PISSED | 462949491019 | | | | |
| | REJECT | 481020101840 | | | | |
| | DESIST | 191049294940 | | | | |
| | TROUBLE | 40483056173710 | | | | |
| | HATE | 28164010 | | | | |
| 3RD GROUP (PITY) | LONELY | 373039103750 | 30 | 27 | 31 |  |
| | SORRY | 4930484850 | | | | |
| | MISS | 38294949 | | | | |
| | CANCEL | 181639181037 | | | | |
| | CHANGE | 182816392710 | | | | |
| | LATE | 37164010 | | | | |
| 4TH GROUP (COMFORT) | CALL | 18163737 | 23 | 21 | 24 |  |
| | FINE | 26293910 | | | | |
| | FUN | 265639 | | | | |
| | GO | 2730 | | | | |
| | MORNING | 38304839293927 | | | | |
| | NIGHT | 3929272840 | | | | |

COMMUNICATION TERMINAL AND COMMUNICATION SYSTEM WITH IMAGE DISPLAY AND IMAGE STORAGE SECTION

BACKGROUND OF THE INVENTION

1. Field of the Invention

The present invention relates to a communication terminal and a communication system, and, more particularly, to a pager capable of displaying an image like a portrait and a paging system for the pager.

2. Description of the Related Art

Known systems for transmitting information such as numerals and characters include a paging system, a teleterminal system and a digital portable telephone system. Of those systems, the paging system is very popular as personal communication means as well as business communication means because portable terminals (pagers) are compact and light and their services charges are inexpensive although the paging system is a one-way communication system.

Pagers with a display function include an NP pager (Numeric Pager) type capable of displaying numerical information and an IP page (Information Pager) type capable of displaying character information. A telephone, a personal computer and the like are used as means for calling a pager and inputting a message to be displayed. There are companies which process transmission information, operation service companies and the like.

Information prepared by a telephone, a personal computer or the like is transmitted via a public telephone line to a pager service company. The pager service company converts the received information to a radiowave of a predetermined signal system, e.g., the POCSAG system, and transmits the radiowave.

The NP type pager informs the user of a ringing (calling) by some sound and displays a sequence of numbers included in the received signal. While an IP type pager informs the user of a call by some sound and displays character information included in the received signal. With the use of the NP type or IP type page, a message formed by a sequence of numbers or character information can be displayed on the pager and can thus be transmitted to the pager owner.

In a paging system using pagers which can display character information and a sequence of numerals, only one way of informing the users of the importance, urgency and the like of the received message is to change the ring back tone informing the user of a ringing. Therefore, the conventional pagers suffer poor expressions and have a difficulty in clearly informing the users of callers, the urgency or importance of a message, or the intentions or feeling of the callers.

This shortcoming is common to other types of communication terminals and communication systems which transmit information in the form of characters, numerals, symbols or the like.

SUMMARY OF THE INVENTION

Accordingly, it is an object of the present invention to provide a communication terminal and a communication system which are better in operability.

It is another object of the present invention to provide a communication terminal and a communication system which can clearly inform a user of the urgency and/or importance of a message, a caller and the like.

It is a further object of the present invention to provide a communication terminal and a communication system which can transmit a message specifying the sender of the message, the section where the sender belongs, the feeling and/or intentions of the sender and the name of the sender.

To achieve the above objects, a communication terminal according to one aspect of this invention comprises:

- receiving means for receiving an image designating code;
- display means for displaying data;
- image storage means for storing a plurality of images; and
- display control means for reading image data corresponding to the image designating code, received by the receiving means, from the image storage means and displaying the image on the display means.

With the above structure, an image corresponding to a specific image designating code can be displayed on the display means in the receiving apparatus like a pager. This structure allows a sender to transmit his or her feeling and/or intentions by means of a portrait representing a human expression or to transmit a business or a matter of business in the form of an image.

If a typical message including characters, numerals, symbols and the like is received and displayed together with an image, it is possible to express a business or a matter of business more surely.

The images may be dynamic pictures or pseudo dynamic pictures by switchingly displaying a plurality of pictures.

A sequence of codes corresponding to an image may be prepared for the purpose of allowing a receiver to display the image.

A communication system according to another aspect of this invention comprises:

- input means for inputting a message including at least one of characters, numerals and symbols;
- transmission means for converting the message, input through the input means, to a signal of a predetermined format and transmitting the signal; and
- a communication terminal for receiving the signal transmitted from the transmission means, determining if the signal is directed to the communication terminal itself, and obtaining and displaying the message when determining that the signal is directed to the communication terminal itself,
- the input means including means for inputting message including an image designating code for designating a display image,
- the communication terminal including:
  - receiving means for receiving the message and the image designating code;
  - display means for displaying data;
  - image storage means for storing a plurality of images; and
  - display control means for selecting image corresponding to the image designating code, received by the receiving means, from the plurality of images stored in the image storage means based on the image designating code, and displaying the image on the display means.

The communication system like a paging system, which has the above structure, can send an arbitrary image designating code to permit an arbitrary image to be displayed on the display means of the communication terminal. It is therefore possible to transmit the feeling of a sender to a receiver in the form of a portrait representing a human expression or to transmit the sender's business or matter of business in the form of an image.

If a typical message includes characters, numerals, symbols and the like is received and displayed together with an image, it is possible to express a business or a matter of business more surely. The images may be dynamic pictures or pseudo dynamic pictures by switchingly displaying a plurality of images.

A sequence of codes to be transmitted may be prepared in the communication terminal for the purpose of allowing a receiver to display an arbitrary image.

BRIEF DESCRIPTION OF THE DRAWINGS

FIG. 3 is a diagram exemplifying a standard message table stored in a ROM 19;

FIGS. 17A through 17C are diagrams showing memory areas in a RAM 20 in a pager according to an embodiment 1-4;

FIG. 23 is a diagram showing a self-made standard message code matrix stored in the ROM 19 in the pager according to the second embodiment;

FIG. 86 is a diagram exemplifying a standard message table used in an eighth embodiment;

FIG. 87 is a diagram showing an example of a free message code matrix used in the eighth embodiment;

DETAILED DESCRIPTION OF THE PREFERRED EMBODIMENTS

Preferred embodiments of the present invention will now be described referring to the accompanying drawings.

Embodiment 1-1

Figure 1:
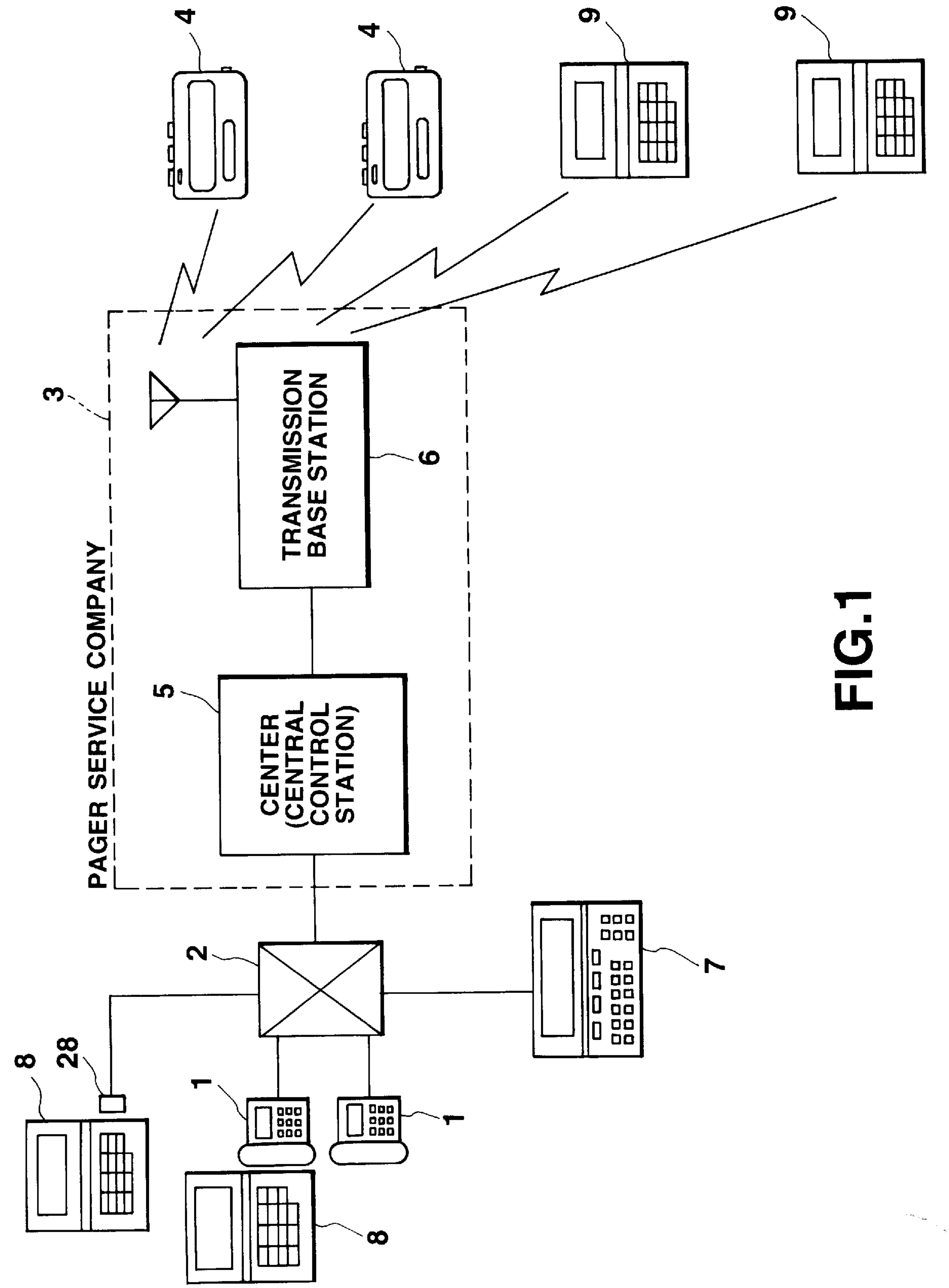
FIG. 1 is a diagram showing one example of a communication system to which the present invention is applied.

FIG. 1 shows the structure of a pager service system according to this embodiment.

As illustrated, telephone terminals 1 like push-phones, a personal computer 7, a modular Jack 28 connected to a pager 8 or the like, which are provided to make a call and input a message, are connected via a public telephone line 2 or the like to a center (central control station) 5 controlled by a pager service company 3. The center 5 is connected to a transmission base station 6. In the illustrated system, calling targets are a plurality of pagers 4 and 9 located in the area under the control of the pager service company 3. When a ringing (calling) code for calling a specific pager or pages 4 and 9 is input from the telephone terminal 1 or the personal computer 7, this ringing code is sent via the public telephone line 2 to the center 5. The center 5 converts the received ringing code to a calling signal of the POCSAG standards and sends it to the transmission base station 6. The transmission base station 6 converts the supplied calling signal to a radio frequency signal and broadcasts the signal. Each pager 4 or 9 intermittently receives the radio frequency signal broadcasted from the transmission base station 6 at a time slot designated by the frame data and determines if the ringing signal included in the radio frequency signal matches with the ringing code assigned to itself. The pager 4 or 9 which has determined that there is a match informs the user of ringing by a tone, light, vibration, display or the like. If message data follows the ringing signal, the pager 4, receives the massage data and displays a message in accordance with this message data.

Figure 2:
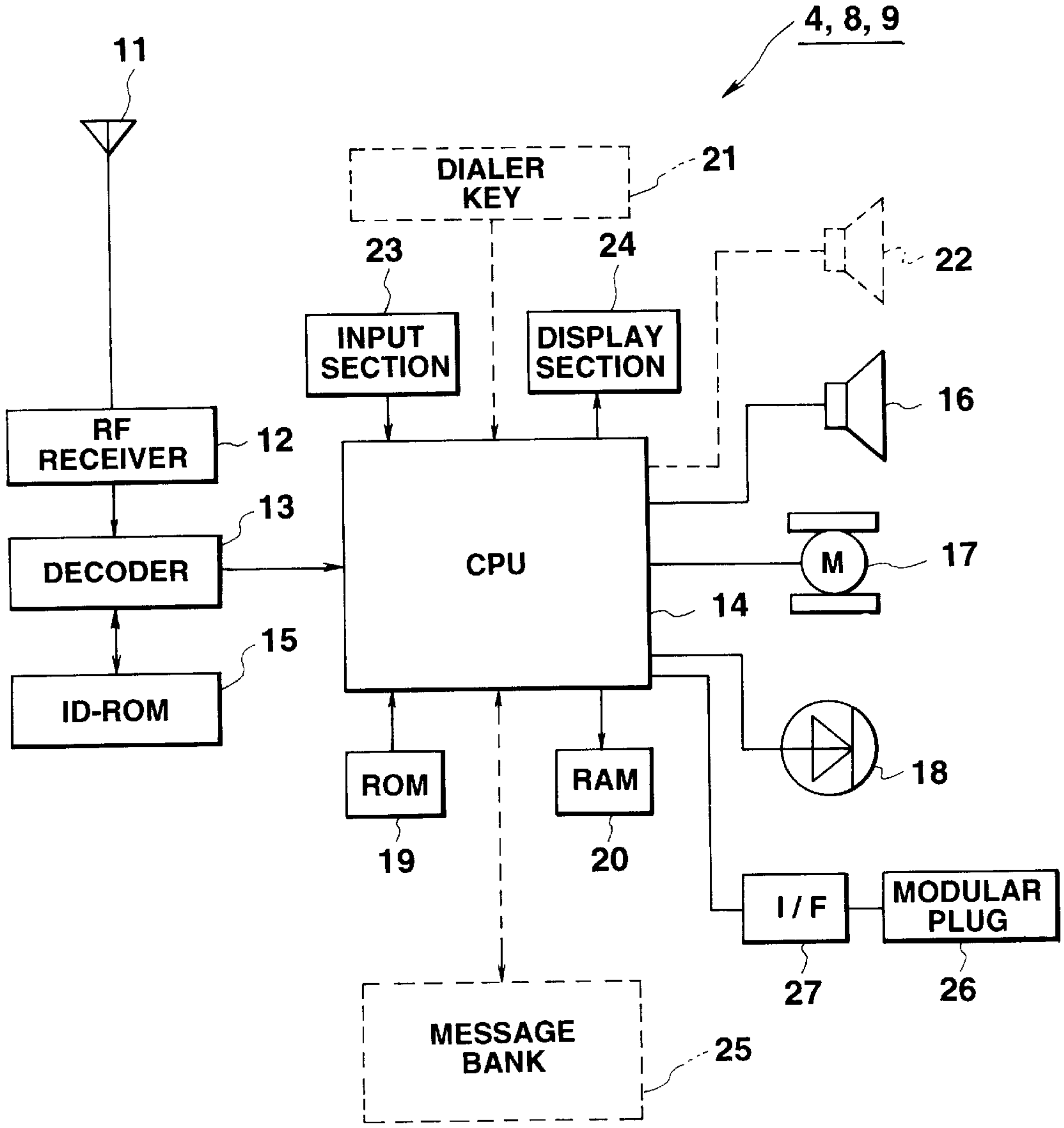
FIG. 2 is a circuit diagrams showing the structure of one example of pager used in this invention.

FIG. 2 shows the circuit structure of the pager 4 of the embodiment. As illustrated, the pager 4 has an antenna 11, an RF (Radio Frequency) receiver 12, a decoder 13, a CPU (control section) 14, an ID (IDentification)-ROM 15, a loudspeaker 16, a vibrator 17, an LED 18, a ROM 19, a RAM 20, an input section 23, and a display section 24.

The RF receiver 12 demodulates a radiowave received at the antenna 11. The ID-ROM 15 stores data particularly assigned to the target pager 4, more specifically, frame data, address data and the like. The decoder 13 collates a ringing signal included in the demodulated, received signal with data stored in the ID-ROM 15, and outputs a ringing detection signal to the CPU 14 when both matches with each other. When message data follows the ringing signal, the decoder 13 also outputs this message data to the CPU 14. The CPU 14 controls the individual circuits; for example, it obtains message data and displays the message in accordance with the message data on the display section 24.

The input section 23 has a plurality of operation keys and a power switch. When any operation key is operated, a key operation signal is supplied to the CPU 14. In accordance with this key operation signal, the CPU 14 drives and controls the display section 24.

The display section 24 has a liquid crystal (LC) panel, an LC panel driver and a display buffer. Other display elements than the LC display, such as an EL display and plasma display, may be used as the display section 24.

Figure 4:
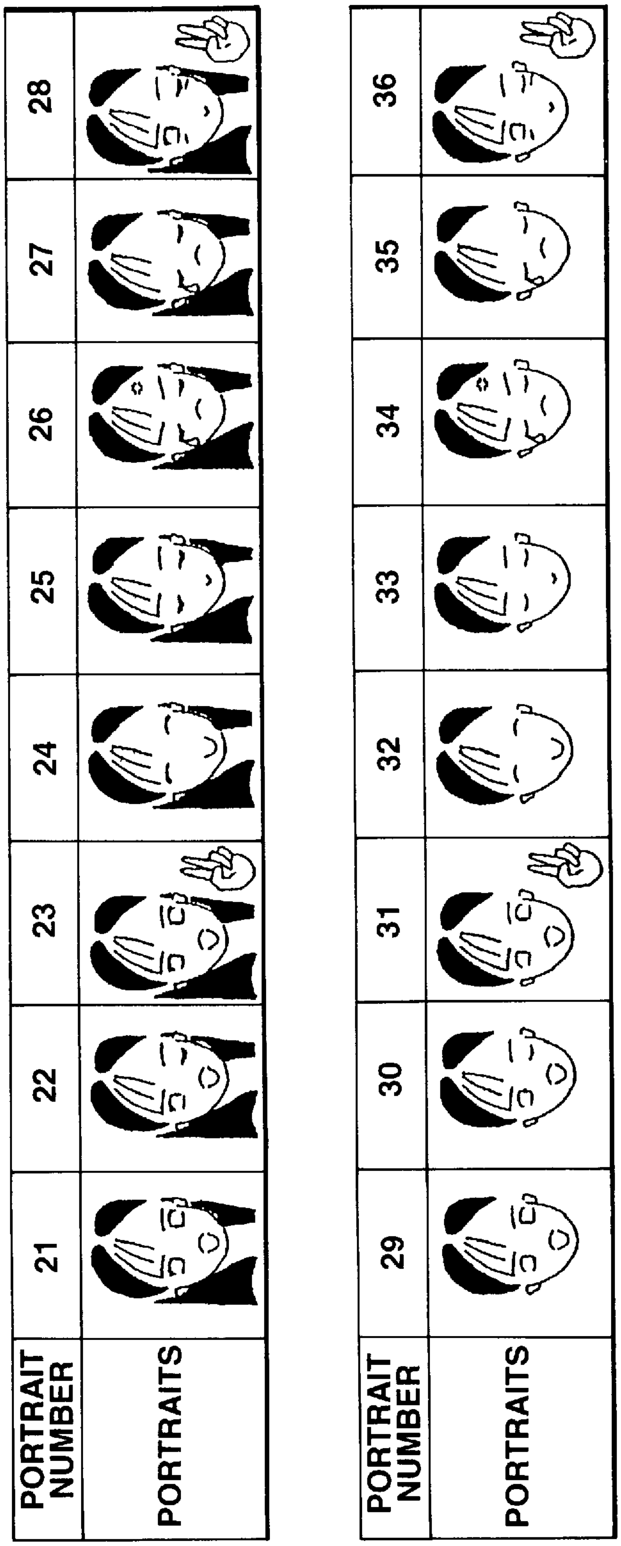
FIG. 4 is a diagram exemplifying a portrait table stored in the ROM 19.

The ROM 19 holds a program or the like for controlling the CPU 14, a standard message table as shown in FIG. 3 and a portrait table as shown in FIG. 4. The standard message table stores message codes “01” to “20” and standard messages in association with one another, as shown in FIG. 3. The portrait table stores portrait codes “21” to “36” and portraits in association with one another, as shown in FIG. 4.

The data for displaying portraits is control data for defining the selective operations of a plurality of display segments of a liquid crystal display (LCD) element constituting the display section 24, namely, the activation (ON action) and deactivation (OFF action) of the display segments. Prepared as portraits are some types of expression patterns of each of a man and a woman.

The RAM 20 has a memory area for storing message data or the like received by the target pager 4.

The loudspeaker 16 has a driver and a buffer, and generates a tone when the ringing signal is received. The vibrator 17 vibrates when the ringing signal is received. The LED 18 is lit or blinks when the ringing signal is received.

In FIG. 2, a dialer key 21 and a dialer key speaker 22 are provided with the pages 8 and 9 having a function for forming a message, converting the message to a dialing tone signal and transmitting the message as the dialing tone signal. A message bank 25 is a storage section to store arbitrary portraits and self-made standard message when prepared. A modular plug 26 and an interface 27 are provided with the pages 8 and 9 for transmitting codes by connecting the modular jack 28 and modular plug 26 with each other. (The dialer key 21, dialer key speaker 22, message bank 25, modular plug 26 and interface 27 are not used in this embodiment, but are used in some embodiments which will be discussed later.)

Figure 5:
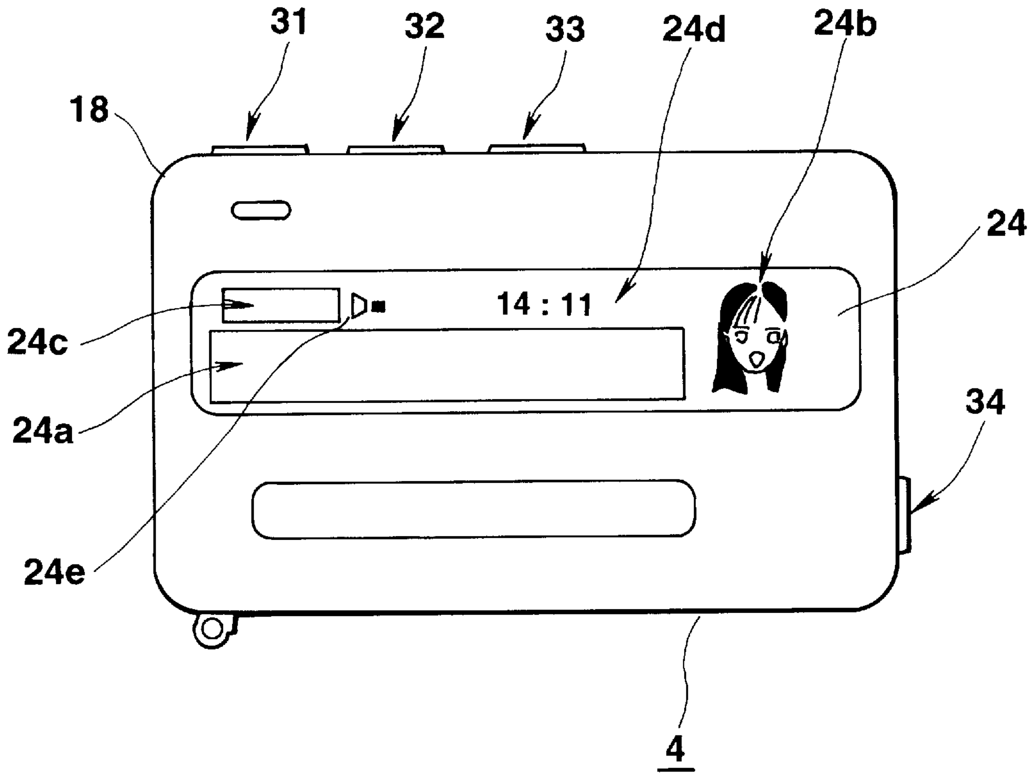
FIG. 5 is a diagram exemplifying the appearance of a pager according to one embodiment of this invention.

FIG. 5 shows the appearance of the pager 4. As illustrated, the pager 4 has the display section 24 on one major surface with a set key 31, a select key 32 a mode key 33 at the top and a power key 34 at one side.

The display section 24 has a character message display area 24*a* for displaying a character-based message, a portrait display area 24*b* for displaying a portrait, a control information display area 24*c* for displaying control information, a time display area 24*d* for displaying the current time or reception time, and a symbol display area 24*e* for displaying a symbol when receiving a ringing signal.

The portrait display area 24*b* is constituted of a segment display section for displaying sixteen types of portraits shown in FIG. 4. The portrait display area 24*b* may be constituted of a dot matrix display section, in which case control data for displaying the portrait is stored in a dot pattern form in the ROM 19.

The set key 31 is for setting and registering data to be selected. The select key 32 serves to select arbitrary data. The mode key 33 serves to switch the operation mode.

A description will now be given of the procedures for transmitting a message to the pager 4 in the paging system having the above-described structure.

There are two types of messages to be displayed: an ordinary message which is the transmitted message directly displayed by the pager 4 on the receiver side, and a message of a standard format, which is obtained by restoring a message or an image in a predetermined form previously stored in the pager 4 on the receiver side based on the transmitted data and is then displayed. In sending a message of a standard format, a predetermined "standard format designating code" including "*" is input as will be described below.

First, the user inputs the ringing code of the target pager 4 from the push-phone 1, personal computer 2 or the like. Then, the user input a message. The following are available messages:

(1) no message (only inform ringing), (2) an ordinary message, (3) any of standard messages shown in FIG. 3, (4) any of portraits shown in FIG. 4, and (5) any combination of the portraits shown in FIG. 4 and the standard messages shown in FIG. 3.

In the case of (1), the user inputs the ringing code. In the case of (2), the user inputs an ordinary message, e.g., numerals, sequentially after inputting the ringing code. In the case of (3), after inputting the ringing code, the user inputs standard message data including a standard message designating code "*4*4" which indicates that the subsequent data is a standard message, and an arbitrary one of message codes in the standard message table shown in FIG. 3. In the case of (4), after inputting the ringing code, the user inputs portrait data including a portrait designating code "*5*5" which indicates that the subsequent data is a portrait code and an arbitrary one of portrait codes in the portrait table shown in FIG. 4. In the case of (5), the user inputs a standard message in the manner described in the case of (3), and then inputs a portrait in the manner described in the case of (4).

The input ringing code and message data are sent via the public telephone line 2 to the center 5. The center 5 converts the received data to a signal of the POCSAG standards and sends the signal to the transmission base station 6. Then, the transmission base station 6 converts this signal to a radio frequency signal and broadcasts the signal.

Figure 6:
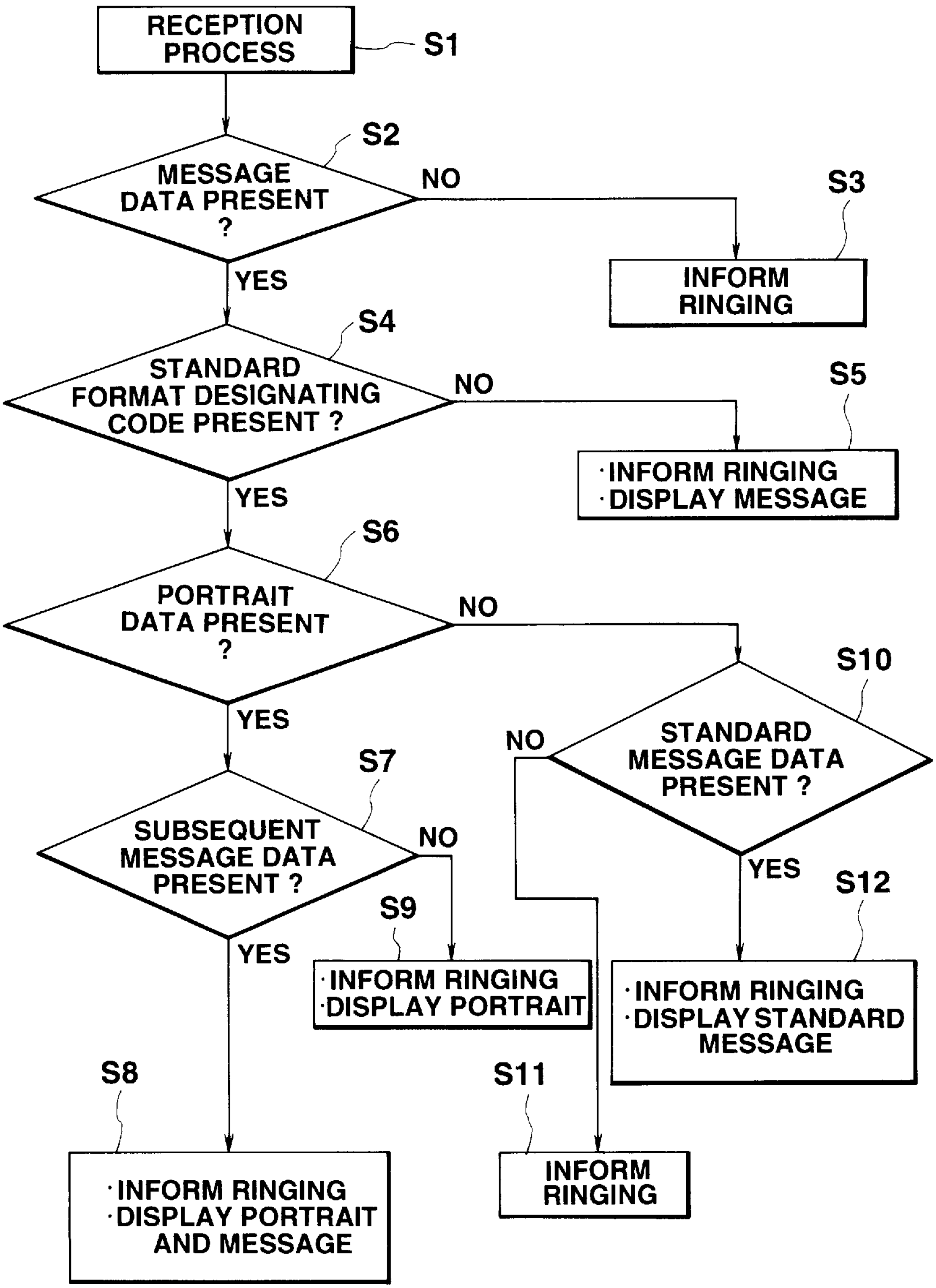
FIG. 6 is a flowchart for explaining the reception operation of a pager according to an embodiment 1-1 of this invention.

The reception operation of the pager 4 according to this embodiment will now be described with reference to the flowchart in FIG. 6.

First, the reception process is performed in step S1. More specifically, each pager 4 receives a radio frequency signal, sent from the transmission base station 6, at the antenna 11, and demodulates the received signal in the RF receiver 12. The decoder 13 detects the "ringing signal (address data) included in the received signal, collates it with the ID code (address data) stored in the ID-ROM 15. When there is a coincidence, the decoder 13 sends a ringing detection signal to the CPU 14. The CPU 14 executes a process starting at step S2 in response to this ringing detection signal.

In step S2, the CPU 14 detects if message data follows this ringing signal. If there is no subsequent message data, the CPU 14 display the symbol on the symbol display area 24*e* of the display section 24, and drives the loudspeaker 16, vibrator 17 and LED 18 to inform the user of the ringing.

When some message data follows the ringing signal, the CPU 14 controls the decoder 13 to continue the reception operation, and obtains the subsequent data, after which the flow proceeds to step S4.

The CPU 14 determines whether a standard format designating code "*4*4" or "*5*5" is present at the head of the received message data. As stated above, the standard format designating code "*4*4" serves to designate one of the standard messages in the standard message table shown in FIG. 3, and the standard format designating code "*5*5" serves to designate one of the portraits in the portrait in the portrait table shown in FIG. 4. When there is no standard format designating code "*4*4" or "*5*5", the CPU 14 displays a message (ordinary message) in accordance with the received message data on the display section 24 in step S5. The CPU 14 also displays the symbol on the display section 24 and drives the loudspeaker 16, vibrator 17 and LED 18 to inform the user of the ringing, and then stores the reception time and the received message data in the RAM 20. After this, the CPU 114 terminates this processing.

When it is determined in step S4 that the standard format designating code "*4*4" or "*5*5" is present at the head of the message, it is determined in step S6 if the message data immediately after the ringing signal is the portrait data including the portrait designating code "*5*5" and one of the portrait codes "21" to "36" to designate a portrait. When the portrait data does not exist, the flow proceeds to step S10. In step S10, it is determined if the message data immediately after the ringing signal is the standard message data including the standard format designating code "*4*4" and one of the message codes "01" to "20". When the message data does not exists, the CPU 14 drives the loudspeaker 16, etc. to inform the ringing and causes the message display area 24*a* to display that there is no message in step S11. Further, the reception time is saved in the RAM 20.

When it is determined in step S10 that the standard message data exists, the ringing is informed, and one of the standard messages shown in FIG. 3 which corresponds to the message code is displayed on the message display area 24*a*. Further, the reception time and the message code are saved in the RAM 20.

When it is determined in step S6 that there exits the portrait data, the flow proceeds to step S7 where it is determined if there is data (message) following that portrait data.

When it is determined in step S7 that there is subsequent data, the ringing is informed and (1) the portrait among those shown in FIG. 4 which is designated by the portrait code and the standard message among those shown in FIG. 3 which is designated by the message code are displayed on the display section 24 if the subsequent data is standard message data (the standard message designating code "*4*4" and the message code), or (2) the received message is displayed together with the portrait if the message data is ordinary message data in step S8. Further, the message data and a reception time are saved in the RAM 20 after which the processing is terminated.

When it is determined in step S7 that there is no subsequent data, the ringing is informed, the portrait corresponding to the portrait code is displayed on the display section 24, and the received message data and the reception time are stored in the RAM 20 in step S9. Thereafter, the processing is terminated.

Figure 7:
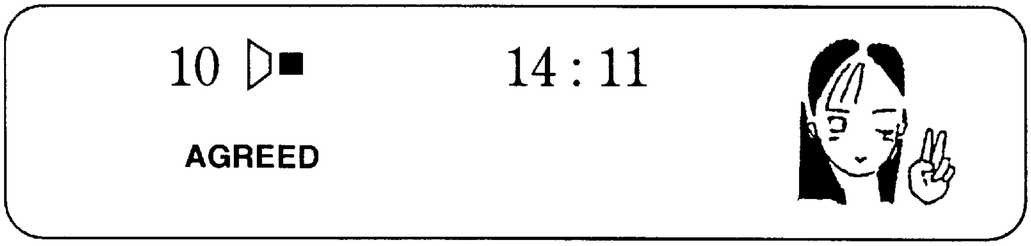
FIGS. 7 through 10 are diagrams showing display examples for the pager of the embodiment 1-1 in a reception mode.

FIG. 7 shows a display example in the case where message data "*5*528*4*420" has been received. This message data has the portrait code "28" following the portrait designating code "*5*5", and the message code "20" following the standard format designating code "*4*4". Therefore, the flow proceeds in the order of step S1→step S2→step S4→step S6→step S7→step S8. In step S8, the ringing is informed, the portrait which is assigned with the portrait code "28" and the standard message "AGREED" assigned with the message code "20" are read from the portrait table shown in FIG. 4 and the standard message table shown in FIG. 3 in the ROM 19 respectively, and the portrait and standard message are respectively displayed in the portrait display area 24*b* and the message display area 24*a* as shown in FIG. 7. Further, the received message data and the reception time are saved in the RAM 20.

Figure 8:
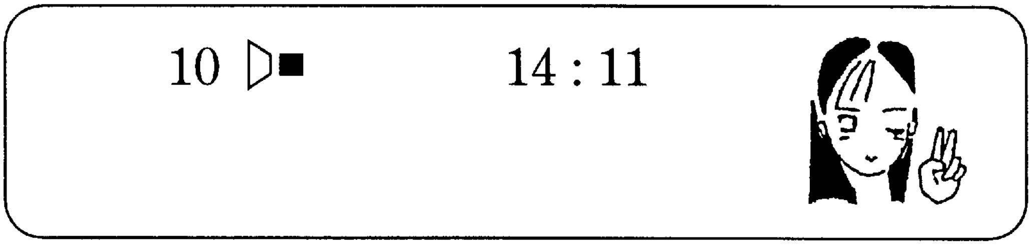

FIG. 8 shows a display example in the case where message data "*5*528" has been received. This message data has the portrait code "28" following the portrait designating code "*5*5". Therefore, the flow proceeds in the order of step S1→step S2→step S4→step S6→step S7→step S9. In step S9, after the ringing is informed, the portrait assigned with the portrait code "28" is read from the portrait table shown in FIG. 4 in the ROM 19, and is displayed in the portrait display area 24*b* as shown in FIG. 8. Further, the received message data and the reception time are saved in the RAM 20.

Figure 9:
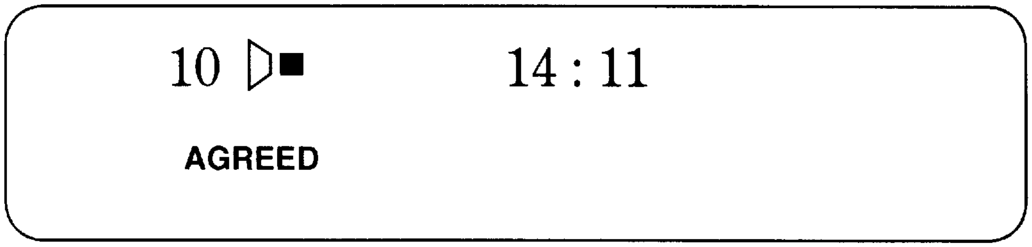

FIG. 9 shows a display example in the case where message data "*4*420" has been received. This message data has the message code "20" following the standard message designating code "*4*4". Therefore, the flow proceeds in the order of step S1→step S2→step S4→step S6→step S10→step S12. In step S12, after the ringing is informed, the standard message "AGREED" is read from the standard message table in the ROM 19 and is displayed in the message display area 24*a* in the display section 24 as shown in FIG. 9. Further, the received message data and the reception time are saved in the RAM 20.

Figure 10:
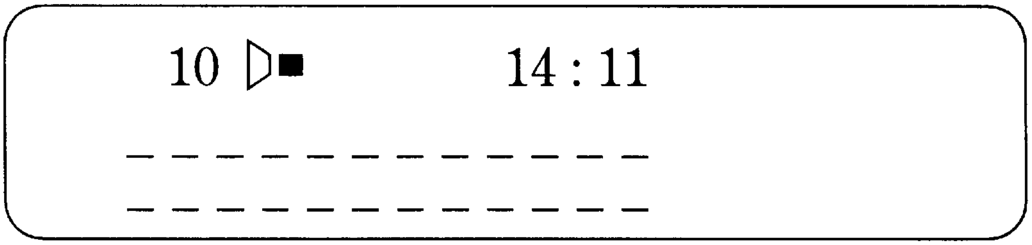

FIG. 10 shows a display example in the case where message data "*4*4" has been received. This message data has no data after the standard message designating code "*4*4". Therefore, the flow proceeds in the order of step S1→step S2→step S4→step S6→step S10→step S11. In step S11, the ringing is informed and an image indicating no message is displayed in the message display area 24*a*. Further, the received message data and the reception time are saved in the RAM 20.

As described above, the paging system and pager according to this embodiment can allow an arbitrary portrait to be selected from a plurality of portraits with different expressions and to be displayed on the pager. Accordingly, not only character information and a sequence of numerals but also the intention and feeling of the caller can be displayed as an image, i.e., a portrait on the pager, so that expressions can be given to the display contents of a message.

Embodiment 1-2

Although the example of displaying portraits with different expressions on a pager has been illustrated in the foregoing description of the embodiment 1-1, it is possible to display the portraits of different persons. The embodiment accomplishing the latter display function will be described below.

Figure 11:
FIG. 11 is a diagram showing a memory area in a RAM 20 used in an embodiment 1-2.
Figure 11:
Figure 11:

The basic structure of the internal circuitry of the pager 4 is the same as the structure shown in FIG. 2, except that the RAM 20 has memory areas where telephone numbers Da of a plurality of callers, names Db corresponding to the telephone numbers Da and portraits Dc are stored, as shown in FIG. 11 as well as an memory area for storing received message data. In FIG. 11, the portraits indicates the persons corresponding to the telephone numbers.

In this embodiment, a caller who calls the pager 4 first calls the center 5, for example, and then sequentially inputs the ringing code of the target pager 4, the telephone number designating code "*09" and the caller's own telephone number. The center 5 converts the ringing code, the telephone number designating code "*09" indicating that the subsequent code is a telephone number, and the caller's own telephone number to a signal of the POCSAG standards. Then, the transmission base station 6 converts this signal to a radio frequency signal and broadcasts the signal.

Figure 12:
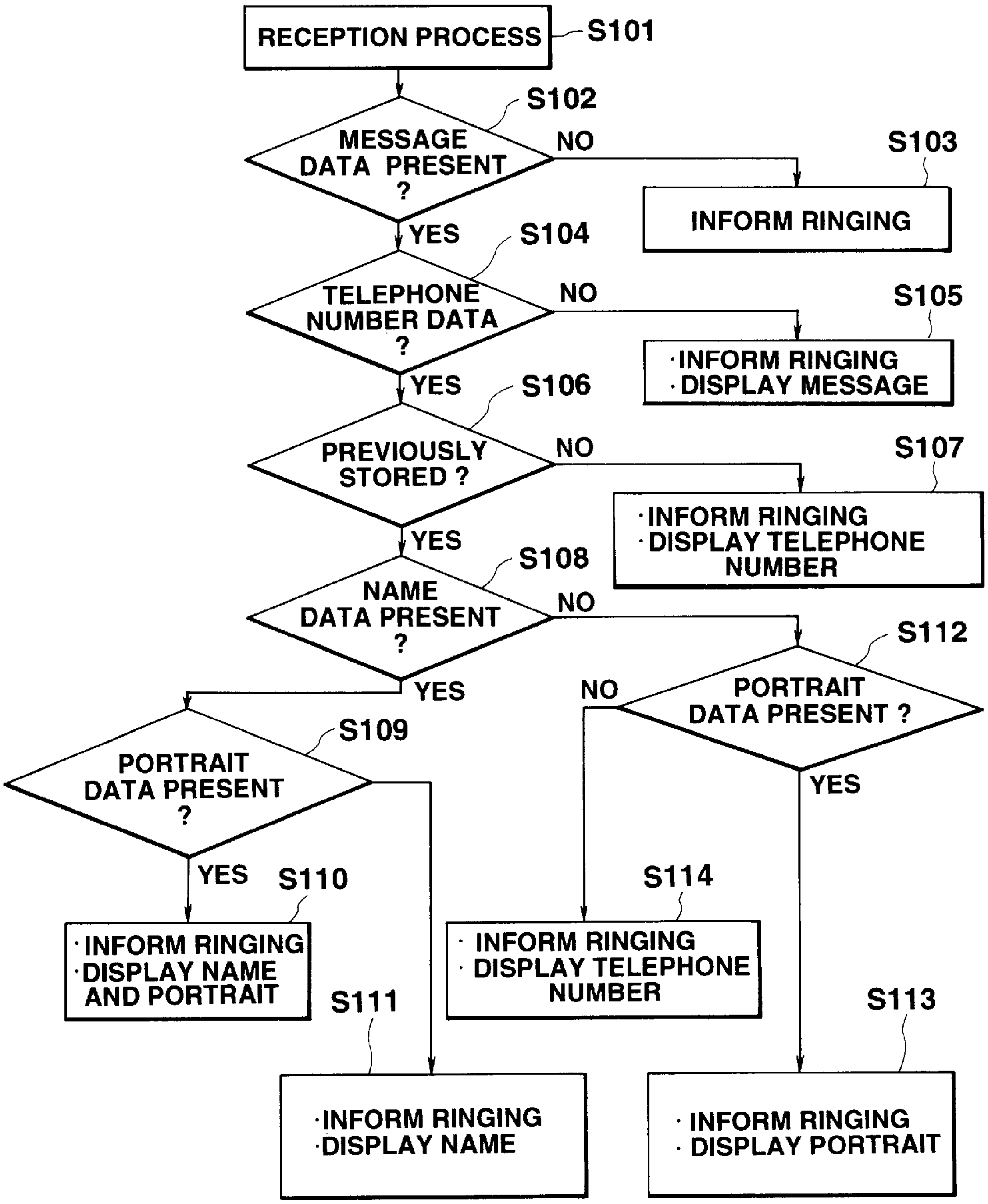
FIG. 12 is a flowchart for explaining the operation of the embodiment 1-2.

The operation of the pager according to this embodiment will now be described with reference to the flowchart in FIG. 12.

First, the same reception process as carried out in step S1 is performed in step S101. More specifically, the received, demodulated ringing signal is collated with the ID code stored in the ID-ROM 15, and when both match with each other, a ringing detection signal is sent to the CPU 14. In response to this ringing detection signal, the CPU 14 executes a process starting at step S102

Figure 13A:
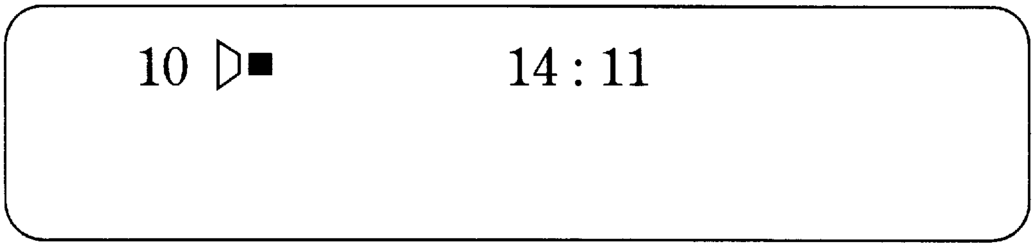
FIGS. 13A through 14D are diagrams showing display examples for the pager of the embodiment 1-2.

In step S102, the CPU 14 determines if message data follows this ringing signal. If there is no subsequent message data, the flow advances to step S103 to inform the ringing. The informing of the ringing is accomplished by means of any of the loudspeaker 16, the vibrator 17 and the LED 18, or by displaying the occurrence of the ringing event on the display section 24. FIG. 13A shows a display example of this case. Displayed on the display section 24 are the symbol indicating the occurrence of the ringing event and the time.

When it is determined in step S102 that message data follows the ringing signal, the flow proceeds to step S104. In step S104, it is determined if the message data after the ringing signal is telephone number data comprising a telephone number designating code "*9" and a telephone number, by determining whether or not the telephone number designating code, e.g., "*09", is located at the head of the message data.

Figure 13B:
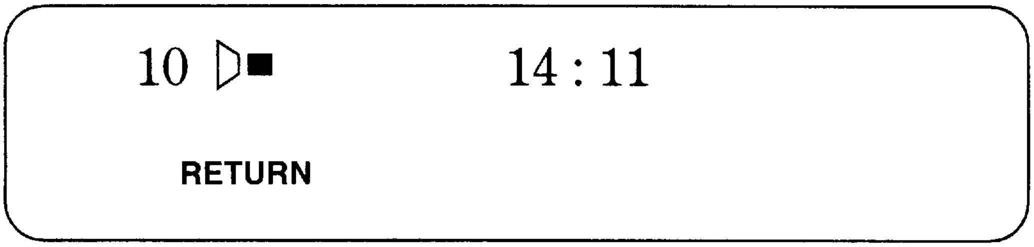

When the message data is not telephone number data, the flow moves to step S105 where the ringing is informed and a message in accordance with the received message data is displayed on the display section 24. Further, the received message data is stored in the RAM 20 after which the processing is terminated. FIG. 13B shows a display example when "*4*403" has been received as message data. In this case, the symbol indicating the informing of the ringing, the reception time and the message "RETURN" are displayed on the display section 24 in the step S105.

When the telephone number designating code "*09" is detected in step S104, the data following this code is determined as telephone number and the flow proceeds to step S106. In step S106, the telephone numbers stored in the area Da in FIG. 11 are searched for the telephone number whose lower four digits match with the lower four digits of the received telephone number.

Figure 13C:
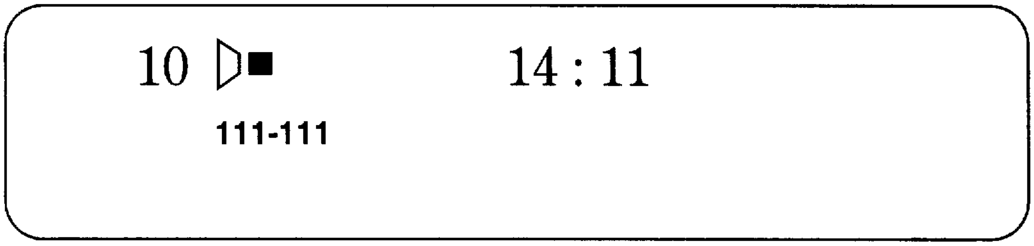

When no corresponding telephone number is found in this search, the flow goes to step S107 where the ringing is informed, and the received telephone number is displayed on the display section 24, and the telephone number and the reception data are stored in the RAM 20. Thereafter, the processing is terminated. FIG. 13C shows a display example in this case. Suppose that the telephone number designating code "*09" and "111-1111" have been received as message data. The telephone number whose lower four digits match with "1111", the lower four digits of the received telephone number, is not stored in the area Da in FIG. 11. Therefore, the symbol, the reception time and the telephone number "111-1111" are displayed on the display section 24.

When the target telephone number is searched out in the search in step S106, the flow proceeds to step S108 where it is determined if name corresponding to this telephone number is stored in the area Db.

When the corresponding name is stored there, the flow moves to step S109 where it is determined if the corresponding portrait is stored in the area Dc. When the corresponding portrait is stored there, the flow proceeds to step S110 where the ringing is informed, the received telephone number, the name and the portrait read from the ROM 19 are displayed on the display section 24. Further, those pieces of data are stored in the RAM 20 after which the processing is terminated.

Figure 14A:
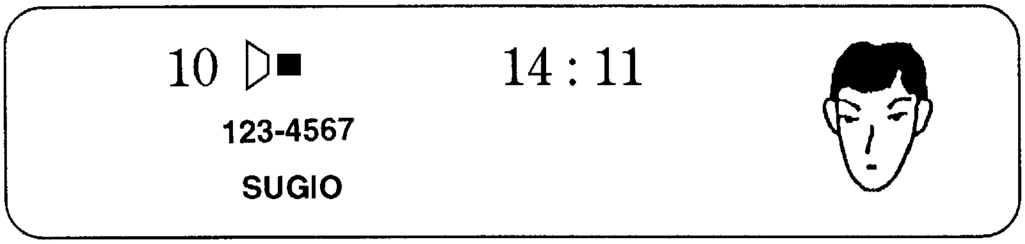

FIG. 14A shows a display example in this case. Suppose that the telephone number designating code "*09" and "123-4567" have been received. The lower four digits of this telephone number, "4567", match with the lower four digits of the telephone number "123-4567" stored in the area Da shown in FIG. 11, and the corresponding name and portrait are respectively stored in the areas Db and Dc. Therefore, the flow proceeds in the order of step S101→step S104→step S106→step S108→step S109→step S110. In step S110, the symbol indicating the reception and the reception time are displayed together with the telephone number "123-4567", the name "SUGIO" and the portrait on the display section 24. Further, those pieces of data are stored in the RAM 20 after which the processing is terminated.

When it is determined in step S109 that no corresponding portrait is stored in the area Dc, the flow proceeds to step S111 where the ringing is informed and the telephone number and name are displayed on the display section 24. Further, those pieces of data are stored in the RAM 20 after which the processing is terminated.

Figure 14B:
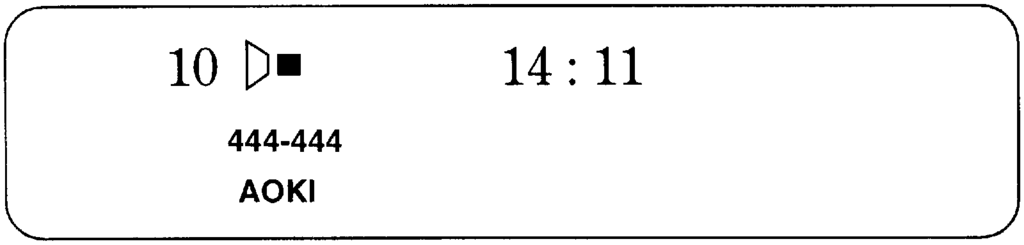

FIG. 14B shows a display example in this case. Suppose that the telephone number designating code "*09" and the telephone number "444-4444" have been received as message data. The telephone number "444-4444" having the same lower four digits "4444" of the received telephone number is stored in the area Da. The corresponding name is stored in the area Db. But, no corresponding portrait is stored in the area Db. Therefore, the symbol, the reception time, the telephone number "444-4444" and the name "AOKI" are displayed on the display section 24.

When it is determined in steps S106 and S108 that a telephone number whose lower four digits coincide with the lower four digits of the received telephone number is stored in the area Da but no corresponding name is stored in the area Dc, the flow proceeds to step S112. In step S112, it is determined if corresponding portrait is stored in the area Dc. When it is determined that the corresponding portrait is stored, the flow moves to step S113 where the symbol, the telephone number and the portrait are displayed on the display section 24. Further, those pieces of data are stored in the RAM 20 after which the processing is terminated.

Figure 14C:
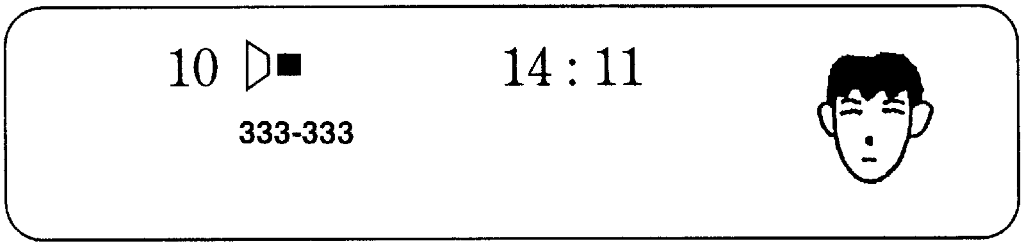

FIG. 14C shows a display example in this case. Suppose that the telephone number designating code "*09" and the telephone number "333-3333" have been received as message data. The telephone number having the same lower four digits "3333" of the received telephone number is stored in the area Da. While no corresponding name is stored in the area Db, the corresponding portrait is stored in the area Dc. Therefore, the symbol, the reception time, the telephone number "333-3333" and the portrait are displayed on the display section 24.

When it is determined in step S112 that no corresponding portrait is stored in the area Dc, the flow moves to step S114 where the symbol and the telephone number are displayed on the display section 24. Further, those pieces of data are stored in the RAM 20 after which the processing is terminated.

Figure 14D:
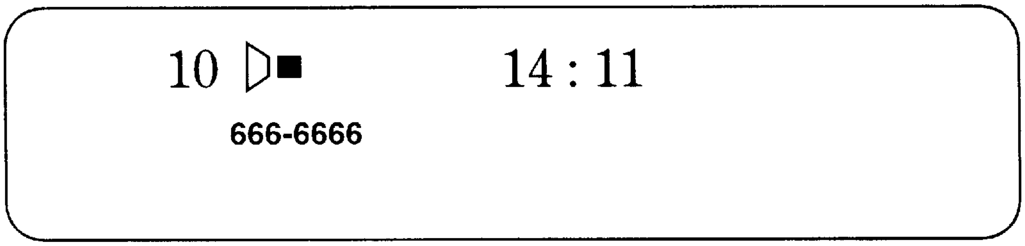

FIG. 14D shows a display example in this case. Suppose that the telephone number designating code "*09" and the telephone number "666-6666" have been received as a message. The telephone number "666-6666" having the same lower four digits "6666" of the received telephone number is stored in the area Da. But, no corresponding name and no corresponding portrait are stored in the respective areas Db and Dc. Therefore, the symbol, the reception time, and the telephone number "666-6666" are displayed on the display section 24.

According to this embodiment, the telephone numbers specifying callers are stored in conjunction with the names and portraits in the RAM 20. Therefore, a caller can be clearly displayed on the pager 4 by the combination of the telephone number, name and portrait, so that the user can accurately confirm the caller.

Embodiment 1-3

In the embodiment 1-2, it is discriminated whether or not to display a name, a portrait and the like by checking the presence/absence of data in the RAM 20. The display contents may be set by setting a flag. An embodiment covering this feature will now be discussed.

Figure 15:
FIG. 15 is a diagram showing a memory area in a RAM 20 in a pager according to an embodiment 1-3.
Figure 15:
Figure 15:
Figure 16:
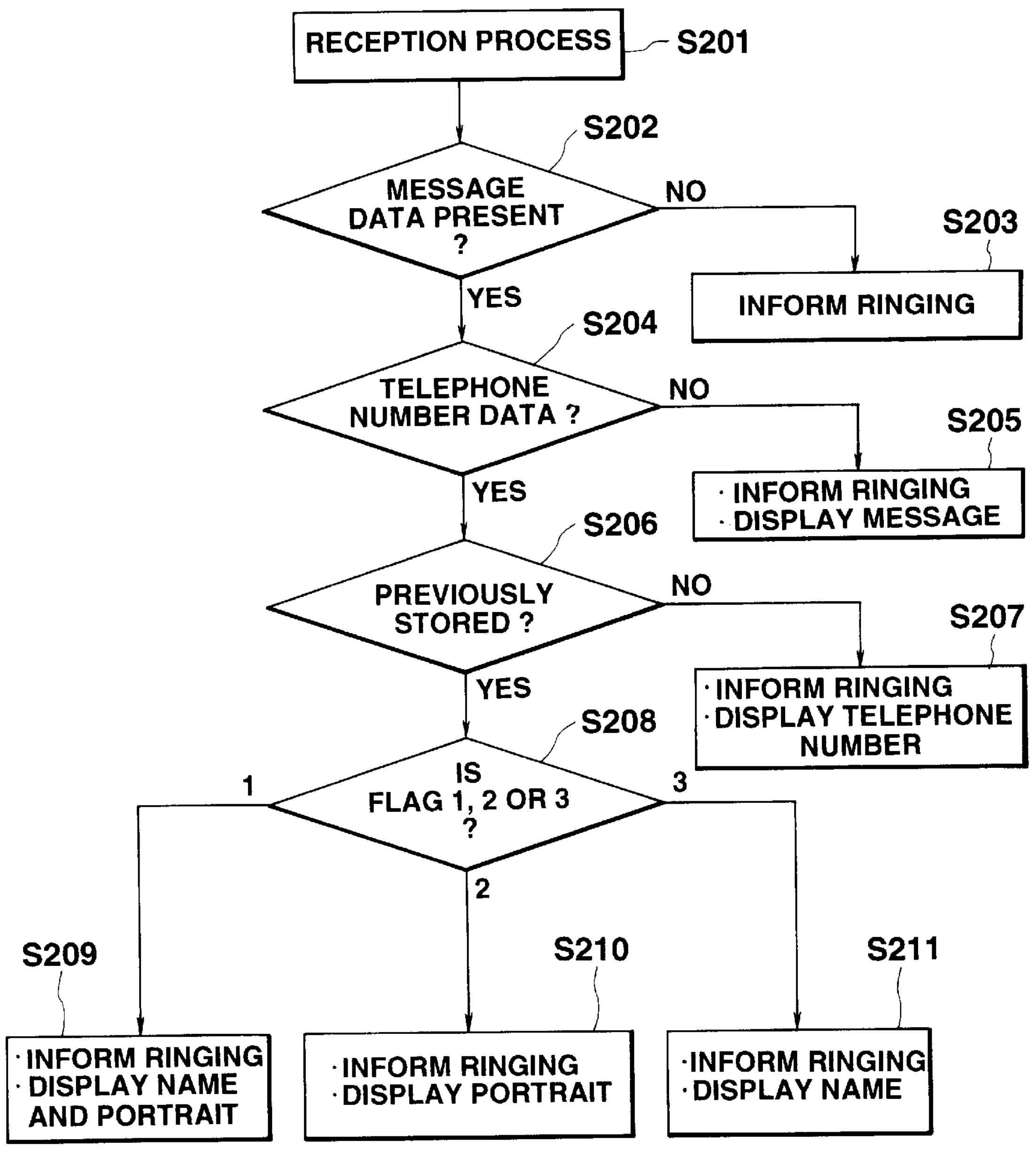
FIG. 16 is a flowchart for explaining the reception operation of the pager according to the embodiment 1-3.

The basic structures of the paging system and pager 4 according to this embodiment are the same as those shown in FIGS. 1 through 4, except that the RAM 20 has memory areas Da to Dd to previously store the telephone numbers of a plurality of callers, names corresponding to the telephone numbers and corresponding portraits respectively, as shown in FIG. 15. The telephone numbers, name and portrait are substantially the same data structure as those used in the embodiment 1-2. The flag comprises two bits data and specifies one of display modes: the flag "1 (01)" indicates the display of a name and a portrait, the flag "2 (10)" indicates the display of a portrait, and the flag "3 (11)" indicates the display of a name.

The operation of the pager 4 according to this embodiment will now be described with reference to the flowchart in FIG. 6.

First, when it is determined in step S201 of the reception process that the ringing signal matches with the ID code of the pager 4, the decoder 13 sends a ringing detection signal to the CPU 14. In response to this ringing detection signal, the CPU 14 executes a process starting at step S202.

In step S202, it is determined if message data follows this ringing signal. When it is determined that there is no subsequent message data, the flow proceeds to step S203 to inform the ringing. This is accomplished by driving the loudspeaker 16, vibrator 17 and/or LED 18, and displaying the symbol on the symbol display area 24e in the display section 24. A display example for this case is the same as the one shown in FIG. 13A.

When message data follows the ringing signal, the flow proceeds to step S204. In step S204, it is determined if the message data after the ringing signal is telephone number data by determining whether or not the telephone number designating code "*09" is located at the head of the message data.

When it is determined that the message data is not telephone number data, the flow moves to step S205 where the ringing is informed, the received message is displayed on the display section 24, and this message and the reception time is stored in the RAM 20 after which the processing is terminated. A display example in this case is the same as the above-described example shown in FIG. 13B.

When the message data is determined as telephone number data in step S204, the flow proceeds to step S206. In step S206, the telephone numbers stored in the area Da shown in FIG. 15 are searched for the telephone number whose lower four digits match with the lower four digits of the received telephone number.

When no matched telephone number is found in this search, the flow goes to step S207 where the ringing is informed, and the received telephone number is displayed on the display section 24 and is stored in the RAM 20 after which the processing is terminated. A display example in this case is the same as the above-describe example shown in FIG. 13C.

When the target telephone number is searched out in the search in step S206, the flow proceeds to step S208 where the associated flag stored in the flag area Dd is referred to.

When the flag "1" is stored, the flow moves to step S209 where the symbol, telephone number, name and portrait are displayed on the display section 24. Further, these pieces of data portrait are stored in the RAM 20 after which the processing is terminated.

Suppose that the telephone number designating code "*09" and telephone number "123-4567" are received as message data. The telephone number "123-4567" whose lower four digits match with the lower four digits "4567" of this telephone number is stored in the area Da. The flag corresponding to this telephone number is "1". Therefore, the symbol, reception time, telephone number "123-4567", name "SUGIO" and portrait are displayed on the display section 24, as shown in FIG. 14A.

When it is determined in step S208 that the flag "2" is stored, the flow moves to step S210 where the symbol and portrait are displayed on the display section 24, and these pieces of data are stored in the RAM 20 after which the processing is terminated.

Suppose that the telephone number designating code "*09" and telephone number "333-3333" are received. The telephone number "333-3333" whose lower four digits match with the lower four digits "3333" of this telephone number is stored in the area Da. The flag corresponding to this telephone number "333-3333" is "2". Therefore, the symbol, reception time, telephone number "333-3333" and portrait are displayed on the display section 24, as shown in FIG. 14C.

When it is determined in step S208 that the flag "3" is stored, the flow moves to step S211 where the symbol and name are displayed as the display contents defined by the flag "3" on the display section 24, and these pieces of data are stored in the RAM 20 after which the processing is terminated.

Suppose that the telephone number designating code "*09" and telephone number "444-4444" are received. The telephone number "444-4444" whose lower four digits match with the lower four digits "4444" of this telephone number is stored in the area Da in the RAM 20. The flag corresponding to this telephone number is "3". Therefore, the symbol, reception time, telephone number "444-4444" and name "AOKI" are displayed on the display section 24, as shown in FIG. 14B.

According to this embodiment, the display mode is set by the flag in accordance with the telephone number of a caller. Therefore, information about the caller such as name and telephone number may be arbitrarily combined and displayed. Thus, the user can correctly confirm the caller at a glance.

Embodiment 1-4

While the portrait of a caller is displayed on the display section 24, an emblem or the like indicating a company for which the caller works may be displayed instead. An embodiment covering this feature will now be discussed.

The basic structures of the paging system and pager 4 according to this embodiment are the same as those shown in FIGS. 1 through 4. The RAM 20 has the first memory area shown in FIG. 17A, the second memory area shown in FIG. 17B and the third memory area shown in FIG. 17C. The first memory area includes memory area Da1, Db1 and Dc1 where the telephone numbers of a plurality of possible (or potential) callers, name corresponding to the telephone numbers and portrait are respectively stored. The second memory area includes memory area Da2, Db2 and Dc2 where the telephone numbers of a plurality of possible callers, company name corresponding to the telephone numbers and company emblem are respectively stored, as shown in FIG. 17B. The third memory area includes memory areas Dd1 and Dd2 where a display flag d1 for a person and a display flag d2 for a company are stored, as shown in FIG. 17C. Each of the display flags d1 and d2 is formed of two bits data.

The portrait data shown in FIG. 17A represents the individual callers, and the company emblem data shown in FIG. 17B represents companies to which the callers belong. The data structure of the flags d1 and d2 are substantially same as those of flags in the embodiment 1-3. The display flag d1 for a person shown in FIG. 17C specifies the display mode: the flag "1" indicates the display of a name and a portrait, the flag "2" indicates the display of a portrait, and the flag "3" indicates the display of a name. The display flag d2 for a company also specifies the display mode: the flag "1" indicates the display of a company name and a company emblem, the flag "2" indicates the display of a company emblem, and the flag "3" indicates the display of a company name.

Figure 18:
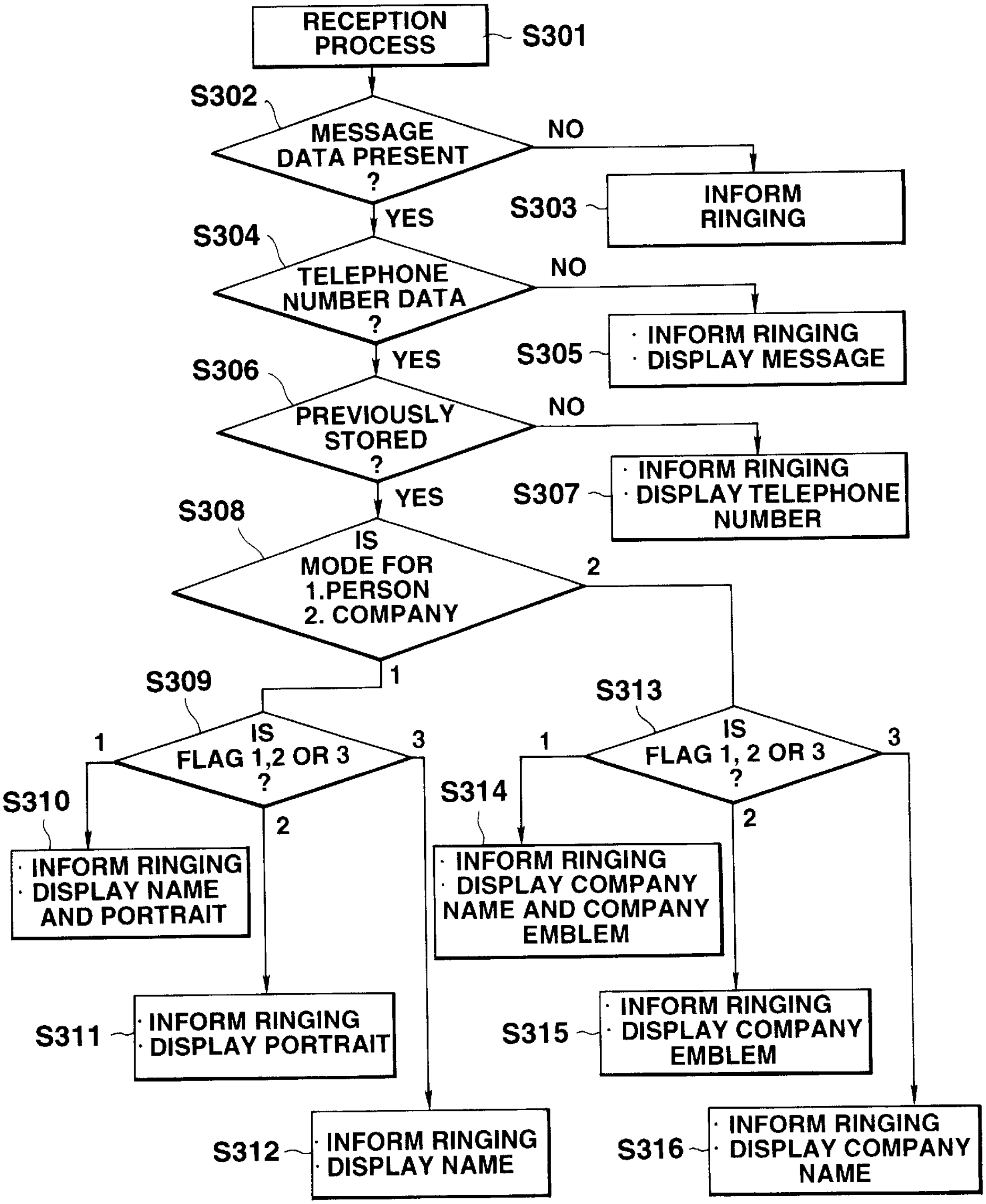
FIG. 18 is a flowchart for explaining the reception operation of the pager according to the embodiment 1-4.

The reception operation of the pager 4 according to this embodiment will now be described with reference to the flowchart in FIG. 18.

First, when it is detected in step S301 that the received ringing signal matches with the ID code, the CPU 14 executes a process starting at step S302.

In step S302, it is determined if message data follows this ringing signal. When it is determined that there is no subsequent message data, the flow proceeds to step S303 to inform the ringing. This informing process involves a process of driving one of the loudspeaker 16, vibrator 17 and LED 18, and the display of the symbol indicating that a call has been made. A display example in this case is the same as the one shown in FIG. 13A.

When message data follows the ringing signal, the flow proceeds to step S304. In step S304, it is determined if the message data after the ringing signal is telephone number data by determining whether or not there is an ID code at the head of the message data.

When it is determined that the message data is not telephone number data, the flow moves to step S305 where the ringing is informed, the message is displayed on the display section 24 and the received message data and reception time are stored in the RAM 20 after which the processing is terminated. A display example in this case is the same as the one shown in FIG. 13B.

When the message data is determined as telephone number data in step S304, the flow proceeds to step S306. In step S306, the telephone numbers stored in the areas Da1 and Da2 shown in FIGS. 17A and 17B are searched for the telephone number whose lower four digits match with the lower four digits of the received telephone number.

When no matched telephone number is found in this search, the flow goes to step S307 where the symbol and the telephone number are displayed on the display section 24, and those data and reception time are stored in the RAM 20 after which the processing is terminated. A display example in this case is the same as the one shown in FIG. 13C.

When it is determined through the search in step S306 that the telephone number whose lower four digits match with the lower four digits of the received telephone number is stored in the telephone numbers stored in the areas Da1 and Da2 shown in FIGS. 17A and 17B, the flow proceeds to step S308 where it is determined if the display contents of the pager 4 are set for the person mode or the company mode. With regard to this mode and the flag d1 for a person (hereinafter simply referred to as "person flag") and the flag d2 for a company (hereinafter simply referred to as "company flag"), which will be discussed later, an arbitrary mode should have been selected using the mode key 33 and should have been set by the set key 31.

If the person mode is set, the flow moves to step S309 to refer to the contents of the person flag d1 shown in FIG. 17C.

When the "1" is set as the person flag d1, the flow moves to step S310 where the ringing is informed, and the name and portrait are displayed on the display section 24. Further, those data and reception time are stored in the RAM 20 after which the processing is terminated.

Suppose that the telephone number "123-4567" is received as a message after the telephone number designating code "*09". As the corresponding telephone number "123-4567" is stored in the area Da1 in FIG. 17A, the symbol, the reception time, telephone number "123-4567", name "SUGIO" and portrait are displayed on the display section 24, as shown in FIG. 14A.

When it is determined in step S309 that "2" is set as the person flag d1, the flow moves to step S311. In this step S311, the ringing is informed and the portrait is displayed on the display section 24, and those data are stored in the RAM 20 after which the processing is terminated.

Figure 19A:
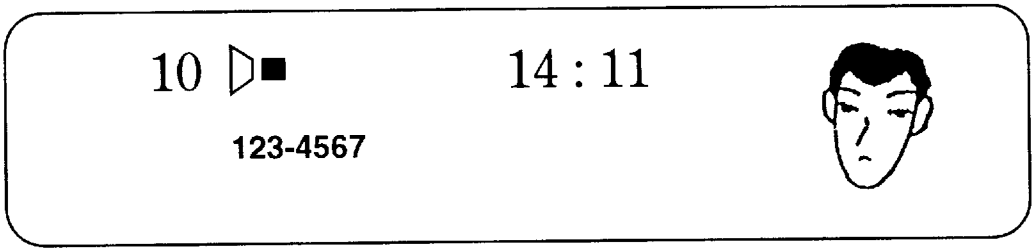
FIGS. 19A, 19B, and 20A to 20C are diagrams showing display examples for the pager of the embodiment 1-4.

Suppose that the telephone number "123-4567" is received after the telephone number designating code "*09". In this case, the symbol, reception time, telephone number "123-4567" and portrait, but excluding the name, are displayed on the display section 24, as shown in FIG. 19A.

When it is determined in step S309 that "3" is set as the person flag d1, the flow moves to step S312. In step S312, the ringing is informed, the name is displayed on the display section 24, and those data are stored in the RAM 20 after which the processing is terminated.

Figure 19B:
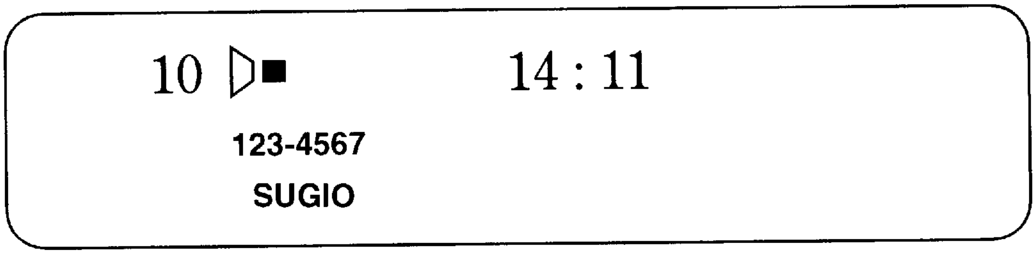

Suppose that the telephone number designating code "*09" and telephone number "123-4567" are received. In this case, the symbol, reception time, telephone number "123-4567" and name are displayed on the display screen, as shown in FIG. 19B.

If it is determined in step S308 that the company mode is set, the flow moves to step S313 to refer to the contents of the company flag d2 shown in FIG. 17C.

Figure 20A:
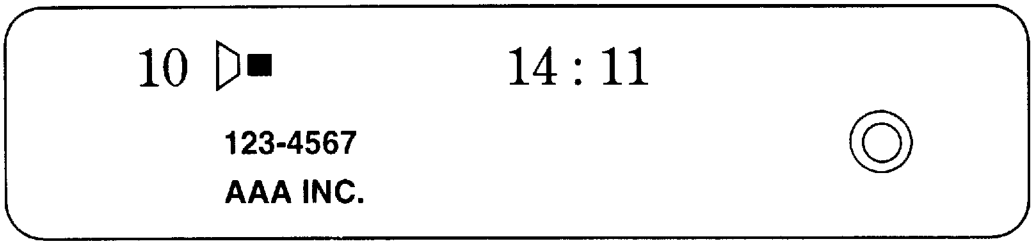

When the "1" is set as the company flag d2, the flow moves to step S314. In step S314, the symbol, company name and company emblem are displayed on the display section 24, and those data are stored in the RAM 20 after which the processing is terminated. Suppose that the telephone number designating code "*09" and the telephone number "123-4567" are received. In this case, the lower four digits "4567" of this telephone number match with the lower four digits of the telephone number "123-4567" stored in the area Da2 in FIG. 17B. Thus, the symbol and reception time are displayed on the display screen together with the telephone number "123-4567", company name "AAA Inc." and company emblem, as shown in FIG. 20A.

Figure 20B:
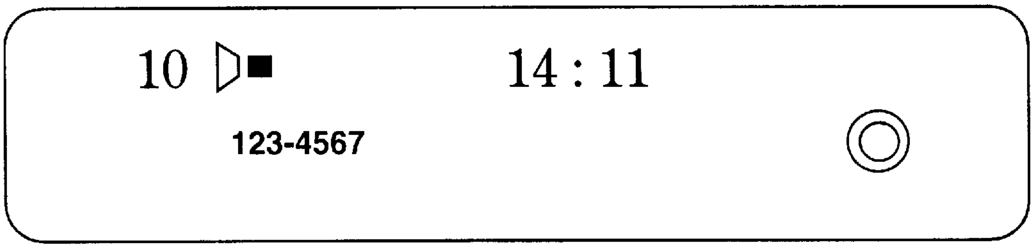

When it is determined in step S313 that "2" is set as the company flag d2, the flow moves to step S315. In step S315, the symbol, received telephone number and company emblem are displayed on the display section 24, and those data are stored in the RAM 20 after which the processing is terminated. A display example for the case where the telephone number "123-4567" has been received as a message is shown in FIG. 20B.

Figure 20C:
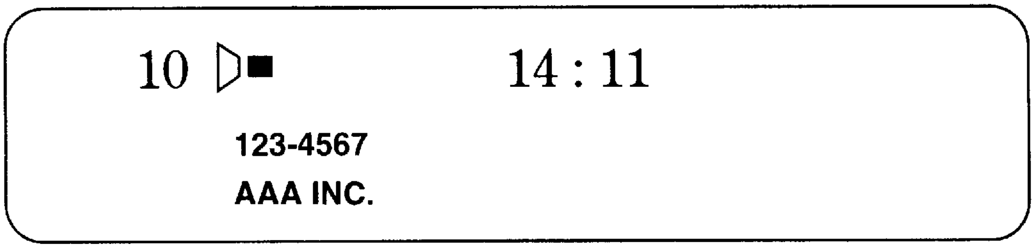

When it is determined in step S313 that "3" is set as the company flag d2, the flow moves to step S316. In step S316, the symbol, reception time, telephone number and company name are displayed on the display section 24, and the reception time, telephone number and company name are stored in the RAM 20 after which the processing is terminated. A display example for the case where the telephone number "123-4567" has been received as a message is shown in FIG. 20C.

According to this embodiment, an image indicating the caller can be displayed together with other character and numeral information in the display mode set by the flag according to the person mode or the company mode. Thus, the user can correctly confirm the caller with not only portraits but also any images.

Second Embodiment

In the embodiments 1-1 to 1-4, a predetermined image is displayed on the display section. But, this invention is not limited to those embodiments. For example, a portrait to be displayed may be prepared by the user. The following will describe an embodiment of the pager 4 which allows the user to prepare a portrait, with reference to the accompanying drawings.

Figure 21:
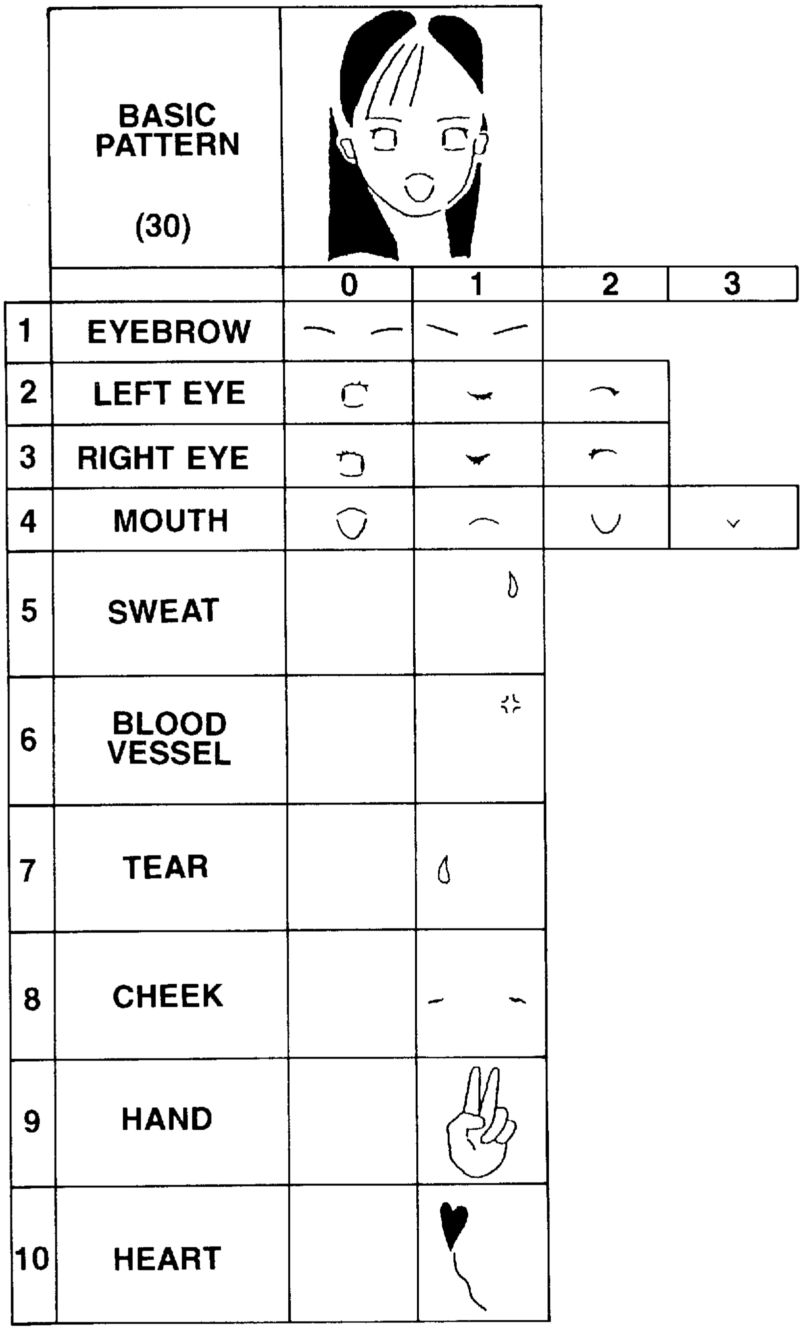
FIG. 21 is a diagram showing a portrait code matrix for a woman stored in a ROM 19 in a pager according to a second embodiment.
Figure 22:
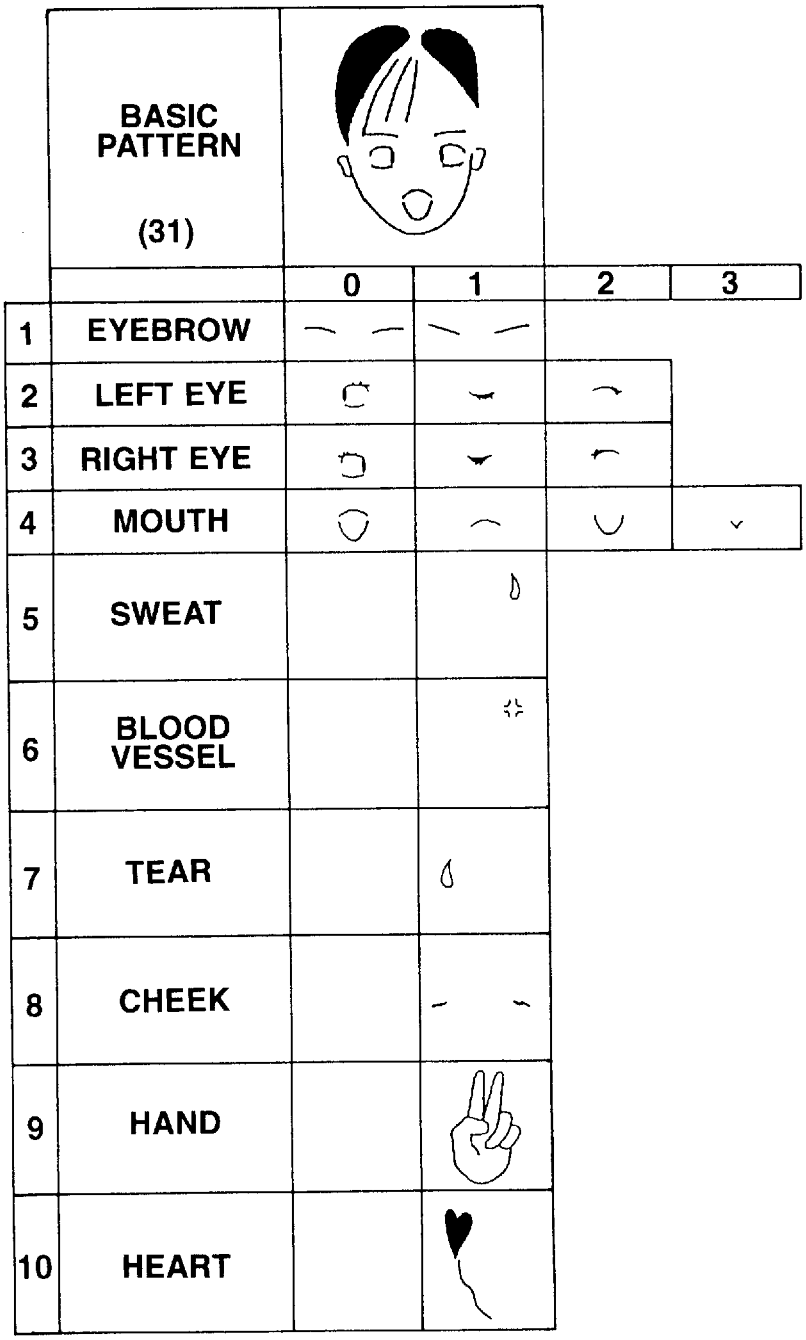
FIG. 22 is a diagram showing a portrait code matrix for a man stored in the ROM 19 in the pager according to the second embodiment.

The basic structures of the paging system and the pager 4 according to this embodiment are the same as those of the embodiment 1-1 shown in FIGS. 1, 2 and 5. The ROM 19 in this embodiment however stores a portrait code matrix for woman shown in FIG. 21, a portrait code matrix for man shown in FIG. 22, a self-made standard message code matrix shown in FIG. 23, a program for switching five types of modes, a reception standby mode (main mode), a time setting mode, a ringing tone switching mode, a portrait preparing mode and a self-made standard message preparing mode, in accordance with the number of depressions of the mode key 33, a program for selecting individual data shown in FIGS. 21, 22 and 23 in accordance with the depressing operations of the select key 32 and the mode key 33, and the like. The portrait code matrix for woman includes basic pattern data of the portrait of a woman and changing pattern data of parts constituting the portrait, such as eyebrow, left eye, right eye, mouth, sweat, blood vessel, tear, cheek, hand and heart, as shown in FIG. 21. The portrait code matrix for man includes basic pattern data of the portrait of a man and changing pattern data of parts constituting the portrait, such as eyebrow, left eye, right eye, mouth, sweat, blood vessel, tear, cheek, hand and heart, as shown in FIG. 22. The portrait is displayed in accordance with control data for controlling the activation (ON action) and deactivation (OFF action) of a plurality of display segments constituting a portrait in the portrait display area 24*b* of the display section 24.

Figure 24:
FIG. 24 is a diagram showing a memory area in a message bank 25 in the pager of the second embodiment.
Figure 24:
Figure 24:
Figure 24:

In this embodiment, the message bank 25 shown in FIG. 2 is connected to the CPU 14. The message bank 25, which is constituted of a volatile memory, has a memory area for storing a message (a portrait and self-made standard message) prepared in accordance with the message preparing flowchart in FIG. 25, as shown in FIG. 24.

The portrait display area 24*b* of the display section 24 shown in FIG. 5 is constituted of segments for displaying the individual parts constituting a portrait.

The area in the message bank 25 for storing portrait data stores codes of the patterns of the individual parts constituting a portrait. A portrait is displayed by activating those of the segments of the portrait display area 24*b* which are associated with the pattern codes stored in the message bank 25. The portrait display area 24*b* may be constituted of a dot matrix display section. In this case, a portrait is displayed in a dot pattern, part by part.

Figure 25:
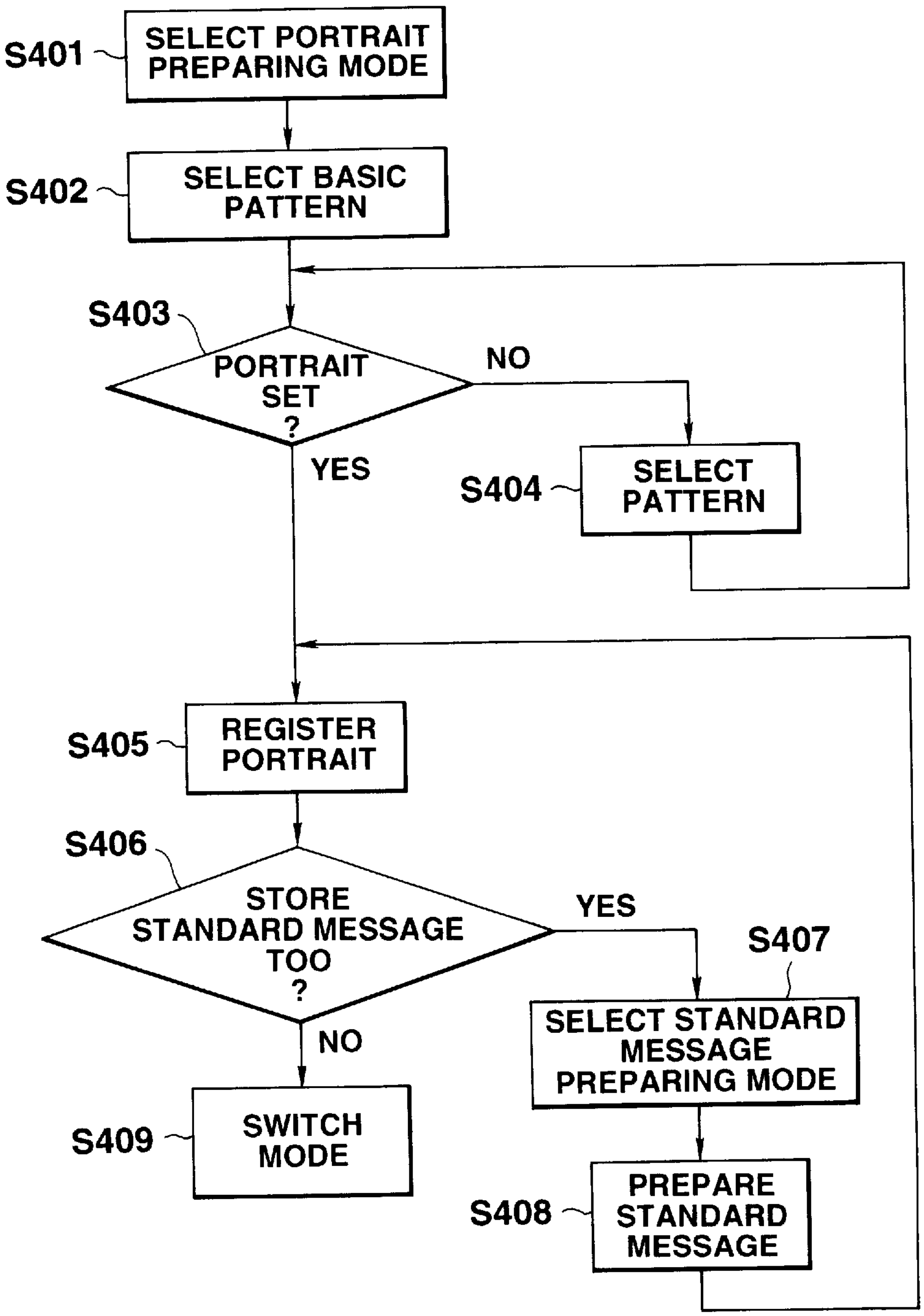
FIG. 25 is a flowchart illustrating a portrait preparing process executed by the pager of the second embodiment.

A method of preparing a portrait and a self-made standard message and registering them in the message bank 25 in the pager 4 of this embodiment will be described in detail, with reference to the flowchart in FIG. 25 and the display examples in FIGS. 26A to 26M.

Figure 26A:
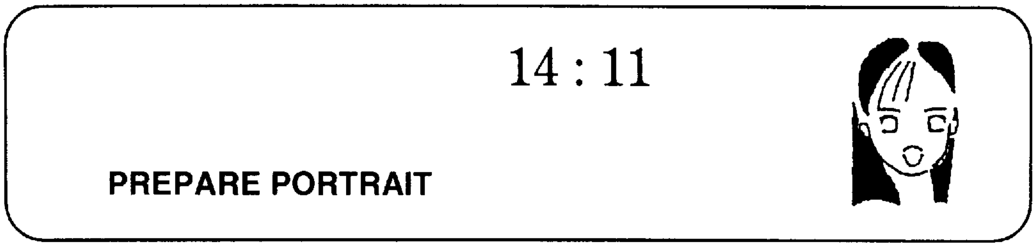
FIGS. 26A through 26I are diagrams showing display examples at the time a portrait is prepared by the pager of the second embodiment.

First, the user depresses the mode key 3 in the reception standby mode to set the portrait preparing mode. A display example in the portrait preparing mode is shown in FIG. 26A. In the initial state in this mode, the basic pattern of a woman's portrait shown in FIG. 21 is displayed in the portrait display area 24*b* of the display section 24. Then, the user depresses the set key 31 to enter the preparing mode and starts preparing a portrait (step S401).

Next, when the depression of the select key 32 is repeated in step S402, the CPU 14 repeatedly displays the basic patterns of the portraits of a man and a woman. After determining either the man or woman, the user depresses the set key 31. In response to this key depression, the CPU 14 sets the basic pattern that is displayed then. It is assumed here that the basic pattern of a woman is selected as shown in enlargement in FIG. 26B.

Next, the user depresses the set key 31 if there are no displayed parts the user wants to change, or the user operates the select key 32 if there are some parts to be changed. Those key operations are detected in step S403. When the set key 31 is depressed, the flow proceeds to step S405, and when the select key 32 is depressed, the flow proceeds to step S404. In step S404, the user selects an arbitrary pattern, part by part.

Figure 26B:
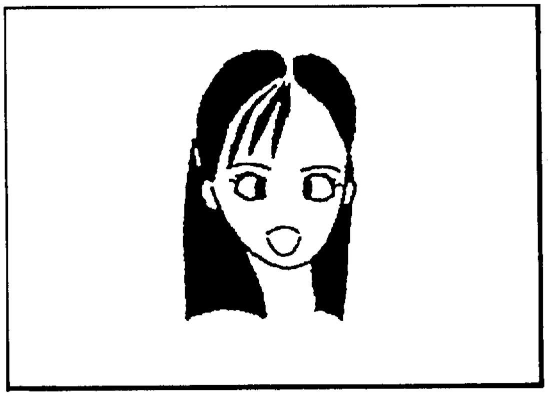

The process in step S404 will now be described in detail with reference to the display example. First, suppose that the basic pattern selected in step S402 is the basic pattern for a woman as shown in FIG. 26B and the portrait to be prepared is the one shown in FIG. 26H.

The user sequentially depresses the mode key 33 to designate the part to be changed in accordance with the portrait code matrix for woman illustrated in FIG. 21, and selects the pattern using the select key 32.

Figure 26C:
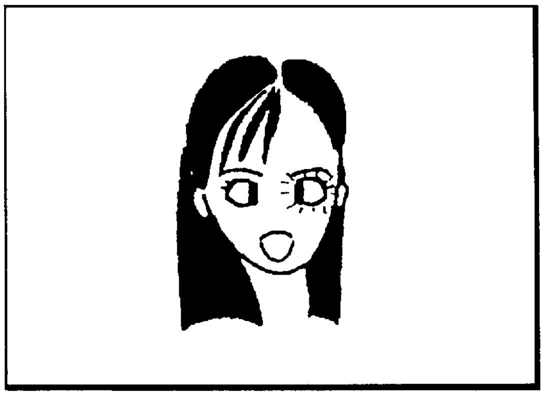
Figure 26D:
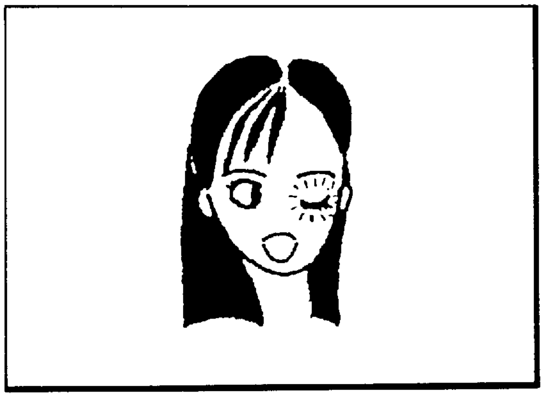
Figure 26E:
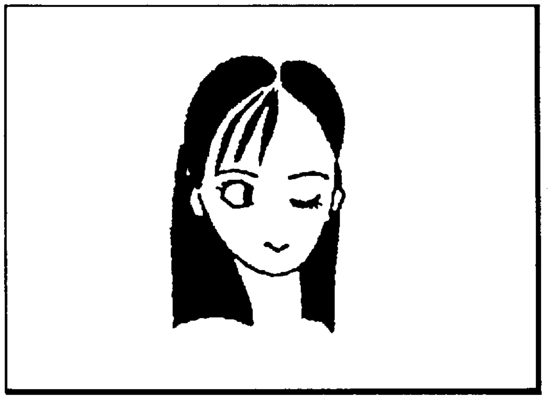
Figure 26F:
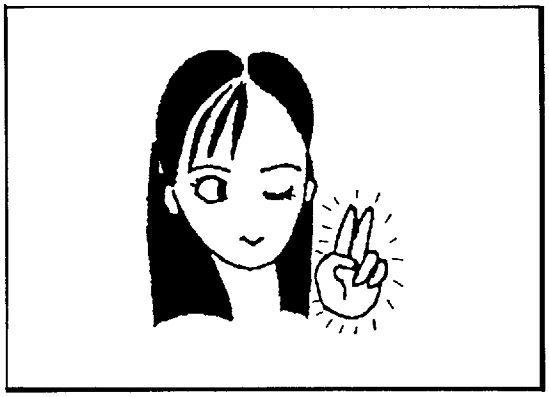
Figure 26G:
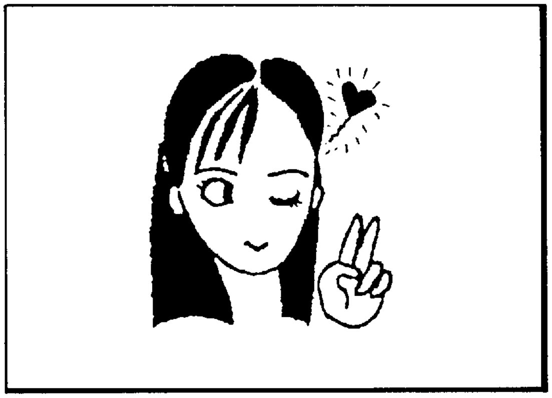

The detailed description of a specific operational example will be given below. As the mode key 33 is depressed, a changeable or selectable part is changed and blinks in the order of eyebrow→left eye→right eye→mouth →sweat→blood vessel→tear→cheek→hand→heart →eyebrow and so forth. In preparing the portrait shown in FIG. 26H from the basic pattern shown in FIG. 26B, first, the user depresses the mode key 33 twice to make the left eye blink as the selectable part as shown in FIG. 26C. Next, the user depresses the select key 32 once, so that the pattern among the pattern data of the left eye shown in FIG. 21, which corresponds to "1" on the horizontal scale, is displayed as shown in FIG. FIG. 26D and blinks. As this pattern is the target pattern of the left eye of the portrait in FIG. 26H, the selection of the left eye is finished. Next, the user depresses the mode key 33 twice to make the mouth pattern changeable, and operates the select key 32 to select the pattern, resulting in the state in FIG. 26E. Further, the user depresses the mode key 33 five times, and depresses the select key 32 once to set the hand pattern as shown in FIG. 26F. Then, the user depresses the mode key 33 once and the select key 32 once to display the heart as shown in FIG. 26G.

Figure 26H:
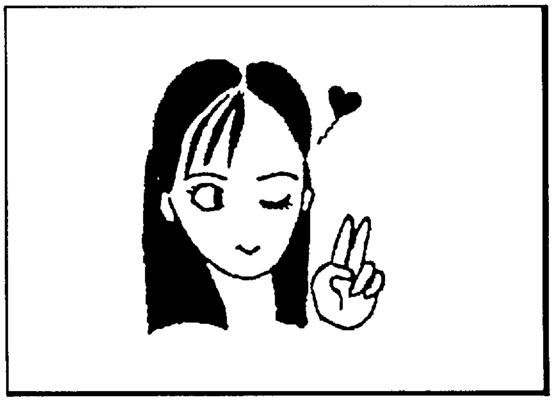
Figure 26I:
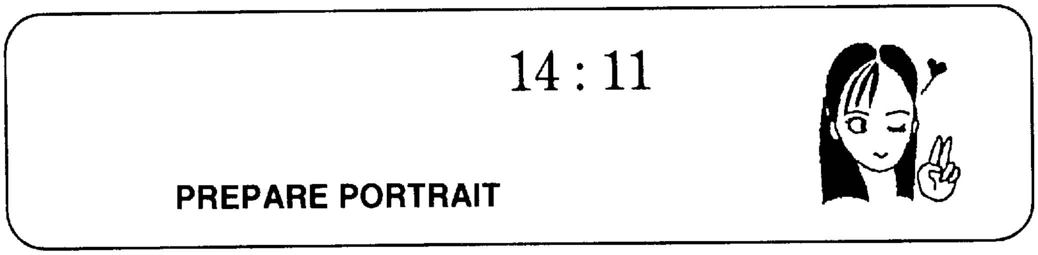
Figure 26J:
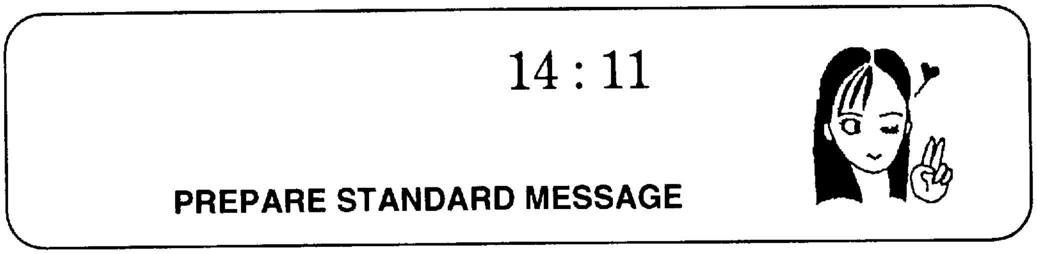
FIGS. 26J through 26L are diagrams showing display examples at the time a portrait is prepared by the pager of the second embodiment.

As the desired portrait is completed through the above operation, the user operates the set key 31. Consequently, the portrait shown in FIG. 26H is set. A display example of the entire display section at this time is shown in FIG. 26I.

Subsequently, the flow moves to step S405 where the user designates the address with the select key 32 to register the prepared portrait in the message bank 25. After the address designation, the user depresses the set key 31. In response to the operation of the set key 31, the CPU 14 registers the pattern codes of the individual parts of the prepared portrait at the designated address as shown in FIG. 24. As nothing can be registered at the addresses where the standard messages (hereinafter, fixed standard message) shown in FIG. 3 are registered, any other address than those should be designated.

Figure 26K:
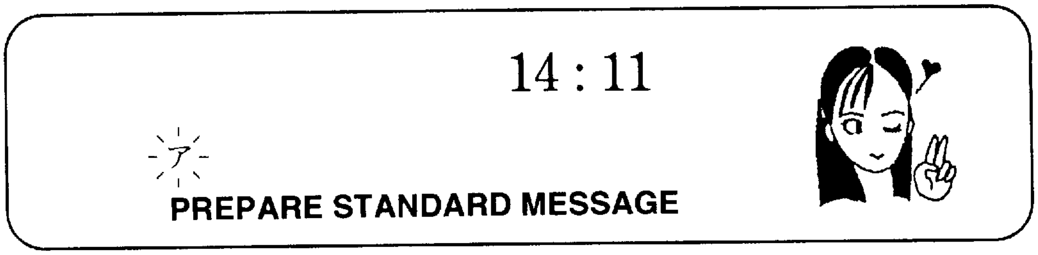
Figure 26L:
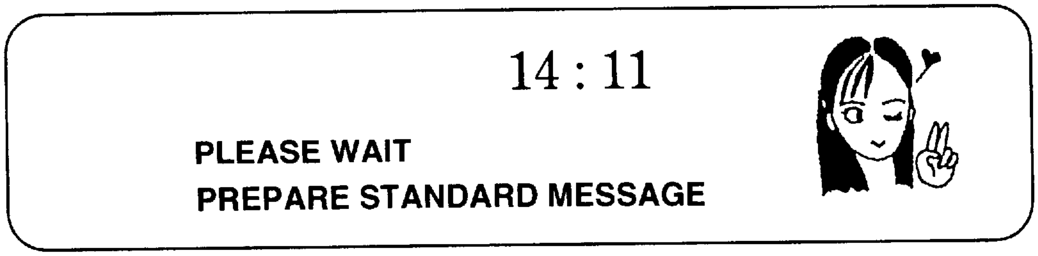

In preparing the user's self-made standard message in association with the portrait prepared and the registered in the above-described manner and registering that message in the message bank 25, the user should depress the mode key 33. This key operation is detected in step S406, and the operation mode is changed to the self-made standard message preparing mode from the portrait preparing mode in step S407. Accordingly, the display is changed to the state shown in FIG. 26J from the state in FIG. 26I. When the user depresses the select key 32 in the self-made standard message code matrix shown in FIG. 23 is read from the ROM 19. As the character "ｱ" in the self-made standard message code matrix is displayed, blinking, at the character input position in the message display area 24*a* as shown in FIG. 26K, the user depresses the select key 32 to select the coordinates in the horizontal direction in the matrix and depresses the mode key 33 to select the vertical coordinates in the matrix. Once a character to be set is determined, the user should depress the set key 31. To prepare the words "PLEASE WAIT", for example, the select key 32 should be depressed five times and the mode key 33 should be depressed three times to display "P". When "P" is displayed, the set key 31 should be depressed. The characters "L", "E", "A", "S", "E", "", "W", "A", "I" and "T" are set in the similar manner. After the preparation of the message is completed, the same register address as the address of the portrait is designated by depressing the select key 32 and is registered by depressing the set key 31.

If there is no change to the registered self-made standard message, the user depresses the mode key 33. This key operation is detected in step S406 and the flow proceeds to step S409. In step S409, the operation for preparing and registering a message consisting of a portrait and a self-made standard message is finished and the operation mode is switched to the reception mode.

The procedures for calling the pager 4 of this embodiment are basically the same as those of the previous embodiment. When the user wants to display a portrait on the destination pager 4, the user inputs the address of an area in the message bank 25 where the desired portrait is stored after the portrait designating code "*5*5". In this case, it is necessary to previously confirm the portrait stored in the message bank 25 of the destination pager 4. An arbitrary message may be input instead of the portrait or may be input together with the portrait.

Figure 27A:
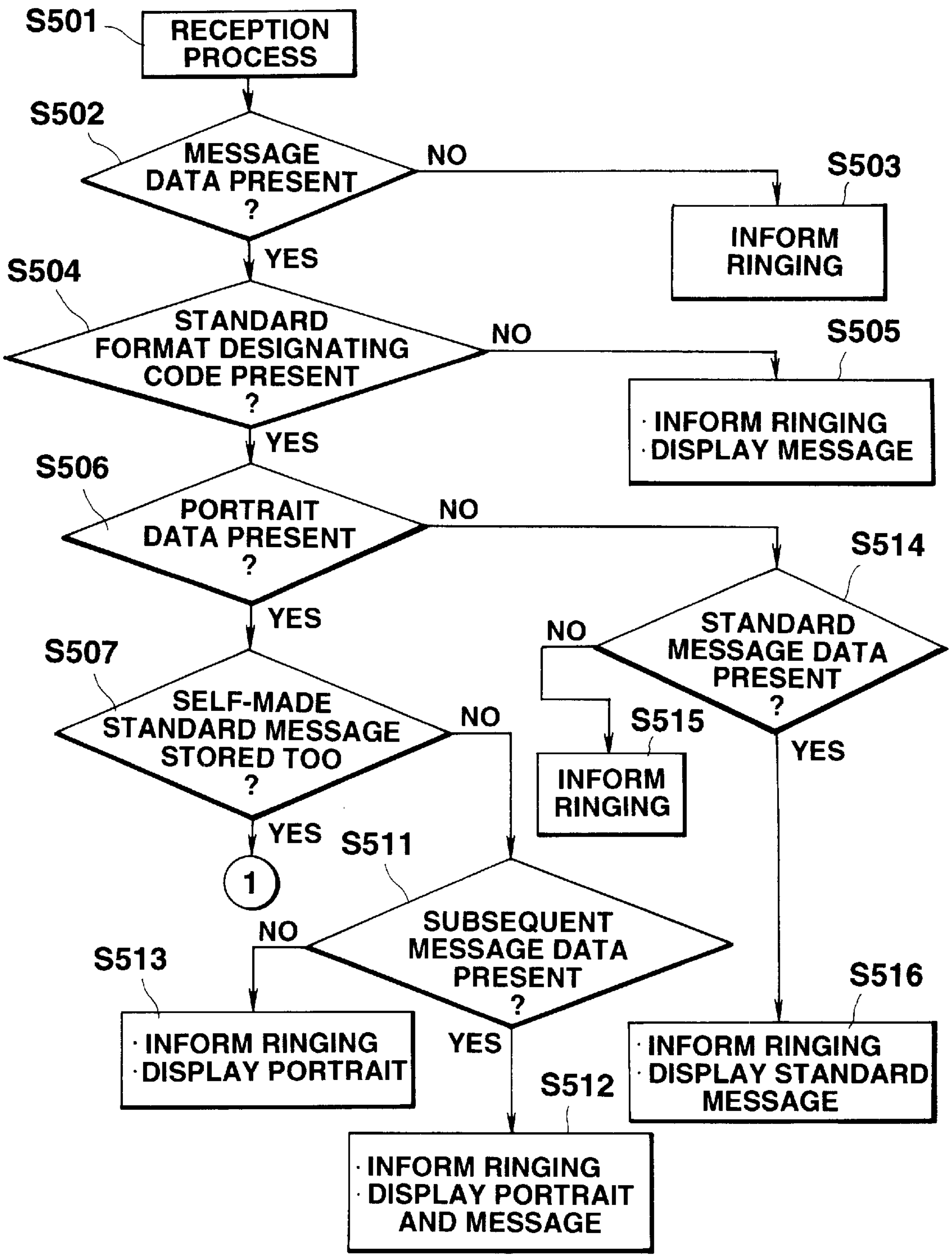
FIGS. 27A and 27B are flowcharts for explaining the reception operation of the pager of the second embodiment.
Figure 27B:
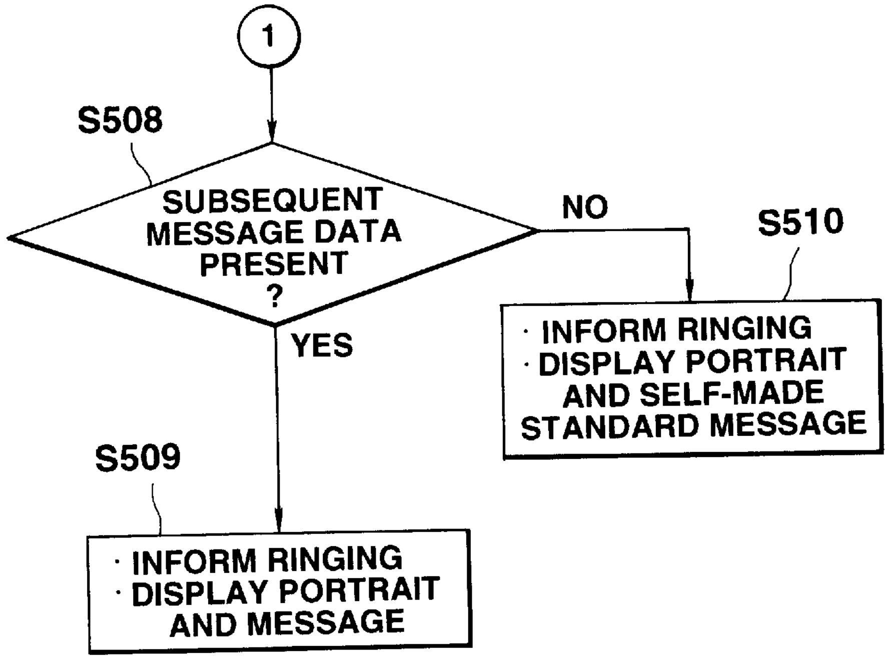

The case where the pager 4 of this embodiment has received the ringing signal will be described in detail with reference to the flowcharts in FIGS. 27A and 27B and the display examples shown in FIGS. 28–33.

First, the received ringing signal is collated with the ID code stored in the ID-ROM 15 in step S501. When there is a match, the flow proceeds to the processing which starts at step S502.

It is determined in step S502 whether or not message data follows this ringing signal. When there is not subsequent message data, the ringing is informed by displaying the symbol on the symbol display area 24*e* of the display section 24 in step S503.

When message data follows the ringing signal, the CPU 14 controls the decoder 13 so as to receive and obtain the message consecutively. Then, the CPU 14 determines whether the standard format designating code "*4*4" or "*5*5" is present at the head of the received message data (step S504). When there is no standard format designating code, the ringing is informed, the reception time and message are displayed on the message display area 24*a* of the display section 24, and the reception time and message data are stored in the RAM 20 after which this processing will be terminated.

When it is determined in step S504 that the standard format designating code is present at the head of the message data, the flow proceeds to step S506. In step S506, the CPU 14 determines if there is portrait data. More specifically, the CPU 14 determines if the standard format designating code is the portrait designating code, the message data following the portrait designating code is data indicating the address in the message bank 25 and the portrait is stored at this address.

When the decision in step S506 is "NO", the flow moves to step S514 and when the decision in step S506 is "YES", the flow moves to step S507. In step S507, it is determined if the self-made standard message is stored together with the portrait at the designated address.

When it is determined in step S507 that the self-made standard message is stored together with the portrait at the designated address, it is determined whether or not message data follows the received address data in step S508. When there is no message data after the received address data, the flow advances to step S510. When there is message data after the received address data, on the other hand, the flow advances to step S509. Of the portrait and self-made standard message stored at the designated address in the message bank 25, the self-made standard message is not displayed but the portrait and the received message are displayed at the display section 24 in step S509. Further, the ringing is informed and this message data is stored in the RAM 20 after which the processing is terminated.

Figure 28:
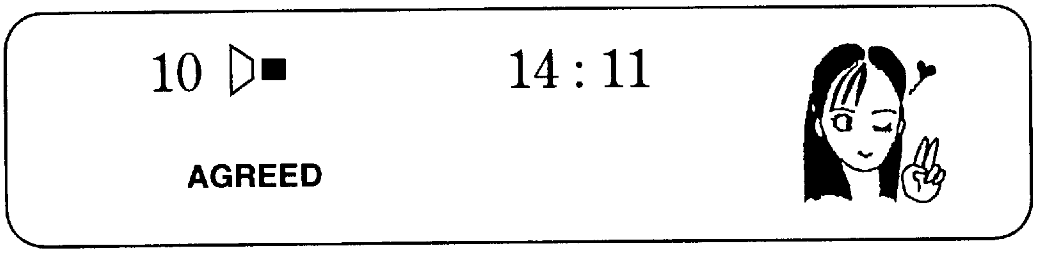
FIGS. 28 through 33 are diagrams showing display examples for the pager of the second embodiment in a reception mode.

FIG. 28 shows a display example where message data is "*5*531*4*420". In this case, the address data "31" follows the portrait designating code "*5*5", further followed by "*4*420" as message data. Thus, the flow proceeds in the above-described order, and the portrait stored at the address "31" in the message bank 25 and the message "AGREED" among the fixed standard messages shown in FIG. 3 stored in the ROM 19 which corresponds to the code "20" are displayed on the display section 24.

When it is determined in step S508 that no message data is located directly after the received address data, the flow moves to step S510. In step S510, the portrait stored at the address in the message bank 25 indicated by the received address data and the self-made standard message are displayed on the display section 24. The ringing informing process is also executed. Further, the received message data is stored in the RAM 20 after which the processing will be terminated.

Figure 29:
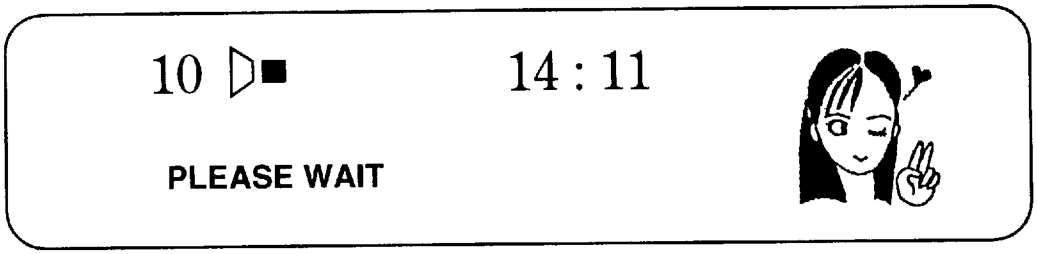

FIG. 29 shows a display example where message data is "*5*531". The address data "31" is present after the portrait designating code "*5*5". Thus, the portrait stored at the address "31" in the message bank 25 and the self-made standard message "PLEASE WAIT" are displayed on the display section 24.

When it is determined in step S507 that no self-made standard message data is stored at the location specified by the received address data, it is determined in step S511 if message data is present immediately after this address data. When there is no subsequent message data, the flow proceeds to step S513. When subsequent message data is present, on the other hand, the flow proceeds to step S512. In step S512, the portrait stored at the address in the message bank 25 indicated by the received address data and the message based on the message data following the received address data are displayed on the display section 24, and the ringing informing process is also executed. Further, the received message data is stored in the RAM 20. Thereafter, the processing will be terminated.

Figure 30:
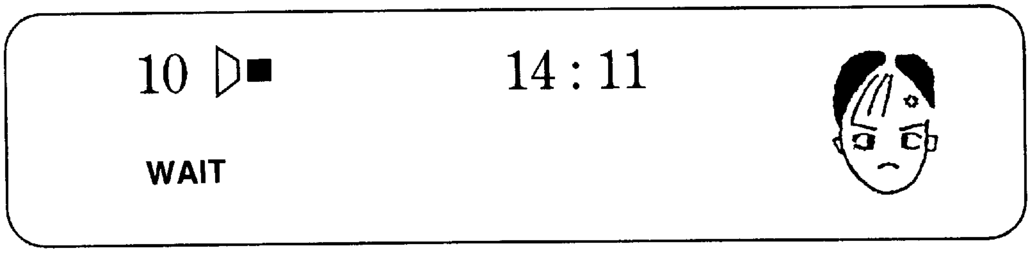

FIG. 30 shows a display example based on message data "*5*533*4*410". The address data "33" follows the portrait designating code "*5*5", further followed by standard message data "*4*410". No self-made standard messages are stored at the address "33" in the message bank 25. Thus, the portrait stored at the address "33" in the message bank 25 is displayed on the message display areas 24*a* of the display section 24. Further, the fixed standard message "WAIT" is read out from the standard message table shown in FIG. 3 based on the message data "*4*410".

When it is determined in step S511 that no message data is located directly after the received address data, the flow moves to step S513 to display the portrait stored at that address. After the ringing is informed, the received message data is stored in the RAM 20 after which the processing will be terminated.

Figure 31:
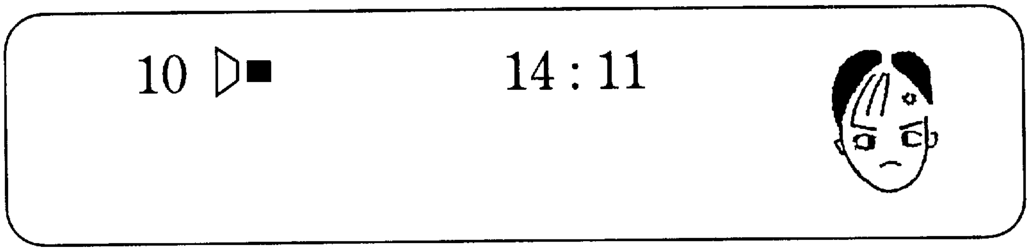

FIG. 31 shows a display example where message data is "*5*533". The address data "33" is present after the portrait designating code "*5*5". While portrait is stored at the address "33" in the message bank 25, no self-made standard message is stored there. Thus, the portrait stored at the address “33” in the message bank 25 is displayed on the display section 24.

When it is determined in step S506 that (1) there is no image designating code “*5*5”, (2) data following the portrait designating code “*5*5” is not address data for the message bank 25, or (3) no portrait is stored at the location specified by the address data following the portrait designating code “*5*5”, the flow proceeds to step S514. When it is determined in step S514 that no self-made standard message data or no fixed standard message data is present at the location indicated by the address data, the ringing is informed after which the processing will be terminated.

Figure 32:
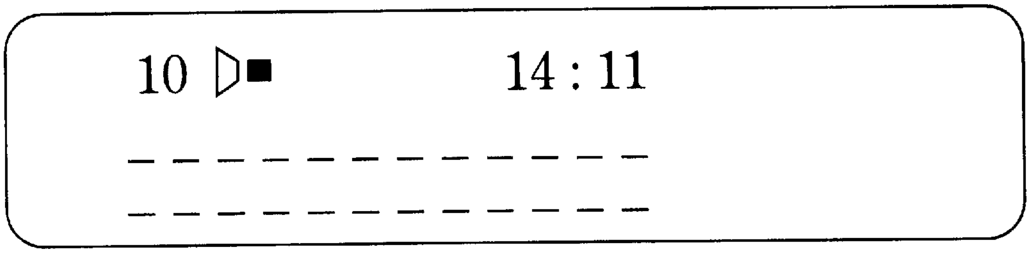

FIG. 32 shows a display example when the received message data is “*5*532”. The address data “32” following the portrait designating code “*5*5” is not the address in the message bank 25. There is no fixed standard message at the address “32”. Thus, the display for informing the ringing is presented as shown in FIG. 33.

When it is determined in step S514 that self-made standard message or fixed standard message is present, this self-made standard message or fixed standard data is displayed and the ringing is informed in step S516. Thereafter, this processing will be terminated.

Figure 33:
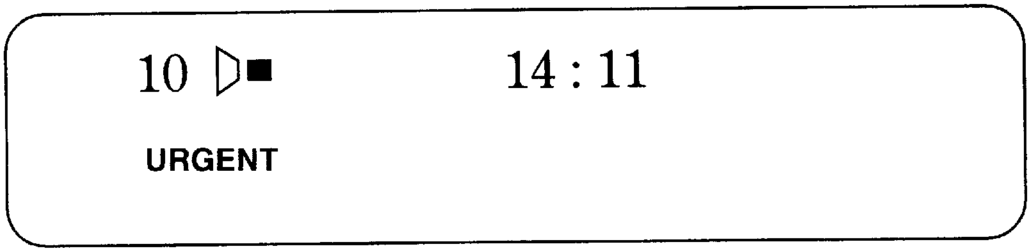

FIG. 33 shows a display example based on the message data “*5*555*4*401”. No portrait is stored at the address “55” in the message bank 25. The flow therefore proceeds to step S514. There is a message code “01” after the standard message designating code “*4*4”. Thus, “URGENT” is read out from the standard messages table shown in FIG. 3 stored in the ROM 19 and is displayed on the display section 24 in step S516.

According to the paging system and pager 4 of this embodiment as described above, the intention, feeling and the like of a caller can be transmitted in the form of a portrait together with the character information. It is therefore possible to provide an expressive message. Portraits to be displayed on the pager 4 can be previously prepared by each user. Therefore, varieties of displays that are not given by fixed patterns can be presented if the correspondence between portrait codes and portrait is taught to the individual users who transmit messages.

Third Embodiment

In the above-described embodiments, a portrait is a still picture. To improve the expressing feature, however, a plurality of portraits may be switchingly displayed. While the pager in the above-described embodiments only has a message receiving ability, the pager itself may be equipped with a function to prepare a transmission message. The following will describe an embodiment of the pager 4 which has a function to display a portrait in a dynamic mode by sequentially displaying a plurality of portraits, changing one after another, on the display section and a function to simply prepare to-be-transmitted message data to display the dynamic picture.

Figure 34:
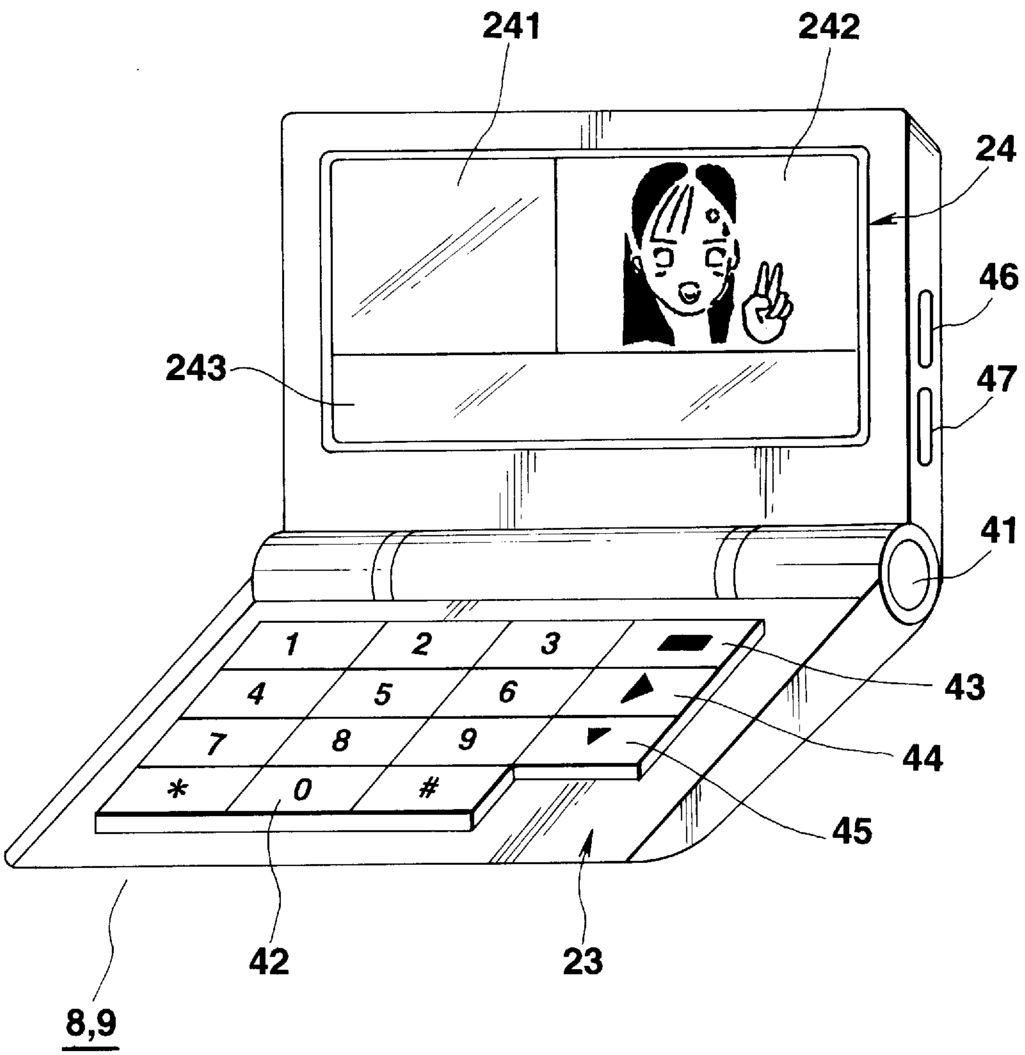
FIG. 34 is a perspective view of a pager according to a third embodiment of this invention.

FIG. 34 shows the outline of the pagers 8 and 9 used in the third embodiment. These pagers 8 and 9 are so designed that the key input section 23 and the display section 24 are coupled via a hinge section 41 and can be folded in two.

The key input section 23, unlike those in the embodiment 1-1 and the second embodiment, has numerical keys 42, a set key 43, a select key 44 and a mode key 45. The numerical keys 42 include keys “1” to “0”, a “*” key and a “#” key. The set key 43 is for setting and registering selected data. The select key 44 serves to select data. The mode key 45 serves to switch the operation mode of pagers 8 and 9, such as the transmission message preparing mode, time setting mode, ringing tone switching mode and the like by the number of operations. The key input section 23 has a power switch 46 and a reset switch 47 too.

The display section 24 has a message display section 241 constituted of a liquid crystal panel for displaying a message, a portrait display section 242 constituted of segments for displaying a portrait and a transmission code display section 243 for displaying a transmission code.

The operation of the pagers 8 and 9 according to the third embodiment will be described below.

Figure 35:
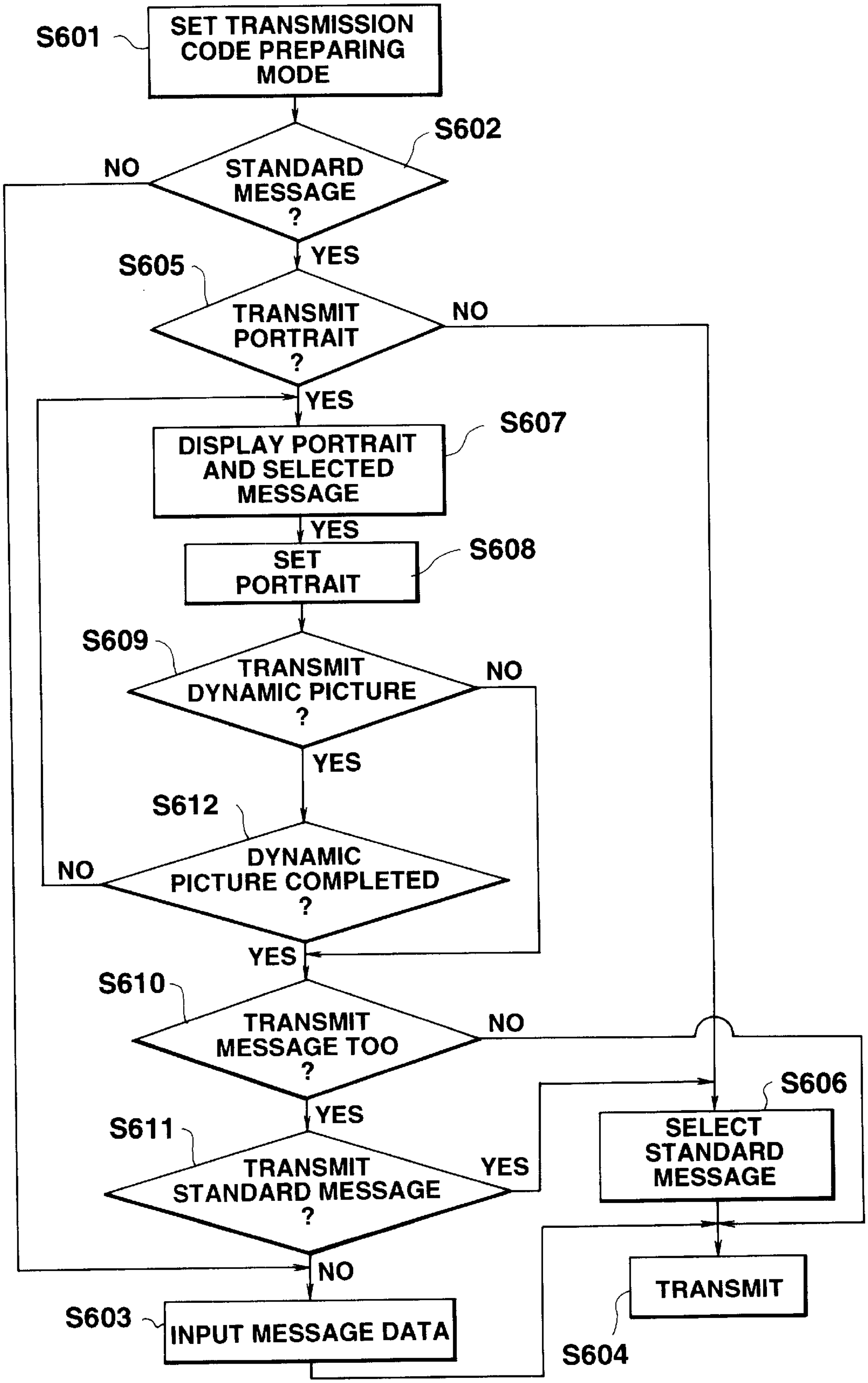
FIG. 35 is a flowchart for explaining the procedures for preparing a sequence of transmission codes in the pager of the third embodiment.

A description will be given first of an operation to prepare a message including a dynamic picture in the pager 8 and an operation to transmit a prepared message to another pager 9, with reference to the flowchart illustrated in FIG. 35.

First, the user selects the transmission message preparing mode using the mode key 45 (step S601). Next, the user sets the type of a message to be transmitted (step S602). As described above, messages include an ordinary message which is the transmitted message data itself that is displayed on the pager 9 on the receiver side, and a standard message to be displayed which is obtained by restoring a standard message or an image previously stored on the receiver side pager based on the transmitted data. In transmitting a standard message, the user first inputs a standard format designating code including “*” and then inputs a message code. In transmitting a non-standard message, the user input the desired message directly.

When no standard message is to be transmitted, i.e., when the first input data is not “*”, the decision in step S602 is “NO” and the flow proceeds to step S603. The user inputs message data (a sequence of numerals) to be transmitted, by using the numeral keys 42. The input sequence of numerals is displayed on the transmission code display section 243.

The user can transmit a message by operating, for example, the push buttons of the push-phone 1 shown in FIG. 1 while referring to the sequence of numerals displayed on the transmission code display section 243 (step S604).

The user inputs the standard format designating code “*4*4” when transmitting a standard message or inputs the portrait designating code “*5*5” when transmitting a portrait. In transmitting only a standard message, therefore, the decision in step S602 is “YES”, the decision in step S605 is “NO”, and the flow proceeds to step S606. The input standard format designating code “*4*4” is displayed on the transmission code display section 243.

In step S606, the user inputs one of the message codes “01” to “20” corresponding to the desired fixed standard message in the standard message table shown in FIG. 3. The input code is displayed on the transmission code display section 243.

In this manner, the button numbers of the push-phone 1 which should be operated in transmitting standard message and the input sequence of the numbers are displayed on the transmission code display section 243.

The user can transmit a message by operating, for example, the push buttons of the push-phone 1 shown in FIG. 1 while referring to the sequence of numerals displayed on the transmission code display section 243 (step S604).

To transmit a portrait, the user inputs the portrait designating code “*5*5”. In this case, the decisions in steps S602 and S605 are “YES”, and the flow proceeds to step S607. In step S607, “*5*5” is displayed on the transmission code display section 243, and a predetermined portrait among portraits in the portrait table shown in FIG. 4 is displayed, blinking, on the portrait display section 242 of the display section 24.

The blinking portrait can be switched to another portrait by operating the select key 44. With the portrait to be transmitted being displayed in a blinking mode, the user operates the set key 43. The portrait is set by this key operation. The portrait code of the portrait selected in step S608 is displayed after the portrait designating code "*5*5" of the transmission code display section 243.

In transmitting a dynamic image on the pager 9, the user further inputs the portrait designating code "*5*5". The presence or absence of this portrait designating code is determined in step S609. When the decision in this step is "YES", the flow moves to step S612. In transmitting a still picture, on the other hand, the decision in step S609 is "NO".

In transmitting only a portrait, the user operates the set key 43 again. Because of this key operation, the decision in step S610 is "NO", and the flow proceeds to step S604. The portrait as a still picture can be transmitted at this stage by inputting the code displayed on the transmission code display section 243 using the push-phone 1.

When a message is to be transmitted together with a portrait, i.e., when the set key 43 has not been operated again, the decision in step S610 is "YES", and the flow proceeds to step S611. It is determined in this step if a standard message should be transmitted. When no standard message is transmitted, i.e., when the "*" key has not been operated, the decision in step S611 is "NO", and the flow proceeds to step S603. In step S603, the user inputs an ordinal numeral as message data. The input numeral is displayed on the transmission code display section 243.

When a standard message is to be transmitted together with a portrait, i.e., when the standard message designating code "*4*4" is input, the decision in step S611 is "YES", and the flow proceeds to step S606. In step S606, a message code corresponding to the desired standard message in the standard message table shown in FIG. 3 is input. Those codes are also displayed on the transmission code display section 243. Message including a standard message and a portrait of a still picture can be transmitted by sequentially transmitting codes, displayed on the transmission code display section 243, from the push-phone 1 or the like.

When it is determined in step S609 that a dynamic picture should be transmitted, it is the determined in step S612 if the preparation of a dynamic picture is completed. The flow then returns to steps S607 and S608 to select a portrait with a different expression from that of the previous selected portrait. When it is determined in step S612 that the preparation of a dynamic picture is completed, the flow proceeds to the above-described step S610.

It is also determined if a message should be transmitted together with the portrait in this case. When no message is to be transmitted, the decision in step S610 is "NO". When a message should be transmitted, on the other hand, the decision in step S610 is "YES" and the flow proceeds to step S611. When no standard message is to be transmitted, the decision in step S611 is "NO" after which the flow proceeds to the aforementioned step S603. In step S604, the user can transmit the message consisting of numerals and a portrait consisting of a dynamic picture by sequentially transmitting codes which are displayed on the transmission code display section 243, from the push-phone 1 or the like.

When a fixed standard message is to be transmitted, the decision in step S611 is "YES", and the flow proceeds to step S606. In step S606, a message code corresponding to the desired standard message in the standard message table shown in FIG. 3 is input. The flow then proceeds to step S604 where the fixed standard message data and a portrait consisting of a dynamic picture can be transmitted.

Figure 36A:
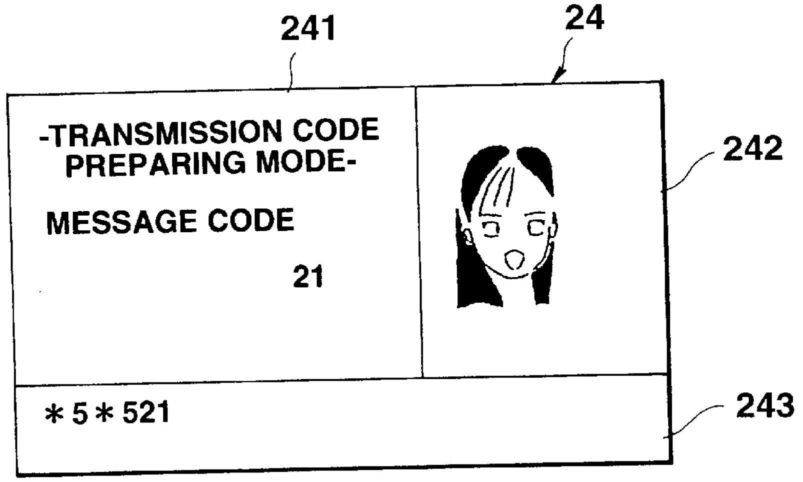
FIGS. 36A through 36E are diagrams showing display examples at the time of preparing a sequence of transmission codes for a message including a dynamic picture in the pager of the third embodiment.

FIGS. 36A through 36C and FIGS. 37A and 37B illustrate procedures of preparing a message code in the case of transmitting a portrait consisting of a dynamic picture and a fixed standard message. Suppose that the portrait designating code "*5*5" has been keyed in. In this case, the decisions in steps S602 and S605 become "YES" and the portrait is displayed on the portrait display section 242 in step S607. When the set key 43 is depressed while the portrait assigned with the portrait code "21" in the portrait code matrix is blinking on the portrait display section 242, the portrait is displayed in a steady form on the portrait display section 242 as shown in FIG. 36A in step S608. The code "21" is displayed following the portrait designating code "*5*5" on the transmission code display section 243.

Figure 36B:
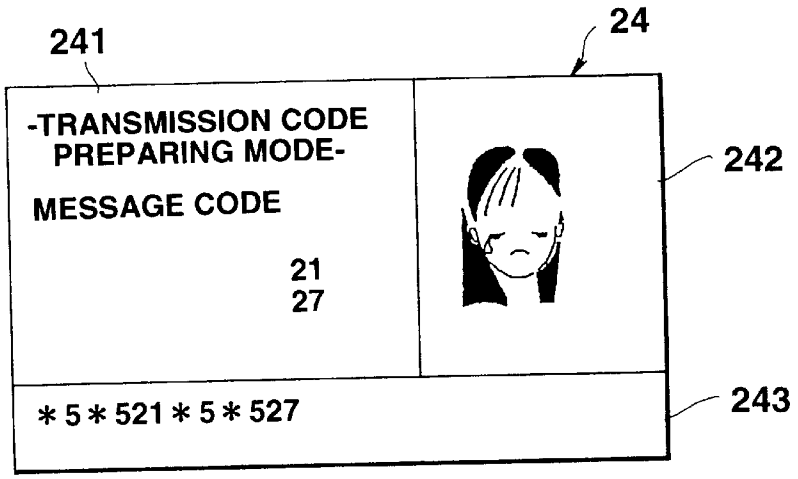

In transmitting a dynamic picture to the pager 9, the user input the portrait designating code "*5*5" again. By this key operation, the decision in step S609 is "YES", the decision in step S612 is "NO" and the next available portrait is displayed in step S607. Subsequently, when the set key 43 is depressed while the portrait with the portrait code "27" is blinking on the portrait display section 242, the portrait designating code "*5*5" and the portrait code "27" of the selected portrait are displayed after "*5*521" on the transmission code display section 243 as shown in FIG. 36B in step S608.

Figure 36C:
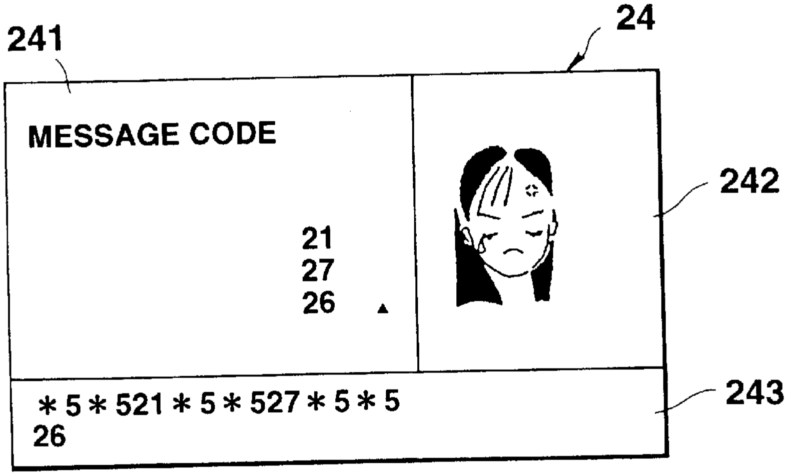
Figure 36D:
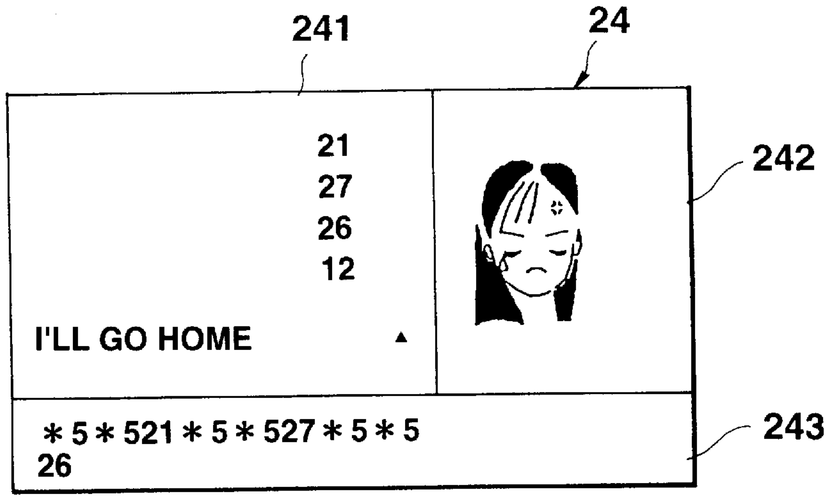
Figure 36E:
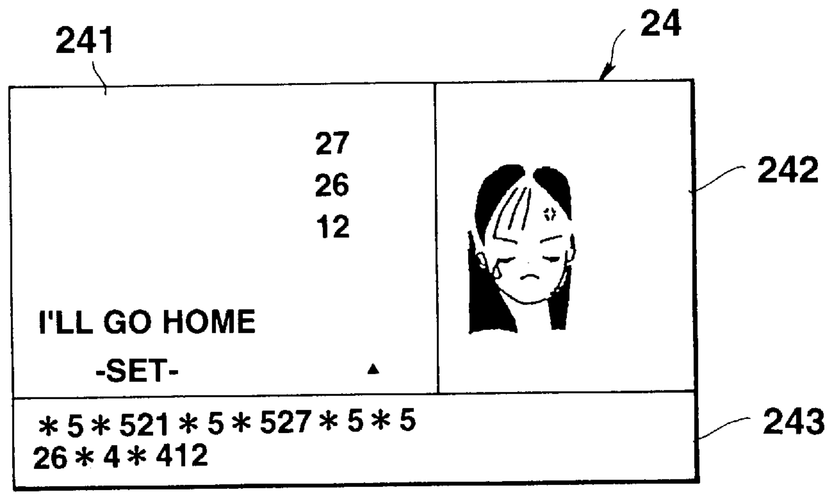

Further, when the set key 43 is depressed after the portrait designating code "*5*5" is input and while the portrait with the portrait code "26" is blinking, the portrait designating code "*5*5" and the portrait code "26" are displayed after "*5*521*5*527" on the transmission code display section 243 as shown in FIG. 36C.

Next, when the standard message designating code "*4*4" and the message code "12" are input, the decisions in steps S612, S610 and S611 are "YES", as shown in FIG. 37A. Because of the message code "12", the corresponding standard message "I'LL GO HOME" is displayed on the message display section 241 in step S606. When the set key 43 is operated, the standard message designating code "*4*4" and the message code "12" are displayed after "*5*521*5*527*5*526" on the transmission code display section 243 as shown in FIG. 37B.

The user can transmit the prepared message to the pager 9 by sequentially transmitting codes, displayed on the transmission code display section 243, from the push-phone 1 or the like.

Figure 37:
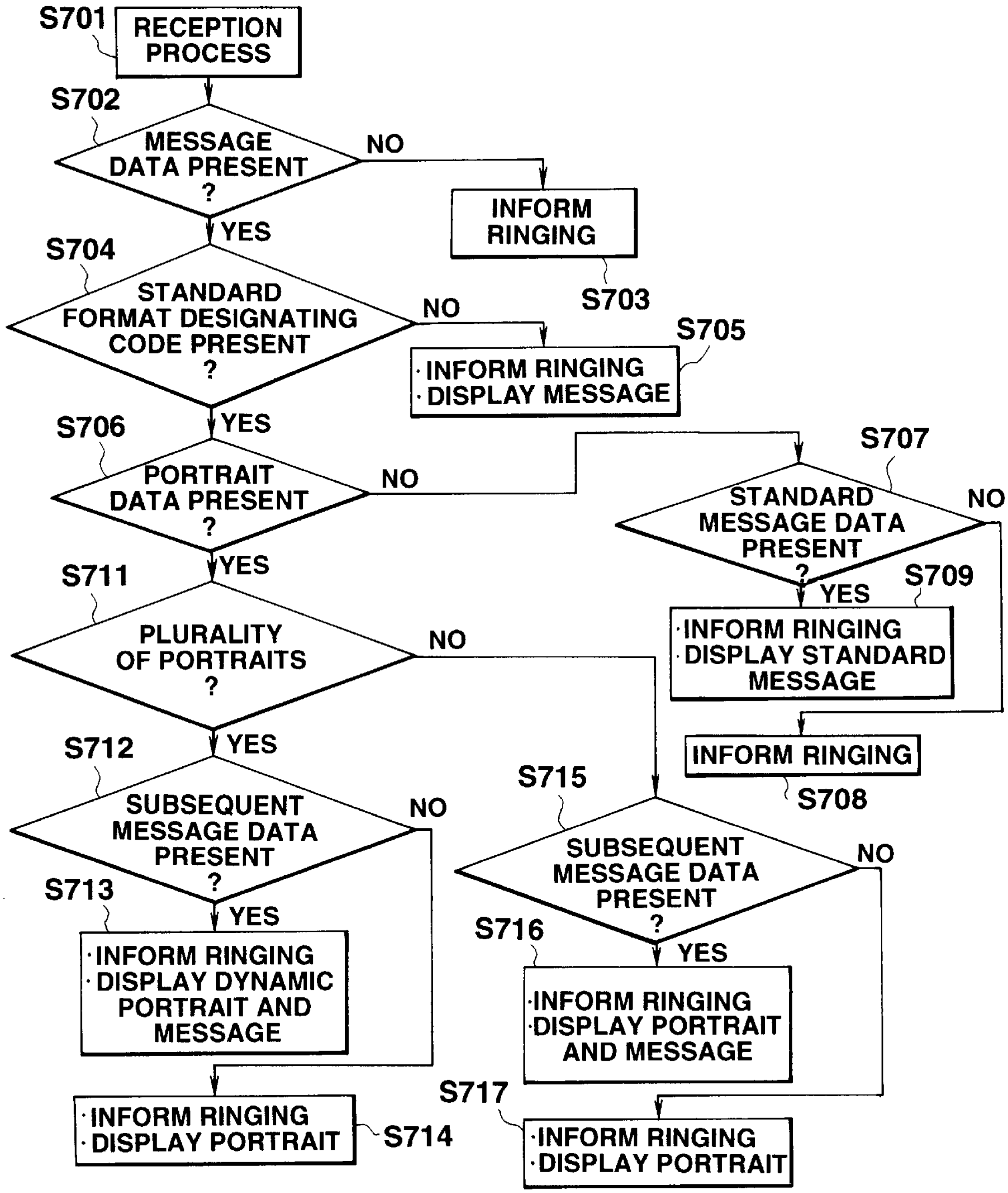
FIG. 37 is a flowchart for explaining the reception operation of the pager of the third embodiment.

The reception operation of the pager 9 will now be described with reference to the flowchart shown in FIG. 37.

First, the RF receiver 12 demodulates the radio frequency signal, received at the antenna 11, and sends the demodulated signal to the decoder 13. The decoder 13 determines if the ringing signal in the demodulated signal matches with the ID code stored in the ID-ROM 15. When both match with each other, the decoder 13 sends the ringing detection signal to the CPU 14. The CPU 14 executes a process starting at step S702 in response to this ringing detection signal.

In step S702, the CPU 14 determines if message data follows this ringing signal. If there is no subsequent message data, the CPU 14 proceeds to step S703 to inform the user of the ringing, for example, by displaying a symbol indicating the ringing.

When some message data follows the ringing signal, the CPU 114 controls the decoder 13 to continue the reception of the incoming signal, obtains the message data, and determines if the standard format designating code "*4*4" or "*5*5" is present at the head of the message.

When the standard format designating code "*4*4" or "*5*5" does not exist, the ringing is informed and the received message is displayed on the display section 24 in step S705. Subsequently, the ringing is informed and then the reception time and the received message data are stored in the RAM 20 after which the processing is terminated.

When it is determined in step S704 that there is message data including the standard format designating code "*4*4" or "*5*5" at the head, the flow proceeds to step S706 where it is determined if there is the portrait data including the portrait designating code "*5*5" and the portrait code. When there is no portrait data "*5*5", the flow proceeds to step S707 where it is determined if there are the standard message data including the standard message designating code "*4*4" and a message code. When there is no standard message data, the ringing is informed in step S708 after which the processing is terminated. When the standard message data exists, the corresponding standard message is displayed on the display section 24 in step S709. Further, the reception time and the received message data are stored in the RAM 20 after which the processing is terminated.

Figure 38A:
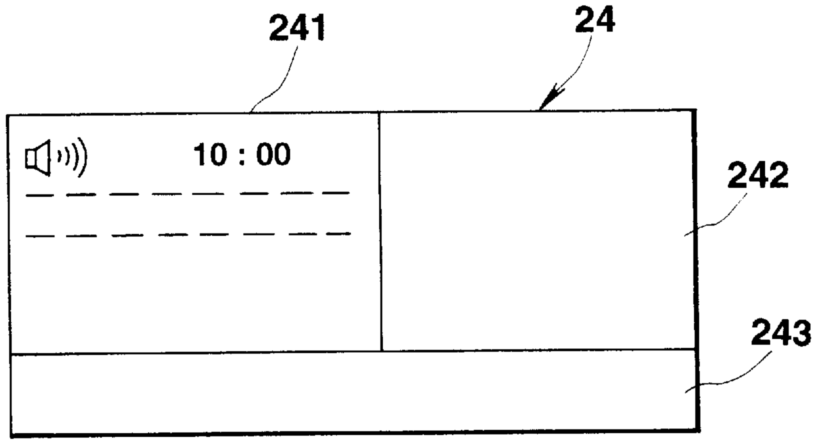
FIGS. 38A through 43C are diagrams showing display examples for the pager of the third embodiment.

FIG. 38A shows a display example in the case where message data "*4*4" has been received. As the message code is not present after the standard message designating code "*4*4", the decision in step S707 is "NO". Therefore, the reception time and the symbol indicating no-message are displayed on the display section 24.

Figure 38B:
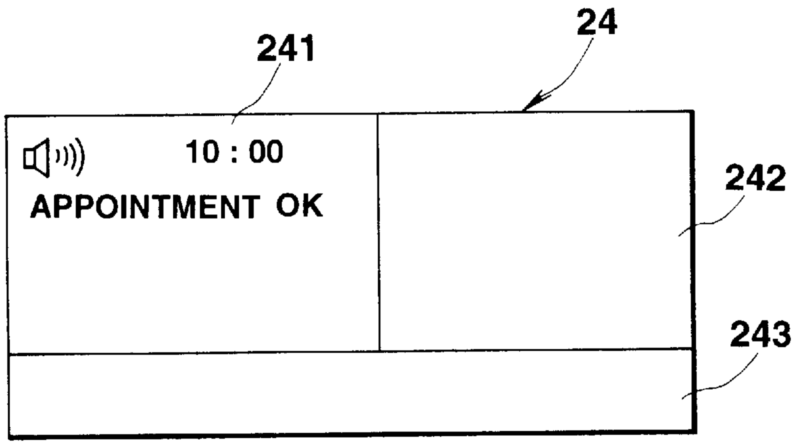

FIG. 38B shows a display example in the case where message code "*4*416" has been received. As the message code "16" is present after the standard message designating code "*4*4", the decision in step S707 is "YES" and "APPOINTMENT OK" corresponding to the message code "16" is read from the standard message table in FIG. 3 in the ROM 19. This message is displayed on the message display section 241 of the display section 24.

When the presence of the portrait data is determined in step S706, the flow proceeds to step S711. In step S711, it is determined if there are a plurality of pairs of the portrait designating codes "*5*5" and portrait codes. When there are a plurality of pairs of the portrait designating codes "*5*5" and portrait codes, the flow proceeds to step S712 to determine is message data follows the last portrait code. When message data is present after the last portrait code, the flow proceeds to step S713 where the ringing is informed and a plurality of portraits corresponding to the plurality of portrait codes are displayed on the portrait display section 242 of the display section 24, sequentially switched from one another. As a result, the displayed portraits becomes a dynamic picture. Further, the ringing is informed, the message is displayed on the message display section 241 of the display section 24, and the received message data is stored in the RAM 20 after which the processing is terminated.

Figure 39A:
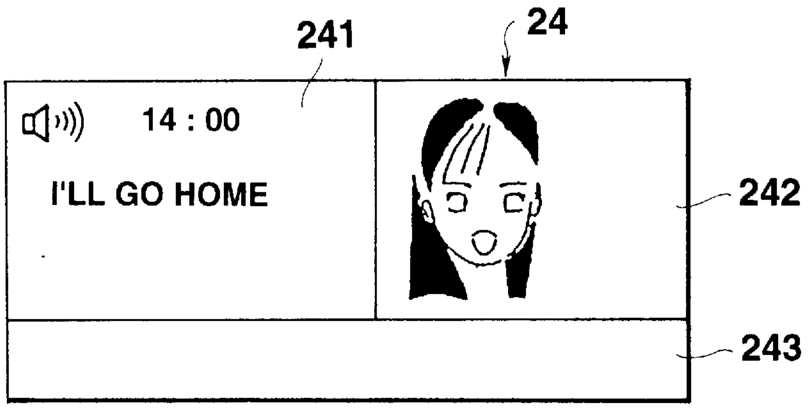
Figure 39B:
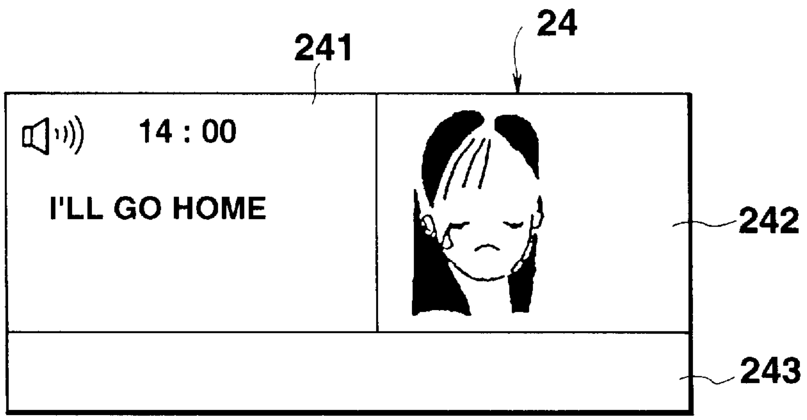
Figure 39C:
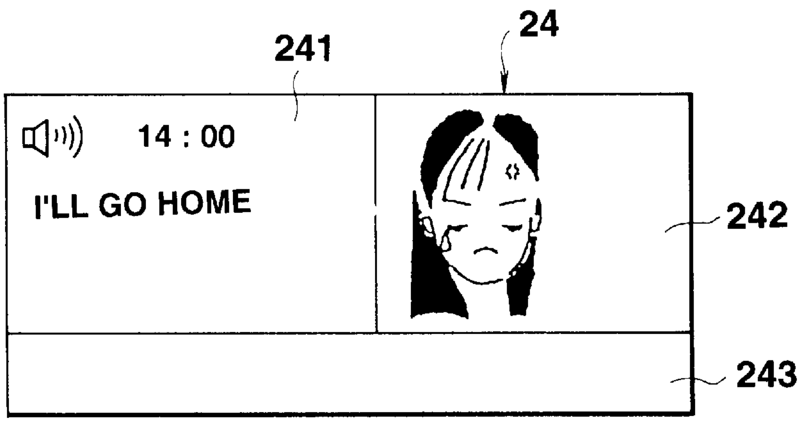

FIGS. 39A to 39C show display examples when message data "*5*521*5*527*5*526*4*412" has been received.

Because this message data contains a plurality of pairs of the portrait designating codes "*5*5" and portrait codes, the decisions in step S702, S704, S706 and S711 are "YES". As the subsequent standard message data "*4*412" exists, the decision in step S712 is also "YES". In step S713, therefore, the portraits corresponding to the portrait codes "21", "27" and "26" are read from the portrait table shown in FIG. 4. Those three portraits are displayed, switched from one to another, on the portrait display section 242 in the order of FIG. 39A→FIG. 39B→FIG. 39C→FIG. 39A and so forth. Based on the standard message designating code "*4*4" and the message code "12", "I'LL GO HOME" is read from the standard message table in FIG. 3 in the ROM 19, and this message is commonly displayed on the message display section 241 as shown in FIGS. 39A to 39C.

When it is determined in step S712 that message data is not present immediately after the portrait code, the flow proceeds to step S714. In step S714, the ringing is informed and a plurality of portraits corresponding to a plurality of portrait codes are displayed, switched from one to another, on the portrait display section 242. Therefore, the displayed portrait becomes a dynamic picture. Subsequently, the reception time, received message data and so forth are stored in the RAM 20 after which the processing is terminated.

Figure 40A:
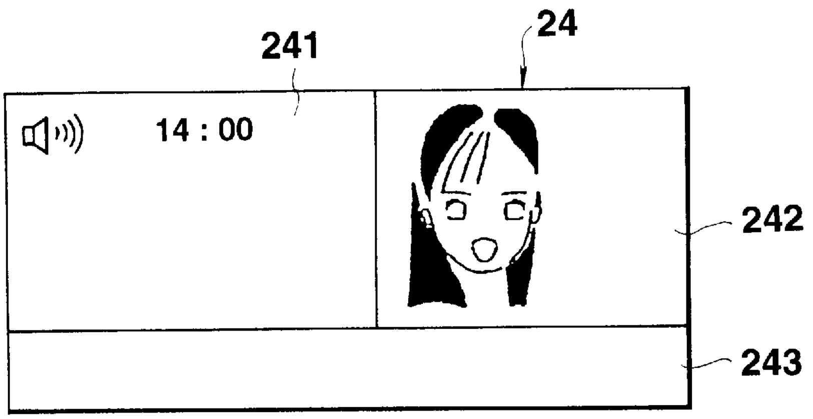
Figure 40B:
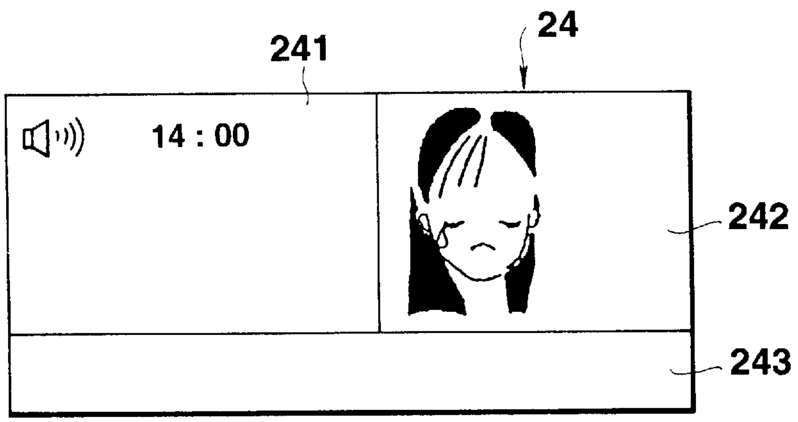
Figure 40C:
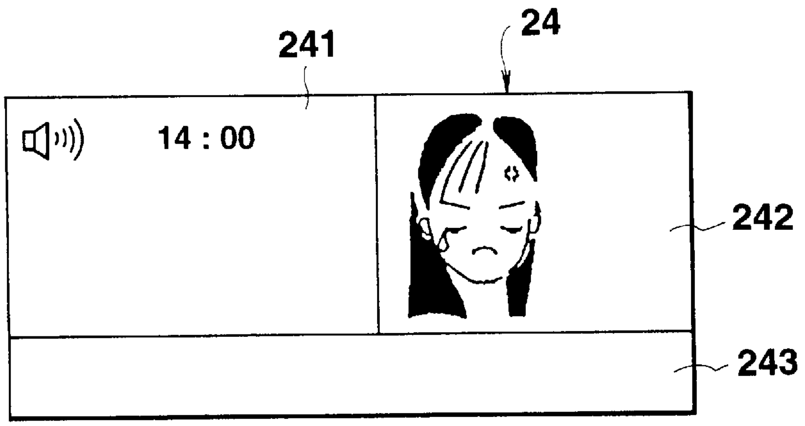

FIGS. 40A to 40C show display examples when the received message is "*5*521*5*527*5*526". This message data does not contain message data immediately after the portrait code. Thus, the decision in step S712 is "NO", and the flow proceeds to step S714. In step S714, the portraits corresponding to the portrait codes "21", "27" and "26" are read from the portrait table shown in FIG. 4. Those three portraits are displayed, switched from one to another, on the portrait display section 242 in the order of FIG. 40A→FIG. 40B→FIG. 40C→FIG. 40A and so forth.

When it is determined in step S711 that there is just one pair of the portrait designating code "*5*5" and the portrait code (no plural pairs), the flow proceeds to step S715. In step S715 it is determined if message data exists immediately after the portrait code. When it is determined that message data immediately follows the portrait code, the flow proceeds to step S716. In step S716, the ringing is informed and the portrait data corresponding to the portrait code is displayed on the portrait display section 242 and the message is displayed on the message display section 41. Further, those data are stored in the RAM 20 after which the processing is terminated.

Figure 41A:
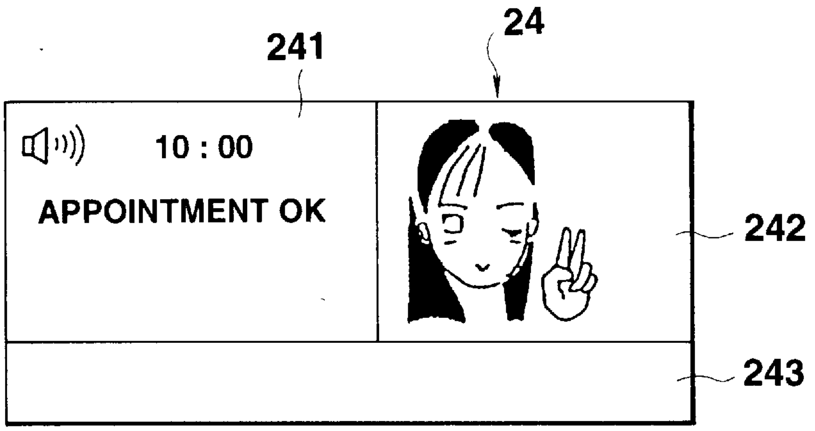

FIG. 41A shows a display example when there is only one pair of the portrait designating code and portrait code and message data immediately follows the portrait code. In this display example, the received message is "*5*528*4*4*416". In this case, based on the portrait designating code "*5*5" and the portrait code "28", the portrait corresponding to the portrait code "28" is read from the portrait table shown in FIG. 4 and is displayed on the portrait display section 242. Further, based on the standard message designating code "*4*4" and the message code "16", "APPOINTMENT OK" is read from the standard message table shown in FIG. 3 and is displayed on the message display section 241. Then, the reception time, received message data, etc. are stored in the RAM 20 after which the processing is terminated.

When it is determined in step S715 that no message data is present immediately after the portrait code, the ringing is informed and the portrait corresponding to the portrait code is displayed on the portrait display section 242 in step S717. Further, the reception time, received message data and so forth are stored in the RAM 20 after which the processing is terminated.

Figure 41B:
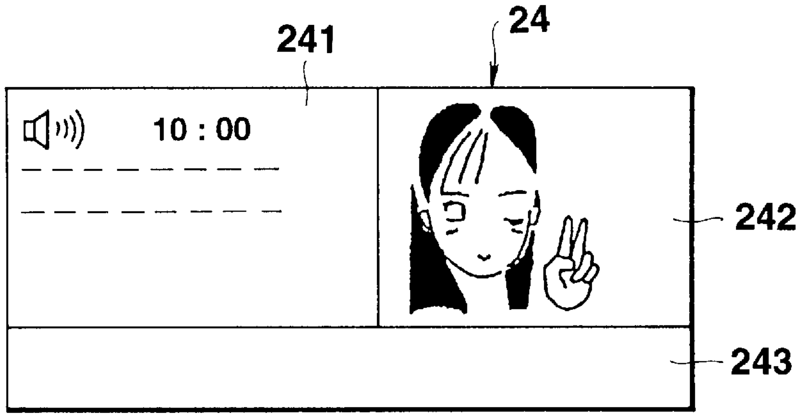

FIG. 41B shows a display example when there is no message data immediately after the portrait code. In this display example, the received message is "*5*528". In this case, based on the portrait designating code "*5*5" and the portrait code "28", the portrait corresponding to the portrait code "28" is read from the portrait table shown in FIG. 4 and is displayed on the portrait display section 242.

According to the pager 8 of this embodiment, as described above, when one portrait or a plurality of portraits are selected, a sequence of codes that should be input to transmit the portraits is displayed on the transmission code display section 243. By transmitting the displayed code sequence from the push-phone or the like, message data in a dynamic picture form which uses a plurality of portraits and is very expressive can be transmitted.

When the pager 9 of this embodiment receives a plurality of portrait codes, it can display a plurality of corresponding portraits, sequentially switched from one to another, on the display section 24. Therefore, it is possible to display a portrait code in a dynamic picture so that an impressive message can be exchanged with this paging system.

This invention is not limited to the above-described embodiment, but may be modified in various other forms without departing from the scope and spirit of the invention.

For example, a transmission code displayed on the transmission code display section 243 is transmitted using a separate telephone unit in the above-described embodiment. The prepared transmission code may however be transmitted directly from the pager 8. As shown in FIG. 2, for example, the dialer key 21 and dialer key speaker 22 indicated by the broken lines may be connected to the CPU 14, so that the transmission code displayed on the transmission code display section 243 is input from the dialer key 21 and a dialing tone signal is generated from the dialer key speaker 22. When this dialing tone signal is transmitted to the service company 3 from a push-phone 1 or the like, a message can be transmitted to the pager 9.

Further, an external output terminal, e.g., the modular plug 26 may be connected via the interface 27 to the CPU 14. In this case, a transmission code may be sent directly to the service company 3 over the public telephone line 2 or the like by connecting the modular plug 26 to the modular jack 28 to establish communication with the service company 3.

Although a portrait is transmitted and displayed on the pager 9 in the above-described embodiment, the transmission data is not limited to a portrait but any image data may be transmitted and displayed. In this case, the display section may be formed of a dot matrix type one.

Figure 42A:
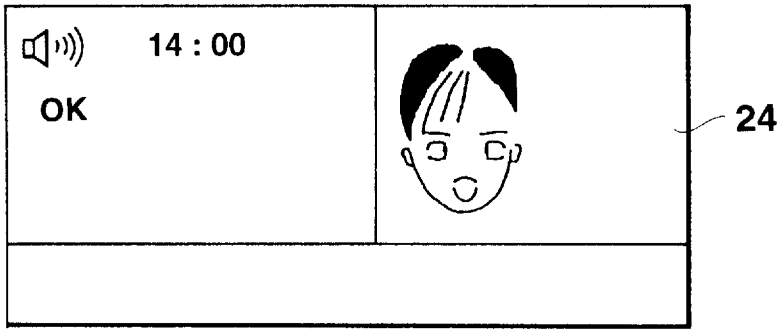
Figure 42B:
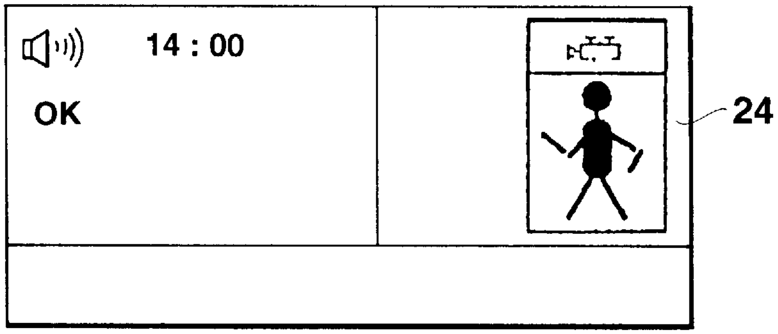
Figure 42C:
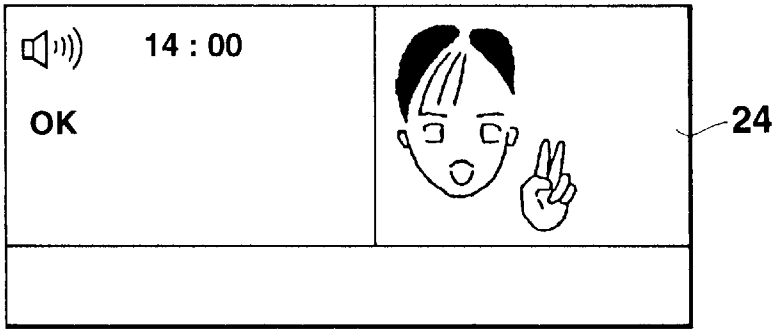
Figure 43A:
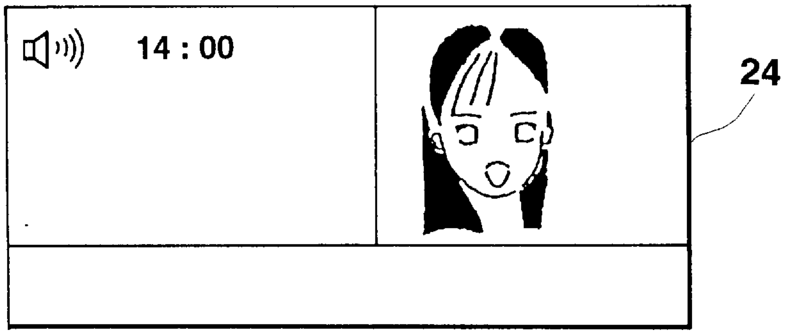
Figure 43B:
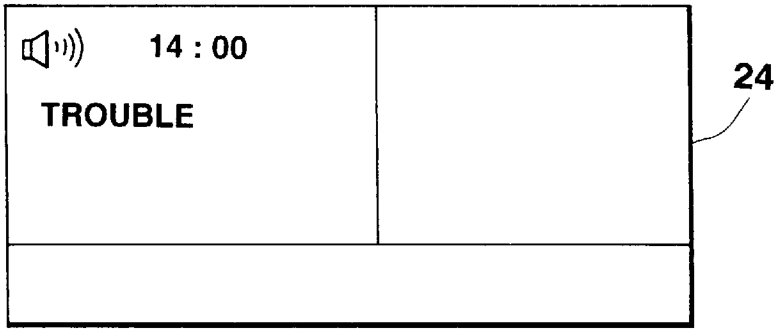
Figure 43C:
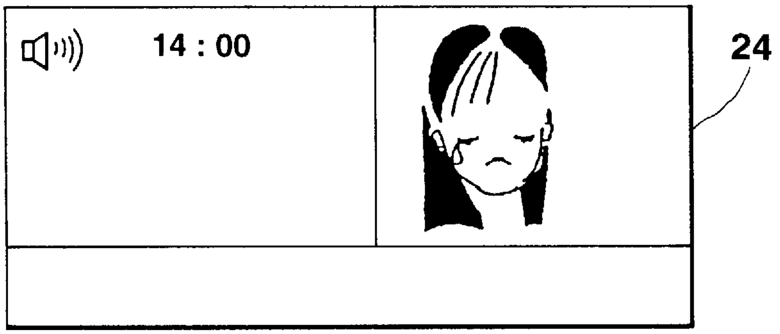

For example, portraits as shown in FIGS. 42A, 42B and 42C and image data other than portraits and previously stored in the ROM 19 may be displayed in the order of FIG. 42A→FIG. 42B→FIG. 42C→FIG. 42A and so forth. Further, the display may be presented in the order of FIG. 43A→FIG. 43B→FIG. 43C→FIG. 43A and so forth by alternately displaying a portrait and a standard message.

According to the above-described embodiment, a sequence of the transmission codes is prepared with the pager 8 by using the standard message table and portrait table stored in the ROM 19. But, a message code and a portrait code may be input using a standard message table and a portrait table which are recorded on another medium.

Fourth Embodiment

Although patterns of a plurality of parts are specified to designate a portrait in the second embodiment, this method requires many parts to designate, which may make it inconvenient to prepare a transmission code. To solve such a problem, for example, a basic portrait and some parts of this portrait which need to be changed may be designated, thus reducing the number of codes to be transmitted. An embodiment covering this feature will be described below.

The pagers 8 and 9 according to this embodiment has the same appearance as the one shown in FIG. 34 and its circuit structure is the same as the one shown in FIG. 2. The ROM 19 stores a standard message table shown in FIG. 3, a portrait code matrix for woman shown in FIG. 21, and a portrait code matrix for man shown in FIG. 22. Codes are assigned to individual images in the portrait code matrixes for woman and man. For example, a portrait code "30" is obtained when the basic pattern of a woman's portrait shown in FIG. 21 is designated and a change pattern code "11" is obtained when the pattern of an "eyebrow" to change the basic pattern of the woman's portrait is designated.

Figure 44:
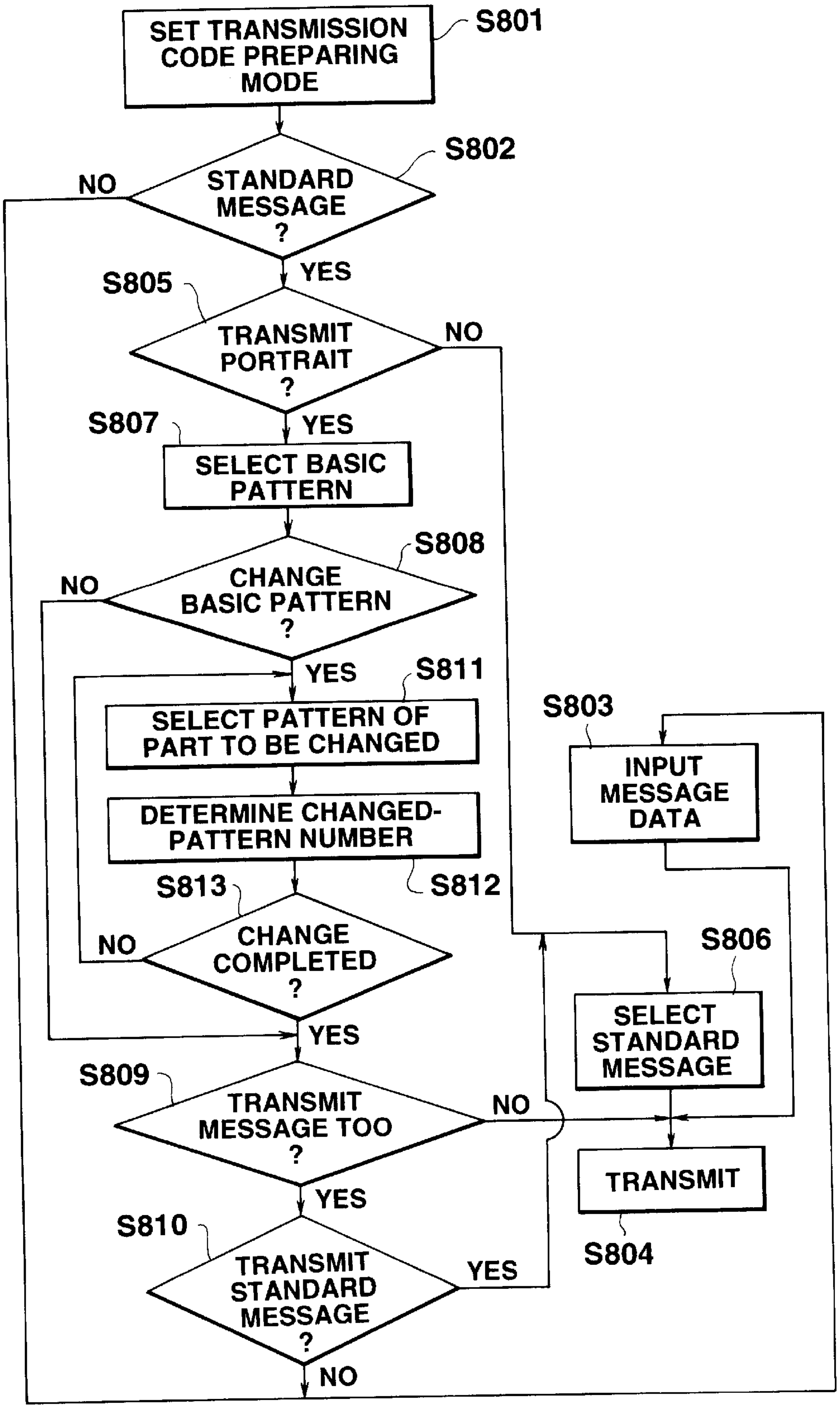
FIG. 44 is a flowchart for explaining the transmission operation of a pager according to a fourth embodiment.

An operation to prepare a transmission code using the pager 8 according to this embodiment will be described below with reference to the flowchart shown in FIG. 44.

First, the user selects the transmission code preparing mode using the mode key 45 in step S801. Next, the user sets the type of a message to be transmitted.

When message data is of a non-standard message (the first data is not "*"), the decision in step S802 is "NO" and the flow proceeds to step S803. The user inputs numerals as message data. The input sequence of numerals is displayed on the transmission code display section 243. The user inputs the transmission code displayed on the transmission code display section 243 from the push-phone 1 or the like and transmits it.

The user inputs the portrait designating code "*5*5" to transmit portrait, and inputs the standard message designating code "*4*4" to transmit standard message data. In transmitting a standard message, therefore, the decision in step S802 is "YES", the decision in step S805 is "NO", and the flow proceeds to step S806. The input standard message designating code "*4*4" is displayed on the transmission code display section 243.

The user inputs one of the message codes "01" to "20" corresponding to the desired standard message in the standard message table shown in FIG. 3. The input code is displayed on the transmission code display section 243.

In this manner, the button numbers of the push-phone 1 which should be operated in transmitting standard message data and the input sequence of the numbers are displayed on the transmission code display section 243.

The user can transmit a message by operating, for example, the push buttons of the push-phone 1 shown in FIG. 1 while referring to the sequence of numerals displayed on the transmission code display section 243 (step S804).

To transmit portrait, the user inputs the portrait designating code "*5*5" through a key operation. Accordingly, the decisions in steps S802 and S805 are "YES", and the flow proceeds to step S807.

In step S807, the basic pattern for a woman shown in FIG. 21 blinks on the portrait display section 242. By operating the select key 44, this woman's basic pattern and the basic pattern for a man shown in FIG. 22 are switched from one to the other in a blinking form. When the set key 43 is operated with one of the basic patterns blinking, the basic pattern of the portrait is set. As the portrait is set, the portrait designating code "*5*5" and the portrait code ("30" or "31") of the basic pattern set in step S807 are displayed on the transmission code display section 243.

The user determines if the basic pattern of the displayed portrait should be changed. When patterns of some parts of the basic pattern are to be changed, the user inputs a change part designating code "*08". The presence or absence of this change part designating code is determined in step S808. When no basic pattern is to be changed, the decision in step S808 is "NO", and the flow proceeds to step S809.

In step S809 it is determined if a message should be transmitted. In transmitting a message, the user operates the numerical keys 42 to input a numeral. If no message is to be transmitted, i.e., when no numeral keys 42 are operated, the decision in step S809 is "NO", and the flow moves to step S804. In step S804, a sequence of codes necessary to transmit a message consisting of a basic pattern is displayed on the transmission code display section 243.

In transmitting a message, the decision in step S809 is "YES", and the flow proceeds to step S810.

It is determined in step S810 if the message to be transmitted is a standard message or the standard message designating code "*4*4" has been input. When the standard message is not to be transmitted, the decision in step S810 is "NO", and the flow proceeds to step S803. In step S803, the user inputs an ordinary numeral as message. The sequence of codes for transmitting the basic pattern of the portrait and the ordinary message is displayed on the transmission code display section 243. The user can transmit a message from the push-phone 1 or the like by referring to the code sequence (step S804).

In transmitting standard message together with portrait, the decision in step S810 is "YES", and the flow proceeds to step S806. In step S806, the user inputs the message code (01–20) corresponding to the desired standard message in the standard message table shown in FIG. 3. The standard message designating code and message code are displayed together with the portrait designating code and portrait code on the transmission code display section 243. Then, the flow proceeds to step S804 to permit the portrait formed by the basic pattern and the message consisting of the standard message data to be transmitted.

To change patterns of some parts of a basic pattern, the user selects the basic pattern and then operates the mode key 45. Therefore, the decision in step S808 is "YES", and the flow proceeds to step S811.

In step S811, the "eyebrow" of the basic pattern determined in step S807 blinks. Operating the mode key 45 shifts the blinking part in the order of "eyebrow"→"left eye"→"right eye"→"mouth"→"sweat"→"blood vessels"→"tear"→"cheek"→"hand"→"heart"→"eyebrow" and so forth. By operating the select key 44, the patterns of the blinking parts are read from the portrait code matrix for woman and are displayed switched from one another. When the proper pattern is displayed, the user operates the set key 43 then. This key operation permits the code of the selected pattern (change part designating code) is obtained from the portrait code matrixes for woman and man shown in FIGS. 21 and 22. Subsequently, the change part designating code "*08" and the acquired change pattern code are displayed on the transmission code display section 243.

When the alteration of the portrait is completed, the user operates the set key 43. When this alteration is not completed, the user operates the mode key 45 to select the next part. Those key operations are determined in step S813. When the alteration of the portrait is not completed, the flow returns to step S811 to obtain change part designating codes for the other parts in the same manner as discussed above.

When the alteration of the portrait is completed, the flow proceeds to step S809.

In step S809, the user determines whether or not to transmit a message too. When no message is to be transmitted, the decision in step S809 is "NO", and the flow proceeds to step S804 where a portrait with the basic pattern changed can be transmitted.

In transmitting an ordinary message (sequence of numerals) together with a portrait, the user inputs a sequence of numerals. In transmitting a standard message together with a portrait, the user inputs the standard message designating code "*4*4" and a message code.

When no standard message is to be transmitted, the decision in step S809 is "YES", the decision in step S810 is "NO" and the input sequence of numerals is displayed on the transmission code display section 243 in step S803.

When a standard message is to be transmitted together with a portrait, the decisions in steps S809 and S810 are "YES", and the flow proceeds to step S806.

In step S806, the input standard message designating code and message code are displayed on the transmission code display section 243.

Figure 45A:
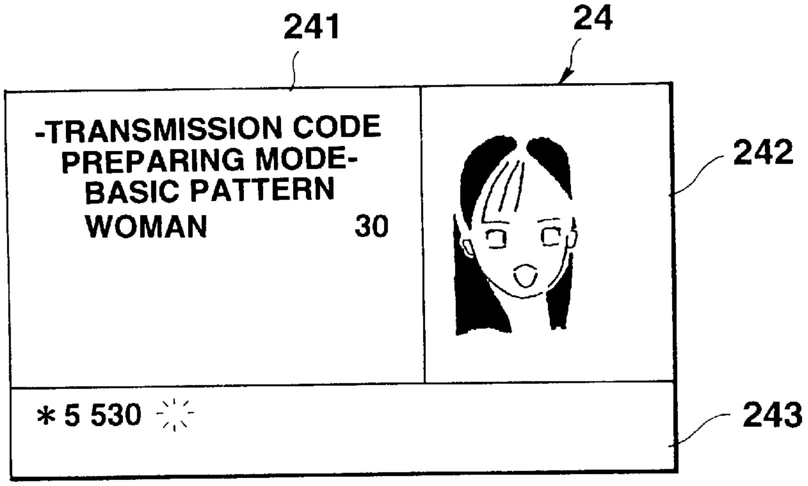
FIGS. 45A through 45C are flowcharts for explaining the procedures for preparing a sequence of transmission codes in the pager of the fourth embodiment.
Figure 45B:
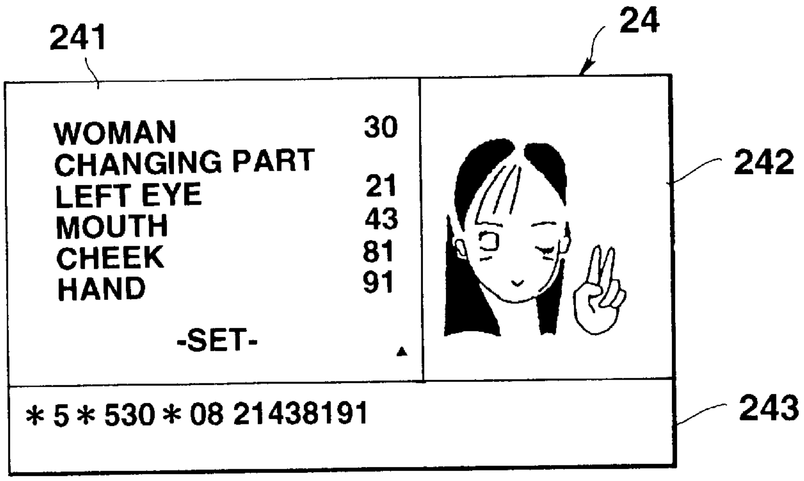
Figure 45C:
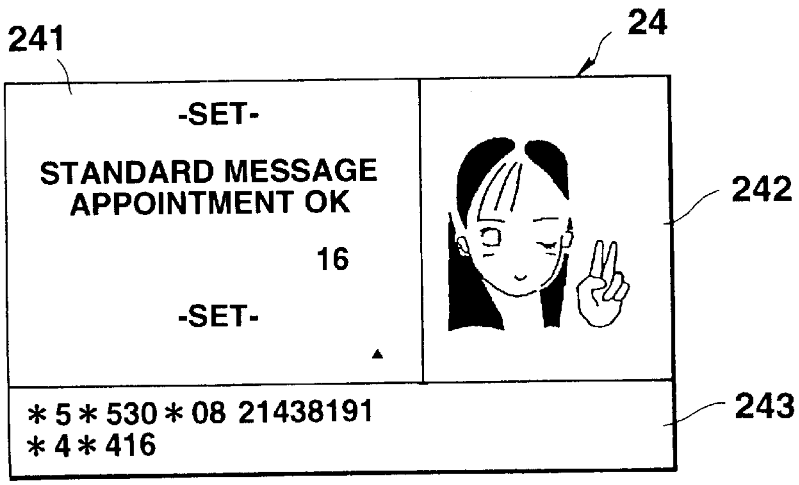

FIGS. 45A through 45C illustrate procedures of preparing a transmission code for a message including a portrait and a standard message.

First, the user instructs the transmission message preparing mode and inputs the portrait designating code "*5*5" with the numerical keys 42. The input key code is displayed on the transmission code display section 243. Through this key operation, the flow proceeds in the order of step S801→S802→S805→S807.

In step S807, the basic pattern for a woman or a man blinks on the portrait display section 242. By operating the select key 44, this basic pattern can be changed. If the set key 43 is operated when the basic pattern of the woman's portrait is displayed as shown in FIG. 45A, this is set as the basic pattern. Code "30" of the woman's basic pattern is displayed after the portrait designating code "*5*5" on the transmission code display section 243.

To change patterns of some parts of the selected basic pattern, the user inputs the change part designating code "*08". This input event is detected in step S808 and the flow proceeds to step S811. In this step, the user operates the mode key 45 to switch the type of a part, operates the select key 44 to switch the part and operates the set key 43 to choose the desired pattern. The selected change pattern code is displayed after the change part designating code "*08" on the transmission code display section 243.

FIG. 45B presents an example where the patterns of the left eye, mouth, cheek and hand of the woman's basic pattern are changed with the patterns of the change portrait codes "21", "43", "81" and "91".

When the standard message designating code "*4*4" and the message code "16" are input, the decisions in steps S809 and S810 are "YES" and "*4*416" is displayed after the aforementioned "*5*530*0821438191" on the transmission code display section 243, as shown in FIG. 45C.

Through the above operation, the transmission message consisting of a portrait and standard message is completed.

Figure 46:
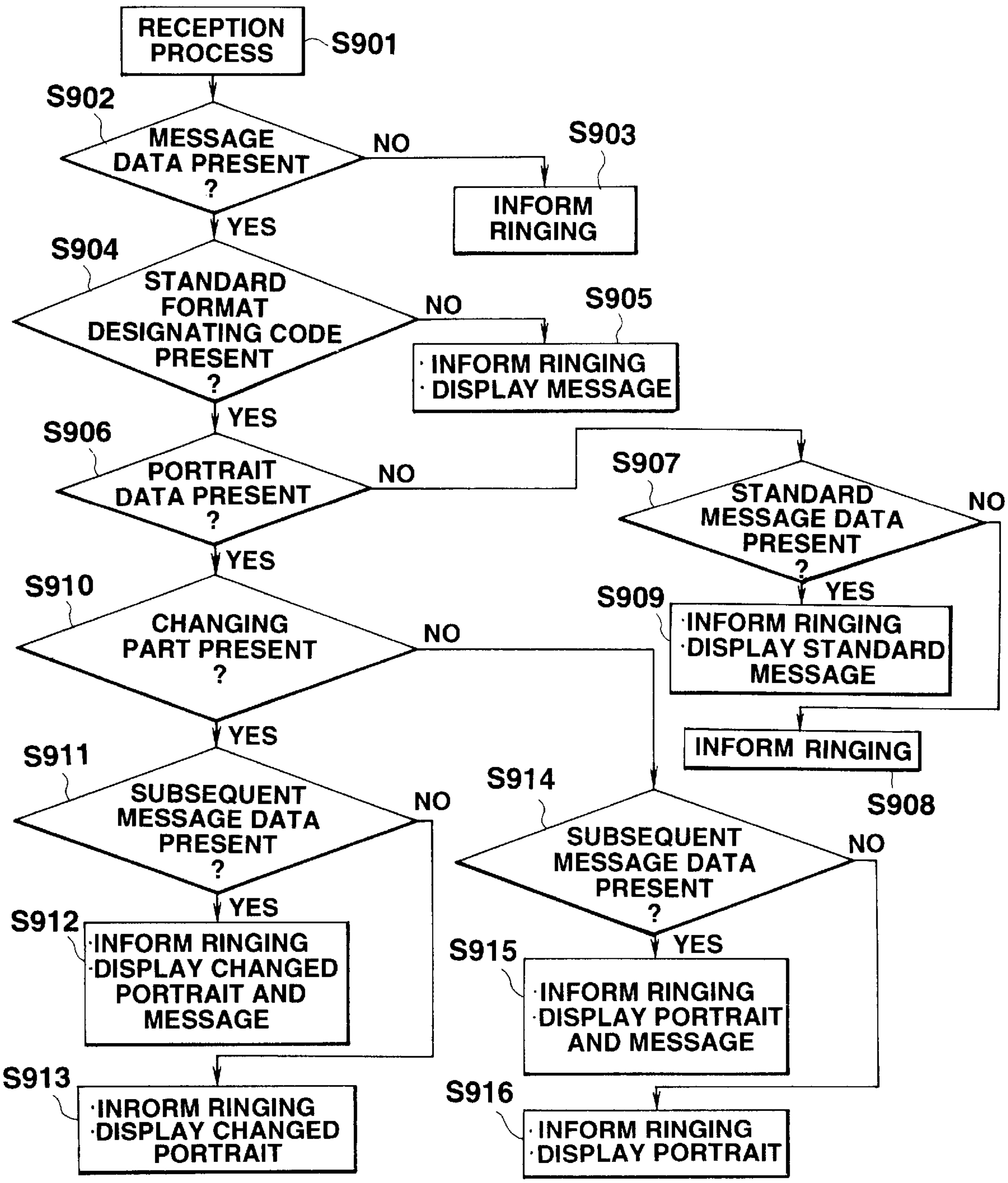
FIG. 46 is a flowchart for explaining the reception operation of the pager of the fourth embodiment.

The operation of the pager 9 according to this embodiment will be described below with reference to the flowchart shown in FIG. 46.

First, in step S901, the decoder 13 determines if the ringing signal demodulated by the RF receiver 12 matches with the ID code stored in the ID-ROM 15, and sends the ringing detection signal to the CPU 14 when both match with each other. In response to the ringing detection signal, the CPU 14 executes a process starting at step S902.

In step S902 it is determined if message data follows the ringing signal. When there is no subsequent message data, the flow proceeds to step S903 to inform the ringing, for example, by displaying the symbol representing the ringing and driving the loudspeaker 16 and so on.

When message data follows the ringing signal, the flow proceeds to step S904. In step S904, the CPU 14 instructs the decoder 13 to keep receiving the incoming signal and acquires message data. The CPU 14 determines if the standard format designating code "*4*4" or "*5*5" is present at the head of the obtained message. When there is no standard format designating code, the ringing is informed and a message based on the received message data is displayed on the display section 24 in step S905. Further, the reception time and the received message data are stored in the RAM 20 after which the processing is terminated.

When it is determined in step S904 that the standard format designating code exists, the flow proceeds to step S906 where it is determined if there is portrait data including a pair of the portrait designating code "*5*5" and the portrait code. When the portrait data do not exist, the flow proceeds to step S907 where it is determined if there is the standard message data including a pair of the standard message code "*4*4" and any of the message codes "01" to "20". When there is no message code, the ringing is informed in step S908. When there is a message code, on the other hand, the corresponding standard message is displayed on the display section 24 in step S909.

Figure 47A:
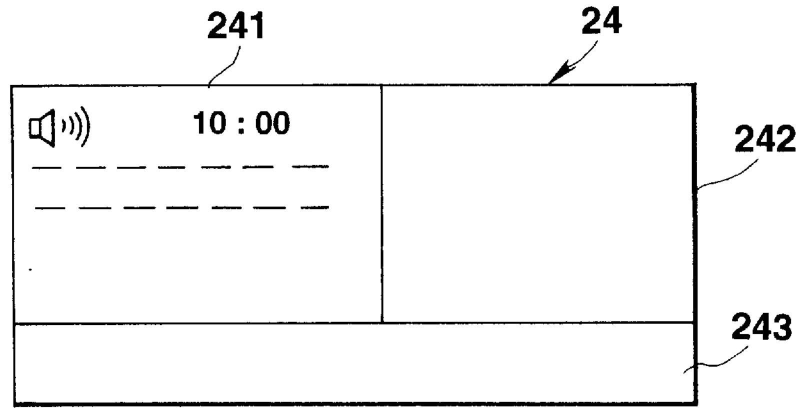
FIGS. 47A through 51 are diagrams showing display examples for the pager of the fourth embodiment.

FIG. 47A shows a display example in the case where the absence of the message code is determined in step S907, e.g., in the case where "*4*4" has been received as message data. As no message code follows the standard message designating code in this case, the reception symbol, the reception time and a symbol indicating that there is no message are displayed on the message display section 241 of the display section 24.

Figure 47B:
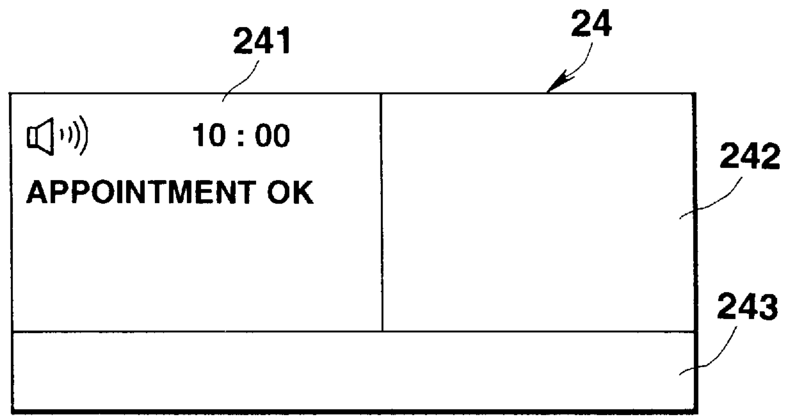

FIG. 47B shows a display example in the case where the presence of the message code is determined in step S907, e.g., in the case where "*4*416" has been received as message data. In this case, the message code "16" follows the standard message designating code "*4*4". Therefore, "APPOINTMENT OK" corresponding to the message code "16" is read from the standard message table shown in FIG. 3, and this message is displayed on the message display section 241.

When the presence of the portrait designating code and portrait code is determined in step S906, it is determined if the change part designating code "*08" follows the portrait code and there is a subsequent change pattern code in step S910.

When the presence of the change part designating code "*08" and change pattern code is determined, the flow proceeds to step S911 where it is determined if there is message data following the change pattern code.

When message data is present after the change pattern code, the flow proceeds to step S912. In step S912, the ringing is informed and a new portrait obtained by changing the basic pattern designated by the portrait code to a pattern designated by the change pattern code is produced. The display section 24 displays the changed portrait on the portrait display section 242 and a message based on the message data on the message display section 241. Further, those data are stored in the RAM 20 after which the processing is terminated.

Figure 48:
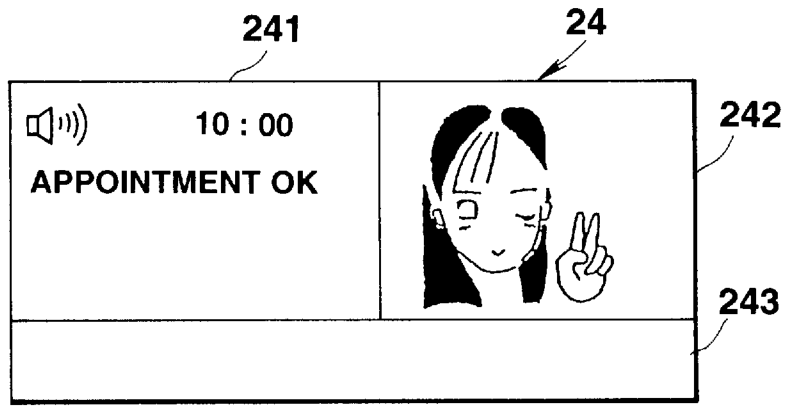

FIG. 48 shows a display example in such a case. In this example, the message data "*5*530*0821438191*4*416" shown in FIG. 45C has been received. In this case, the woman's basic pattern is read from the portrait code matrix for woman shown in FIG. 21 based on the portrait code "30" following the portrait designating code "*5*5". Next, patterns corresponding the change pattern codes "21", "43", "81" and "91" following the change part designating code "*08" are read from the portrait code matrix for woman, and a new portrait having the basic pattern partially changed is produced. This portrait is displayed on the portrait display section 242.

Further, based on the standard message designating code "*4*4" and the message code "16", "APPOINTMENT OK" is read from the standard message table shown in FIG. 3 and is displayed on the message display section 241.

When it is determined in step S911 that no message data follows this change pattern code, the flow proceeds to step S913 where the ringing is informed and the basic pattern corresponding to the portrait code is changed using the patterns corresponding to the change pattern codes. The changed basic pattern is displayed on the portrait display section 242. Further, the received message data and the like are stored in the RAM 20 after which the processing is terminated.

Figure 49:
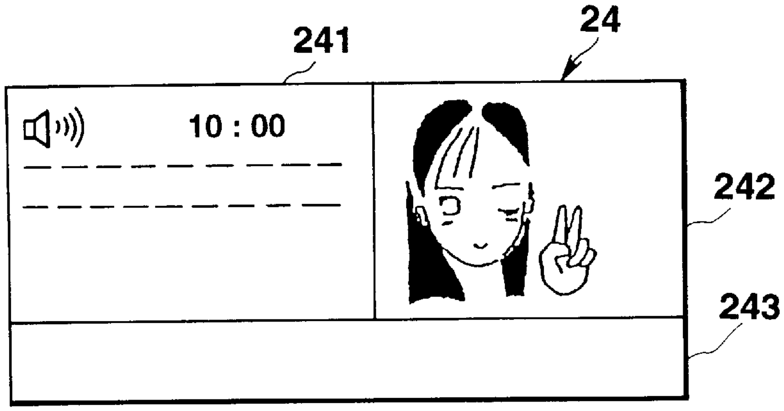

FIG. 49 shows a display example in such a case. In this example, the message data "*5*530*0821438191" has been received. In this case, the woman's basic pattern is read from the portrait code matrix for woman shown in FIG. 21 based on the portrait code "30" following the portrait designating code "*5*5". Next, patterns corresponding the change pattern codes "21", "43", "81" and "91" following the change part designating code "*08" are read from the portrait code matrix for woman. The basic pattern is partially changed based on those patterns, producing a new portrait. This portrait is displayed on the portrait display section 242.

When there is message data following the portrait code, the flow proceeds to step S915. In step S915, the ringing is informed, the basic pattern corresponding to the portrait code is displayed on the portrait display section 242 and a message based on the message data is displayed on the message display section 241. The received message data is stored in the RAM 20 after which the processing is terminated.

Figure 50:
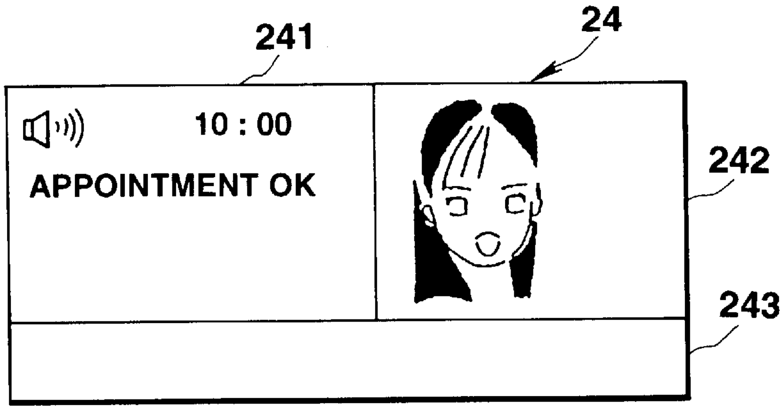

FIG. 50 shows a display example in such a case. In this example, the received message is "*5*530*4*416". In this case, the woman's basic pattern is read from the portrait code matrix for woman shown in FIG. 21 based on the portrait code "30" following the portrait designating code "*5*5". Based on the standard message designating code "*4*4" and the message code "16", "APPOINTMENT OK" is read from the standard message table shown in FIG. 3 and is displayed on the message display section 241.

When it is determined in step S914 that no message data follows the portrait code, the flow proceeds to step S916 where the ringing is informed and the basic pattern is displayed on the portrait display section 242. Further, those received message data are stored in the RAM 20 after which the processing is terminated.

Figure 51:
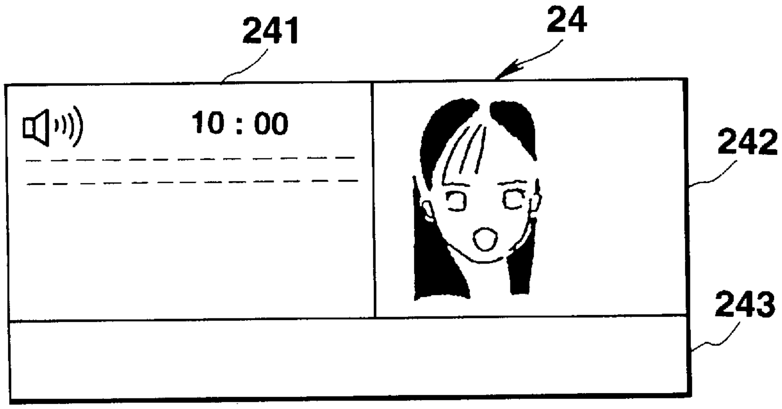

FIG. 51 shows a display example in such a case. In this example, the message data is "*5*530". Based on the portrait code "30" following the portrait designating code "*5*5", the woman's basic pattern is read from the portrait code matrix for woman shown in FIG. 21 and is displayed on the portrait display section 242.

According to this embodiment, as described above, the patterns of the individual parts of the basic pattern can be changed to desired patterns. It is therefore possible to prepare and transmit very expressive message.

Figure 52:
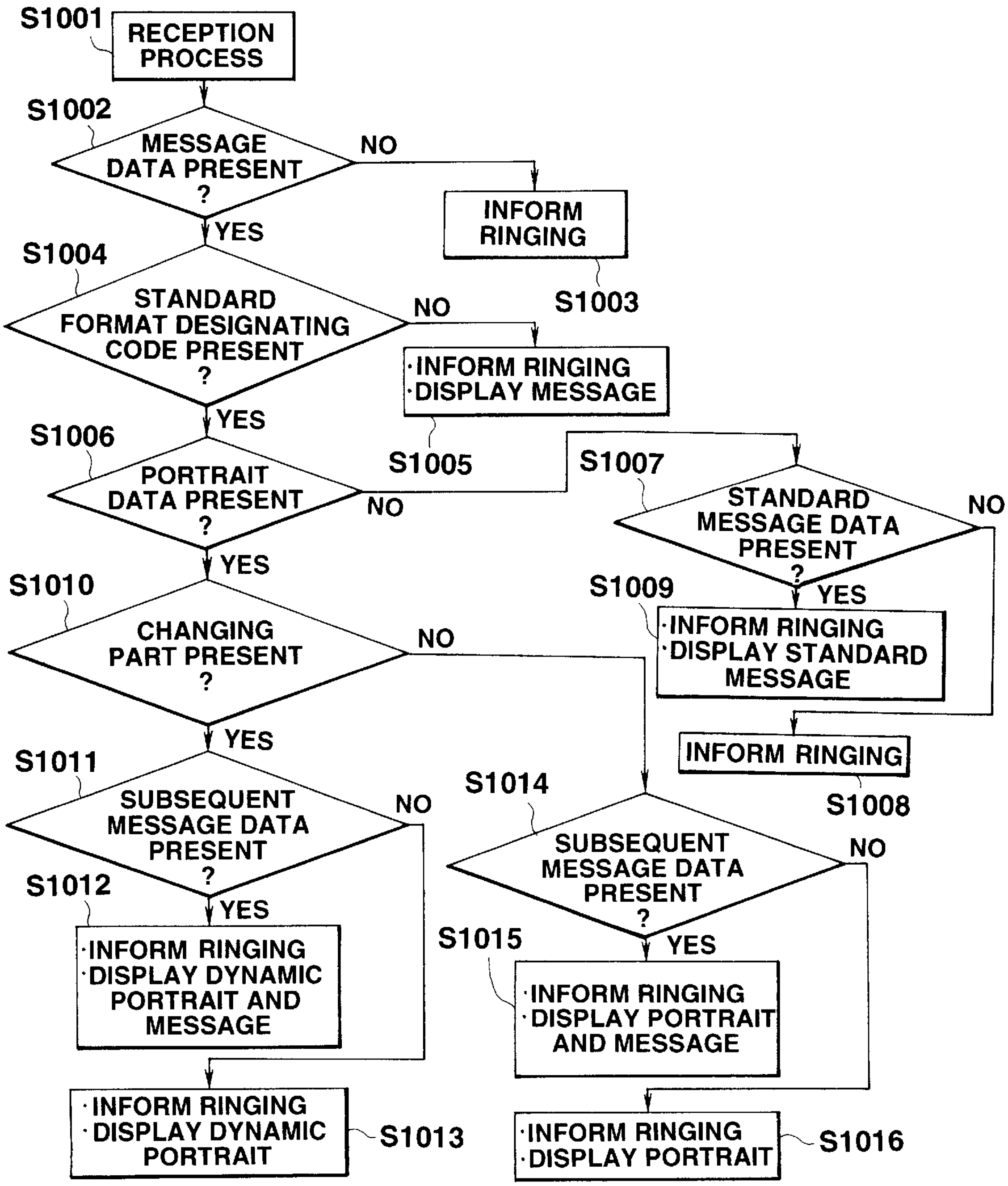
FIG. 52 is a flowchart for explaining the operation to receive a message including a dynamic picture in the pager of the fourth embodiment.

Although a portrait is a still picture in the foregoing description, a portrait may be a dynamic picture. The following will discuss the reception operation of the pager 9 in that case, with reference to FIG. 52.

The processes in steps S1001 to S1009 are substantially the same as the processes in steps S901 to S909.

When the presence of the portrait designating code and portrait code is determined in step S1006, it is determined in step S1010 if change pattern data including the change part designating code "*08" and a subsequent change pattern code follow the portrait code.

When the presence of the change part data is determined in step S1010, the flow proceeds to step S1011 where it is determined if there is message data following the change part data.

When message data is present after the change part data, the flow proceeds to step S1012. In step S1012, the ringing is informed and a first portrait formed of the basic pattern designated by the portrait code and a second portrait resulting from changing the first portrait based the patterns corresponding the change pattern codes are produced. Those first and second portraits are displayed, alternately switched from one to the other, on the portrait display section 242. Further, a message is displayed on the message display section 241 and those received message data are stored in the RAM 20 after which the processing is terminated.

When "*5*530*0821438191" is received as message data, for example, the woman's basic pattern is read as the first portrait from the portrait code matrix for woman FIG. 21 in the ROM 19, based on the portrait designating code "*5*5" and the portrait code "30". Next, the basic pattern is changed based on patterns corresponding the change pattern codes "21", "43", "81" and "91", thus yielding the second portrait. The first and second portraits are displayed, alternately switched from one to the other, on the portrait display section 242, as shown in FIGS. 50 and 48.

When it is determined in step S1011 that no message data follows the portrait code, the flow proceeds to step S1013. In step S1013, the ringing is informed and the first portrait based the basic pattern and the second portrait obtained by changing the first portrait based the pattern corresponding the change pattern code are produced. Those first and second portraits are displayed, alternately switched from one to the other, on the portrait display section 242. Further, received message data is stored in the RAM 20 after which the processing is terminated.

When it is determined in step S1010 that no change part data follows the portrait data, the flow proceeds to step S1014 where it is determined if message data follows the portrait data.

When message data follows the portrait code, the flow proceeds to step S1015 where the ringing is informed, the basic pattern based on the portrait code is displayed on the portrait display section 242 of the display section 24 and the message is displayed on the message display section 241. Then, those received data are stored in the RAM 20 after which the processing is terminated.

When the absence of message data after the portrait data is determined in step S1014, the flow proceeds to step S1016 where the ringing is informed and the basic pattern based on the portrait code is displayed on the portrait display section 242. Then, those data are stored in the RAM 20 after which the processing is terminated.

According to this embodiment, as described above, the first portrait formed by the basic pattern and the second portrait formed by changing the basic pattern based on the pattern corresponding to the change pattern code are displayed, alternately switched from one to the other, thus presenting a dynamic picture. It is therefore possible to transmit message data in a dynamic picture form which is rich in expression.

This invention is not limited to the above-described embodiment, but may be modified in various other forms as needed without departing from the scope and spirit of the invention.

For example, the foregoing description has been given of the case where the feeling, expression or the like of the caller is mainly transmitted in the form of a portrait to the pager 9. But, a business illustration matrix holding images representing actions and places as shown in FIG. 53 may be stored in the ROM 19, so that messages as shown in FIGS. 54A and 54B can be transmitted to and displayed on the pager 9.

Figure 53:
FIG. 53 is a diagram showing one example of a business illustration data matrix.
Figure 53:
Figure 53:
Figure 53:
Figure 53:
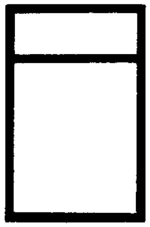
Figure 53:
Figure 53:
Figure 53:
Figure 53:
Figure 54A:
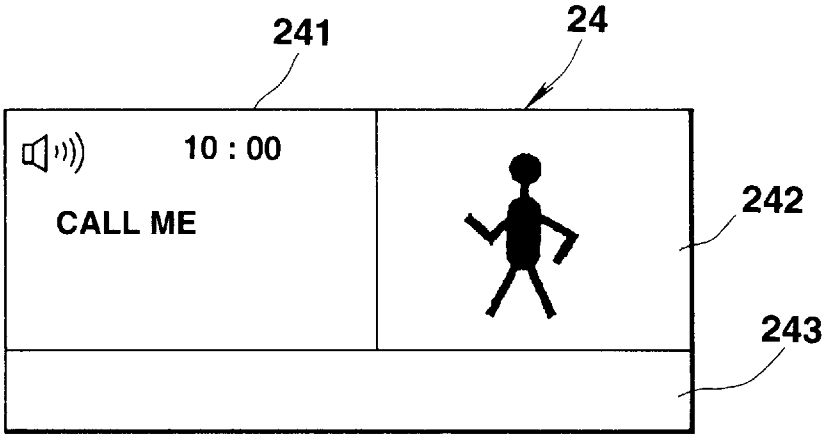
FIGS. 54A and 54B are diagrams showing other display examples for the pager of the fourth embodiment.
Figure 54B:
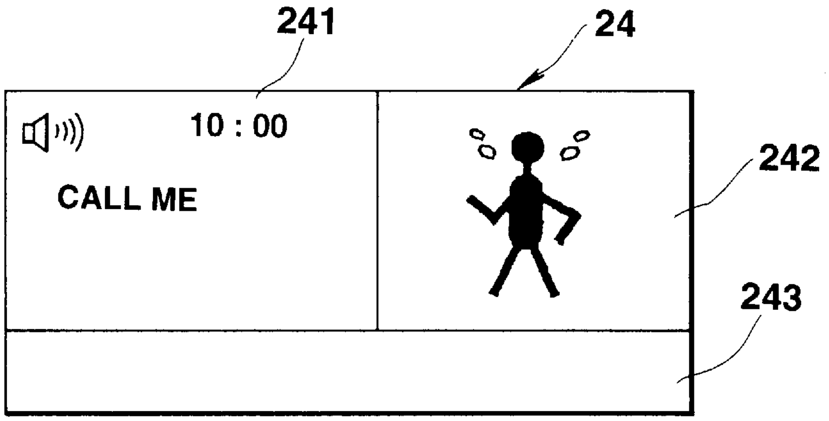

In this example, a business format designating code "*7*7" is used to designate an image shown in FIG. 53.

Suppose that as an example, the pager 4 has received the business format designating code "*7*7", basic pattern code "0121", change part designating code "*08", change code "31", standard message designating code "*4*4" and message code "02" as message data.

In this case, based on the codes "01 (human)" and "21 (left shift)" following the business format designating code "*7*7", the CPU 14 reads two corresponding patterns from the business illustration matrix shown in FIG. 53. The read patterns are combined to produce the basic pattern of a business illustration, for example, as shown in FIG. 54A. Then, the pattern corresponding to the code "31" following the change part designating code "*08" is read out, and the basic pattern is partially changed based on this pattern, thus producing a changed business illustration pattern as shown in FIG. 54B. The illustration patterns shown in FIGS. 54A and 54B are alternately displayed as a dynamic picture on the portrait display section 243.

Based on the message code "02" following the standard message designating code "*4*4", the standard message "CALL ME" is read. This standard message is displayed on the message display section 241 as shown in FIGS. 54A and 54B.

With the above structure, the importance and urgency of a message can be expressed by specifically designing a dynamic picture. The portrait and the business illustration may be displayed in order.

Fifth Embodiment

Although the portrait and pattern codes are designated to transmit a portrait in the second and fourth embodiments, a portrait may be specified by designating the codes of the individual parts constituting the portrait.

The fifth embodiment designed to accomplish the above will be described below.

Figure 55:
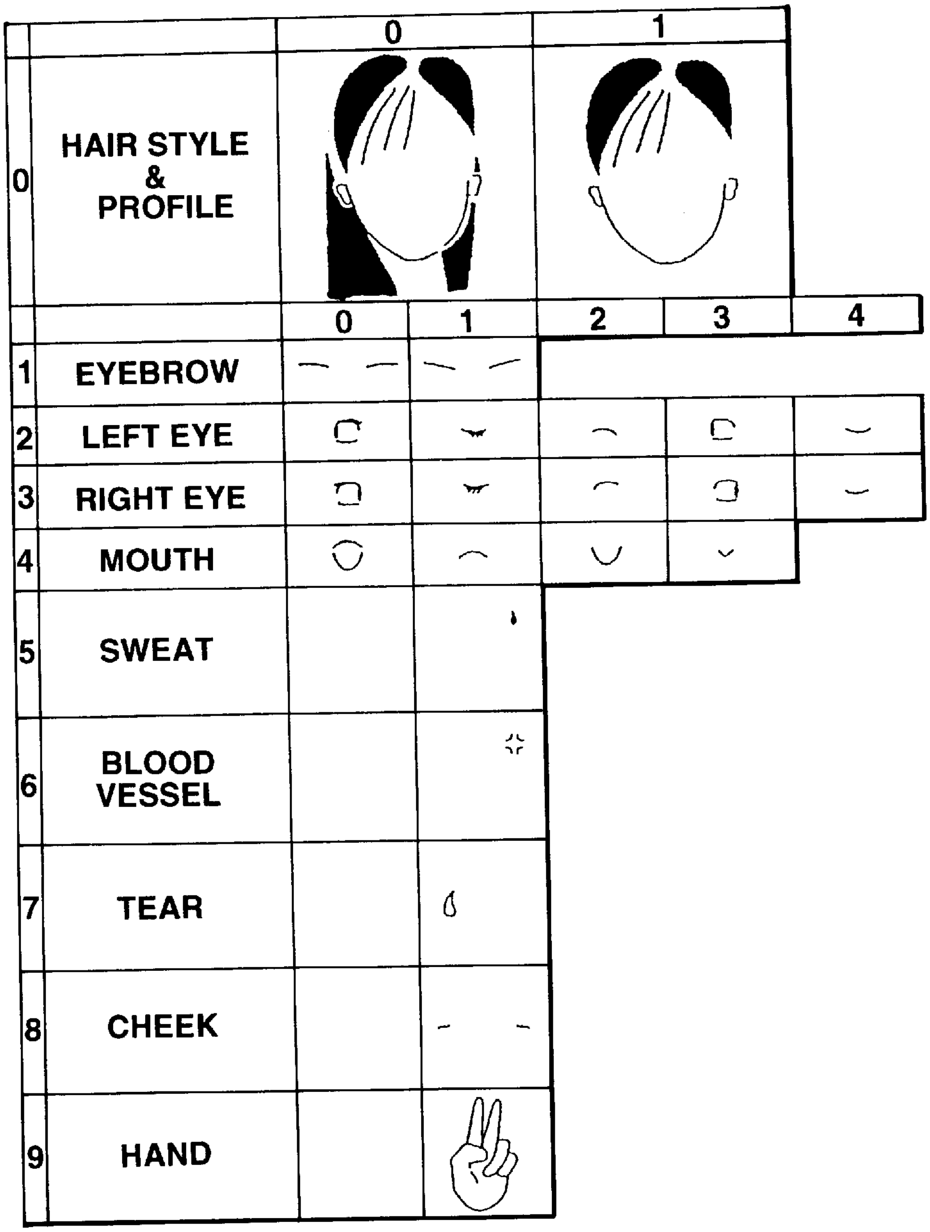
FIG. 55 is a pattern code matrix.

In the fifth embodiment, the ROM 19 is holding a standard message table and a pattern code matrix. In this case, the standard message table stores standard messages in association with the message codes as shown in FIG. 3. The pattern code matrix stores the patterns of parts, such as "hair style and profile", "eyebrow", "eye" and "mouth" for preparing a portrait, in association with pattern codes, as shown in FIG. 55. For example, when a pattern code "00" is designated, the pattern of a woman's "hair style and profile" is obtained, and when a pattern code "11" is designated, the pattern of an "eyebrow" in an angry state is obtained.

Figure 56:
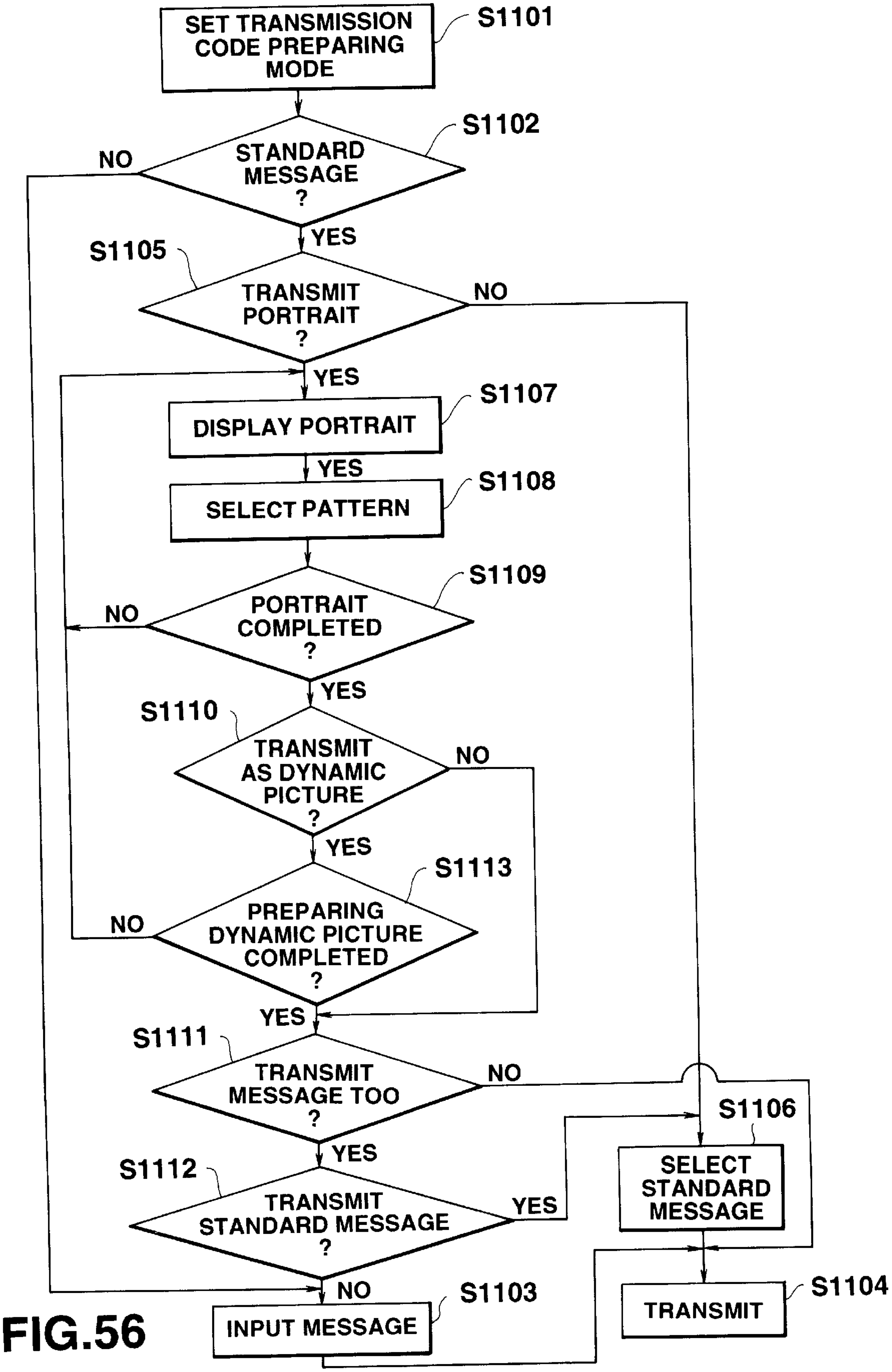
FIG. 56 is a flowchart for explaining the procedures for preparing a sequence of transmission codes for a message in a pager according to a fifth embodiment.

An operation to prepare a transmission code using a pager 8 according to this embodiment and to transmit the prepared message to a pager 9 will be described below with reference to the flowchart shown in FIG. 56.

First, the user selects the transmission code preparing mode using the mode key 45 in step S1101. Next, the user sets the type of a message to be transmitted.

When a non-standard message is to be transmitted, the decision in step S1102 is "NO" and the flow proceeds to step S1103. The user inputs ordinary numerals as a message. The CPU 14 displays the input message on the transmission code display section 243. In other words, key codes which should be operated to transmit this message and the sequence of the key codes are displayed on the transmission code display section 243. In the next step S1104, the user can transmit a numerals-oriented message by inputting the same data as the message data displayed on the transmission code display section 243 from the push-phone 1 or the like.

The user inputs the pattern designating code "*2*2" to transmit portrait, and inputs the standard message designating code "*4*4" to transmit a standard message. The input code is displayed on the transmission code display section 243.

When a standard message, not portrait, is to be transmitted, the decision in step S1102 is "YES", the decision in step S1105 is "NO", and the flow proceeds to step S1106. The user inputs a message code in step S1106. This message code is also displayed on the transmission code display section 243.

The user can transmit a numerals-oriented message by inputting the same data as the message data displayed on the transmission code display section 243 from the push-phone 1 or the like (step S1104).

To transmit portrait data, the user inputs the pattern designating code "*2*2" so that the decision in step S1105 is "YES", and the flow proceeds to step S1107. In step S1107, one of the basic portraits based on the pattern code matrix shown in FIG. 55 is displayed on the portrait display section 242 of the display section 24, and the pattern of the "style and profile" blinks. Further, the pattern designating code "*2*2" is displayed on the transmission code display section 243.

The blinking pattern is sequentially shifted in the order of "hair style and profile", "eyebrow", "left eye", "right eye" and so forth by operating the mode key 45. The pattern of a blinking part is switched to another pattern by operating the select key 44. When the desired pattern for the blinking part is displayed, the set key 43 is operated to set the pattern for that part (step S1108).

When the set key 43 is operated, the code of the set pattern is displayed on the transmission code display section 243.

It is then determined if the portrait has been completed, i.e., if the patterns have been set for all the parts. When the portrait is incomplete, the decision in step S1109 is "NO", and the flow returns to step S1107 to select the proper patterns for other parts in the above-described manner.

When a portrait is completed, it is then determined if a dynamic picture should be transmitted. When a dynamic picture is to be transmitted, the user keys in a dynamic-picture pattern designating code "*6*6". The presence or absence of this code is determined in step S1110. In the case where a still picture is to be transmitted, i.e., when the dynamic-picture pattern designating code "*6*6" does not exist, the decision in step S1110 is "NO", and the flow proceeds to step S1111.

In step S1111, it is determined if a message should be transmitted together with a portrait. When no message is to be transmitted, the decision in step S1111 is "NO", and the flow proceeds to the aforementioned step S1104.

When a message is to be transmitted, the decision in step S1111 is "YES", and the flow proceeds to step S1112 where it is determined if the message is a standard message or if the standard message designating code "*4*4" has been input. When no standard message is to be transmitted, the decision in step S1112 is "NO", and the flow proceeds to step S1103 where the user inputs a numerals-oriented message. The input message is displayed on the transmission code display section 243. In step S1104, the user can transmit a portrait in a still picture form and a numerals-oriented message to another pager 9 by inputting the sequence of codes displayed on the transmission code display section 243 from the push-phone 1 or the like.

When a standard message is to be transmitted, the decision in step S1112 is "YES" and the flow moves to step S1106. In step S1106, the user inputs an arbitrary message code in the standard message table shown in FIG. 3. This message code is also displayed on the transmission code display section 243. The flow then moves to step S1104 to be ready to transmit data having standard message and portrait consisting of a still picture.

When it is determined in step S1110 that a dynamic picture is to be transmitted, it is determined if the preparation of the dynamic picture is completed in step S1113, and the flow returns to step S1107 to prepare a different portrait. The preparation of the portrait in this case is determined by selecting the pattern of a part to be changed.

Consequently, the pattern code of a pattern to be changed is displayed after the pattern designating code "*2*2", the pattern code, dynamic-picture pattern designating code "*6*6" on the transmission code display section 243.

It is determined again in step S1113 if the preparation of the dynamic picture has been completed, and the flow proceeds to step S1111. In this case too, it is determined if a message is to be transmitted. When no message is to be transmitted, the decision in step S1111 is "NO" and the portrait consisting of the dynamic picture can be transmitted in step S1104.

When a message is to be transmitted, on the other hand, the decision in step S1111 is "YES" and the flow proceeds to step S1112 to determine is a standard message is to be transmitted. When no standard message is to be transmitted, the decision in step S1112 is "NO" and the flow proceeds to step S1103. In step S1103, the user inputs an ordinary numeral as message data. In the next step S1104, the portrait consisting of the dynamic picture and numerals-oriented message can be transmitted. In the case where a standard message is to be transmitted, the decision in step S1112 is "YES" and the flow proceeds to step 1106 where a message code is input. In step S1104, the portrait consisting of the dynamic picture and the message consisting of the standard message can be transmitted.

FIGS. 57A through 60 illustrate procedures of preparing a transmission code for a portrait consisting of a dynamic picture and a message consisting of a standard message.

Figure 57A:
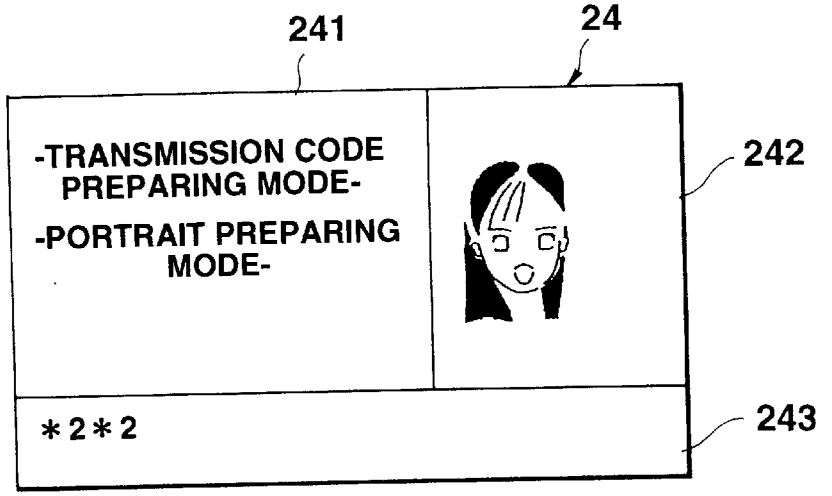
FIGS. 57A through 57H are diagrams showing display examples at the time of preparing a sequence of transmission codes in the pager of the fifth embodiment.

First, the user instructs the transmission message preparing mode and inputs the pattern designating code "*2*2" with the numerical keys 42. Because of this key-in operation, the decisions in steps S1102 and S1105 become "YES", the pattern designating code "*2*2" is displayed on the transmission code display section 243, a basic portrait is displayed on the portrait display section 242 as shown in FIG. 57A, and the pattern of "hair style and profile" blinks (step S1107).

Figure 57B:
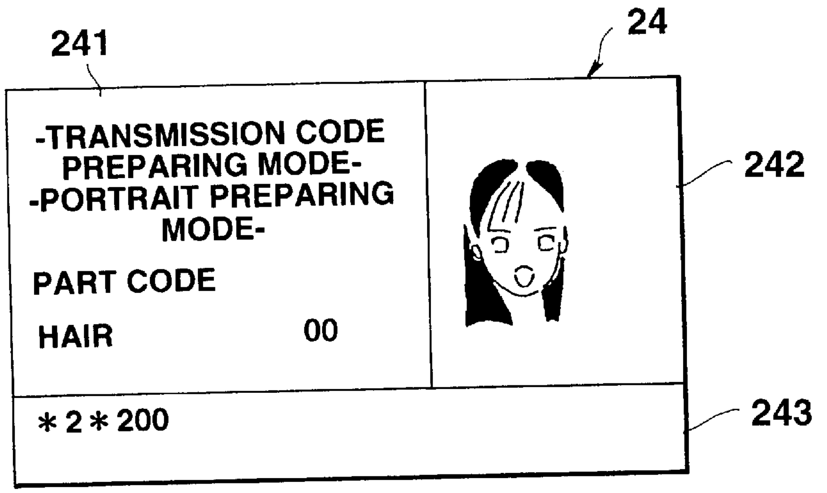

As shown in FIG. 57B, to use the pattern with the pattern code "00" for the "hair style and profile", the user should operate the select key 44 and then operate the set key 43 when this pattern is displayed. This key operation causes the pattern code "00" to be displayed after the pattern designating code "*2*2" on the transmission code display section 243.

Thereafter, likewise, the user operates the mode key 45 to change the blinking part, operates the select key 44 to select the pattern of the blinking part from those shown in FIG. 55, and operates the set key 43 when the desired pattern is displayed. The codes for the patterns of the individual parts are displayed in this manner. The pattern codes of the set patterns are displayed on the transmission code display section 243.

Figure 57C:
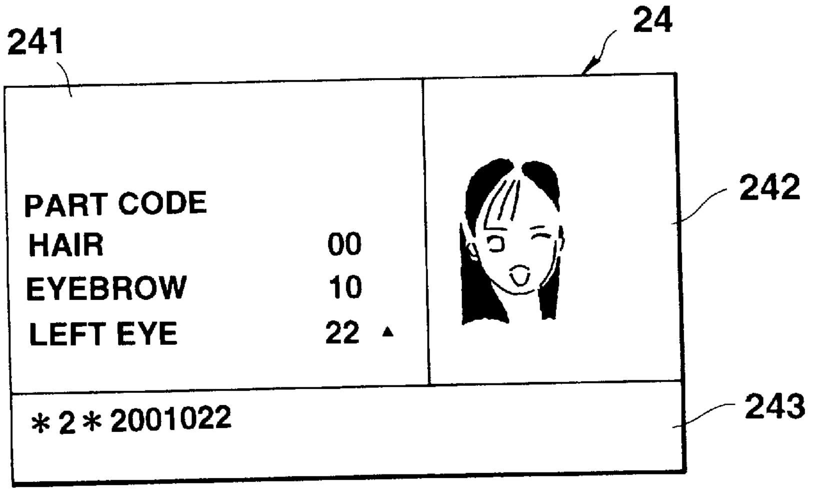
Figure 57D:
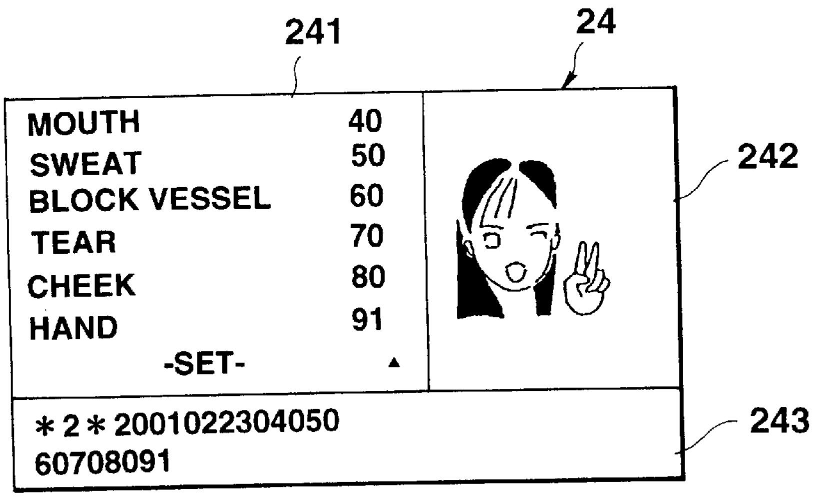

FIG. 57C presents a display example when the pattern with the code "10" is selected for "eyebrow" and the pattern with the code "22" is selected for "left eye". FIG. 57D presents a display example when the patterns with the codes "30", "40", "50", "60", "70", "80" and "91" are subsequently selected for "right eye", "mouth", "sweat", "blood vessel", "tear", "cheek" and "hand". When the selection of the patterns is completed, the user operates the set key 43 which causes the flow to proceed to step S1110 from step S1109.

Figure 57E:
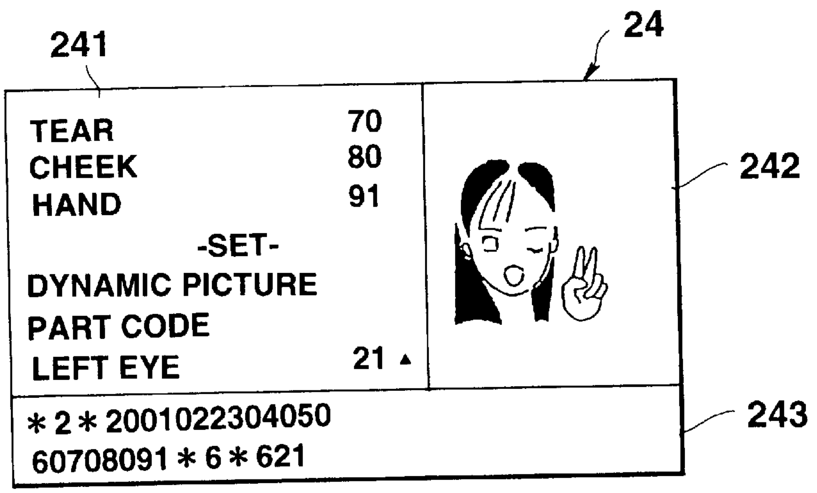

Next, when the user inputs the dynamic-picture pattern designating code "*6*6" to instruct a dynamic picture, the dynamic-picture pattern designating code "*6*6" is displayed on the transmission code display section 243 as shown in FIG. 57E. Then, the user sequentially designates the patterns of some parts of the prepared portrait which should be changed.

Figure 57F:
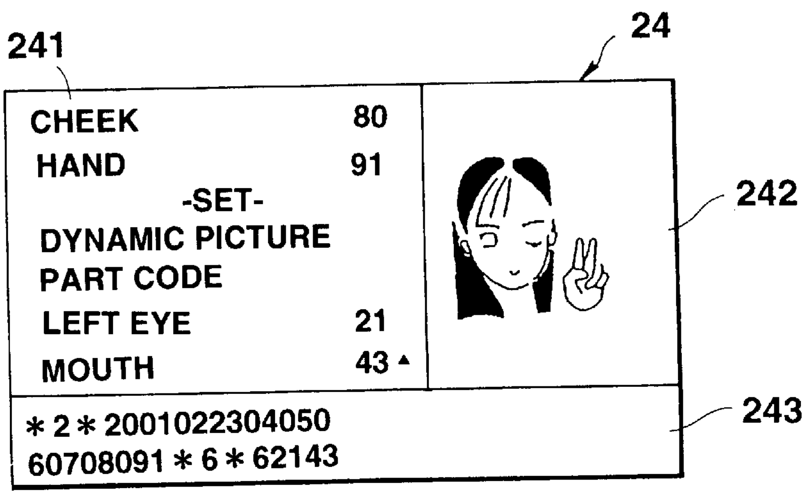
Figure 57G:
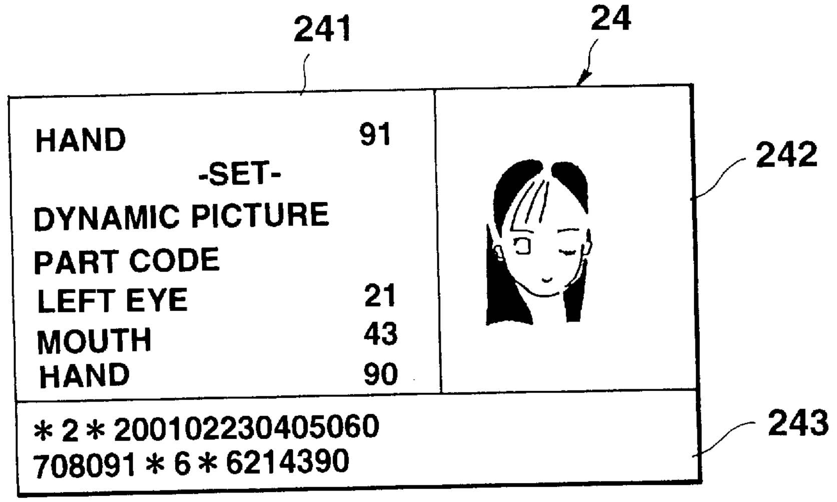

In this example, the patterns of "left eye", "mouth" and "hand" are to be changed. In this case, the user operates the mode key 45 to select the left eye and operates the select key 44 to select the pattern corresponding to the code "21". A display example at this point of time is given in FIG. 57E. FIG. 57F presents a display example when the pattern with the code "43" is selected for "mouth". FIG. 57G presents a display example when the pattern with the code "90" is selected for "hand".

Figure 57H:
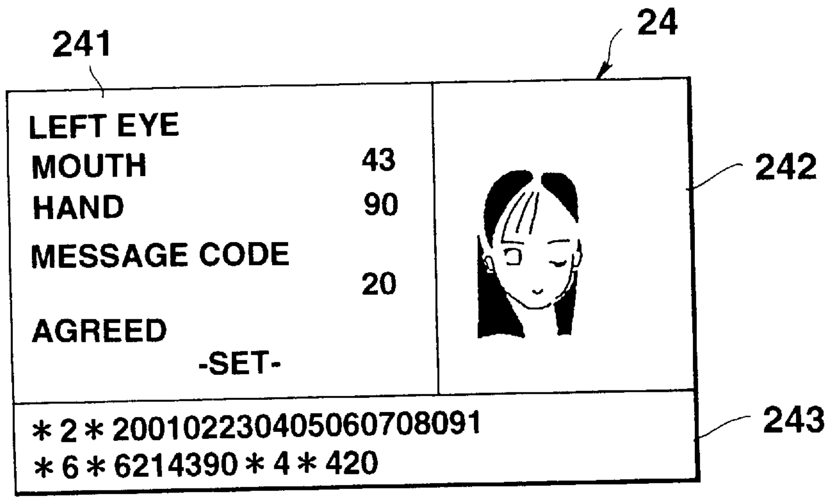

When the user then inputs the standard message designating code "*4*4" and message code "20" and operates the set key 43, the standard message designating code "*4*4" and message code "20" are displayed after the aforementioned "*2*2001022304050607080 91*6*6214390" on the transmission code display section 243, as shown in FIG. 57H.

Figure 58:
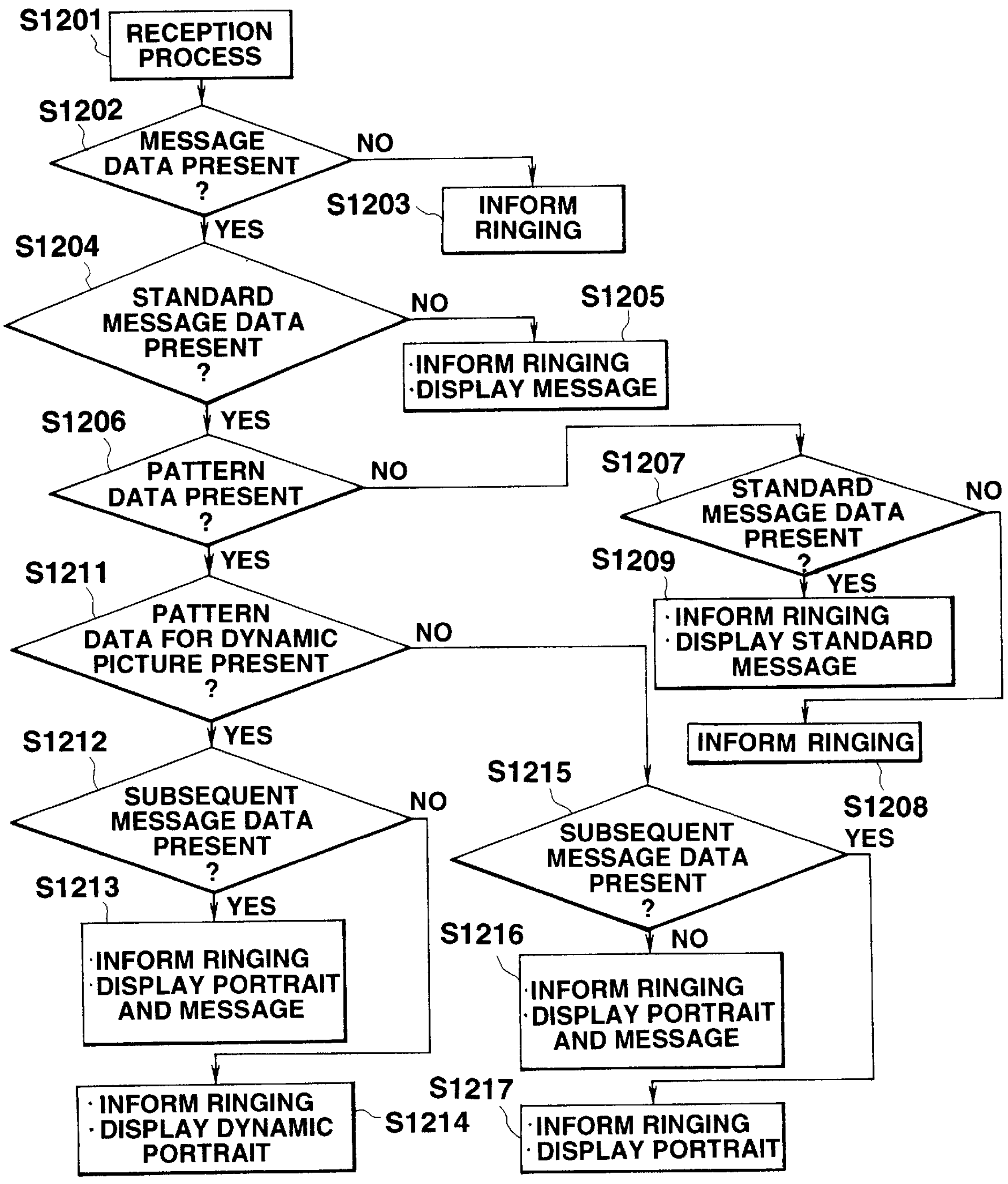
FIG. 58 is a flowchart for explaining the reception operation of the pager of the fifth embodiment.

The reception operation of the pager 9 according to this embodiment will be described below with reference to the flowchart shown in FIG. 58.

In step S1201, it is determined if the demodulated ringing signal matches with the ID code stored in the ID-ROM 15. The processing starting at step S1202 will be executed only when both match with each other.

In step S1202 it is determined if message data follows the ringing signal. When there is no subsequent message data, the flow proceeds to step S1203 to inform the ringing, for example, by displaying the symbol representing the ringing.

When message data follows the ringing signal, the flow proceeds to step S1204. In step S1204, the CPU 14 instructs the decoder 13 to keep receiving the incoming signal, acquires message data and determines if the standard format designating code is present at the head of the obtained message. When there is no standard format designating code, the ringing is informed and the received message is displayed on the display section 24 in step S1205. Further, the reception time and the received message data are stored in the RAM 20 after which the processing is terminated.

When it is determined in step S1204 that the standard format designating code exists, the flow proceeds to step S1206 where it is determined if there is pattern data including the pattern designating code "*2*2" and the pattern codes. When the pattern data does not exist, the flow proceeds to step S1207 where it is determined if there is standard message data including the standard message designating code "*4*4" and message code. When there is no standard message data, the ringing is informed in step S1208. When there is standard message data, on the other hand, the corresponding standard message is displayed on the display section 24 in step S1209.

Figure 59:
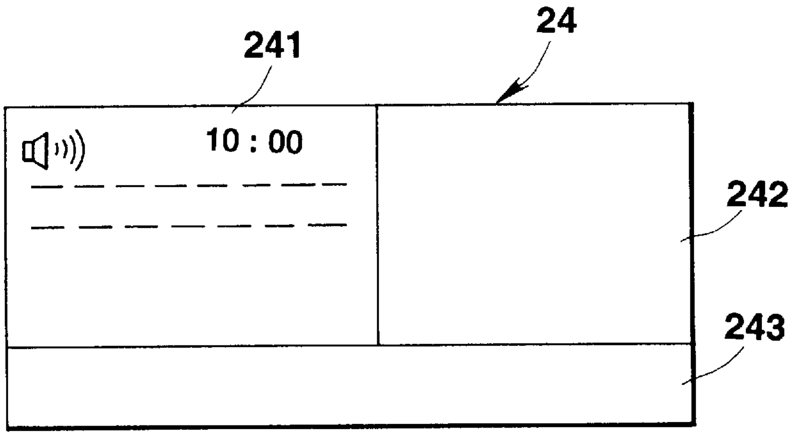
FIGS. 59 through 64 are diagrams showing display examples for the pager of the fifth embodiment.

FIG. 59 shows a display example in the case where the absence of standard message data is determined in step S1207 and "*4*4" has been received as message data. As no message code follows the standard message designating code in this case, the reception time and a symbol indicating that there is no message are displayed on the message display section 241.

Figure 60:
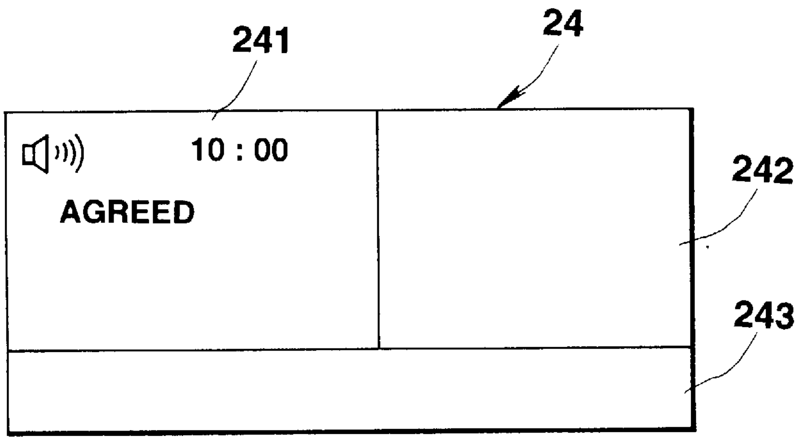

FIG. 60 shows a display example in the case where the presence of the standard data is determined in step S1207 and "*4*420" has been received as message data. In this case, the standard message "AGREED" corresponding to the message code "20" is read from the standard message table shown in FIG. 3, and this message is displayed on the message display section 241.

When the presence of the pattern data is determined in step S1206, it is determined in step S1211 if the pattern data for dynamic picture including a dynamic picture pattern designating code "*6*6" and at least one pattern code.

When the presence of the pattern data for dynamic picture is determined in step S1211, the flow proceeds to step S1212 where it is determined if there is message data immediately after the pattern code.

When message data is present immediately after the pattern data for dynamic picture, the flow proceeds to step S1213. In step S1213, the ringing is informed and a first portrait is formed based on the pattern codes following the pattern designating code "*2*2". A second portrait is formed by replacing the patterns of the first portrait with the pattern corresponding to the pattern codes following the dynamic picture pattern designating code "*6*6". The first and second portraits are displayed, alternately switched from one to the other, as a dynamic picture on the portrait display section 242 of the display section 24, and a message is displayed on the message display section 241 of the display section 24. Further, those data are stored in the RAM 20 after which the processing is terminated.

Figure 61A:
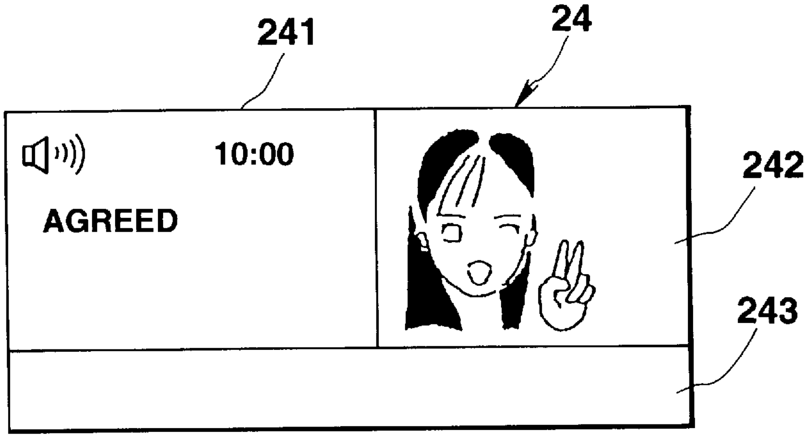
Figure 61B:
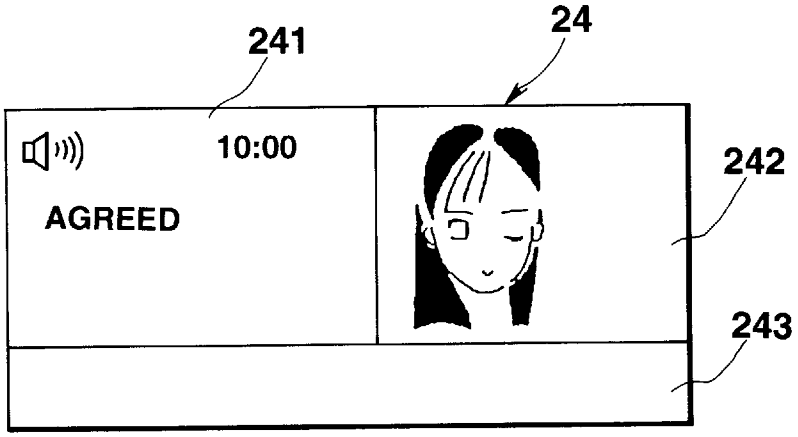

FIGS. 61A and 61B show display examples in such a case; "*2*2001022304050607080 91*6*6214390*4*420" shown in FIG. 57H has been received as message data.

In this case, since the pattern designating code "*2*2" and the pattern codes are present, the decisions in step S1201, S1204 and S1206 are "YES". Since the dynamic-picture pattern designating code "*6*6" and the pattern codes exist, the decision in step S1212 is "YES" and the flow proceeds to step S1213.

In this case, first portrait is prepared based on the pattern designating code "*2*2" and the subsequent pattern codes "00", "10", . . . , "91". Based on the dynamic-picture pattern designating code "*6*6" and the subsequent pattern codes "21", "43" and "90", the first portrait is changed to prepare the second portrait. Those portraits are displayed, alternately switched from one to the other, on the portrait display section 242 in the order of FIG. 61A→FIG. 61B→FIG. 61A and so forth.

Further, based on the last standard message designating code "*4*4" and the subsequent message code "20", "AGREED" is read from the standard message table shown in FIG. 3. This message is displayed on the message display section 241 as shown in FIGS. 61A and 61B.

When it is determined in step S1212 that no message data is present immediately after the pattern code, the flow proceeds to step S1214. In step S1214, the ringing is informed and the first portrait is formed based on the pattern code following the pattern designating code, and the second portrait is formed by correcting the first portrait based on the pattern codes following the dynamic picture pattern designating code "*6*6". The first and second portraits are displayed, alternately switched from one to the other, as a dynamic picture on the portrait display section 242 of the display section 24, and a message is displayed on the message display section 241 of the display section 24. Further, those data are stored in the RAM 20 after which the processing is terminated.

Figure 62A:
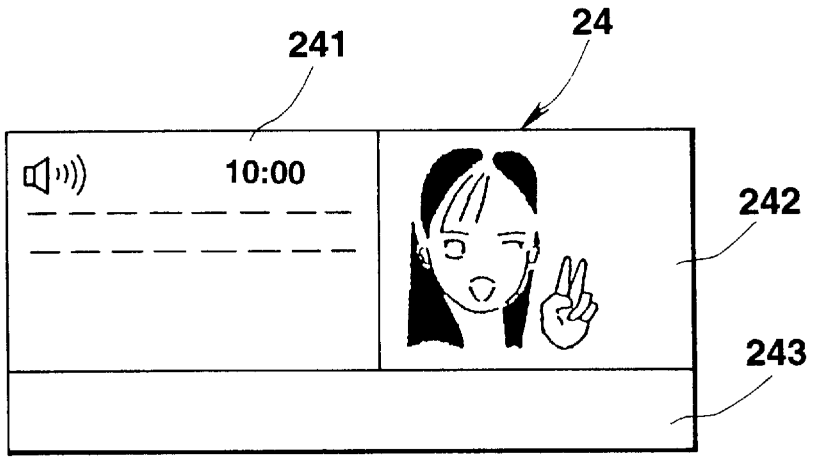
Figure 62B:
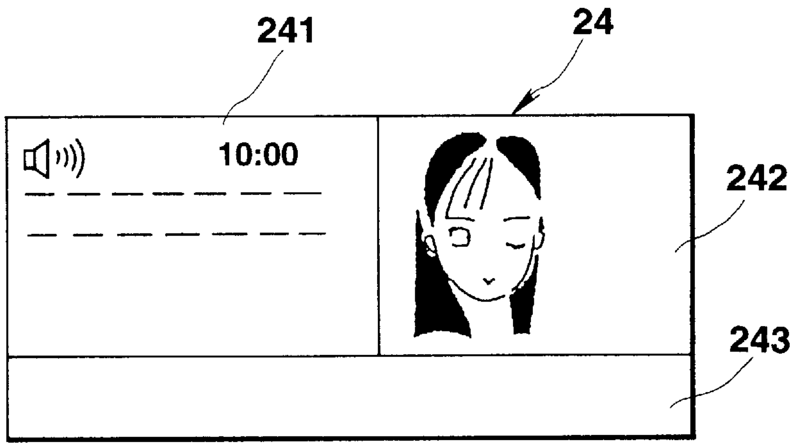

FIGS. 62A and 62B show display examples in such a case; "*2*200102230405060708091*6*6214390" shown in FIG. 57G has been received as message data. In this case, the first portrait is prepared based on the pattern designating code "*2*2" and the subsequent pattern codes "00", "10", . . . , "91" and the first portrait is changed to prepare the second portrait based on the dynamic-picture pattern designating code "*6*6" and the subsequent pattern codes "21", "43" and "90". The first and second portraits are displayed, alternately switched from one to the other, on the portrait display section 242 in the order of FIG. 62A→FIG. 62B→FIG. 62A and so forth.

When it is determined in step S1211 that there is no pattern data for dynamic-picture after the pattern data, the flow proceeds to step S1215 to determine if there is message data after the pattern data.

When message data is present immediately after the pattern data, the flow proceeds to step S1216. In step S1216, the ringing is informed, the portrait is formed based on the pattern codes and is displayed on the portrait display section 242, and the message is displayed on the message display section 241. Further, those data are stored in the RAM 20 after which the processing is terminated.

Figure 63:
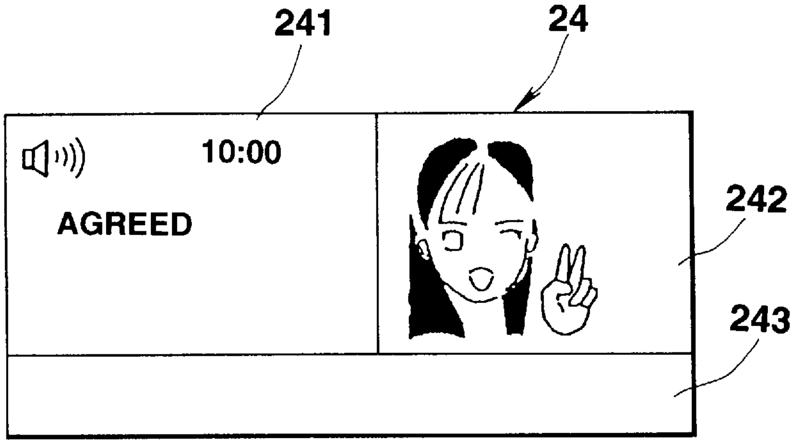

FIG. 63 shows display examples in such a case; message data "*2*200102230405060708091*4*420" has been received. In this case, since the pattern data, i.e., the pattern designating code "*2*2" and the pattern codes exist, the decisions in steps S1202, S1204 and S1206 are "YES". As the pattern data for dynamic-picture does not exist, the decision in step S1211 is "No". Because of the presence of the subsequent message data "*4*420", the decision in step S1215 is "YES".

In this case, the portrait is prepared based on the pattern designating code "*2*2" and the subsequent pattern codes "00", . . . "91" and this portrait is displayed on the portrait display section 242, as shown in FIG. 63.

Based on the standard message designating code "***4*4" and message code "20", the corresponding standard message "AGREED" is read from the standard message table shown in FIG. 3, and this standard message is displayed on the message display section 241 as shown in FIG. 63**.

When it is determined in step S1215 that no message data immediately follows the pattern code, the flow proceeds to step S1217. In step S1217, the ringing is informed, and the portrait is formed based on the pattern codes and is displayed on the portrait display section 242. Further, those data are stored in the RAM 20 after which the processing is terminated.

Figure 64:
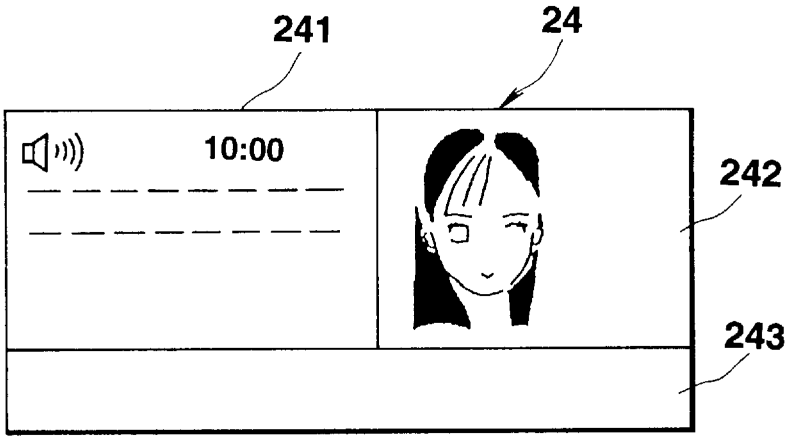

FIG. 64 shows display examples in such a case; the received message is "*2*20010213043506070809 0". In this case, since the pattern data exists, the decisions in steps S1202, S1204 and S1206 are "YES". As there is neither the pattern data for dynamic-picture nor a subsequent message, the decisions in steps S1211 and S1215 are "NO". Therefore, the portrait is prepared based on the pattern codes "00", "10", . . . "90" following the pattern designating code "*2*2" and this portrait is displayed on the portrait display section 242 as shown in FIG. 64.

According to this embodiment, as described above, a first portrait formed by the combination of the patterns of the individual parts and a second portrait obtained by partially changing the former portrait can be displayed, switched from one to the other. It is therefore possible to transmit the resultant portrait as very expressive message data in a dynamic picture form.

This invention is not limited to the above-described embodiment, but may be modified in various other forms as needed without departing from the scope and spirit of the invention. For example, the business illustration matrix shown in FIG. 53 may be stored in the ROM 19, so that the display processing as shown in FIGS. 54A and 54B can be performed too.

Although two portraits are displayed, switched from one to the other, in this embodiment, this invention is not limited to this structure. This embodiment may be modified so that a plurality of dynamic-picture pattern designating codes and corresponding pattern codes can be transmitted, and message data containing a plurality of dynamic-picture pattern designating codes and corresponding pattern codes can be received. This structure permits three or more portraits to be displayed, switched from one to another.

Although the prepared transmission code is transmitted using a push-phone 1 in the above-described embodiment, the circuit structure shown in FIG. 2 may be equipped with a dialer mechanism which has the dialer key 21 and the dialer key speaker 22 indicated by the broken line. This structure allows that the CPU 14 stores the prepared transmission codes in an output buffer (not shown) and transmits the transmission codes in response to the operation of the dialer key 21. An interface 27 and a modular plug 26 which is connected directly to the modular jack 28 may be provided to the pager 8 as an external terminal, so that data itself can be transmitted directly to the pager service company 3.

Sixth Embodiment

Although one portrait is associated with one portrait code in the first to fourth embodiments, a plurality of portraits may be associated with a single portrait code and those portraits may be switched from one to another. The sixth embodiment designed to accomplish this feature will be described below.

Figure 65:
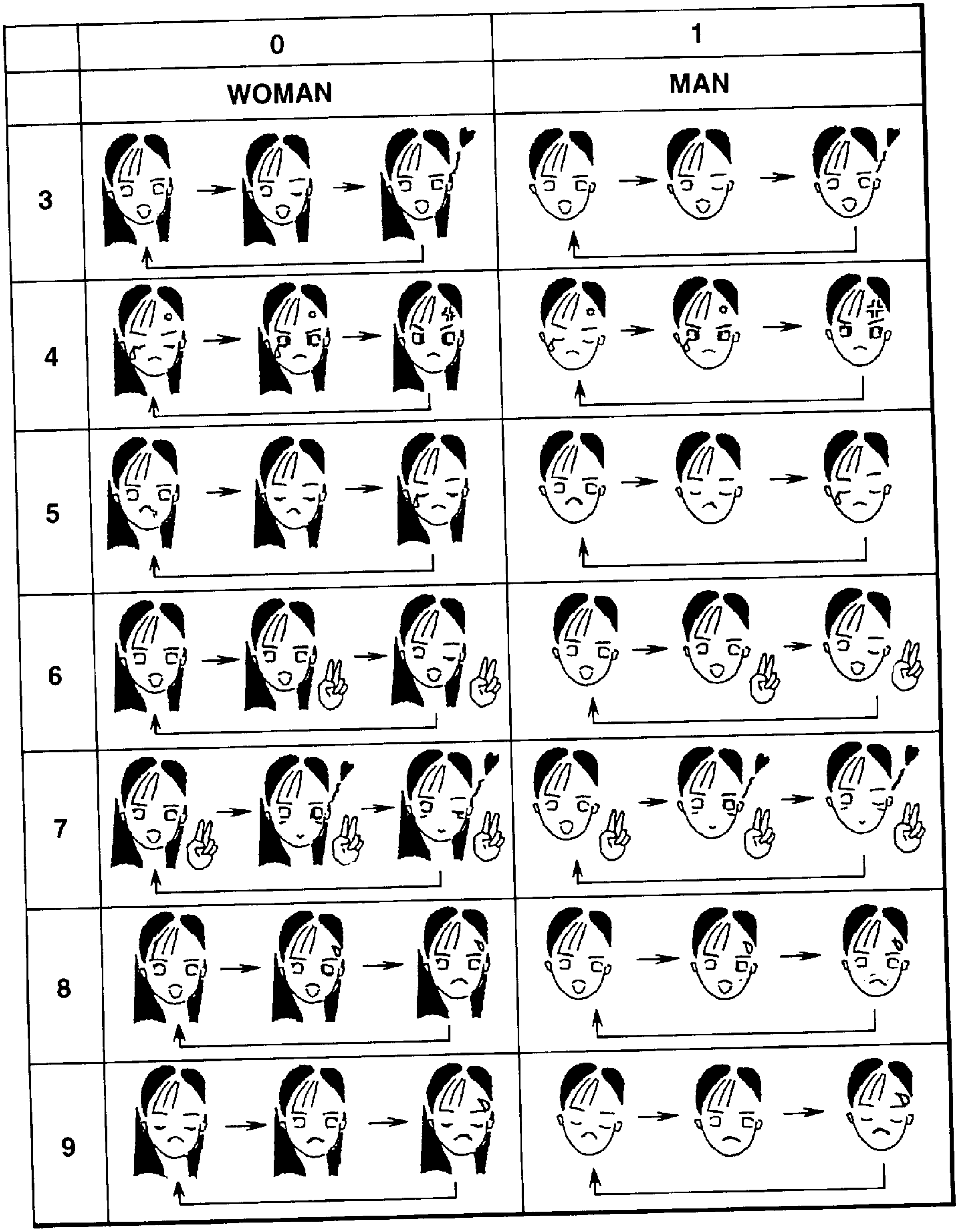
FIG. 65 is a diagram showing portrait table stored in a ROM 19 in a sixth embodiment.

The circuit structure of a pager according to this embodiment is substantially the same as that of the pager 4 of the embodiment 1-1, except that the ROM 19 holds the standard message table shown in FIG. 3 and a portrait table shown in FIG. 65. This portrait table stores portrait codes "30", "40", . . . , "90" in association with a set of three patterns of a woman's portrait and stores portrait codes "31", "41", . . . , "91" in association with a set of three patterns of a man's portrait. When a portrait code is designated, the associated three portraits are displayed, sequentially switched from one to another in the direction of the illustrated arrow.

In this embodiment, a dynamic picture designating code "*3*3" is used to transmit the portraits shown in FIG. 65 as messages. In transmitting any set of portraits shown in FIG. 65, the caller transmits the dynamic picture designating code "*3*3" and the portrait code. The other transmission operation is the same as that of the other embodiments.

Figure 66:
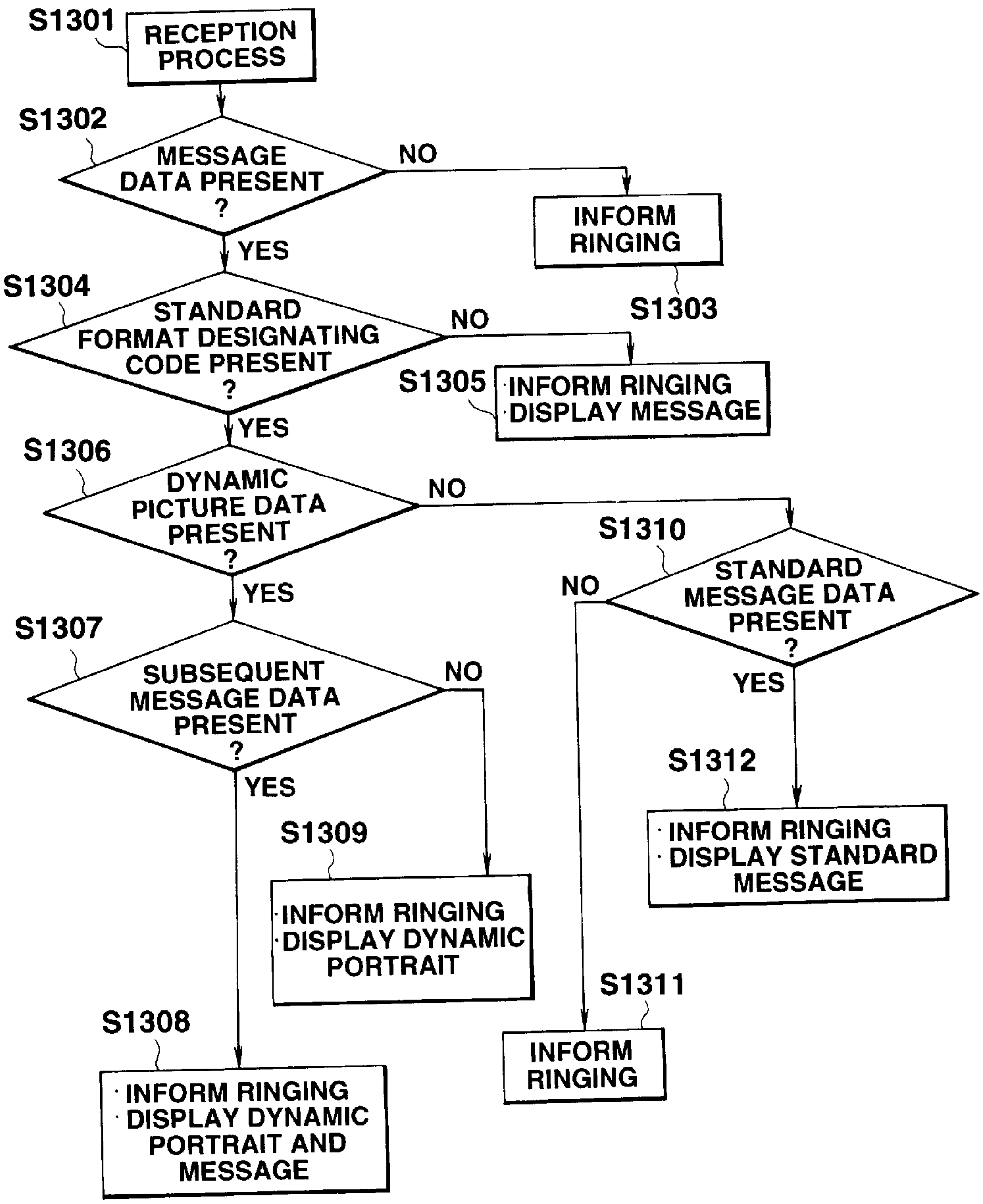
FIG. 66 is a flowchart for explaining the reception operation of the pager of the sixth embodiment.

The reception operation of the pager 4 according to this embodiment will be described below with reference to the flowchart shown in FIG. 66.

First, in step S1301, the CPU 14 determines if the target pager has been called, and performs the following processing if called.

In step S1302 it is determined if message data follows the ringing signal. When there is no subsequent message data, the flow proceeds to step S1303 to inform the ringing, for example, by displaying the symbol representing the reception.

When message data follows the ringing signal, the CPU 14 controls the decoder 13 to keep receiving the incoming signal, acquires message data and determines if the standard format designating code is present at the head of the obtained message in step S1304. When there is no standard format designating code, the received message data is displayed on the message display area 24*a*, the ringing is informed and the received message data is stored in the RAM 20 in step S1305 after which the processing is terminated.

When it is determined in step S1304 that the standard format designating code exists, the flow proceeds to step S1306 where it is determined if the dynamic picture data including the dynamic picture designating code "*3*3" and a portrait code is present. When the dynamic picture data does not exist, the flow proceeds to step S1310. When there is the dynamic picture data, it is determined in step S1307 if message data follows the dynamic picture data.

When it is determined in step S1307 that there is subsequent message data, a dynamic picture designated by the portrait code and a message corresponding to the subsequent message data are displayed. If this message data is designated by a standard message designating code and a message code, a standard message is displayed together with the dynamic picture. If the message data is ordinary message data, an ordinary message based on the message data is displayed together with the dynamic picture.

Figure 67A:
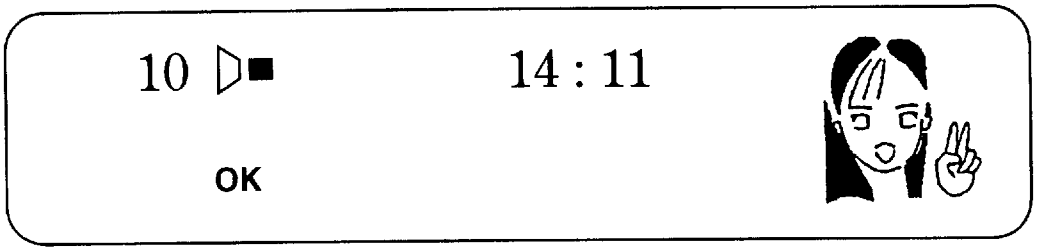
FIGS. 67A through 72F are diagrams showing display examples for the pager of the sixth embodiment in a reception mode.
Figure 67B:
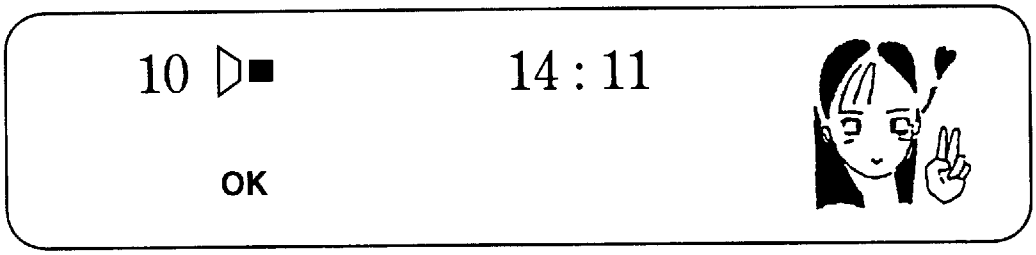
Figure 67C:
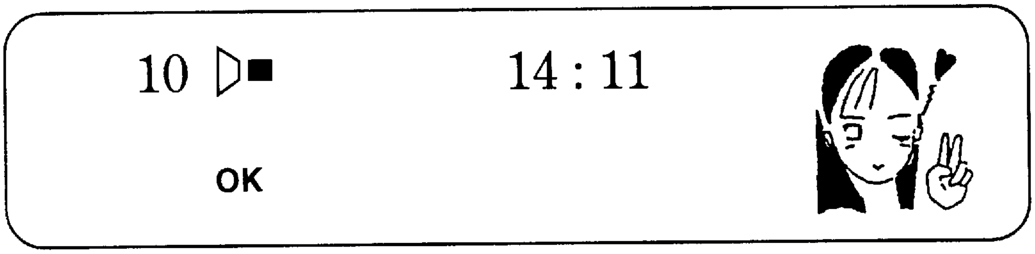

FIGS. 67A–67C show display examples in the case where message data "*3*370*4*418" has been received. The portrait code "70" follows the dynamic picture designating code "*3*3" and "*4*418" further follows as message data. Consequently, the decisions in steps S1302, S1304, S1306 and S1307 become "YES". In step S1308, therefore, three portraits stored in association with the portrait code "70" in FIG. 65 and the standard message "OK" corresponding to the message data "*4*418" are displayed, sequentially switched from one to another, on the display section 24 in the order of FIG. 67A→FIG. 67B→FIG. 67C →FIG. 67A and so forth.

When it is determined in step S1307 that there is subsequent message data, the ringing is informed and three portraits are displayed, sequentially switched from one to another, on the display section 24 in accordance with the portrait code in step S1309. Further, the received message data is stored in the RAM 20 after which the processing is terminated.

Figure 68A:
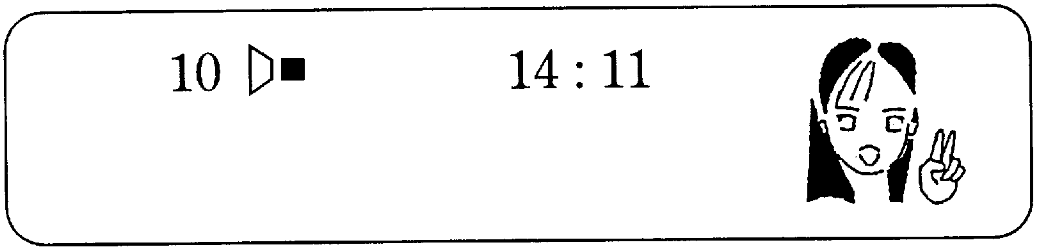
Figure 68B:
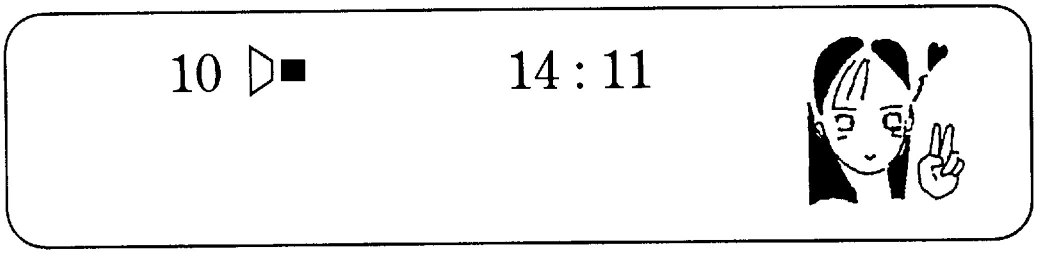
Figure 68C:
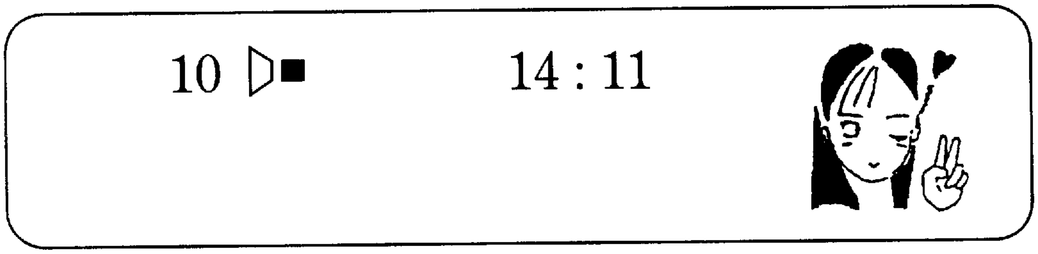

FIGS. 68A through 68C show display examples based on the message data "*3*370" in this case. The portrait code "70" follows the dynamic picture designating code "***3*3" Therefore, three portraits stored in association with the portrait code "70" are displayed, sequentially switched from one to another, on the display section 24 in the order of FIG. 68A→FIG. 68B→FIG. 68C→FIG. 68**A and so forth.

When it is determined in step S1306 that the dynamic picture data does not exist, it is determined in step S1310 if a standard message data including the standard message designating code "*4*4" and the message code is present. When the presence of the standard message data is determined in this step S1310, the ringing is informed and the standard message is displayed in step S1312. Further, the received message data is stored in the RAM 20 after which the processing is terminated.

Figure 69:
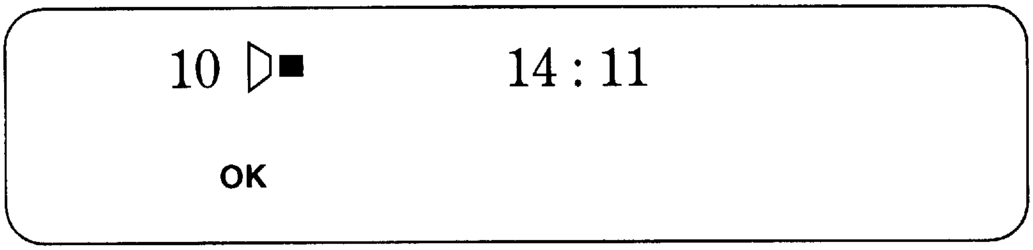

FIG. 69 shows a display example based on the message data "*4*418" in this case. The standard message code "18" is present after the standard message designating code "*4*4". Therefore, the standard message "OK" is read and is displayed on the display section 24.

When it is determined in step S1310 that there is no message code, the ringing is informed in step S1311 and this processing is terminated.

Figure 70:
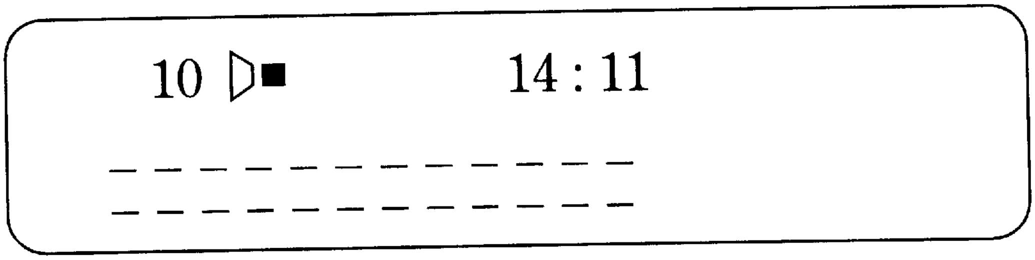

FIG. 70 shows a display example in the case where the message data "*4*4" has been received. In this case, no message code is present after the standard message designating code "*4*4". Accordingly, information to that effect is displayed on the display section 24.

According to the pager 4 of this embodiment, when one portrait code is transmitted, a plurality of portraits are switched from one to another, thus providing a dynamic-picture portrait.

Figure 71A:
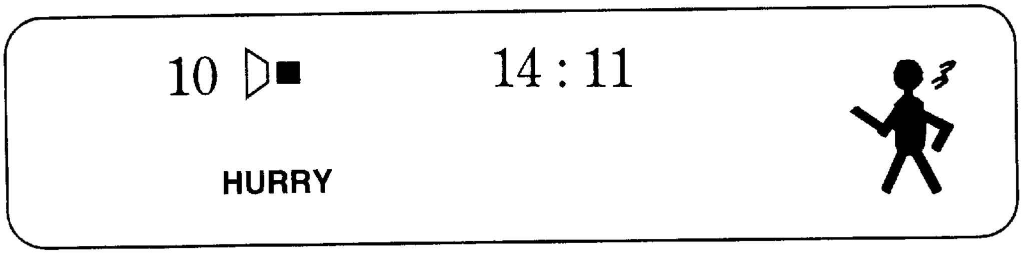
Figure 71B:
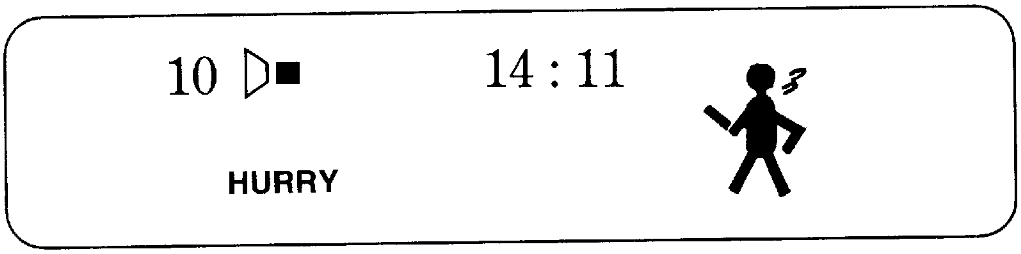
Figure 71C:
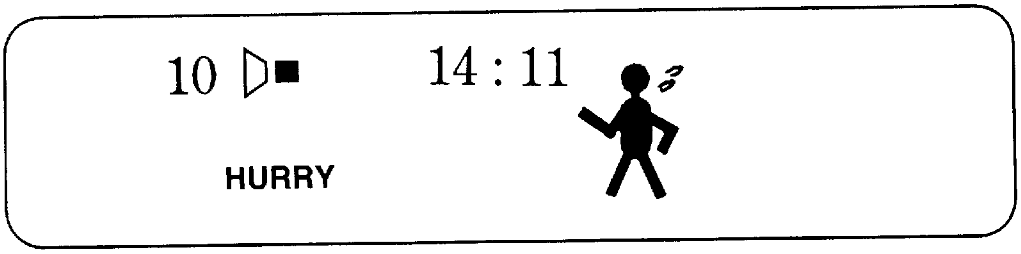
Figure 71D:
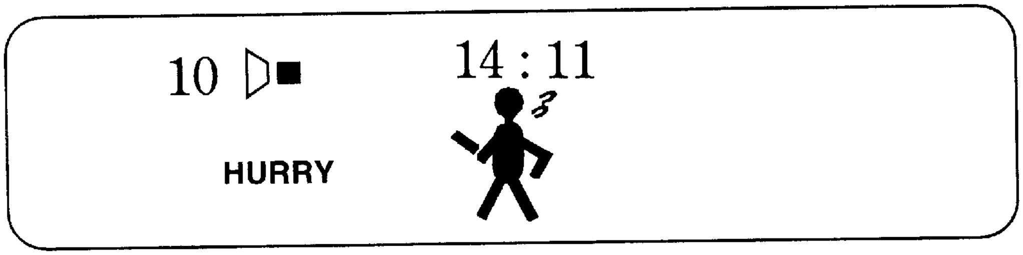
Figure 72A:
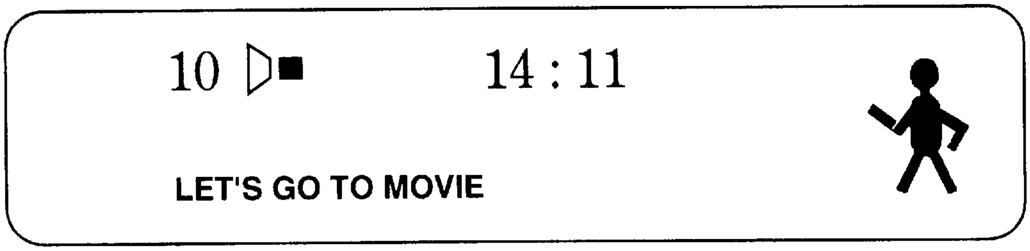
Figure 72B:
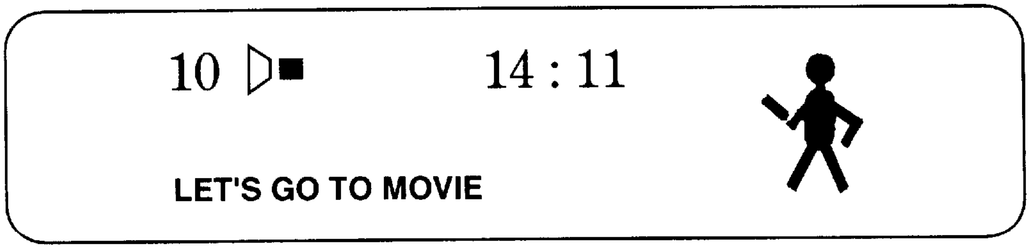
Figure 72C:
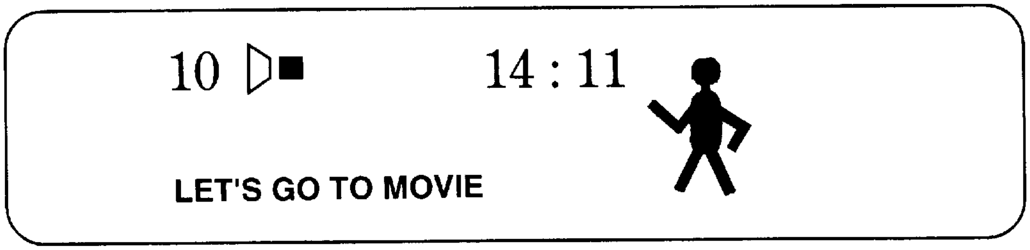
Figure 72D:
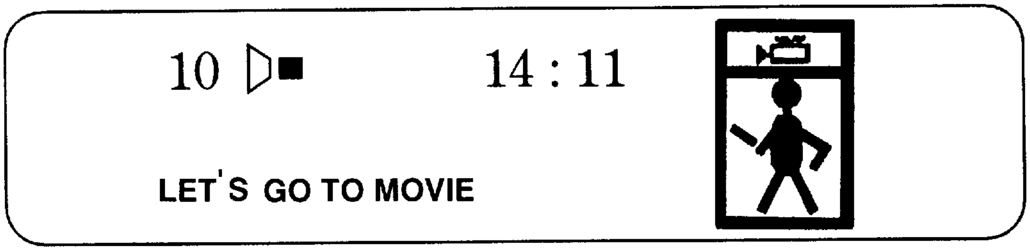
Figure 72E:
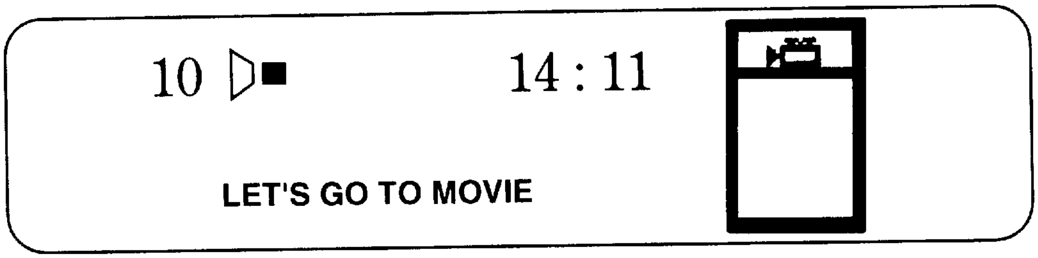
Figure 72F:
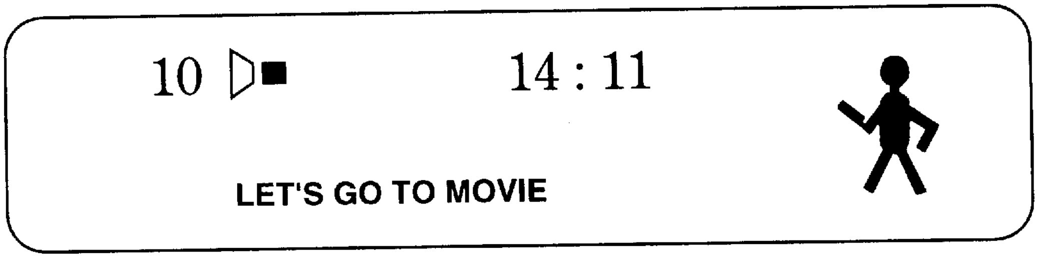

Although a portrait is displayed in the above-described embodiment, the caller's intention or business matter to be displayed may directly be displayed as pictures, which may be switched from one to another when displayed in the order of FIG. 71A→FIG. 71B→FIG. 71C→FIG. 71D→FIG. 71E and so forth. This can permit the urgency and/or importance of the business matter to be expressed in a dynamic picture.

As shown in FIGS. 72A through 72F, a message which is difficult to convey with characters can be readily transmitted by a dynamic picture.

Although each set of portraits which are displayed in association with portrait codes is determined previously, the user may arbitrarily set a set of a plurality of portraits in association with the portrait code. For example, all portraits may be stored in the ROM 19, and areas for setting portraits to be displayed, switched from one to another in association a portrait code and the display sequence of the portraits may be provided in the RAM 20. In this case, in accordance with the reception of a portrait code, the portraits are displayed, sequentially switched from one to another in accordance with the sequence set in the RAM 20.

Seventh Embodiment

Although portraits are previously determined in the sixth embodiment, images like portraits may be prepared as needed. Like in the second embodiment, a self-made standard message may be stored together with a prepared image. An embodiment of a pager 4 designed to cover this feature will now be described.

The circuit structure and appearance of the pager 4 according to this embodiment are substantially the same as those of the pager of the embodiment 1-1, except that the ROM 19 holds the portrait code matrixes shown in FIGS. 21 and 22.

Figure 74:
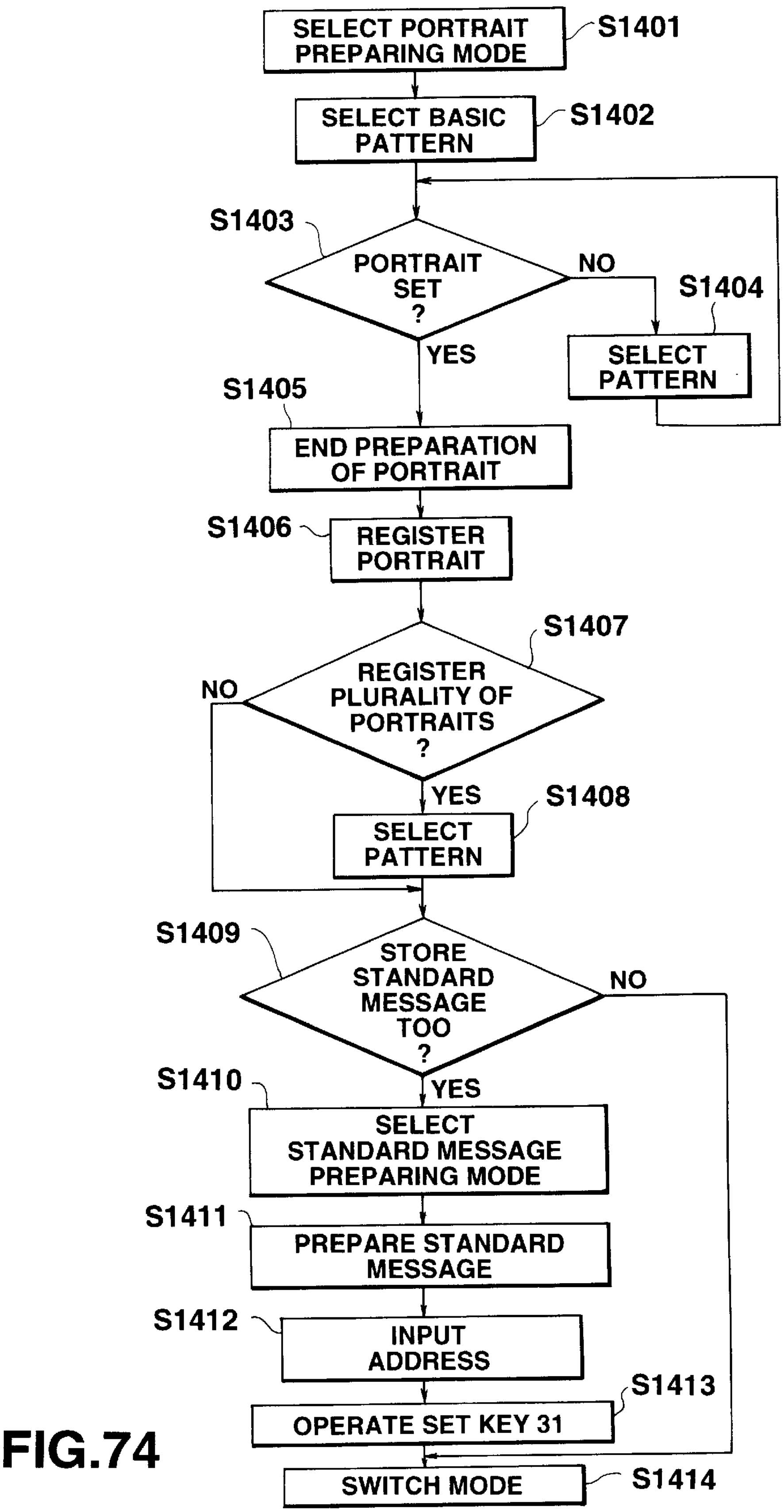
FIG. 74 is a flowchart illustrating a portrait preparing process executed by the pager of the seventh embodiment.
Figure 75A:
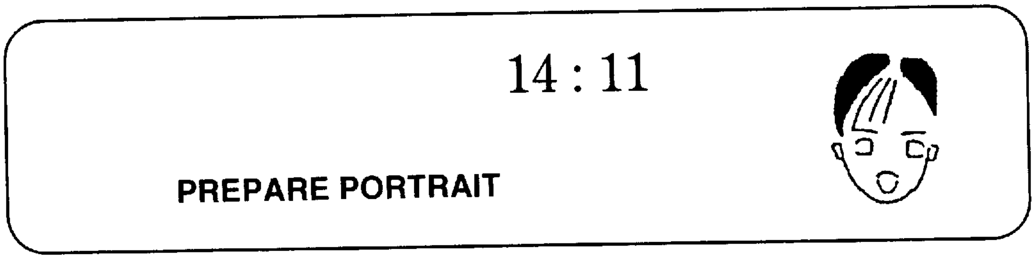
FIGS. 75A through 75J are diagrams showing display examples at the time a portrait is prepared by the pager of the seventh embodiment.

A method of allowing a user to prepare the portraits and the self-made standard messages and register them in the pager 4 of this embodiment will be described below with reference to the flowchart in FIG. 74 and FIGS. 75A to 75O.

First, in step S1401, the user selects the portrait preparing mode. FIG. 75A shows the initial display when the portrait preparing mode is selected. In this example, characters "PREPARE PORTRAIT" indicating that the operation mode is set to the portrait preparing mode is displayed on the message display area 24*a* of the display section 24, and the basic pattern of a man's portrait is displayed on the portrait display area 24*b*.

Figure 75B:
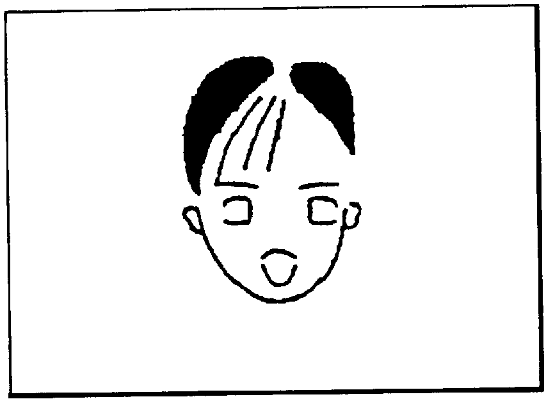

FIG. 75B is an enlarged view of the basic pattern. The preparation of a portrait starts when the user depresses the set key 31 to set the portrait preparing in the display state shown in FIG. 75A.

When the operation of the select key 32 is repeated in step S1402, the CPU 14 responds to this key operation and displays the basic pattern of a man and the basic pattern of a woman on the portrait display area 24*b* in an alternate switching manner. When determining one of the man's and woman's basic patterns, the user presses the set key 31. Consequently, the portrait code matrix for woman or man shown in FIGS. 21 or 22 is read from the ROM 19.

In the next step S1403, it is determined if the preparation of the portrait has been completed by checking the type of the operated key. When the operated key is the mode key 33 or the select key 32, the flow advances to step S1404 to parts selecting process. When the operated key is the set key 31, which is considered as the completion of the preparation of the portrait, the flow advances to step S1405 to perform a preparation terminating process.

Let's consider the case of registering three portraits and a self-made standard message at an address 96 in the message bank 25. First, the user operates the select key 32 and the set key 31 to set the man's basic pattern shown in FIG. 75A in step S1402. Next, the user designates a to-be-changed part of the portrait illustrated in enlargement in FIG. 75B in accordance with the portrait code matrix for man using the mode key 33, and selects the pattern of the designated part with the select key 32 in steps S1403 and S1404.

Figure 75C:
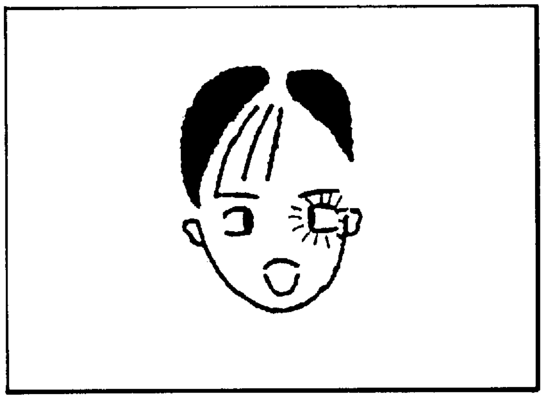
Figure 75D:
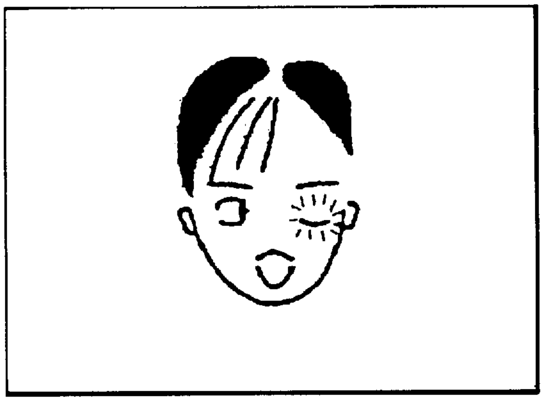
Figure 75E:
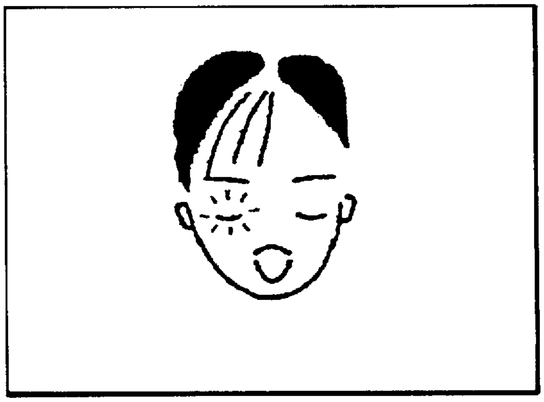
Figure 75F:
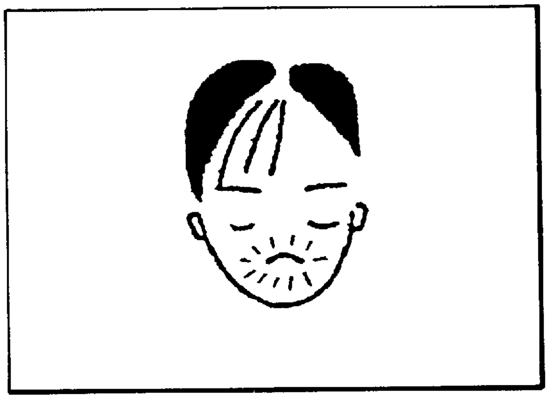
Figure 75G:
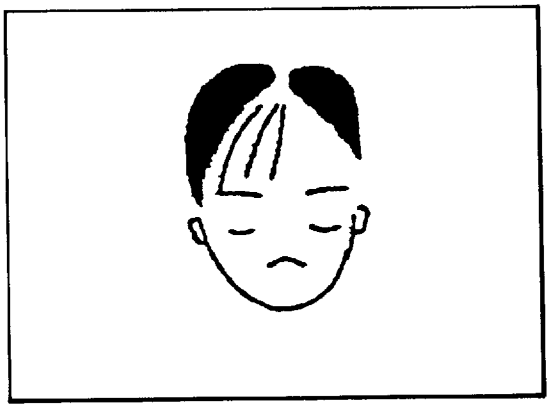

More specifically, as the mode key 33 is depressed, a changeable part is switched and blinking, in the order of eyebrow→left eye→right eye→mouth→sweat→blood vessel→tear→cheek→hand→heart→eyebrow and so forth. Since the portrait in FIG. 75G is to be prepared in this example, the mode key 33 is first depressed twice to cause the left eye as the target part blinks as indicated in the display example in FIG. 75C. Then, the select key 32 is depressed once to select the pattern with the code "21". Consequently, the pattern blinks as shown in FIG. 75D. Next, to change the pattern of the right eye, the mode key 33 is depressed once to set the right eye blinking, and the select key 32 is depressed to select the pattern of the right eye as shown in FIG. 75E. When the mode key 33 and select key 32 are operated under this situation, the pattern of the mouth are changed as shown in FIG. 75F. When the desired portrait is prepared in this manner, the set key 31 should be depressed last. As a result, the decision in step S1403 becomes "YES" and the preparation terminating process is performed in step S1405. The resultant display becomes non-blinking and still as shown in FIG. 75G.

Next, to register the prepared portrait at the address 96 in the message bank 25, an address "96" is designated by the numeral keys after which the set key 31 is operated in step S1406. Consequently, the CPU 14 registers the prepared portrait at the address 96 in the message bank 25. The address "96" at which the portrait has been registered is displayed on the control information display area 24*c* while the portrait is kept displayed on the portrait display area 24*b*.

The pager 4 may be designed in such a way that the CPU 14 increments (or decrements) the address in accordance with the operation of the select key 32 and display it on the control information area 24*c*, and that the address is selected using the select key 32 and the set key 31.

In the next step S1407, it is determined whether or not if another portrait should be set at the same address by checking if the set key 31 has been operated.

Figure 75H:
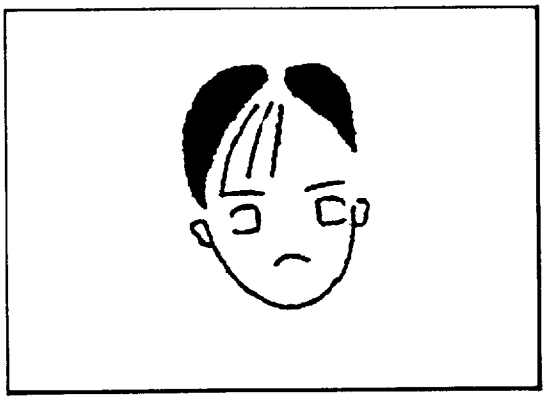
Figure 75I:
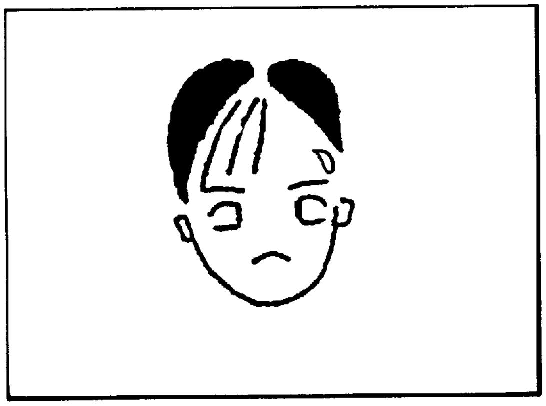
Figure 75J:
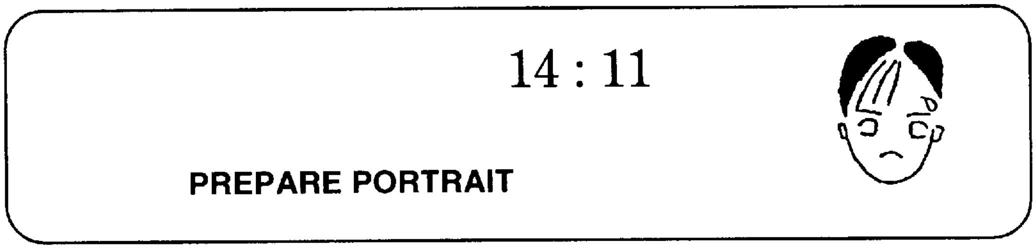

To register a plurality of portraits at the same address and switch them from one to another while being displayed to present a pseudo dynamic picture, the user should depress the set key 31 again. When the set key 31 is depressed, the decision in step S1407 is "YES" and the flow proceeds to the portrait preparing/registering process in step S1408. Although this process is expressed in one step, it actually the repetitive sequence of processes in steps S1403 to S1406. That is, the mode key 33 and select key 32 are operated to prepare the desired portrait. The prepared portrait 31 is registered at the same address as the second portrait when set by the operation of the set key 31. In registering the portrait shown in FIG. 75H following the portrait shown in FIG. 75G at the address 96, the pattern of the mouth of the basic pattern shown in FIG. 22 is changed, and the changed portrait is registered at the address 96 in the message bank 25. Consequently, the portrait shown in FIG. 75H is registered next to the memory area where the portrait shown in FIG. 75G is registered. When the third portrait shown in FIG. 75I is prepared and registered in the same manner, three portraits shown in FIGS. 75G, 75H and 75I are stored at the address 96.

Figure 73:
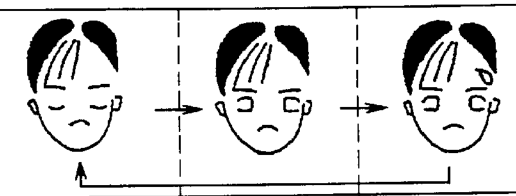
FIG. 73 is a diagram showing examples of messages stored in a message bank 25 in a pager according to a seventh embodiment.
Figure 73:
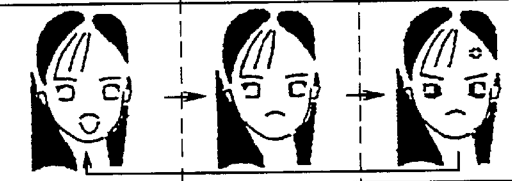
Figure 73:
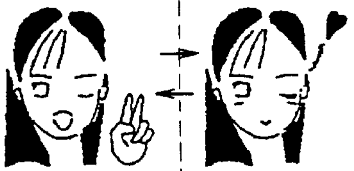
Figure 73:
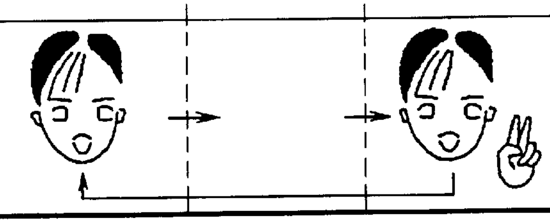

When two portraits are stored at the same address in the message bank 25, a flag to determine what kind of a dynamic picture should be displayed is selected by the select key 32 and is registered by the set key 31. This flag simply alternately displays the two portraits when it is "0", and alternately displays the two portraits and the self-made standard message when it is "1". As "1" is set in the flag area at the address 84 in the message bank 25 in FIG. 73, for example, two expressive messages and one self-made standard message alternately displayed. As the flag is "0" at the address 32, two portraits are simply displayed alternately.

Since portraits cannot be registered at the register address for standard message data designated in the ROM 19, the other addresses than this particular address should be designated.

Figure 75K:
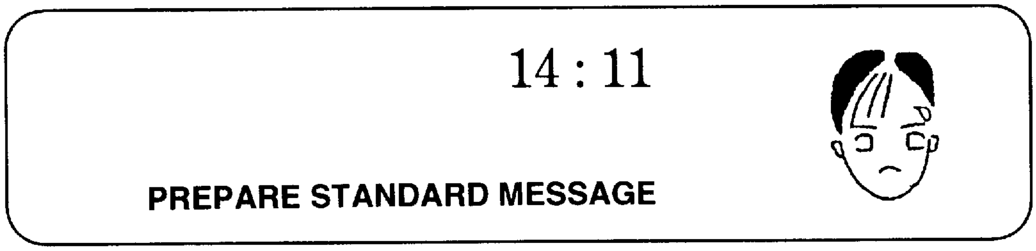
FIGS. 75K through 75O are diagrams showing display examples at the time a self-made standard message is prepared by the pager of the seventh embodiment.
Figure 75L:
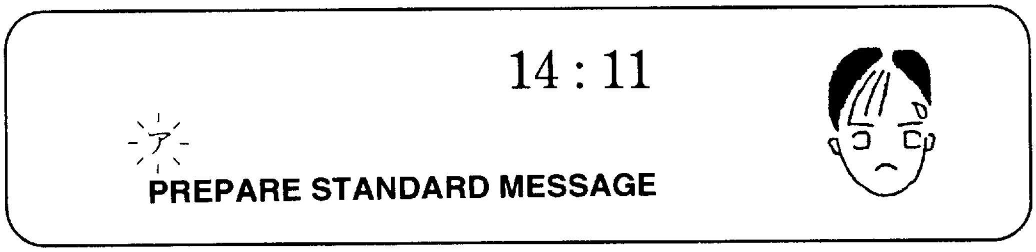

In the case where the self-made standard message is stored in association with one to three portraits prepared and registered in the above-described procedures, the mode key 33 should be depressed once when the preparation and registration of the portraits are completed. The operation of the mode key 33 is detected in step S1409, and the portrait preparing mode is changed to the self-made standard message preparing mode in step S1410. In accordance with the mode change, the display is changed to the state shown in FIG. 75K from the one in FIG. 75I.

When the select key 32 is depressed in step S1410, the self-made standard message code matrix shown in FIG. 23 is read from the ROM 19. Then, the top character "ｧ" in the self-made standard message code matrix blinks at the portion where the message is to be displayed. The depression of the select key 32 changes the horizontal scale code of the self-made standard message code matrix, while the depression of the mode key 33 changes the vertical scale code of the self-made standard message code matrix. When the character is determined, the set key 31 should be depressed. In preparing five characters "SORRY" as in the display example in FIG. 75M, for instance, the mode key 33 should be depressed three times and the select key 32 should be depressed eight times from the first displayed state displaying "ｧ". The set key 31 should be depressed at the blinking character "S". For the next character "O", the mode key 33 should be depressed nine times and the select key 32 one time. When the character "O" appears blinking, the set key 31 should be depressed to set this character. The other characters "R", "R" and "Y" should be selected and registered in a similar manner.

When the preparation of the self-made standard message is finished, the same address (e.g., 96) at which the portraits are previously registered should be input by operating the select key 32 or the numerical keys (step S1412). Then, the message is registered at the address 96 by operating the set key 31 (step S1413).

Figure 75M:
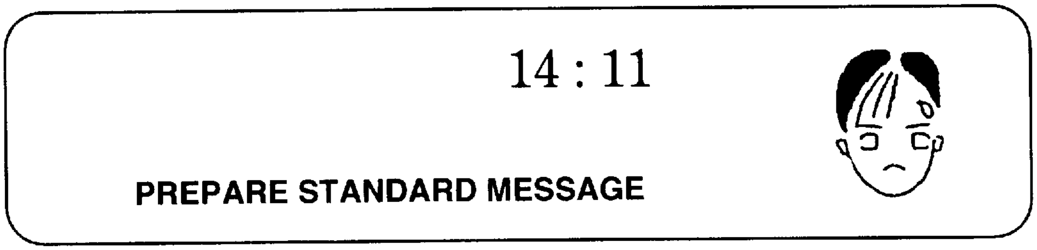
Figure 75N:
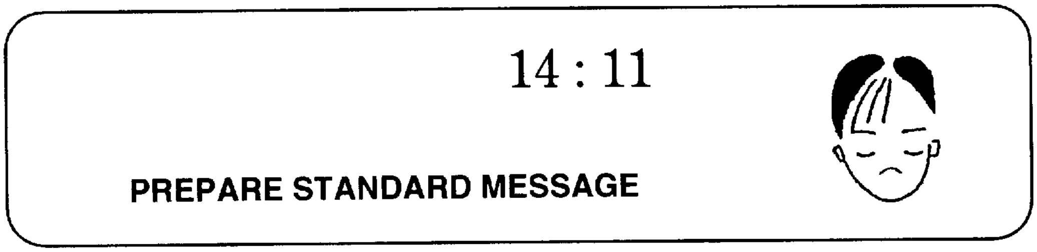
Figure 75O:
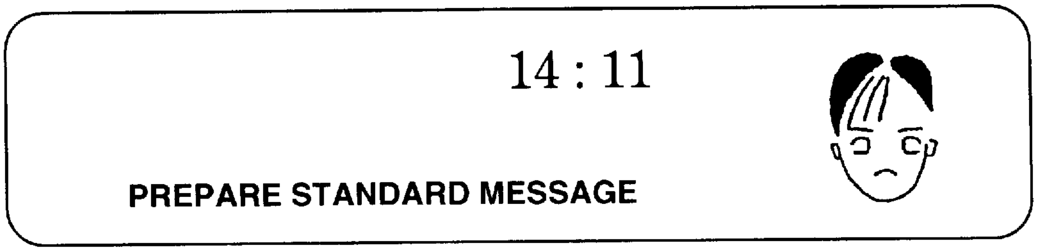

The three portraits and self-made standard message, prepared and registered in the above-described procedures, are displayed in the order of FIG. 75N, FIG. 75O and then FIG. 75M every time the set key 31 is operated. When the registered contents need not be changed, the mode key 33 should be depressed to terminate the preparation and registration of the portraits and the self-made standard message and to change the operation mode to the ordinal reception mode from the self-made standard message preparing mode.

Figure 76A:
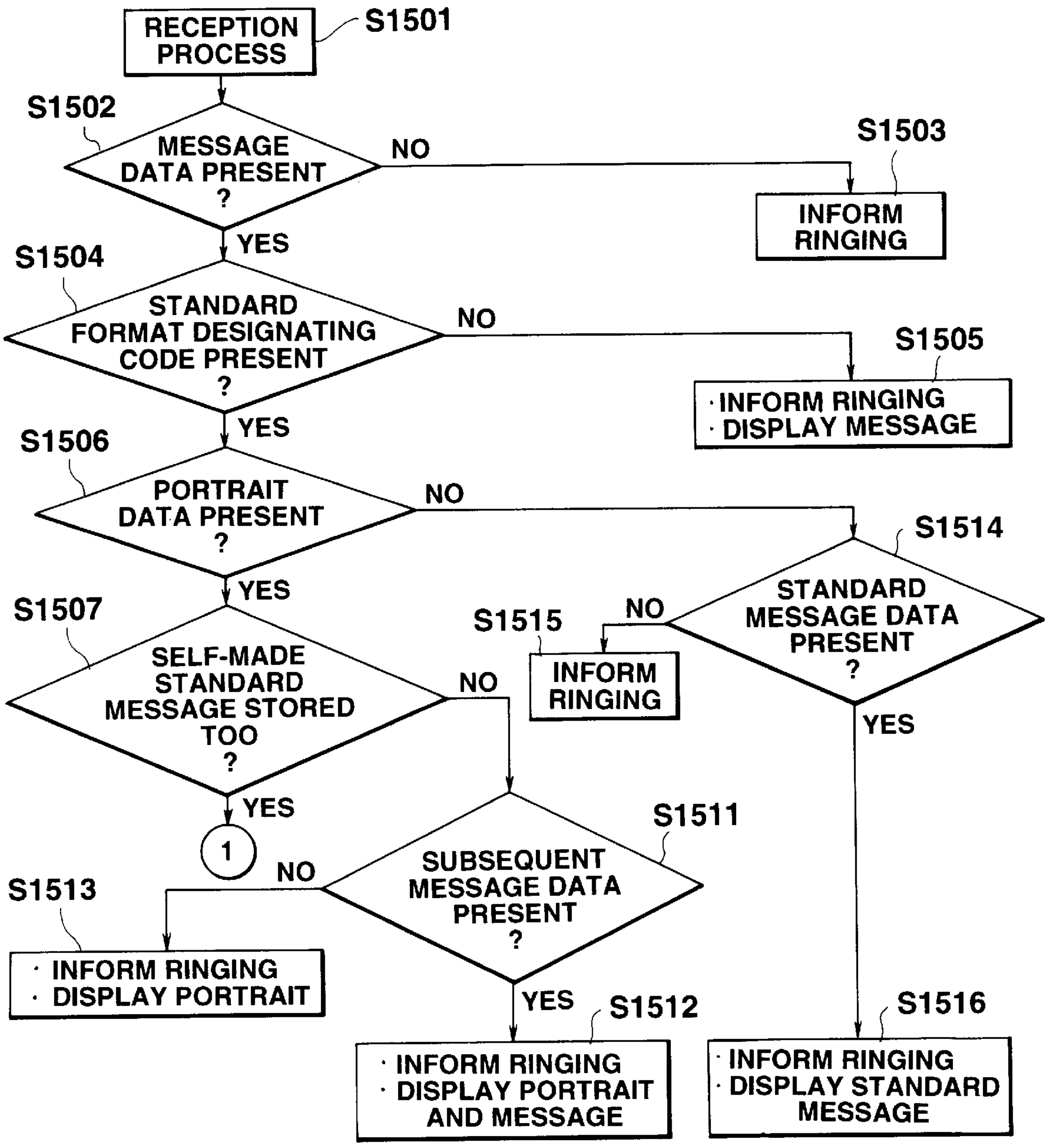
FIGS. 76A and 76B are flowcharts for explaining the reception operation of the pager of the seventh embodiment.
Figure 76B:
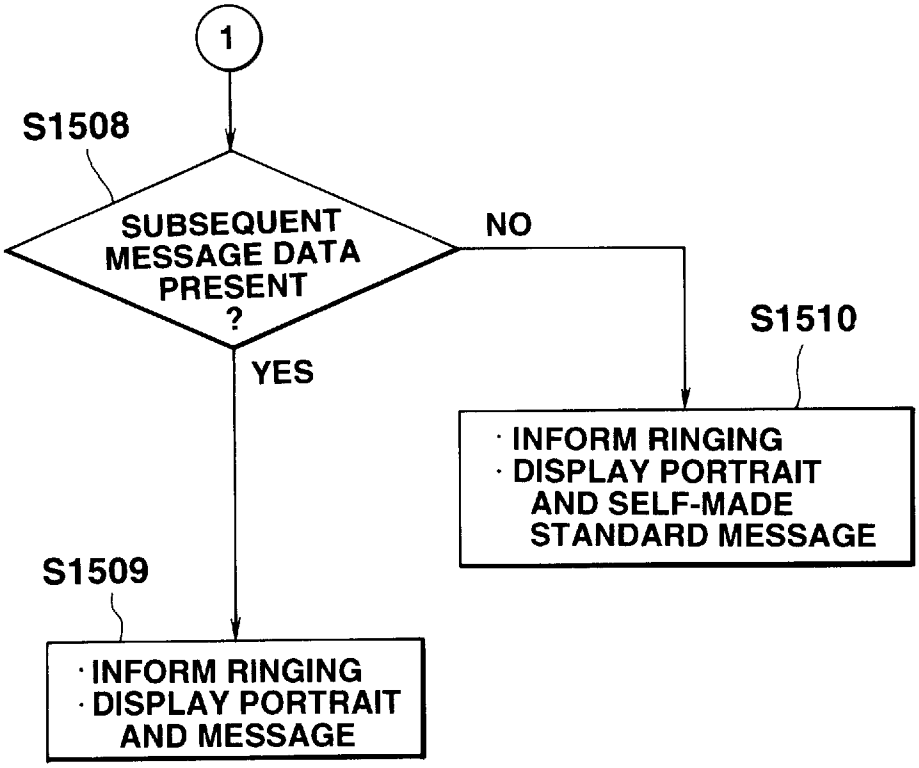

The reception operation of the pager 4 according to this embodiment will be described in detail below with reference to the flowcharts shown in FIGS. 76A and 76B and the display examples in FIGS. 77 to 82.

In step S1501, the ringing signal transmitted from the transmission base station 6 in FIG. 1 is collated with the ID code stored in the ID-ROM 15. When both match with each other, the ringing detection signal is sent to the CPU 14. In response to this ringing detection signal, the CPU 14 performs the processing starting at step S1502.

In step S1502 it is determined if message data follows the ringing signal. When there is no subsequent message data, the ringing is informed, for example, by displaying the symbol representing the ringing in step S1503.

When message data follows the ringing signal, the CPU 14 controls the decoder 13 to keep receiving the incoming message data and acquires this message data in step S1504. The CPU 14 then determines if the standard format designating code is present at the head of the obtained message data.

When there is no standard format designating code, the ringing is informed, the message in accordance with the message data is displayed on the display section 24, and the reception time and the received message data are stored in the RAM 20 after which the processing is terminated.

When it is determined in step S1504 that the standard format designating code exists at the head of the received message data, the flow proceeds to step S1506. In step S1506, it is determined if the portrait data exists. More specifically, it is determined if the standard message designating code is the dynamic picture designating code "*3*3", if address data representing the address in the message bank 25 follows the dynamic picture designating code, and if portrait is stored at the location specified by the address data.

When no portrait exists at the location specified by the address data in step S1506, the flow proceeds to step S1514. When portrait data at the specified location, the flow proceeds to step S1507 to determine if the portrait and the self-made standard message are both located at the position specified by the address data.

When it is determined in step S1507 that the self-made standard message is stored together with the portrait, it is then determined in step S1508 if the message data exists immediately after the address data. When there is no message data following the address data, the flow proceeds to step S1510. When there is message data following the address data, on the other hand, the ringing is informed, the portraits are read out from the message bank 25 based on the address data and is alternately displayed as a dynamic picture on portrait display area 24*b*, and the message based on the message data immediately after the address data is displayed on the message display area 24*a* in step S1509. It is to be noted that the self-made standard message is not displayed. Further, the reception time and received message data are stored in the RAM 20 after which the processing is terminated.

Figure 77A:
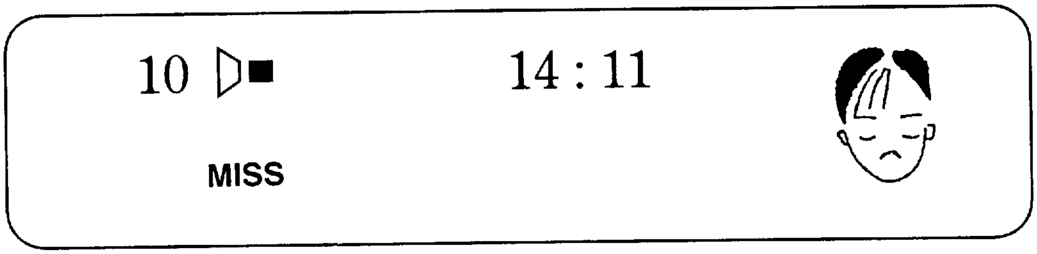
FIGS. 77A through 85C are diagrams showing display examples for the pager of the seventh embodiment in a reception mode.
Figure 77B:
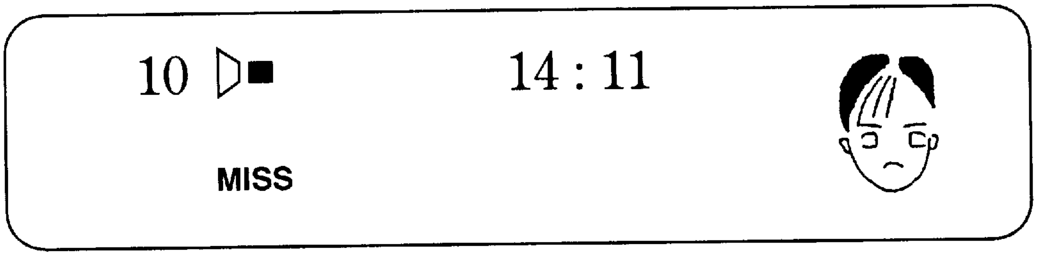
Figure 77C:
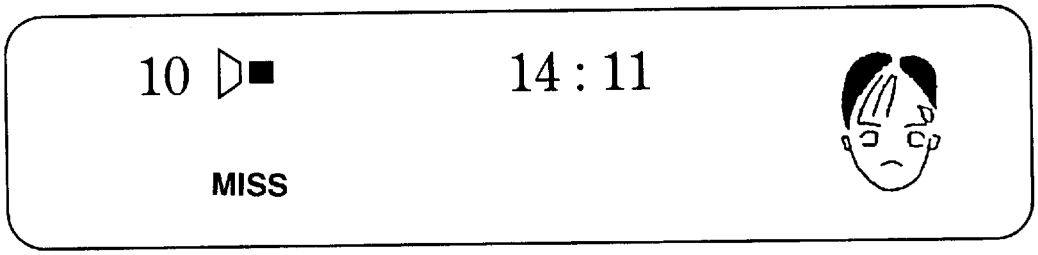

FIGS. 77A through 77C show display examples in this case, particularly, where the message data "*3*396*4*419" has been received. In this example, the address data "96" follows the dynamic picture designating code "*3*3" and the standard message data "*4*419" comes after the data "96". Therefore, the decisions in steps S1502, S1504, S1506, S1507 and S1508 all become "YES". The three portraits based on the portrait data stored at the address "96" in the message bank 25 shown in FIG. 75 and the standard message "MISS" read from the standard message table in FIG. 3 are alternately displayed in the order of FIG. 77A→FIG. 77B→FIG. 77C→FIG. 77A and so forth.

When it is determined in step S1508 that no message data immediately follows the address data, the flow proceeds to step S1510. In step S1510, the ringing is informed and the portraits stored at the location in the message bank 25 specified by the address data and the portrait based on the self-made standard message are displayed on the display section 24. Further, the reception time, received message data and the like are stored in the RAM 20 after which the processing is terminated.

Figure 78A:
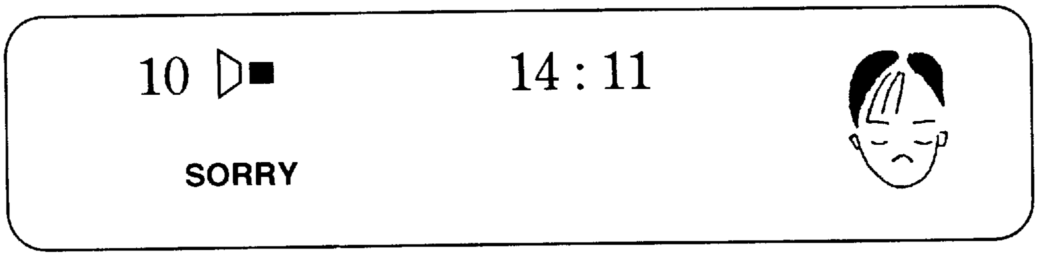
Figure 78B:
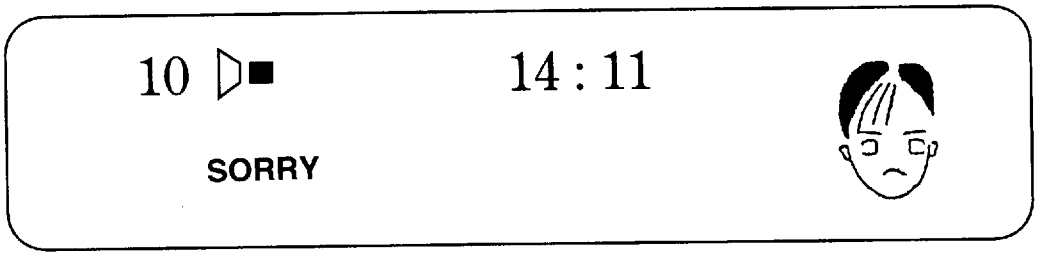
Figure 78C:
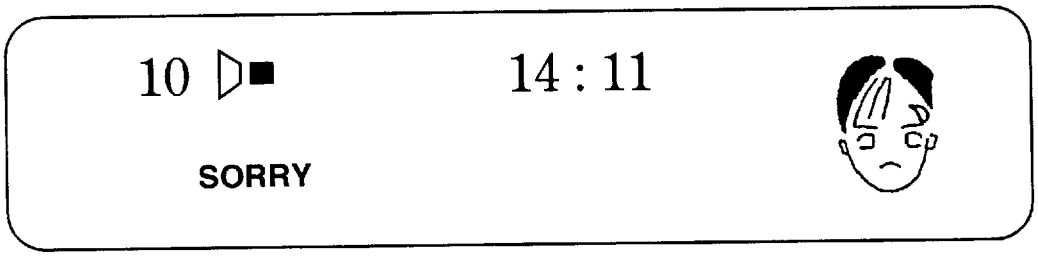

FIGS. 78A through 78C show display examples based on the message data "*3*396". In this case, the address data "96" follows the dynamic picture designating code "*3*3". Therefore, the decisions in steps S1502, S1504, S1506, and S1507 all become "YES", the decision in step S1510 is "NO" and the flow proceeds to step S1510. In step S1510, the portraits based on the portrait stored at the address "96" in the message bank 25 and the self-made standard message "SORRY" are alternately displayed in the order of FIG. 78A →FIG. 78B→FIG. 78C→FIG. 78A and so forth.

When it is determined in step S1507 that the self-made standard message data is not stored at the location specified by the address data, it is then determined in step S1511 if message data follows this address data. When there is no message data, the flow proceeds to step S1513. When there is message data following the address data, on the other hand, the ringing is informed, and the portraits stored at the location specified by the address data and the message based on the message data immediately after the address data are displayed on the display section 24. Further, the reception time and received message data are stored in the RAM 20 after which the processing is terminated.

Figure 79A:
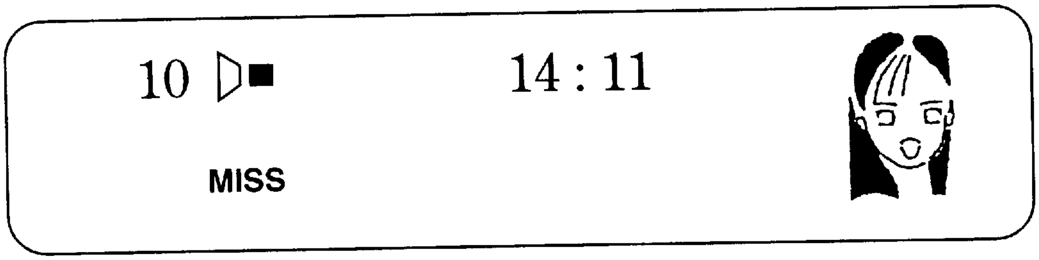
Figure 79B:
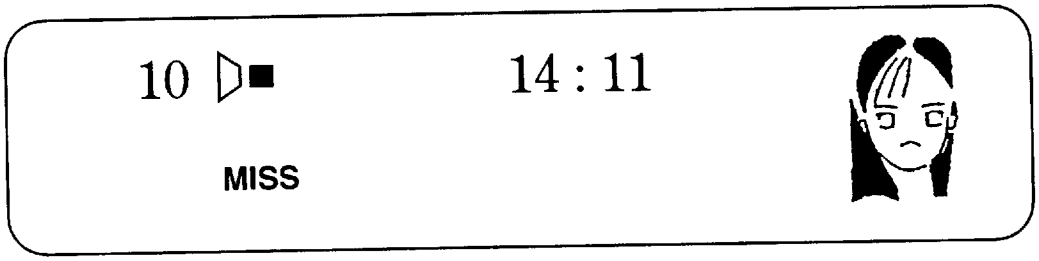
Figure 79C:
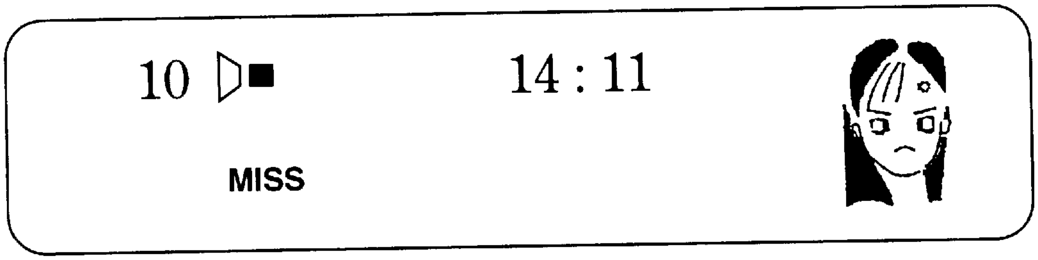

FIGS. 79A through 79C show display examples in this case, particularly, where the message data "*3*377*4*419" has been received. In this example, the register address data "77" follows the dynamic picture designating code "*3*3" and standard message data "*4*419" comes after the data "77". Therefore, the portraits stored at the address "77" in the message bank 25 and the standard message "MISS" based on the message data "*4*419" are alternately displayed in the order of FIG. 79A→FIG. 79B→FIG. 79C →FIG. 79A and so forth.

When it is determined in step S1511 that no message data immediately follows the address data. As no message code follows the standard message designating code in this case, the ringing is informed, and portraits stored at the location specified by the address data are displayed on the display section 24. Further, the reception time and the reception message data are stored in the RAM 20 after which the processing will be terminated.

Figure 80A:
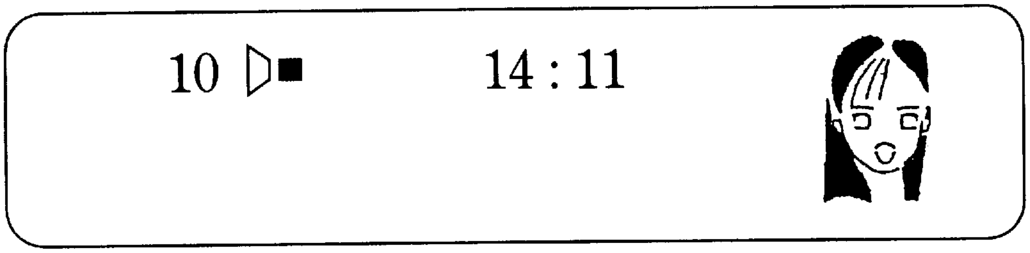
Figure 80B:
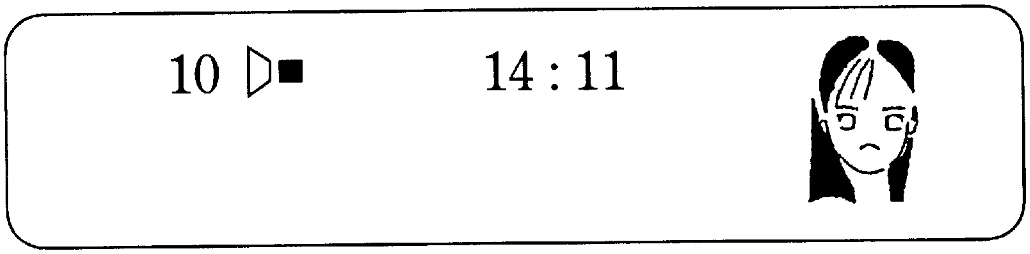
Figure 80C:
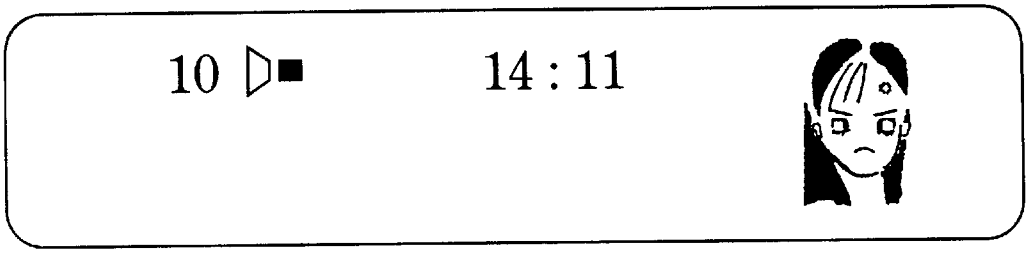

FIGS. 80A through 80C show display examples in this case, particularly, where the message data "*3*377" has been received. The address data "77" follows the dynamic picture designating code "*3*3". Therefore, the portraits stored at the address "77" in the message bank 25 are alternately displayed in the order of FIG. 80A→FIG. 80B →FIG. 80C→FIG. 80A and so forth.

When it is determined in step S1506 that the portrait data does not exist. More specifically, when it is determined that the standard format designating code is not the dynamic picture designating code, that the message data following the dynamic picture designating code is not the address data of the message bank 25, or that no portrait data is stored at the location specified by the address data of the message bank 25 even when the message data following the dynamic picture designating code is address data, it is then determined in step S1514 whether, standard message data is present. When the absence of standard message data is determined in step S1514, the ringing is informed in step S1515 after which the processing will be terminated.

Figure 81:
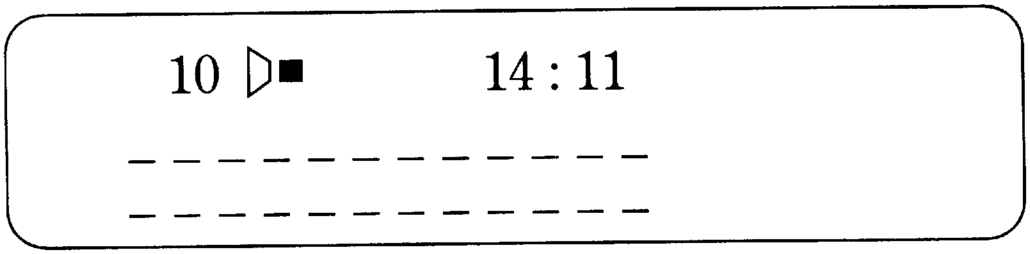
Figure 82:
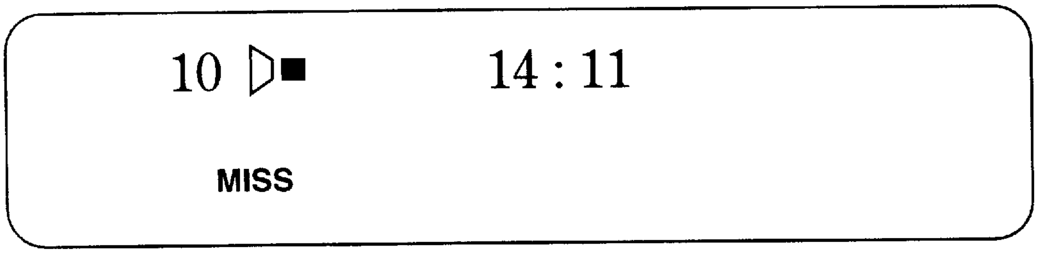

FIG. 81 shows a display example in this case with message data "*4*4" received. Since the standard message designating code "*4*4" is a standard format designating code, the decisions in steps S1502, S1504 and S1506 become "YES". Because of no message code present after "*4*4", the decision in step S1514 is "NO". Thus, information about no message display is displayed on the display section 24.

When the presence of fixed, standard message data is determined in step S1514, the standard message corresponding to the message code is read from the standard message table in FIG. 3 and the reception message data is stored in the RAM 20 in step S1516 after which this processing is terminated.

FIG. 84 shows a display example in this case with message data "*4*419" received. The message code "19" exists after the standard message designating code "*4*4". Accordingly, the decision in step S1514 become "YES", and the fixed standard message "MISS" is read from the ROM 19 and is displayed on the display section 24.

Figure 83A:
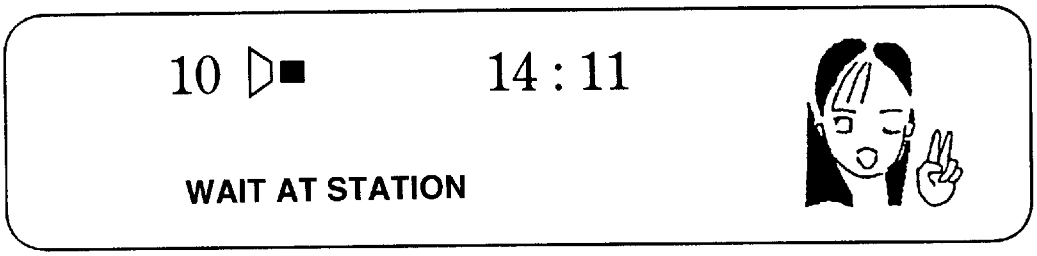
Figure 83B:
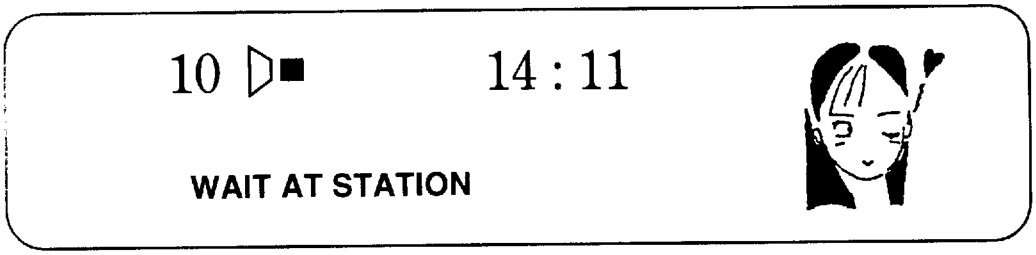

FIGS. 83A and 83B show display examples in the case where message data "*3*332" has been received. In this case, the flag at the address 32 in the message bank 25 is "0". Therefore, the two portraits and the self-made standard message "WAIT AT STATION" are alternately displayed on the display section 24 in the order of FIG. 83A→FIG. 83B→FIG. 83A and so forth.

Figure 84A:
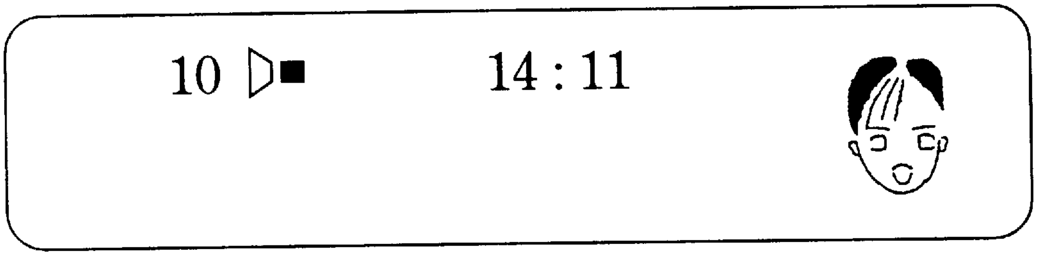
Figure 84B:
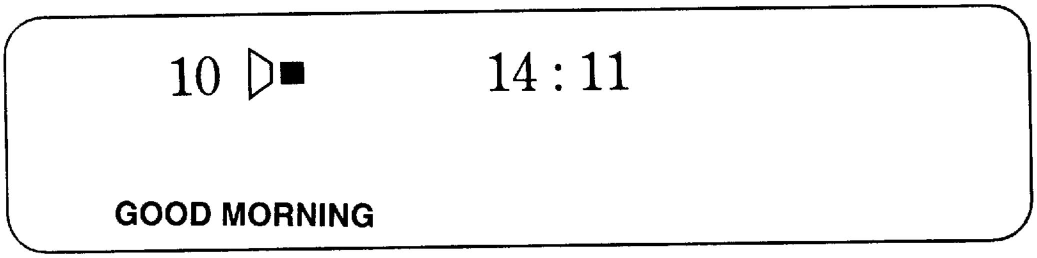
Figure 84C:
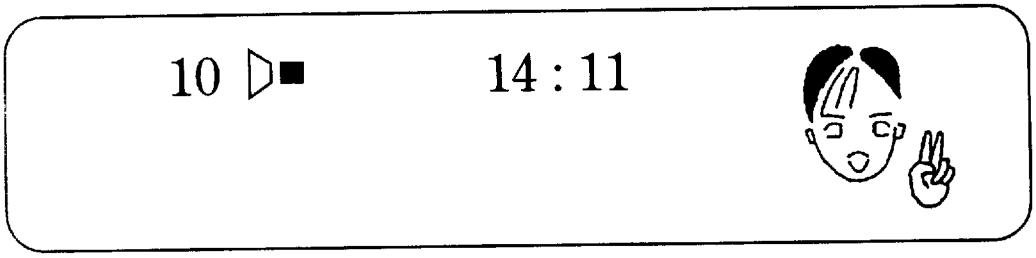

FIGS. 84A through 84C show display examples in the case where message data "*3*384" has been received. In this case, the flag at the address 84 in the message bank 25 is "1". In the state in FIG. 84B showing no portrait on the display section 24, therefore, the self-made standard message "GOOD MORNING" is displayed. The display is therefore changed in the order of FIG. 84A→FIG. 84B FIG. 84A and so forth.

Figure 85A:
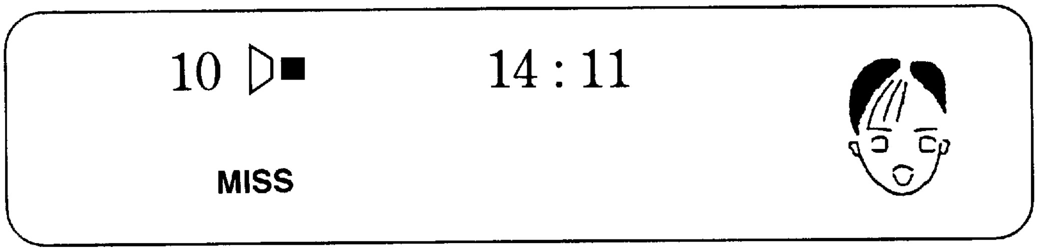
Figure 85B:
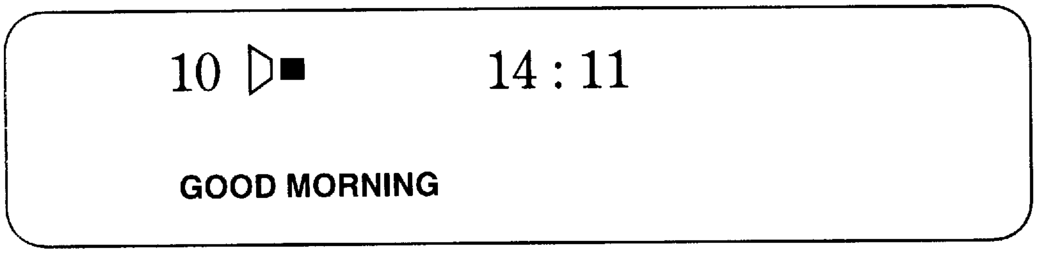
Figure 85C:
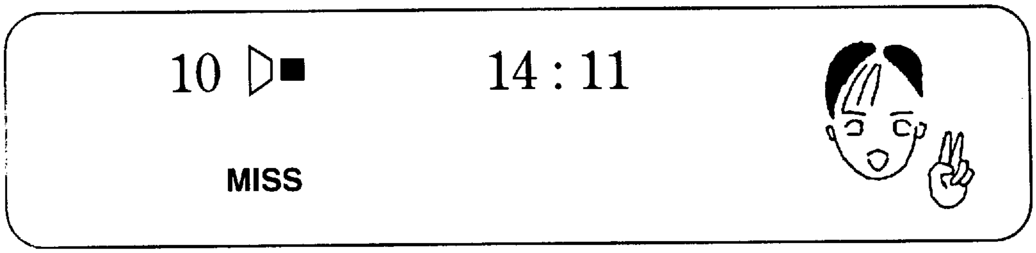

When message data further follows the portrait data "*3*384", e.g., when message data "*3*3*4*419" has been received, the portraits and the message may be displayed as shown in FIGS. 85A to 85C. In other words, the standard message "MISS" based on "*4*419" is not displayed but the self-made standard message "GOOD MORNING" is displayed in FIG. 85B which does not show a portrait. The display is therefore changed in the order of FIG. 85A→FIG. 85B→FIG. 85C→FIG. 85A and so forth.

According to this embodiment, as described above, the user can prepare a portrait and a message. If the correlation between designating codes and a plurality of portraits is taught to the individual users who transmit messages. Therefore, varieties of displays that are not given by fixed patterns can be presented, thus improving the expressing feature. According to this embodiment, a dynamic picture is presented by repeatedly displaying two portraits or three portraits. This invention is not limited to this particular type, but it is possible to alternately switch four or more patterns of portraits in accordance with the memory structure of the message bank 25.

The caller's intention or business matter to be displayed as shown in FIGS. 71A to 71D may alternately be displayed in the order of FIG. 71A→FIG. 71B→FIG. 71C→FIG. 71D→FIG. 71A and so forth, thus improving the urgency of the matter. Likewise, the display screen may be presented on the display section 24 as shown in FIGS. 72A to 72F, but in the order of FIG. 72A→FIG. 72B→FIG. 72C→FIG. 72D→FIG. 72E→FIG. 72F→FIG. 72A and so forth. With this modification, a message which is difficult to convey with characters can be readily transmitted by a dynamic picture.

Eighth Embodiment

Although a caller specifies a code for designating a portrait to be displayed in the above-described embodiment, an image like a portrait may be automatically selected and transmitted in accordance with a message to be displayed. An embodiment of a pager designed to cover this feature will now be discussed.

The structure of the pager of this embodiment is substantially the same as that of the pager of the third embodiment. It is however to be noted that the ROM 19 holds a standard message table, a free message conversion code matrix, a dynamic picture pattern table, etc.

The standard message table stores sequences of codes converted to sequences of numerals in association with the individual message codes as shown in FIG. FIG. 86 and further based on the free message code matrix shown in FIG. 87. For example, the message code "01" provides the sequence of codes "564827103940" for the standard message "URGENT" and the message code "02" provides the sequence of codes "18163737803810" for the standard message "CALL ME".

As shown in FIG. 87, the free message code matrix, which is used to prepare a message, stores kata-kana (Japanese letters), alphabets, numerals, symbols and so forth in a matrix form. For instance, the code "1(column) 6 (row)" provides "A" and the code "69" provides "?".

Figure 88:
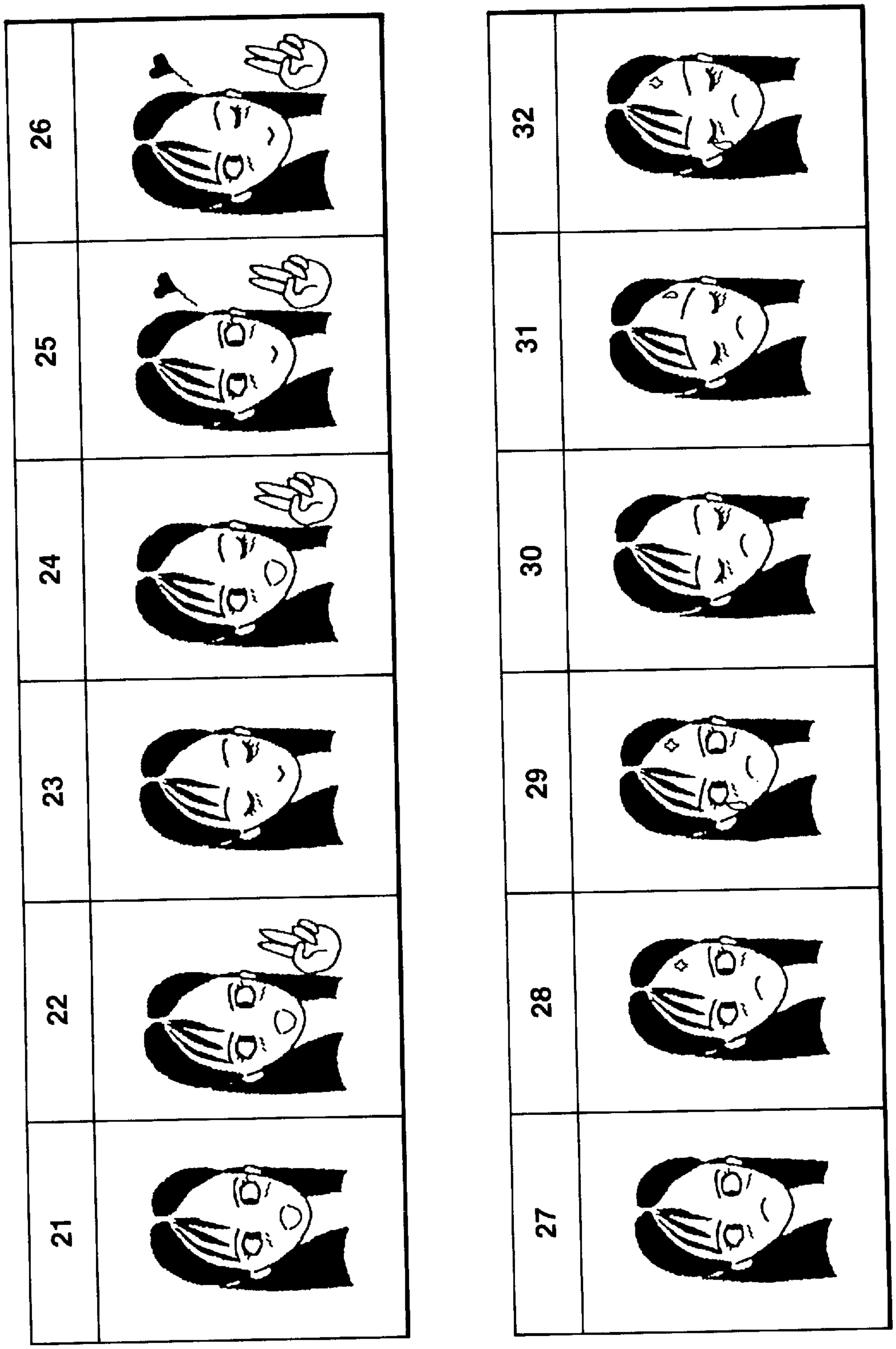
FIG. 88 is a diagram exemplifying a portrait table used in the eighth embodiment.

The portrait table stores portrait codes and portraits of various expressions as shown in FIG. 88. For example, the designation of the portrait code "21" provides the associated portrait.

Figure 89:
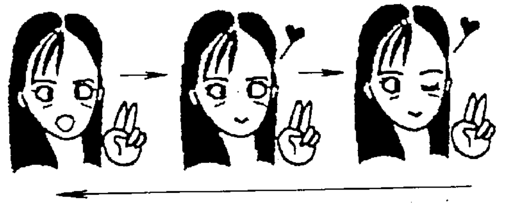
FIG. 89 is a diagram exemplifying a dynamic picture pattern table used in the eighth embodiment.
Figure 89:
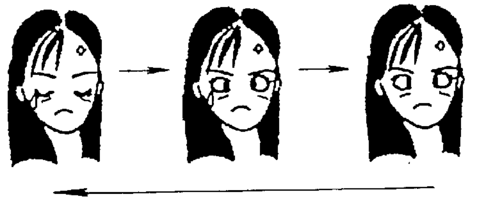
Figure 89:
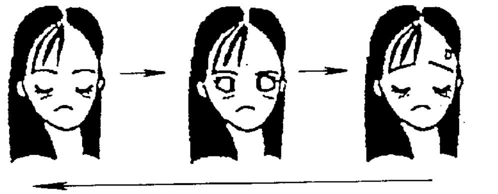
Figure 89:
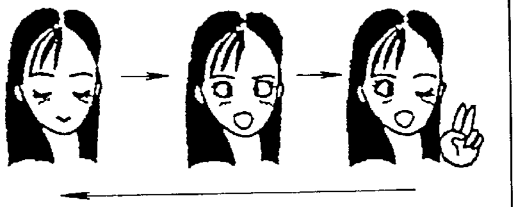

The dynamic picture pattern table is used to display portraits associated with keywords. As shown in FIG. 89, the individual keywords are classified into four groups, group 1 (joy), group 2 (anger), group 3 (pity) and group 4 (comfort), in accordance with the types of portraits, and the portrait codes of a plurality of portraits which are to be alternately displayed are stored for each group. For example, the keyword "ENJOY" (code sequence 1039203050) belongs to the group 1 (joy) and can provide the portrait codes "22", "25" and "26" associated with the group 1.

The operation of the pager 4 with the above structure will now be described.

Figure 90:
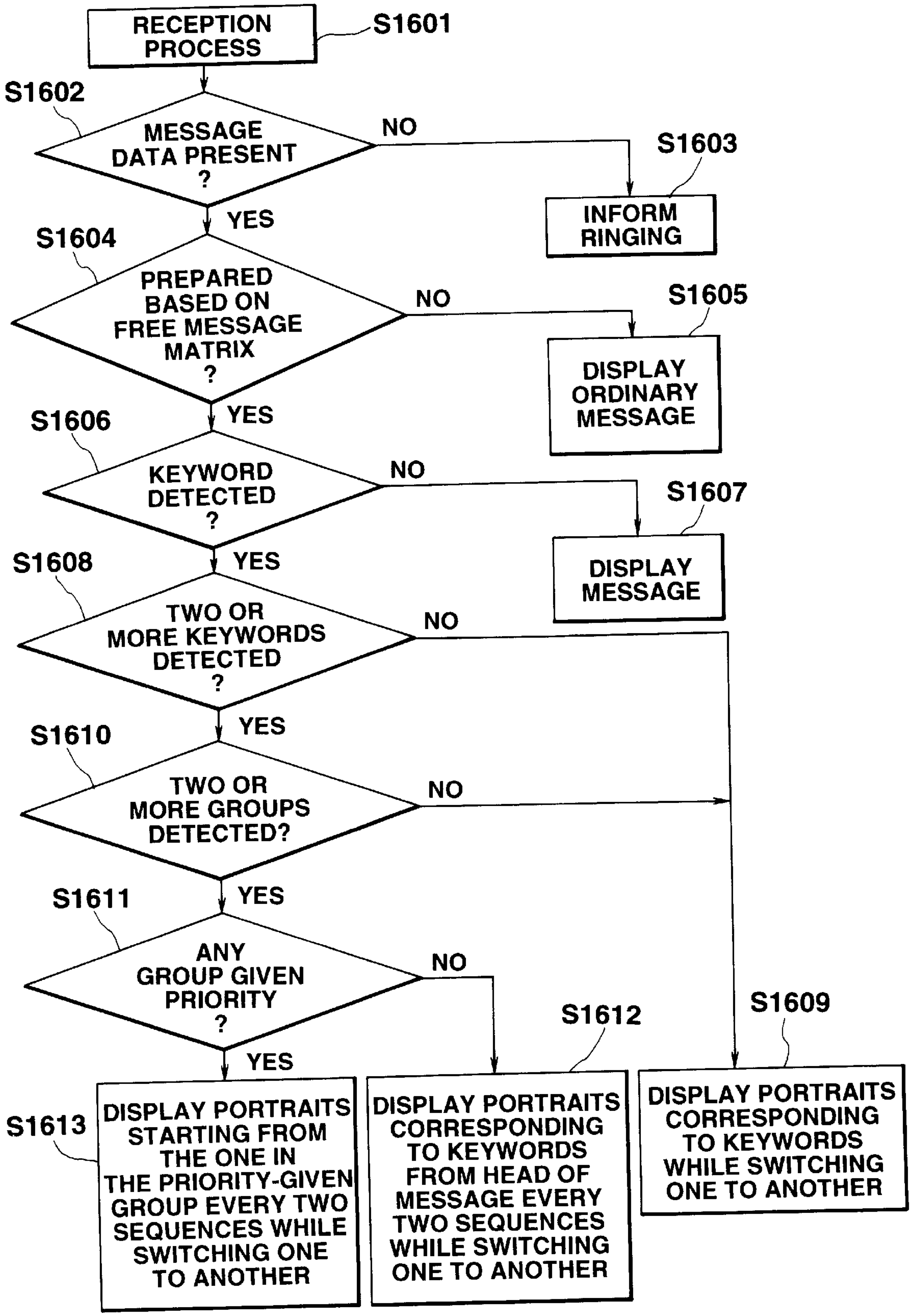
FIG. 90 is a flowchart for explaining the reception operation of a pager according to the eighth embodiment.

When the power switch 46 is operated to power the pager 4, the reception mode is set and the flowchart illustrated in FIG. 90 is executed.

First, in step S1601, the RF receiver 12 demodulates the ringing signal, received via the antenna 11, and sends the demodulated signal to the decoder 13. The decoder 13 determines if the demodulated ringing signal matches with the ID code stored in the ID-ROM 15. When both match with each other, the decoder 13 sends the ringing detection signal to the CPU 14. In response to this ringing detection signal, the CPU 14 executes a process starting at step S1602.

Figure 91:
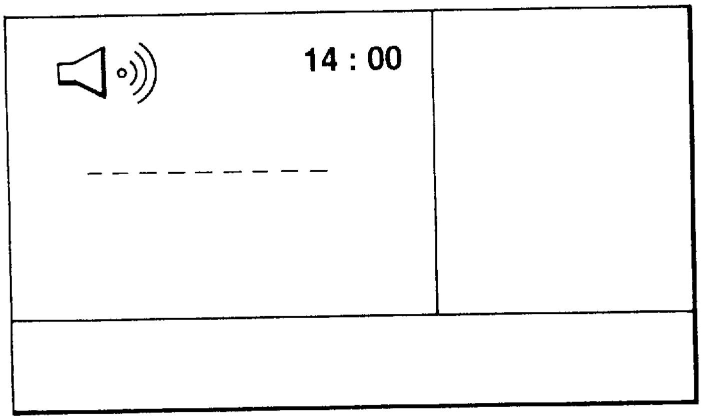
FIGS. 91 through 100C are diagrams showing display examples for the pager of the eighth embodiment in a reception mode.

In step S1602, the CPU 14 detects if message data follows this ringing signal. If there is no subsequent message data, the flow proceeds to step S1603 to inform the user of the ringing. FIG. 91 shows a display example in the case of informing the ringing.

When some message data follows the ringing signal, the flow proceeds to step S1604 where the CPU 114 instructs the decoder 13 to continue receiving the incoming signal and obtains the subsequent data. The CPU 14 then determines if a standard format designating code is present at the head of the obtained message data. When the presence of the standard format designating code is determined, the flow goes to step S1606. In this embodiment, the free message designating code "*7*7" indicating that the message is prepared by the standard message designating code "*4*4" and the free message designating code is used as the standard format designating code.

Figure 92:
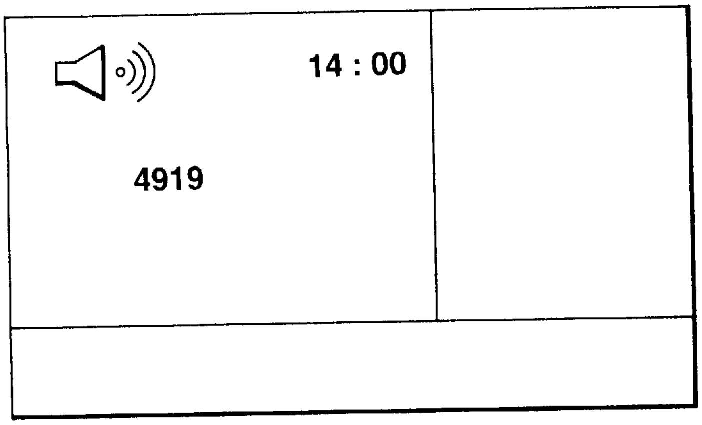

When the standard format designating code does not exist, the ringing is informed and a message based on the received message data is displayed on the display section 24 in step S1605. FIG. 92 shows an example for displaying a numerical message having no standard format designating code.

When it is determined in step S1604 that the standard format designating code is present at the head of the message, the flow advances to step S1606 where it is determined if the message following the format designating code contains a keyword consisting of a specific sequence of codes.

The above will be discussed below more specifically. First, message data after the standard format designating code is converted to a sequence of codes using the standard message table shown in FIG. 86 and the free message code matrix shown in FIG. 87.

Assuming that message data is "*4*402" (CALL ME), the portion "02" is converted to a code sequence of "18163737803810" based on the standard message table shown in FIG. 86.

The converted code sequence is checked from the top, one by one, to determine if the code sequence includes a code sequence corresponding to any of the keywords set in the dynamic picture pattern table shown in FIG. 89. The code sequence "18163737" included in the aforementioned code sequence "18163737803810" matches with the code sequence "18163737" for the keyword "CALL" in the group 4 (comfort) in the dynamic picture pattern table shown in FIG. 89.

Figure 93:
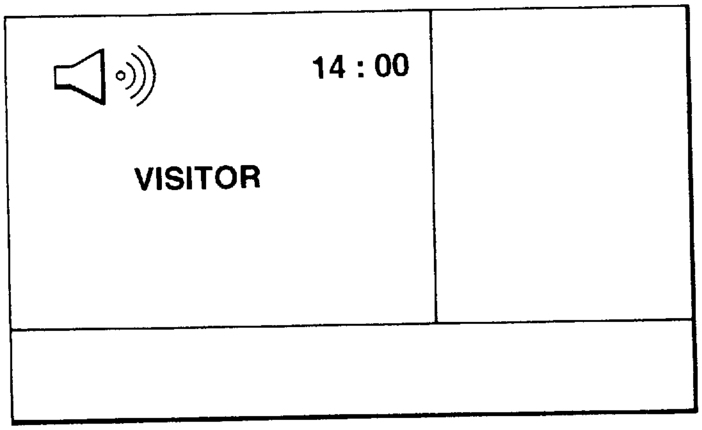

When it is determined in step S1606 that the received message contains none of the keywords in FIG. 89, the flow proceeds to step S1607 to display the converted message on the display section 24. FIG. 93 shows a display example for the message data "*4*414) (VISITOR). In this case, "14" is converted to a code sequence "57294929403048" based on the standard message table in FIG. 86. This code sequence does not include a code sequence corresponding to any of the keywords in the dynamic picture pattern table in FIG. 89. Accordingly, the standard message "VISITOR" corresponding to the message code "14" is displayed on the display section 24.

When it is determined in step S1606 that the received message contains a keyword, the flow proceeds to step S1608 where it is determined if the message data contains two or more keywords. When it is determined that the message data does not contain two or more keywords, the flow proceeds to step S1609 where a plurality of portraits corresponding to the portrait code associated with the detected keyword and the received message are alternately displayed as a dynamic picture on the display section 24.

Figure 94A:
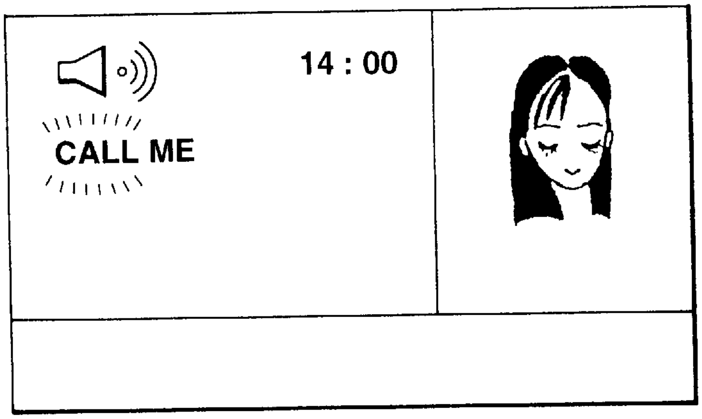
Figure 94B:
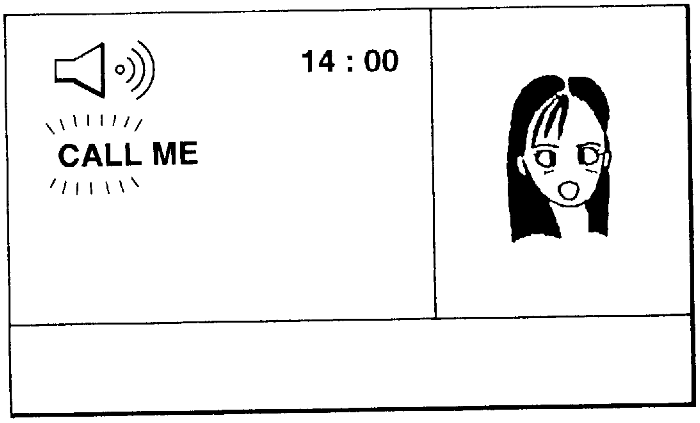
Figure 94C:
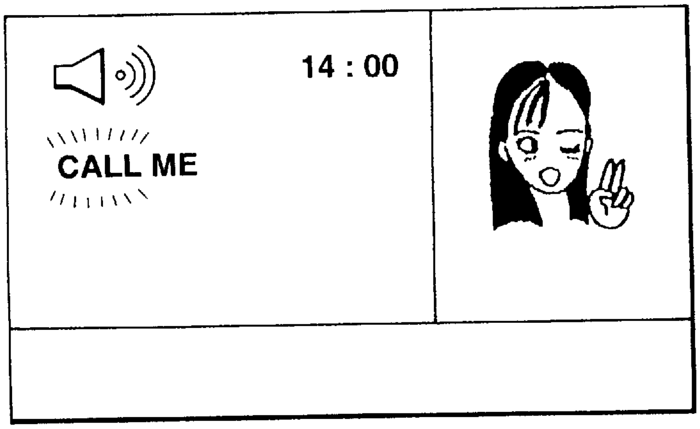

FIG. 94A shows a display example for the message data "*4*402" (CALL ME). As described above, the code sequence "18163737803810" corresponding to this message data includes the code sequence "18163737" for the keyword "CALL" in the group 4 (comfort) in the dynamic picture pattern table shown in FIG. 89. Therefore, the portrait codes "23", "21" and "24" belonging to the group 4 (comfort) are indicated in step S1609. Consequently, portraits corresponding to those portrait codes "23", "21" and "24" are read from the portrait table in FIG. 88, are alternately displayed in the order of FIGS. 94A to 94C on the display section 24.

In this case, the CPU 14 repeats the switching display of the portraits twice. During the switching display of the portraits, the CPU 14 causes the part corresponding to the keyword of the message (CALL ME), "CALL", in this case to blink.

When it is determined in step S1608 that there are two or more detected keywords, the flow proceeds to step S1610 where it is determined if there are two or more groups associated with those keywords. When the detected keywords do not belong to two or more groups, i.e., the detected keywords all belong to the same group, the flow proceeds to step S1609 to display the portraits together with the message in a dynamic picture on the display section 24.

FIGS. 95A to 95C and FIGS. 96A to 96C show display examples for the case where the message data "*4*402*4*411" has been received. In this case, the standard message "CALL ME" corresponding to the message data "*4*402" contains the code sequence for the keyword "CALL" in the group 4 (comfort) in the dynamic picture pattern table shown in FIG. 89, as mentioned above. Therefore, the portrait codes "23", "21" and "24" associated with the group 4 (comfort) are designated. The message data "*4*411" indicates the standard message "I'LL GO EARLIER". This standard message is converted to a code sequence "29683737802730801016483729l048" based on the standard message table shown in FIG. 86. The four digits "2730" in this code sequence match with the code sequence for the keyword "GO" in the group 4 (comfort) in the dynamic picture pattern table in FIG. 89. With regard to the message data "*4*411", therefore, the portrait codes "23", "21" and "24" belonging to the group 4 (comfort) are designated. Consequently, portraits corresponding to those portrait codes "23", "21" and "24" are read from the portrait table in FIG. 88, are switched in the order of FIGS. 95A to 95C and FIGS. 96A to 96F, and are displayed together with the messages "CALL ME" and "I'LL GO EARLIER", on the display section 24.

Figure 95A:
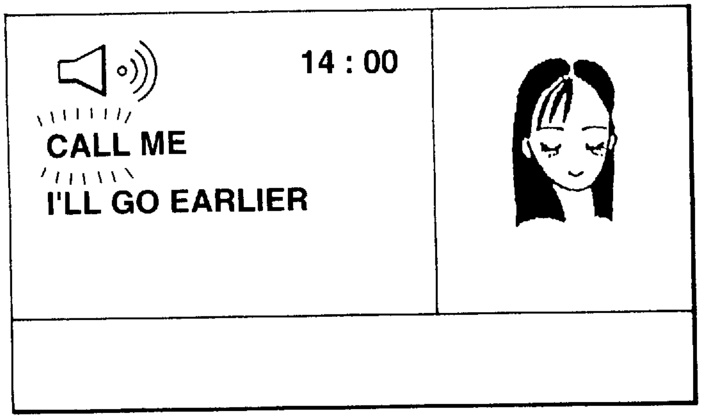
Figure 95B:
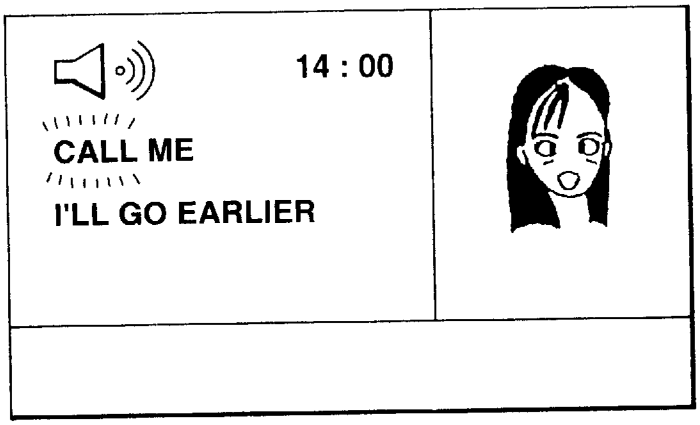
Figure 95C:
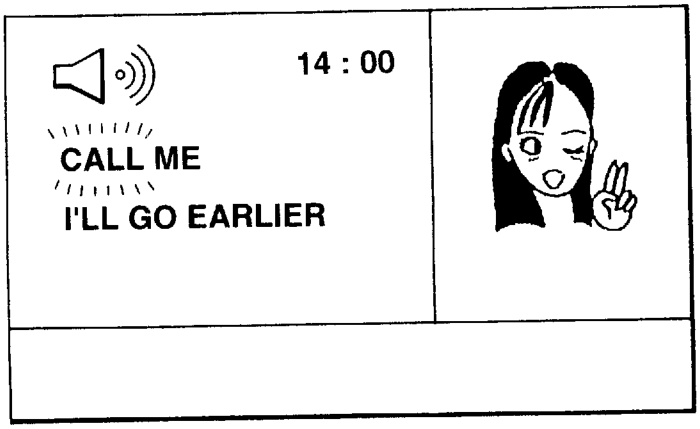
Figure 96A:
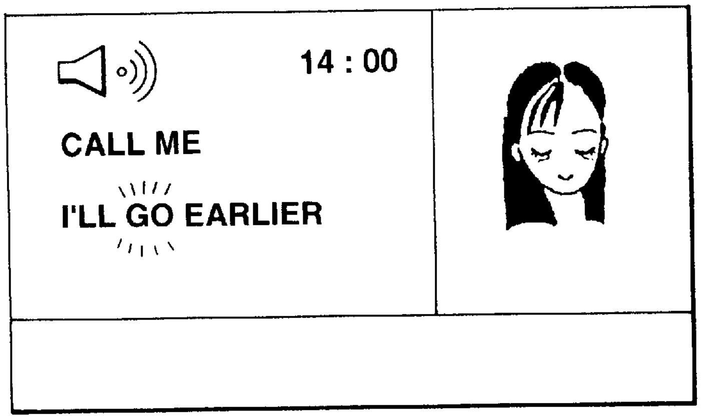
Figure 96B:
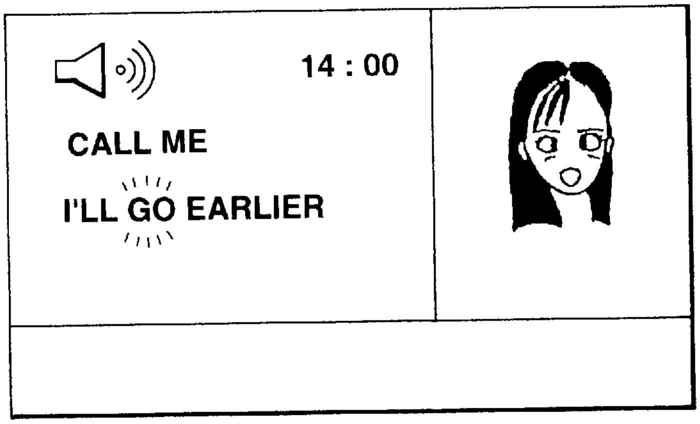
Figure 96C:
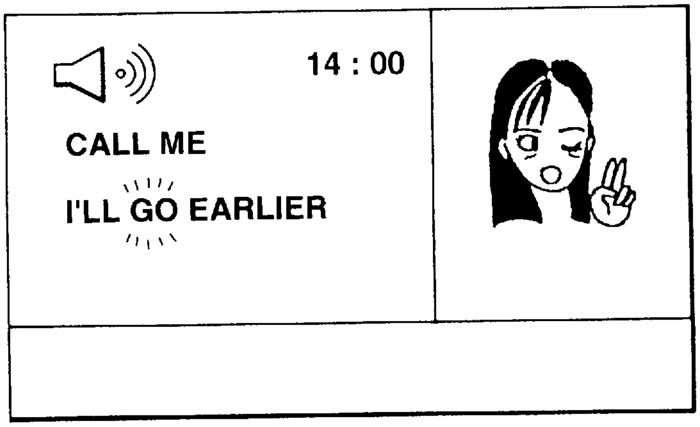

In this case, the switching display of the portraits is performed once for the displays in FIGS. 95A–95C and is performed once for the displays in FIGS. 96A–96C. During the display of the portraits shown in FIGS. 95A–95C, "CALL" corresponding to the keyword of the message "CALL ME" blinks. During the display of the portraits shown in FIGS. 96A–96C, "GO" corresponding to the keyword of the message "I'LL GO EARLIER" blinks.

When it is determined in step S1610 that the detected keywords belong to two or more groups, the flow proceeds to step S1611 where it is determined if there is any group given priority over the other. The priority order classifies the detected keywords group by group, and is determined by the number of keywords belonging to each group.

When it is determined in step S1611 that there are no groups given priority, the portraits are displayed together with the message on the display section 24 as in the case where the flow moves to step S1609.

FIGS. 97A to 97C and FIGS. 98A to 98C show display examples for the case where the message data "*4*402*4*407" has been received. The standard message corresponding to the message data "*4*402" contains the code sequence for the keyword "CALL" in the group 4 (comfort), as mentioned above. Therefore, the portrait codes "23", "21" and "24" associated with the group 4 are designated. The standard message "CANCEL" corresponding to the message data "*4*407" is converted to the code sequence "181639181037" based on the standard message table in FIG. 86. This code sequence are equivalent to the code sequence of the keyword "CANCEL" in the group 3 (pity) based on the dynamic picture pattern table shown in FIG. 89. Therefore, the portrait codes "30", "27" and "31" belonging to the group 3 are designated.

Figure 97A:
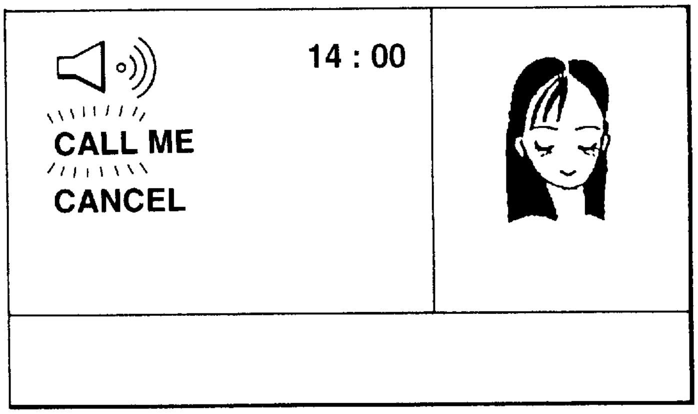
Figure 97B:
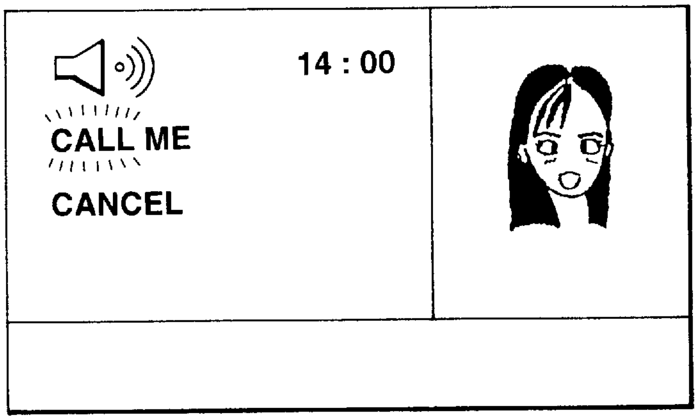
Figure 97C:
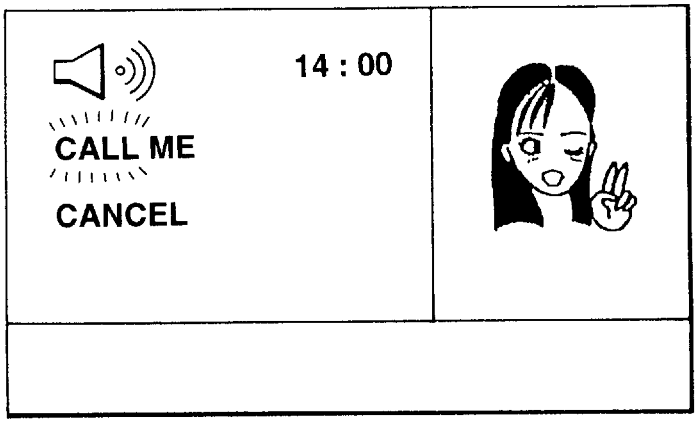

Consequently, portraits corresponding to the portrait codes "23", "21" and "24" corresponding to the keyword "CALL" are read together with the message "CALL ME" and "I'LL GO EARLIER" from the portrait table in FIG. 88, and are switched in the order of FIGS. 97A to 97C. Further, portraits corresponding to the portrait codes "30", "27" and "31" corresponding to the keyword "CANCEL" are read from the portrait table in FIG. 88, and are switched in the order of FIGS. 98A to 98C.

Figure 98A:
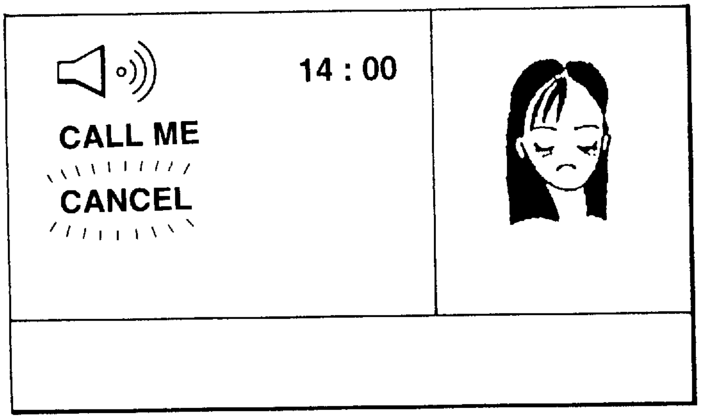
Figure 98B:
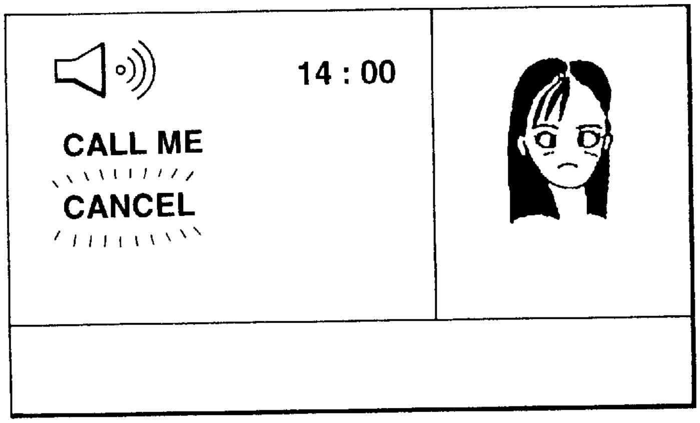
Figure 98C:
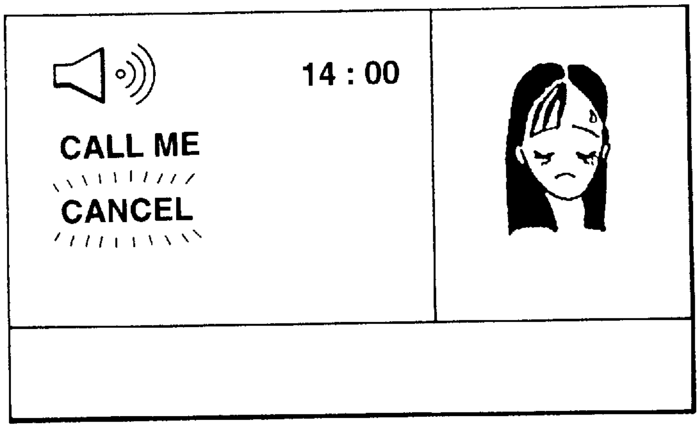

In this case, the switching display of the portraits is performed twice for the displays in FIGS. 97A–97C and twice for the displays in FIGS. 98A–98C. During the switching display of the portraits belonging to the group 4 and shown in FIGS. 97A–97C, "CALL" in the standard message "CALL ME", which corresponds to the keyword, blinks. During the switching display of the portraits belonging to the group 3 and shown in FIGS. 98A–98C, "CANCEL" corresponding to the keyword blinks.

When it is determined in step S1611 that there are groups given priority, the flow proceeds to step S1613 where the portraits are displayed together with the message on the display section 24.

FIGS. 99A to 99C and FIGS. 100A to 100C show display examples for the case where the message data "*4*418*4*420*4*411" has been received. In this case, the standard message "OK" corresponding to the message data "*4*418" is converted to a code sequence "3036" based on the standard message table shown in FIG. 86. The code sequence "3036" matches with the code sequence for the keyword "OK" in the group 1 in the dynamic picture pattern table in FIG. 89.

The standard message "AGREED" corresponding to the message data "*4*420" is converted to a code sequence "162748101019". This code sequence "162748101019" matches with the code sequence for the keyword "AGREED" in the group 1 in the dynamic picture pattern table in FIG. 89.

Further, the standard message "I'LL GO EARLIER" corresponding to the message data "*4*411" is converted to a code sequence "296837378027308010164837291048" based on the standard message table shown in FIG. 86. The four digits "2730" in this code sequence match with the code sequence for the keyword "GO" in the group 4 in the dynamic picture pattern table in FIG. 89.

This received message data, therefore, includes two keywords belonging to the group 1 and one keyword belonging to the group 4. Accordingly, the group 1 is given priority so that the associated portrait codes "22", "25" and "26" are designated, and then the portrait codes "23", "21" and "24" associated to the group 4 are designated. Consequently, the portraits corresponding to the portrait codes "22", "25" and "26" of the keywords "OK" and "AGREED" are read from the portrait table in FIG. 88, are switched in the order of FIGS. 99A to 99C and are displayed together with the messages. Subsequently, the portraits corresponding to the portrait codes "23", "21" and "24" of the keyword "GO" are likewise read from the portrait table in FIG. 88, are switched in the order of FIGS. 100A to 100C, and are displayed together with the messages on the display section 24.

Figure 99A:
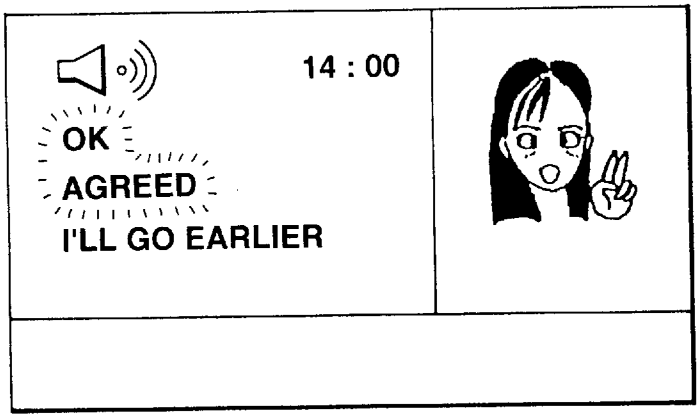
Figure 99B:
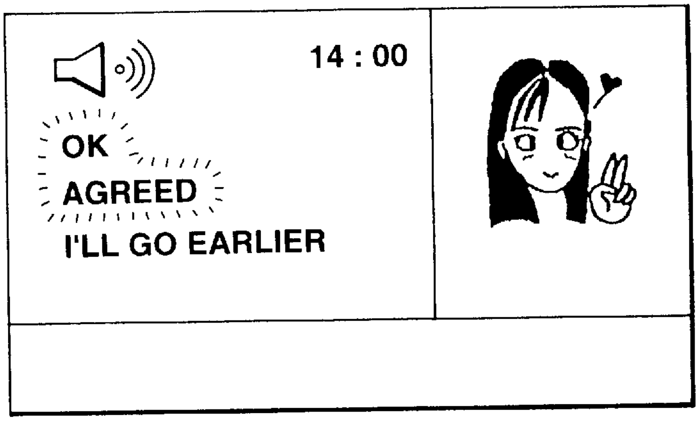
Figure 99C:
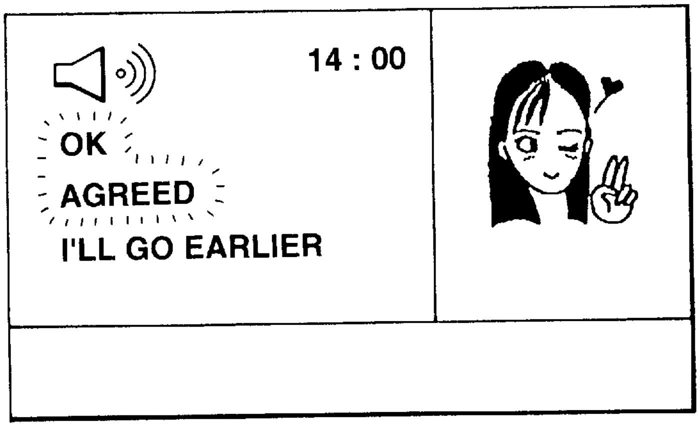
Figure 100A:
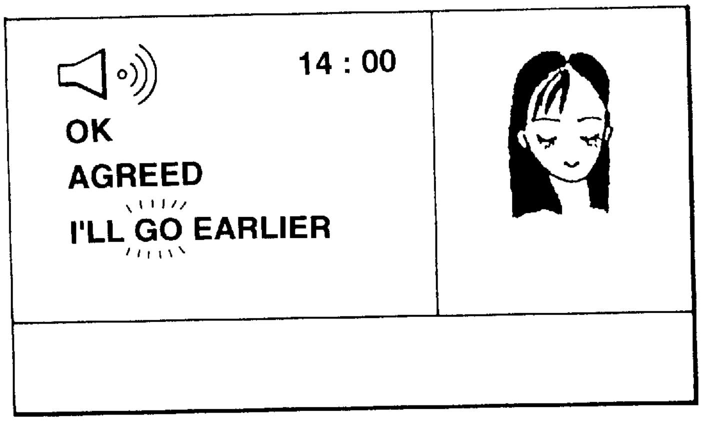
Figure 100B:
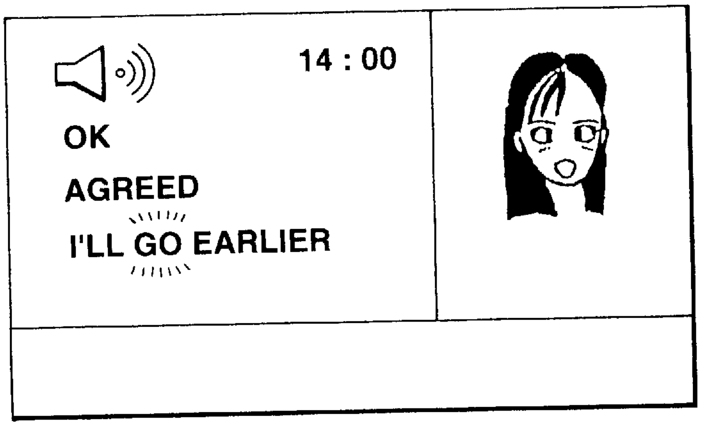
Figure 100C:
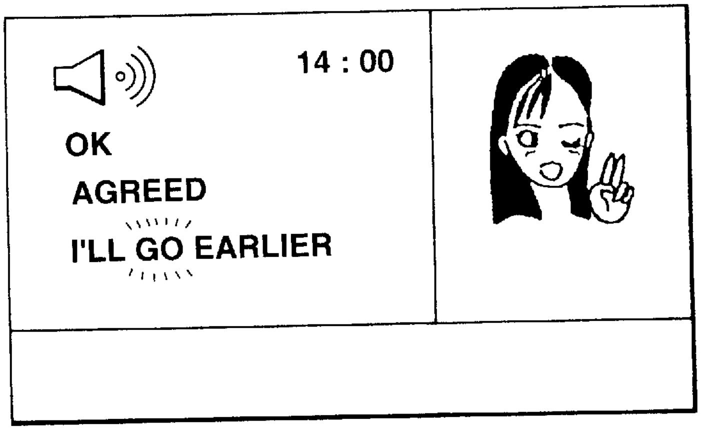

In this case, the switching display of the portraits is performed twice for the displays in FIGS. 99A to 99C and twice for the displays in FIGS. 100A to 100C. During the display of the portraits shown in FIGS. 99A to 99C, "OK" associated with the keyword of the message (OK) and "AGREED" associated with the keyword of the message (AGREED) blink. During the display of the portraits shown in FIGS. 100A to 100C, "GO" associated with the keyword of the message (I'LL GO EARLIER) blinks.

According to this embodiment, as described above, a keyword included in a message is detected, and portraits associated with this keyword are sequentially switched on the display section 24. Therefore, the user of this pager can receiver a very expressive message which can sufficiently transmit the feeling or intention of the sender.

The dynamic picture pattern table classifies the keywords into a plurality of groups each for transmitting relatively similar feeling in different expressions, and a plurality of portrait codes are stored group by group. It is therefore also possible to express the sender's feeling matching with each keyword using fewer portraits.

Embodiment 9-1

Although an image like a portrait is transmitted to the pager to be displayed thereon to transmit the feeling, business matter and the like of each caller in the above-described embodiments, other matters may be transmitted in the form of an image. For example, whether the address data of the ringing signal is a personal address or a group address may be indicated by an image. The following will discuss a pager 4 which indicates whether each call is addressed to a person or some group.

The basic structure of the pager 4 according to this embodiment is the same as that of the embodiment 1—1.

In this embodiment, the illustrated ID-ROM 15 holds a personal address set for each pager and a group address shared by a plurality of pagers. The address data is not limited to those two types, but third and fourth address data, such as address data for receiving an information service, may be stored in the ID-ROM 15 in advance.

If the ID-ROM 15 is constituted of an EEPROM (rewritable ROM) which is a non-volatile type, address data to be stored may be changed or updated.

Figure 101:
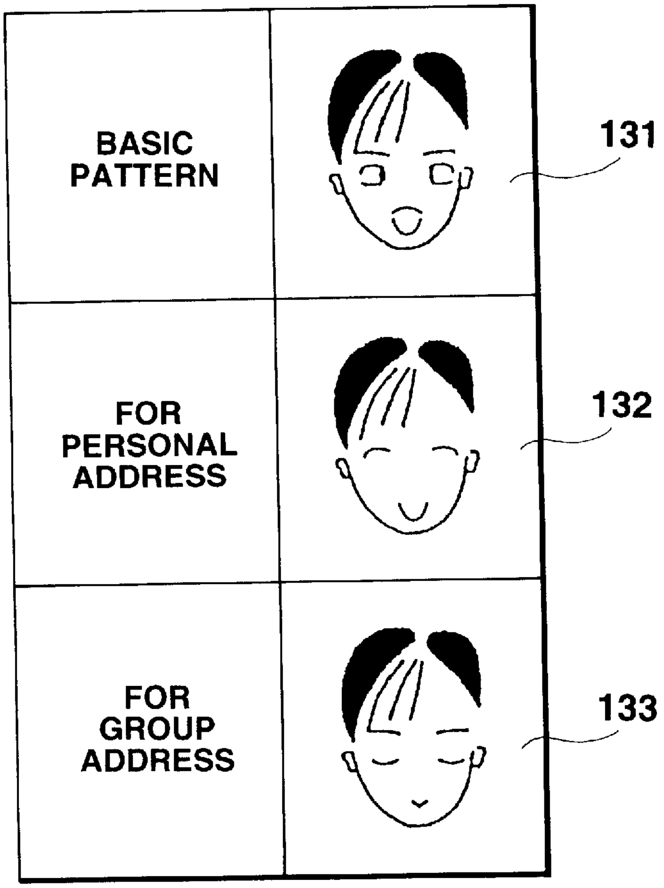
FIG. 101 is a diagram showing one example of a portrait table stored in a ROM 19 used in an embodiment 9-1.

The ROM 19 holds a control program previously prepared for the CPU 14, and a portrait table as shown in FIG. 101. Stored in this portrait table as portraits are a portrait 132 for the personal address and a portrait 133 for the group address in addition to a basic portrait 131 which is a copy of, for example, a person.

Figure 102:
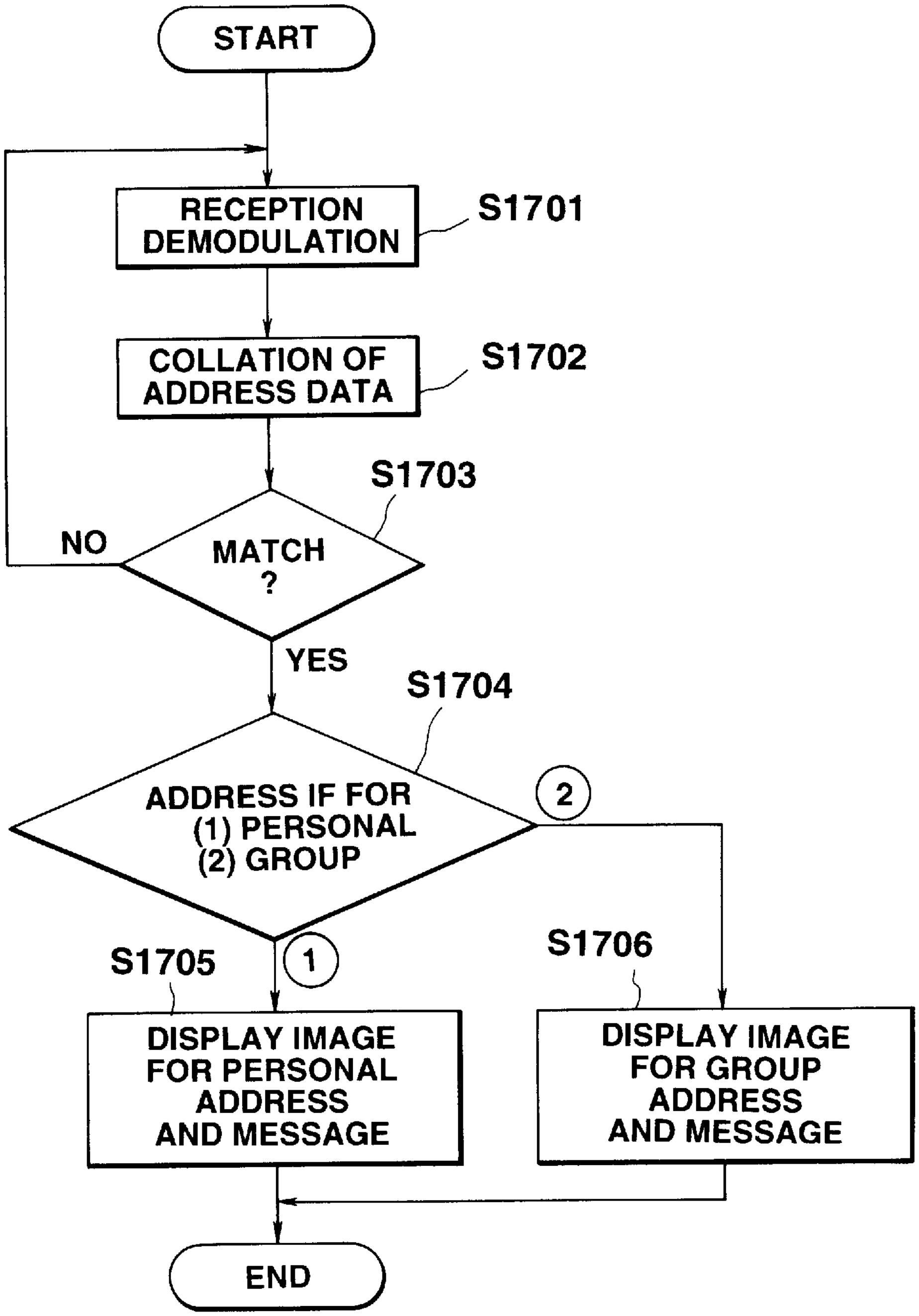
FIG. 102 is a flowchart for explaining the reception operation of a pager according to the embodiment 9-1.

The operation of the pager 4 of this embodiment will be described below with reference to the flowchart illustrated in FIG. 102.

First, in step S1701, upon reception of a ringing signal calling the target pager 4 via the antenna 11, the RF receiver 12 demodulates this ringing signal and sends the demodulated signal to the decoder 13. In step S1702, the decoder 13 determines whether or not the address included in the demodulated ringing signal matches with the ID code (the personal address or group address) stored in the ID-ROM 15.

When the personal address among the ID codes set in the ID-ROM 15 matches with the address data in the ringing signal, the decision in step S1703 becomes "YES" and the flow proceeds to step S1704. In step S1704, it is determined if the address is for a person or a group.

Figure 103A:
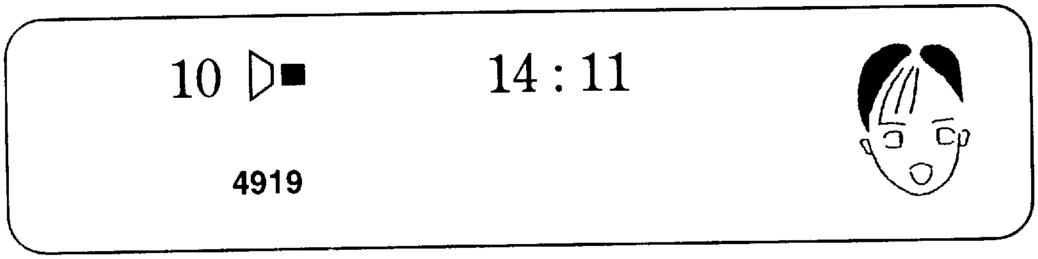
FIGS. 103A through 103C are diagrams showing display examples for the pager of the embodiment 9-1.
Figure 103B:
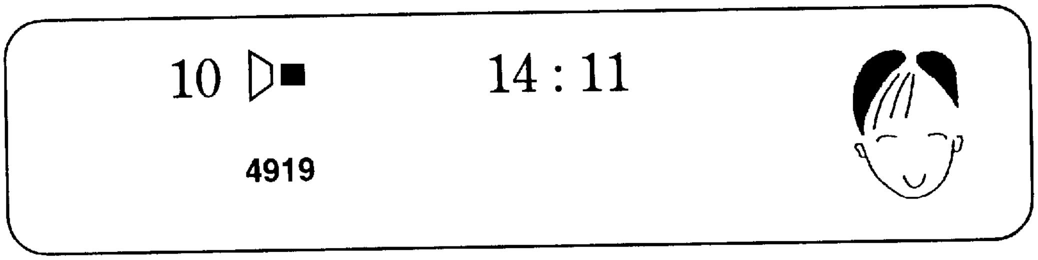

In this example, because it is determined that the address is the personal one, the flow proceeds to step S1705. In step S1705, the portrait 132 is read as the personal address, together with the basic portrait 131, from the portrait table shown in FIG. 101 stored in the ROM 19, and those portraits are displayed on the display section 24. When "4919" is received as message data, for example, the display of the message "4919" and the basic pattern 131 as shown in FIG. 103A and the display of the message "4919" and the portrait 132 for the personal address as shown in FIG. 103B are alternately switched.

When the group address among the ID codes set in the ID-ROM 15 matches with the address data in the ringing signal, the flow proceeds to step S1706.

Figure 103C:
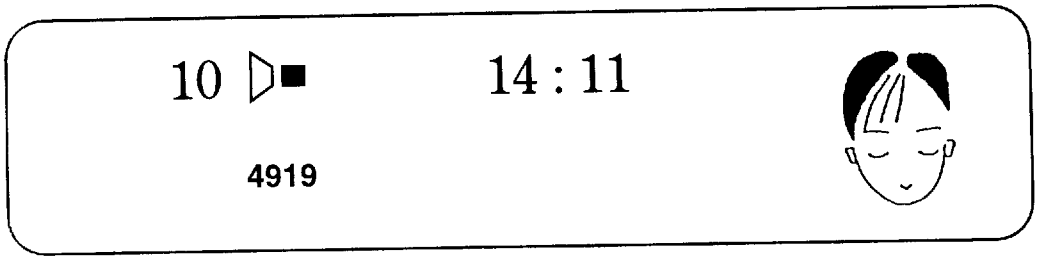

In step S1706, the basic portrait 131 and the portrait 133 are read from the portrait table in FIG. 101 stored in the ROM 19, and those portraits are displayed on the display section 24. When "4919" is received as message data, for example, the display of the message "4919" and the basic pattern 131 as shown in FIG. 103A and the display of the message "4919" and the portrait 133 for the group address as shown in FIG. 103C are alternately switched.

According to this embodiment, therefore, the user of the pager 4 can promptly know whether the address data in the received ringing signal is the personal address or group address from the displayed image. This pager can surely prevent the user from erroneously coping with the received message, as compared with the prior art pager which displays only the received message.

Although the address in the ID code stored in the ID-ROM 15 is used as an address in this embodiment, any data and code may be used as an address as long as the call can be discriminated. For instance, function bit data (control signal) in the received ringing signal may be used to discriminate whether or not the target pager is called. Commands defined by a predetermined combination of the function bit data (data designating command) and the message (message defining the contents of the command) may be used to discriminate the ringing.

Embodiment 9-2

Although the embodiment 9-1 displays an image indicative of whether the called address is a personal address or a group address, this invention is not limited to this particular type. For example, an image representing the type of the received message may be displayed. A pager 4 designed to cover this feature will now be described.

The schematic structure of the pager according to this embodiment is basically the same as the one shown in FIG. 2. It is however to be noted that the ROM 19 holds a portrait table shown in FIG. 104, a standard message table shown in FIG. 3 and a free message code matrix shown in FIG. 87.

Figure 104:
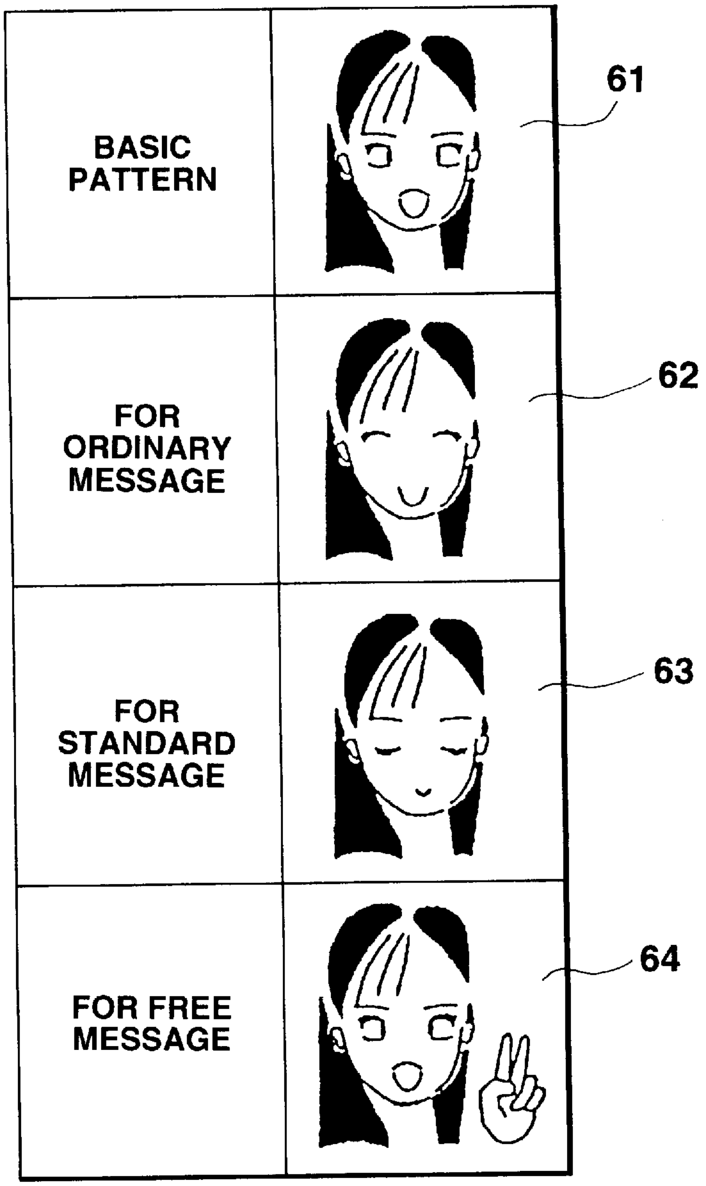
FIG. 104 is a diagram showing one example of a portrait table stored in a ROM 19 used in an embodiment 9-2.

The portrait table in FIG. 104 stores a basic portrait 161, a portrait 162 for an ordinary message, a portrait 163 for a standard message and a portrait 164 for a free message as portraits. In accordance with each designating code included in message data, the ordinary message 162 is displayed for an ordinary message using numerals, the portrait 163 is displayed for a standard message defined by the standard message designating code, and the portrait 164 is displayed for a free message using a sequence of characters based on the free message table defined by the free message designating code.

The operation of the pager of this embodiment 9-2 will be described below with reference to the flowchart illustrated in FIG. 105.

In this case too, when receiving a ringing signal calling the target pager via the antenna 11, the RF receiver 12 demodulates this ringing signal and sends the demodulated signal to the decoder 13 in step S1801. The decoder 13 determines whether or not the address included in the demodulated ringing signal matches with the ID code from the ID-ROM 15, which is assigned to this pager. Only when both match with each other, the decoder sends the ringing detection signal to the CPU 14. In response to this ringing detection signal, the CPU 14 executes the processing starting at step S1802.

In step S1802, it is determined if message data follows the ringing signal. When there is no following message data, the flow proceeds to step S1803 to inform the ringing.

When message data follows the ringing signal, on the other hand, the flow proceeds to step S1804 where the type of the message data following the ringing signal is discriminated from the content of the standard format designating code.

When it is determined that the message data includes no standard format designating code and the message is a ordinary message using numerals corresponding to the message code, the flow proceeds to step S1805. In step S1805, the basic pattern 161 and the ordinary message portrait 162 are read from the portrait table shown in FIG. 104, and are displayed together with the received ordinary message ("4919" in this example) on the display section 24.

Figure 106A:
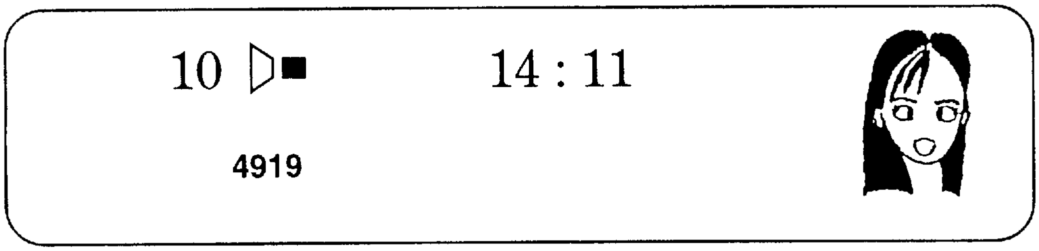
FIGS. 106A through 109 are diagrams showing display examples for the pager of the embodiment 9-2 in a reception mode.
Figure 107:
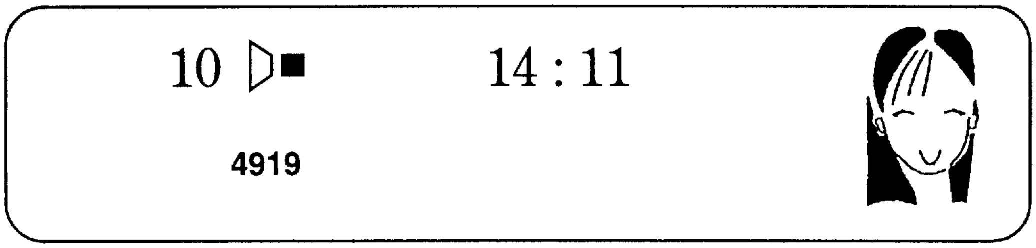

In this case, the display of the basic portrait 161 shown in FIG. 106A and the display of the ordinary message portrait 162 shown in FIG. 107 are alternately switched on the display section 24 in accordance with the display of the ordinary message "4919".

When the standard message designating code "*4*4" is detected in the message data and the received message is determined as a standard message in step S1804, the flow proceeds to step S1806. In step S1806, the basic portrait 161 and the portrait 163 are read from the portrait table shown in FIG. 108, and are displayed together with the received standard message (for example, "URGENT" corresponding to the message code "01") on the display section 24.

Figure 106B:
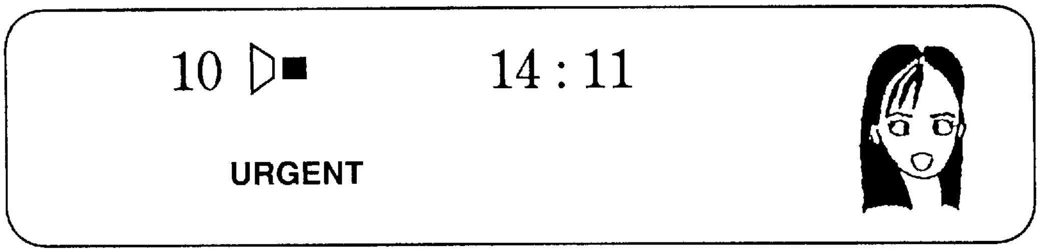
Figure 108:
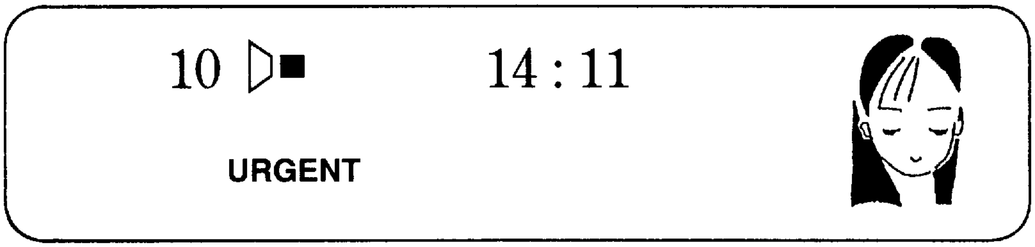

In this case, the display of the basic portrait 161 shown in FIG. 106B and the display of the standard message portrait 163 shown in FIG. 108 are alternately switched on the display section 24 in accordance with the display of the standard message "URGENT".

When the free message designating code "*9*9" is detected in the message data and the received message is determined as a free message using a sequence of characters corresponding to the free message code, the flow proceeds to step S1807. In step S1807, the basic portrait 161 and the portrait 164 are read from the portrait table shown in FIG. 104, and are displayed together with the received free message ("TEL" formed by "T" corresponding to the code "40", "E" corresponding to the code "10", and "L" corresponding to the code "37" in this example) on the display section 24.

Figure 106C:
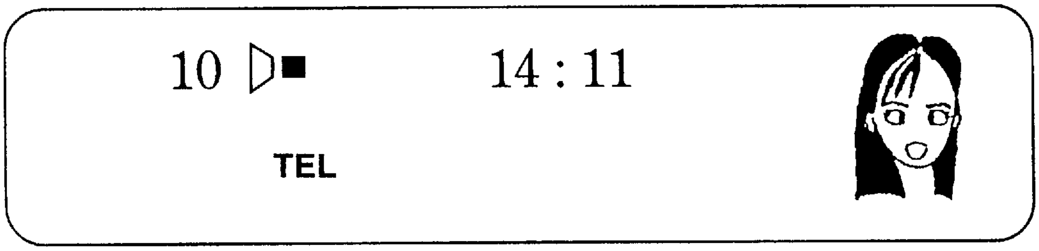
Figure 109:
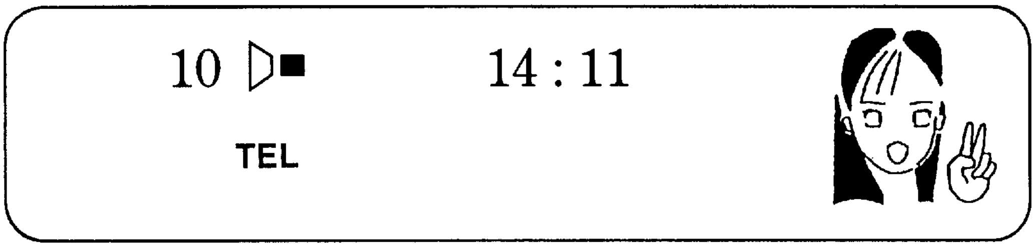

In this case, the display of the basic pattern 161 shown in FIG. 106C and the display of the free message portrait 164 shown in FIG. 109 are alternately switched on the display section 24.

According to the embodiment 9-2, therefore, the user can quickly know whether the received message is an ordinary message, a standard message or a free message from the display content of the display section 24.

Figure 105:
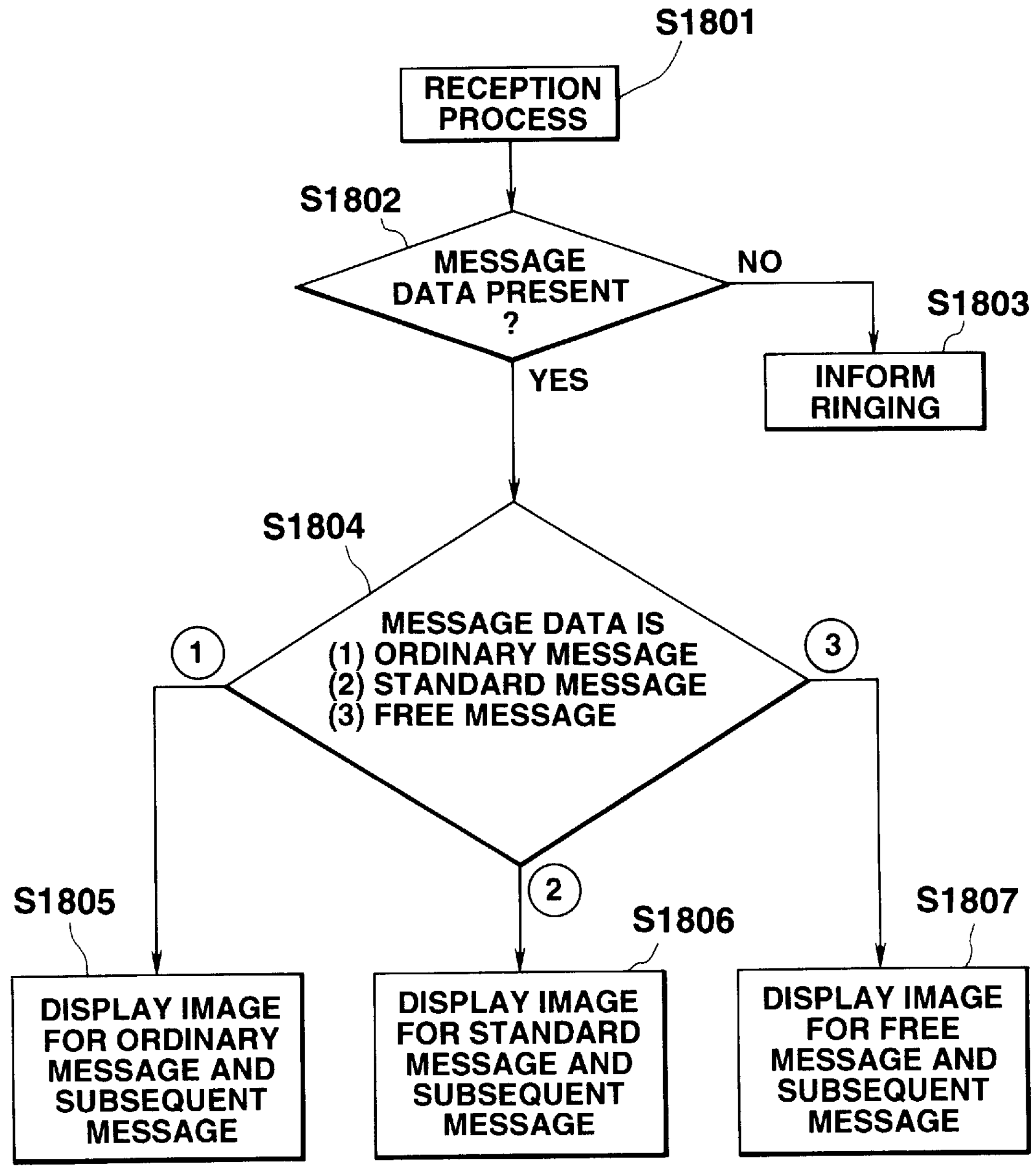
FIG. 105 is a flowchart for explaining the operation of a pager according to the embodiment 9-2.

Although the embodiments 9-1 and 9-2 are separate embodiments in the foregoing description, if the portrait table shown in FIG. 105 and the portrait table shown in FIG. 108 are stored in the ROM 19, the corresponding portraits may be read out from the two tables in accordance with the received ringing signal and message data and may be alternately displayed. Although two portraits are alternately displayed in this embodiment, the portrait may be displayed as a still picture or a still picture and a dynamic picture may be alternately switched on the display section. Further, three or more portraits may be switched from one to another on the display section.

This invention is not limited to the embodiment 1-1 to the embodiment 9-1, but may be modified in various other forms without departing from the scope of the invention.

For example, while a portrait is mainly used as an image in the above-described embodiments, other images as exemplified in FIG. 53 may be used as needed.

In the foregoing embodiments, a plurality types of standard format designating codes such as the standard message designating code "*4*4", the portrait designating code "*5*5" are used. One standard format designating code may be used for a plurality types of messages. For example, a designating code "*0*0" may be used for designating both portraits and standard messages. In this case, the code following the standard format designating code is used for designating the portrait and standard message. For example, the message data "*0*001" may indicate the standard message "URGENT" in the standard message table shown in FIG. 3, and the message data "*0*021" may indicate the portrait of woman whose code is "21" in the portrait table shown in FIG. 4.

Although the operation of the pager discussed in the foregoing description is mainly centered on the reception operation, image data such as a portrait is displayed when the received message data, temporarily stored in the RAM 20, is read therefrom.

A free message may be used in the embodiment 1-1 to the embodiment 9-1.

If the display section 24 has a dot matrix structure and the input section 23 is equipped with an input operational terminal such as a pen input device, the pager 4 can display any illustration created by the pen instead of displaying a patterned image. Further, a plurality of arbitrary illustrations may be switched from one to another when displayed.

Figure 110:
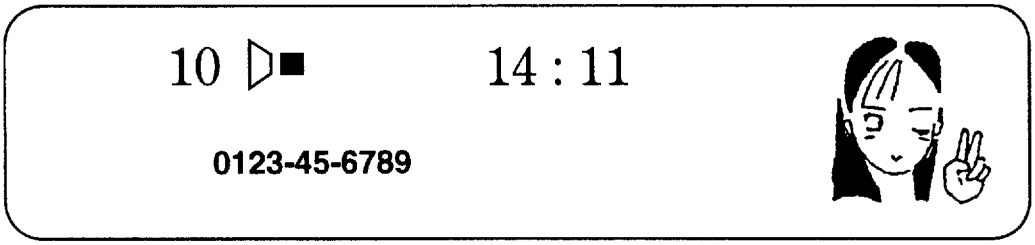
FIG. 110 is a diagram showing a display example for a numeric pager.

Although an information pager capable of displaying characters has been discussed in the foregoing description of the 1-1 to 9-2 embodiments, the pager is not limited to this particular type but the same reception process can also be performed for a numeric pager capable of displaying only numerals. In this case, standard message format data can be used to designate a portrait. If message data "*5*5230123#245#26789" as a specific example has been received, the display process would be as shown in the display example in FIG. 110. That is, the portrait having the portrait code "23" is read from the portrait table in, for example, FIG. 4 in accordance with "*5*523" and is displayed together with the message "0123-24526789". It is to be noted that "#2" in the received message data represents "-".

This invention is not limited to a pager which uses a public telephone line, but may be adapted for various type of communication terminals having a radio communications function. In other words, this invention may be applied to teleterminal systems, digital portable telephone system, local area pagers which do not use a public telephone line, toys with a communications function to communicate in the form of infrared rays or the like, personal computers, electronic organizers and other electronic computers, which have a communications capability.

What is claimed is:

1. A communication terminal comprising:

a receiving section (11 to 13 and 15) for receiving an image designating code;

a display (24) for displaying an image;

an image storage section (19, 20 and 25) for storing a plurality of images; and display control means (14) for reading an image corresponding to said image designating code, received by said receiving section (11 to 13 and 15), from said image storage section (19, 20 and 25), and displaying said image on said display (24), wherein said image storage section (19, 20 and 25) stores said plurality of images corresponding to the same image designating codes and image selection data for designating which image in said plurality of images is to be displayed in response to the same image designating codes; and wherein said display control means (14) reads said image designating code and said image from said image storage section in accordance with said image selection data to be displayed on said display (24).

2. A communication terminal comprising:

a receiving section (11 to 13 and 15) for receiving an image designating code;

a display (24) for displaying an image;

an image storage section (19, 20 and 25) for storing a plurality of images;

display control means (14) for reading an image corresponding to said image designating code, received by said receiving section (11 to 13 and 15), from said image storage section (19, 20 and 25), and displaying said image on said display (24); and image preparing means (14, 23) for preparing an image and storing said prepared image in said image storage section (25) in association with said image designating code.

3. A communication terminal comprising:

a receiving section (11 to 13 and 15) for receiving an image designating code;

a display (24) for displaying an image;

an image storage section (19, 20 and 25) for storing a plurality of images; and display control means (14) for reading an image corresponding to said image designating code, received by said receiving section (11 to 13 and 15), from said image storage section (19, 20 and 25), and displaying said image on said display (24), wherein:

said image is formed by a combination of patterns of a plurality of parts;

said image storage section (19, 20 and 25) stores said patterns of said plurality of parts and combination data defining combinations of said patterns of said plurality of parts in association with said image designating code; and said display control means (14) displays said patterns of said plurality of parts based on said combination data associated with said received image designating code on said display means (24).

4. A communication terminal comprising:

an image storage section (19) for storing a basic pattern and patterns of individual parts;

a receiving section (11 to 13 and 15) for receiving a first designating code for designating said basic pattern and an image designating code including a second designating code for designating a pattern of a part of said basic pattern to be changed;

a display (24) for displaying an image; and display control means (14) for controlling said display (24) in accordance with said image designating code received by said receiving section (11 to 13 and 15), wherein:

said image storage section (19) stores said basic pattern and patterns of individual parts; and said display control means (14) includes:

means for reading said basic pattern from said image storage section (19) in accordance with said first designating code received by said receiving section (11 to 13 and 15), and reading said pattern of said part to be changed from said image storage section (19) in accordance with said second designating code received by said receiving section (11 to 13 and 15), thereby changing said basic pattern; and means for switchingly displaying said basic pattern and said changed basic pattern on said display (24).

5. A communication terminal comprising:

an image storage section (19) for storing patterns of individual parts constituting a basic pattern;

a receiving section (11 to 13 and 15) for receiving a first designating code for designating said basic pattern and an image designating code including a second designating code for designating a pattern of a part of said basic pattern to be changed;

a display (24) for displaying an image; and display control means (14) for controlling said display (24) in accordance with said image designating code received by said receiving section (11 to 13 and 15), and wherein said display control means (14) includes:

means for reading said basic pattern from said image storage section (19) to form a basic pattern in accordance with said first designating code received by said receiving section (11 to 13 and 15), and reading said pattern of said part to be changed from said image storage section (19) in accordance with said second designating code received by said receiving section (11 to 13 and 15), thereby changing said basic pattern; and means for switchingly displaying said basic pattern and said changed basic pattern on said display (24).

6. A communication terminal comprising:

a receiving section (11 to 13 and 15) for receiving a message;

a keyword detector for detecting whether the message received by said receiving section includes a predetermined keyword or not;

an image storage section (19) which stores an image for a group of a plurality of keywords;

a display (24) for displaying an image; and display control means (14) for reading an image corresponding to the detected keyword from said image storage section when said keyword detector detects said keyword in the received message, and displaying the read image and the received message on said display (24).

7. A communication terminal comprising:

a receiving section (11 to 13 and 15) for receiving a message;

a keyword detector for detecting whether the message received by said receiving section includes a predetermined keyword or not;

an image storage section (19);

a display (24) for displaying an image; and display control means (14) for reading an image corresponding to the detected keyword from said image storage section when said keyword detector detects said keyword in the received message, and displaying the read image and the received message on said display (24);

wherein when said message includes a plurality of keywords, said display control means (14) displays associated images on said display (24) with a predetermined priority.

8. A communication terminal comprising:

a receiving section (11 to 13 and 15) for receiving a message, a keyword detector for detecting whether the message received by said receiving section includes a predetermined keyword or not;

an image storage section (19);

a display (24) for displaying an image; and display control means (14) for reading an image corresponding to the detected keyword from said image storage section when said keyword detector detects said keyword in the received message, and displaying the read image and the received message on said display (24);

wherein:

said image storage section stores a plurality of images corresponding to the detected keyword; and said display control means reads the plural images corresponding to the detected keyword from said image storage section when said keyword detector detects said keyword in the received message, and sequentially displays, on said display, the read images while being changed.

9. A communication terminal comprising:

a receiving section (11 to 13 and 15) for receiving an image designating code, a display (24) for displaying an image;

an image storage section (19, 20 and 25) for storing a plurality of images;

display control means (14) for reading an image corresponding to said image designating code, received by said receiving section (11 to 13 and 15), from said image storage section (19, 20 and 25), and displaying said image on said display (24); and selection/preparation means (23, 14) for selecting or preparing an image to be displayed on a destination communication terminal, based on an image stored in said image storage section (19, 25), wherein said display control means (14) includes means (14) responsive to an operation of said selection/preparation means (23, 14) to convert said selected or prepared image to a sequence of codes to be transmitted to be displayed on said destination communication terminal and displaying said converted sequence of codes on said display (24).

10. The communication terminal according to claim 9, wherein:

said selection/preparation means (23, 14) includes means for selecting or preparing a message to be displayed on said destination communication terminal; and said display control means (14) further includes means responsive to a selection/preparation operation of said selection/preparation means (23, 14) to convert said selected or prepared message to a sequence of codes to be transmitted to be displayed on said destination communication terminal and displaying said converted sequence of codes, together with said sequence of codes converted from said image, on said display (24).

11. A communication terminal comprising:

a receiving section (11 to 13 and 15) for receiving an image designating code;

a display (24) for displaying an image;

an image storage section (19, 20 and 25) for storing a plurality of images;

display control means (14) for reading an image corresponding to said image designating code, received by said receiving section (11 to 13 and 15), from said image storage section (19, 20 and 25), and displaying said image on said display (24);

selection/preparation means (23, 14) for selecting or preparing an image to be displayed on a destination communication terminal, based on an image stored in said image storage section (19, 25); and a transmission section (21, 22, 27 and 26) which is responsive to an operation of said selection/preparation means (23, 14) for converting said selected or prepared image to a sequence of codes to be transmitted to be displayed on said destination communication terminal and transmitting said converted sequence of codes.

12. The communication terminal according to claim 11, wherein:

said selection/preparation means includes means for preparing a message to be displayed on said destination communication terminal; and said transmission section includes means responsive to a selection/preparation operation of said selection/preparation means for converting said prepared message to a sequence of codes to be transmitted to be displayed on said destination communication terminal and transmitting said converted sequence of codes together with said sequence of codes converted from said image.

13. A communication system comprising:

an input section (1, 7 and 8) for inputting a message including at least one of characters, numerals and symbols;

a communication terminal (4, 9) for receiving a signal transmitted from a transmission section (3, 5 and 6), determining if said signal is directed to said communication terminal itself, and obtaining and displaying said message when determining that said signal is directed to said communication terminal itself;

said input section (1, 7 and 8) inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24);

wherein:

said image is formed by a combination of patterns of a plurality of parts;

said input section (1, 7 and 8) inputs a message including an image designating code for defining said combination of patterns;

said image storage section (19, 20 and 25) stores said patterns of said plurality of parts and combination data indicating combinations of patterns of a plurality of parts corresponding to said image designating code; and said display control means (14) displays patterns of a plurality of parts combined based on said combination data corresponding to said received image designating code on said display (24).

14. A communication system comprising:

an input section (1, 7 and 8) for inputting a message including at least one of characters, numerals and symbols;

a transmission section (3, 5 and 6) for converting said message, input through said input section (1, 7 and 8), to a signal of a predetermined format and transmitting said signal; and a communication terminal (4, 9) for receiving said signal transmitted from said transmission section (3, 5 and 6), determining if said signal is directed to said communication terminal itself, and obtaining and displaying said message when determining that said signal is directed to said communication terminal itself;

said input section (1, 7 and 8) inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24), wherein:

said image storage section (19, 25) stores a plurality of images in association with image designating codes;

said input section (1, 7 and 8) inputs a message including an image designating code for designating said plurality of images; and said display control means (14) reads a plurality of images associated with said image designating code received by said receiving section (11 to 13 and 15) from said image storage section (19, 5) and sequentially displays said images on said display (24).

15. A communication system comprising:

an input section (1, 7 and 8) for inputting a message including at least one of characters, numerals and symbols;

a transmission section (3, 5 and 6) for converting said message, input through said input section (1, 7 and 8), to a signal of a predetermined format and transmitting said signal; and a communication terminal (4, 9) for receiving said signal transmitted from said transmission section (3, 5 and 6), determining if said signal is directed to said communication terminal itself, and obtaining and displaying said message when determining that said signal is directed to said communication terminal itself;

said input section (1, 7 and 8) inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24), and wherein:

said image designating code comprises a first designating code for designating a basic pattern and a second designating code for designating a pattern of a part of said basic pattern to be changed;

said input section (1, 7 and 8) inputs a message including said first designating code and said second designating code;

said image storage section (19) stores said basic pattern and patterns of individual parts; and said display control means (14) includes:

means for reading said basic pattern from said image storage section (19) in accordance with said first designating code received by said receiving section (11 to 13 and 15), reading said pattern of said part to be changed from said image storage section (19) in accordance with said second designating code received by said receiving section (11 to 13 and 15), and changing said basic pattern; and means for switchingly displaying said basic pattern and said changed basic pattern on said display (24).

16. A communication system comprising:

an input section (1, 7 and 8) for inputting a message including at least one of characters, numerals and symbols;

a transmission section (3, 5 and 6) for converting said message, input through said input section (1, 7 and 8), to a signal of a predetermined format and transmitting said signal; and a communication terminal (4, 9) for receiving said signal transmitted from said transmission section (3, 5 and 6), determining if said signal is directed to said communication terminal itself, and obtaining and displaying said message when determining that said signal is directed to said communication terminal itself;

said input section (1, 7 and 8) inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24), wherein:

said image designating code comprises a first designating code for designating a basic pattern and a second designating code for designating a pattern of a part of said basic pattern to be changed;

said input section (1, 7 and 8) inputs said first designating code and said second designating code;

said image storage section (19) stores a plurality of patterns of individual parts constituting an image; and said display control means (14) includes:

means for reading patterns of a plurality of parts from said image storage section (19) to form a basic pattern in accordance with said first designating code received by said receiving section (11 to 13 and 15), reading said pattern of said part to be changed from said image storage section (19) in accordance with said second designating code received by said receiving section (11 to 13 and 15), and changing said basic pattern; and means for switchingly displaying said basic pattern and said changed basic pattern on said display (24).

17. A communication system comprising:

an input section (1, 7 and 8) for inputting a message including at least one of characters, numerals and symbols;

a transmission section (3, 5 and 6) for converting said message, input through said input section (1, 7 and 8), to a signal of a predetermined format and transmitting said signal; and a communication terminal (4, 9) for receiving said signal transmitted from said transmission section (3, 5 and 6), determining if said signal is directed to said communication terminal itself, and obtaining and displaying said message when determining that said signal is directed to said communication terminal itself;

said input section (1, 7 and 8) inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24), wherein:

said communication terminal (4) further includes selection/preparation means (14, 23) for selecting or preparing an image to be displayed on a destination communication terminal (9), based on an image stored in said image storage section (19, 25); and said display control means (14) includes means responsive to an operation of said selection/preparation means (14, 23) to convert said selected or prepared image to a sequence of codes to be transmitted to be displayed on said destination communication terminal (9) and displaying said converted sequence of codes on said display (24).

18. A communication system comprising:

an input section (1, 7 and 8) for inputting a message including at least one of characters, numerals and symbols;

a transmission section (3, 5 and 6) for converting said message, input through said input section (1, 7 and 8), to a signal of a predetermined format and transmitting said signal; and a communication terminal (4, 9) for receiving said signal transmitted from said transmission section (3, 5 and 6), determining if said signal is directed to said communication terminal itself, and obtaining and displaying said message when determining that said signal is directed to said communication terminal itself;

said input section (1, 7 and 8) including means for inputting a message including an image designating code for designating a display image;

said communication terminal (4, 9) including:

a receiving section (11 to 13 and 15) for receiving said message and said image designating code;

a display (24) for displaying an image;

an image storage section (19, 20 and 25) for storing a plurality of images; and display control means (14) for selecting an image corresponding to said image designating code, received by said receiving section (11 to 13 and 15), from said plurality of images stored in said image storage section (19, 20 and 25), based on said image designating code, and displaying said image on said display (24), wherein said communication terminal (4) further includes:

selection/preparation means (14, 23) for selecting or preparing an image to be displayed on a destination communication terminal (9), based on an image stored in said image storage section (19, 25); and a transmission section (21, 22, 27 and 26) responsive to an operation of said selection/preparation means (14, 23) to convert said selected or prepared image to a sequence of codes to be transmitted to be displayed on said destination communication terminal (9) and transmitting said converted sequence of codes.

* * * * *